(12) United States Patent
Vorbach et al.

(10) Patent No.: US 9,170,812 B2
(45) Date of Patent: Oct. 27, 2015

(54) DATA PROCESSING SYSTEM HAVING INTEGRATED PIPELINED ARRAY DATA PROCESSOR

(71) Applicant: PACT XPP TECHNOLOGIES AG, Munich (DE)

(72) Inventors: Martin Vorbach, Lingenfeld (DE); Jürgen Becker, Wörth (DE); Markus Weinhardt, Munich (DE); Volker Baumgarte, Munich (DE); Frank May, Munich (DE)

(73) Assignee: PACT XPP TECHNOLOGIES AG, Munich (DE)

( * ) Notice: Subject to any disclaimer, the term of this patent is extended or adjusted under 35 U.S.C. 154(b) by 0 days.

(21) Appl. No.: 14/572,643

(22) Filed: Dec. 16, 2014

(65) Prior Publication Data

US 2015/0106596 A1    Apr. 16, 2015

Related U.S. Application Data

(63) Continuation-in-part of application No. 12/570,943, filed on Sep. 30, 2009, now Pat. No. 8,914,590, which is a continuation of application No. 10/523,764, filed (Continued)

(30) Foreign Application Priority Data

| Mar. 21, 2002 | (DE) | 102 12 621 |
|---|---|---|
| Mar. 21, 2002 | (DE) | 102 12 622 |
| May 2, 2002 | (DE) | 102 19 681 |
| May 2, 2002 | (EP) | 02009868 |
| Jun. 12, 2002 | (DE) | 102 26 186 |
| Jun. 20, 2002 | (DE) | 102 27 650 |
| Jun. 20, 2002 | (WO) | PCT/EP02/06865 |
| Aug. 7, 2002 | (DE) | 102 36 269 |
| Aug. 7, 2002 | (DE) | 102 36 271 |
| Aug. 7, 2002 | (DE) | 102 36 272 |
| Aug. 16, 2002 | (WO) | PCT/EP02/10065 |
| Aug. 21, 2002 | (DE) | 102 38 172 |
| Aug. 21, 2002 | (DE) | 102 38 173 |
| Aug. 21, 2002 | (DE) | 102 38 174 |
| Aug. 27, 2002 | (DE) | 102 40 000 |
| Aug. 27, 2002 | (DE) | 102 40 022 |
| Sep. 3, 2002 | (WO) | PCT/DE02/03278 |
| Sep. 6, 2002 | (DE) | 102 41 812 |
| Sep. 9, 2002 | (WO) | PCT/EP2002/10084 |
| Sep. 18, 2002 | (DE) | 102 43 322 |
| Sep. 18, 2002 | (WO) | PCT/EP02/10464 |
| Sep. 18, 2002 | (WO) | PCT/EP02/10479 |
| Sep. 19, 2002 | (WO) | PCT/EP02/10536 |
| Sep. 19, 2002 | (WO) | PCT/EP02/10572 |
| Oct. 10, 2002 | (EP) | 02022692 |
| Dec. 6, 2002 | (EP) | 02027277 |
| Jan. 7, 2003 | (DE) | 103 00 380 |
| Jan. 20, 2003 | (WO) | PCT/DE03/00152 |
| Jan. 20, 2003 | (WO) | PCT/DE03/00624 |
| Feb. 18, 2003 | (WO) | PCT/DE03/00489 |
| Mar. 6, 2003 | (DE) | 103 10 195 |
| Apr. 4, 2003 | (DE) | 103 15 295 |
| Apr. 30, 2003 | (EP) | 03009906 |
| May 15, 2003 | (DE) | 103 21 834 |
| Jun. 17, 2003 | (EP) | 03013694 |
| Jul. 2, 2003 | (EP) | 03015015 |

(51) Int. Cl.

| G06F 12/00 | (2006.01) |
|---|---|
| G06F 9/30 | (2006.01) |
| G06F 12/08 | (2006.01) |
| G06F 15/78 | (2006.01) |
| G06F 9/345 | (2006.01) |
| G06F 9/38 | (2006.01) |

(52) U.S. Cl.
CPC .......... *G06F 9/3001* (2013.01); *G06F 9/30047* (2013.01); *G06F 9/30076* (2013.01); *G06F 9/3455* (2013.01); *G06F 9/3897* (2013.01); *G06F 12/0862* (2013.01); *G06F 12/0875* (2013.01); *G06F 15/7814* (2013.01); *G06F 2212/452* (2013.01)

(58) Field of Classification Search
CPC . G06F 12/08; G06F 12/0802; G06F 12/0811; G06F 12/0897
USPC .......... 711/100, 117, 118, 137, 143, 154, 166
See application file for complete search history.

*Primary Examiner* — Tuan Thai
(74) *Attorney, Agent, or Firm* — Edward P. Heller III

(57) ABSTRACT

A data processing system having a data processing core and integrated pipelined array data processor and a buffer for storing list of algorithms for processing by the pipelined array data processor.

18 Claims, 95 Drawing Sheets

Related U.S. Application Data as application No. PCT/EP03/08080 on Jul. 24, 2003, now Pat. No. 8,156,284, application No. 14/572,643, which is a continuation-in-part of application No. 14/540,782, filed on Nov. 13, 2014, which is a continuation of application No. 12/729,090, filed on Mar. 22, 2010, now abandoned, which is a continuation of application No. 10/508,559, filed as application No. PCT/DE03/00942 on Mar. 21, 2003, now abandoned, application No. 14/572,643, which is a continuation-in-part of application No. 10/551,891, filed as application No. PCT/EP2004/003603 on Apr. 5, 2004.

(56) References Cited

U.S. PATENT DOCUMENTS

| | | |
|---|---|---|
| 347,316 A | 10/1969 | Wahlstrom et al. |
| 353,166 A | 9/1970 | Spandorfer et al. |
| 4,020,469 A | 4/1977 | Manning |
| 4,412,303 A | 10/1983 | Barnes et al. |
| 4,454,578 A | 6/1984 | Matsumoto et al. |
| 4,539,637 A | 9/1985 | DeBruler |
| 4,577,293 A * | 3/1986 | Matick et al. ............ 365/189.04 |
| 4,642,487 A | 2/1987 | Carter |
| 4,700,187 A | 10/1987 | Furtek |
| 4,706,216 A | 11/1987 | Carter |
| 4,722,084 A | 1/1988 | Morton |
| 4,724,307 A | 2/1988 | Dutton et al. |
| 4,748,580 A | 5/1988 | Ashton et al. |
| 4,758,985 A | 7/1988 | Carter |
| 4,768,196 A | 8/1988 | Jou et al. |
| 4,786,904 A | 11/1988 | Graham, III et al. |
| 4,791,603 A | 12/1988 | Henry |
| 4,837,735 A | 6/1989 | Allen, Jr. et al. |
| 4,862,407 A | 8/1989 | Fette et al. |
| 4,918,440 A | 4/1990 | Furtek |
| 4,959,781 A | 9/1990 | Rubinstein et al. |
| 5,036,473 A | 7/1991 | Butts et al. |
| 5,055,997 A | 10/1991 | Sluijter et al. |
| 5,070,475 A | 12/1991 | Normoyle et al. |
| 5,081,575 A | 1/1992 | Hiller et al. |
| 5,103,311 A | 4/1992 | Sluijter et al. |
| 5,113,498 A | 5/1992 | Evan et al. |
| 5,119,499 A | 6/1992 | Tonomura et al. |
| 5,123,109 A | 6/1992 | Hillis |
| 5,144,166 A | 9/1992 | Camarota et al. |
| 5,197,016 A | 3/1993 | Sugimoto et al. |
| 5,212,777 A | 5/1993 | Gove et al. |
| 5,243,238 A | 9/1993 | Kean |
| 5,245,227 A | 9/1993 | Furtek et al. |
| RE34,444 E | 11/1993 | Kaplinsky |
| 5,261,113 A | 11/1993 | Jouppi |
| 5,287,511 A | 2/1994 | Robinson et al. |
| 5,296,759 A | 3/1994 | Sutherland et al. |
| 5,298,805 A | 3/1994 | Garverick et al. |
| 5,336,950 A | 8/1994 | Popli et al. |
| 5,355,508 A | 10/1994 | Kan |
| 5,357,152 A | 10/1994 | Jennings, III et al. |
| 5,361,373 A | 11/1994 | Gilson |
| 5,386,154 A | 1/1995 | Goetting et al. |
| 5,386,518 A | 1/1995 | Reagle et al. |
| 5,394,030 A | 2/1995 | Jennings, III et al. |
| 5,408,129 A | 4/1995 | Farmwald et al. |
| 5,410,723 A | 4/1995 | Schmidt et al. |
| 5,412,795 A | 5/1995 | Larson |
| 5,421,019 A | 5/1995 | Holsztynski et al. |
| 5,426,378 A | 6/1995 | Ong |
| 5,430,885 A | 7/1995 | Kaneko et al. |
| 5,440,711 A | 8/1995 | Sugimoto |
| 5,448,496 A | 9/1995 | Butts et al. |
| 5,469,003 A | 11/1995 | Kean |
| 5,488,582 A | 1/1996 | Camarota |
| 5,500,609 A | 3/1996 | Kean |
| 5,504,439 A | 4/1996 | Tavana |
| 5,525,971 A | 6/1996 | Flynn |
| 5,572,680 A | 11/1996 | Ikeda et al. |
| 5,574,930 A | 11/1996 | Halverson, Jr. et al. |
| 5,581,778 A | 12/1996 | Chin et al. |
| 5,596,743 A | 1/1997 | Bhat et al. |
| 5,600,597 A | 2/1997 | Kean et al. |
| 5,608,342 A | 3/1997 | Trimberger |
| 5,619,720 A | 4/1997 | Garde et al. |
| 5,625,836 A | 4/1997 | Barker et al. |
| 5,631,578 A | 5/1997 | Clinton et al. |
| 5,635,851 A | 6/1997 | Tavana |
| 5,642,058 A | 6/1997 | Trimberger et al. |
| 5,646,544 A | 7/1997 | Iadanza |
| 5,646,546 A | 7/1997 | Bertolet et al. |
| 5,651,137 A | 7/1997 | MacWilliams et al. |
| 5,652,529 A | 7/1997 | Gould et al. |
| 5,656,950 A | 8/1997 | Duong et al. |
| 5,659,785 A | 8/1997 | Pechanek et al. |
| 5,671,432 A | 9/1997 | Bertolet et al. |
| 5,675,262 A | 10/1997 | Duong et al. |
| 5,675,777 A | 10/1997 | Glickman |
| 5,682,491 A | 10/1997 | Pechanek et al. |
| 5,685,004 A | 11/1997 | Bruce et al. |
| 5,687,325 A | 11/1997 | Chang |
| 5,696,976 A | 12/1997 | Nizar et al. |
| 5,701,091 A | 12/1997 | Kean |
| 5,705,938 A | 1/1998 | Kean |
| 5,715,476 A | 2/1998 | Kundu et al. |
| 5,721,921 A | 2/1998 | Kessler et al. |
| 5,734,869 A | 3/1998 | Chen |
| 5,742,180 A | 4/1998 | DeHon et al. |
| 5,748,979 A | 5/1998 | Trimberger |
| 5,752,035 A | 5/1998 | Trimberger |
| 5,761,484 A | 6/1998 | Agarwal et al. |
| 5,765,009 A | 6/1998 | Ishizaka |
| 5,774,704 A | 6/1998 | Williams |
| 5,778,439 A | 7/1998 | Trimberger et al. |
| 5,781,756 A | 7/1998 | Hung |
| 5,805,477 A | 9/1998 | Perner |
| 5,808,487 A | 9/1998 | Roy |
| 5,812,844 A | 9/1998 | Jones et al. |
| 5,815,004 A | 9/1998 | Trimberger et al. |
| 5,828,858 A | 10/1998 | Athanas et al. |
| 5,832,288 A | 11/1998 | Wong |
| 5,857,109 A | 1/1999 | Taylor |
| 5,892,962 A | 4/1999 | Cloutier |
| 5,893,165 A | 4/1999 | Ebrahim |
| 5,894,565 A | 4/1999 | Furtek et al. |
| 5,898,602 A | 4/1999 | Rothman et al. |
| 5,905,875 A | 5/1999 | Takahashi et al. |
| 5,913,925 A | 6/1999 | Kahle et al. |
| 5,915,123 A | 6/1999 | Mirsky et al. |
| 5,933,642 A | 8/1999 | Greenbaum et al. |
| 5,943,242 A | 8/1999 | Vorbach et al. |
| 5,956,518 A | 9/1999 | DeHon et al. |
| 5,966,534 A | 10/1999 | Cooke et al. |
| 5,978,583 A | 11/1999 | Ekanadham et al. |
| 5,978,830 A | 11/1999 | Nakaya et al. |
| 5,990,910 A | 11/1999 | Laksono et al. |
| 6,011,407 A | 1/2000 | New |
| 6,023,564 A | 2/2000 | Trimberger |
| 6,023,742 A | 2/2000 | Ebeling et al. |
| 6,034,542 A | 3/2000 | Ridgeway |
| 6,038,646 A | 3/2000 | Sproull |
| 6,049,859 A | 4/2000 | Gliese et al. |
| 6,052,773 A | 4/2000 | DeHon et al. |
| 6,058,465 A | 5/2000 | Nguyen |
| 6,075,935 A | 6/2000 | Ussery et al. |
| 6,076,157 A | 6/2000 | Borkenhagen et al. |
| 6,077,315 A | 6/2000 | Greenbaum et al. |
| 6,096,091 A | 8/2000 | Hartmann |
| 6,104,696 A | 8/2000 | Kadambi et al. |
| 6,108,737 A | 8/2000 | Sharma et al. |
| 6,119,219 A | 9/2000 | Webb et al. |
| 6,122,719 A | 9/2000 | Mirsky et al. |
| 6,122,720 A | 9/2000 | Cliff |
| 6,124,868 A | 9/2000 | Asaro et al. |
| 6,128,720 A | 10/2000 | Pechanek et al. |

| | | |
|---|---|---|
| 6,141,734 A | 10/2000 | Razdan et al. |
| 6,145,072 A | 11/2000 | Shams et al. |
| 6,148,407 A | 11/2000 | Aucsmith |
| 6,178,494 B1 | 1/2001 | Casselman |
| 6,209,020 B1 | 3/2001 | Angle et al. |
| 6,209,065 B1 | 3/2001 | Van Doren et al. |
| 6,215,326 B1 | 4/2001 | Jefferson et al. |
| 6,216,174 B1 | 4/2001 | Scott et al. |
| 6,219,833 B1 | 4/2001 | Solomon et al. |
| 6,226,717 B1 | 5/2001 | Reuter et al. |
| 6,237,059 B1 | 5/2001 | Dean et al. |
| 6,247,036 B1 | 6/2001 | Landers et al. |
| 6,263,406 B1 | 7/2001 | Uwano et al. |
| 6,286,090 B1 | 9/2001 | Steely, Jr. et al. |
| 6,289,369 B1 | 9/2001 | Sundaresan |
| 6,308,191 B1 | 10/2001 | Dujardin et al. |
| 6,314,484 B1 | 11/2001 | Zulian et al. |
| 6,321,296 B1 | 11/2001 | Pescatore |
| 6,321,298 B1 | 11/2001 | Hubis |
| 6,341,318 B1 | 1/2002 | Dakhil |
| 6,347,346 B1 | 2/2002 | Taylor |
| 6,374,286 B1 | 4/2002 | Gee et al. |
| 6,385,672 B1 | 5/2002 | Wang et al. |
| 6,405,185 B1 | 6/2002 | Pechanek et al. |
| 6,421,757 B1 | 7/2002 | Wang et al. |
| 6,425,068 B1 | 7/2002 | Vorbach et al. |
| 6,457,100 B1 | 9/2002 | Ignatowski et al. |
| 6,467,009 B1 | 10/2002 | Winegarden et al. |
| 6,501,999 B1 | 12/2002 | Cai |
| 6,522,167 B1 | 2/2003 | Ansari et al. |
| 6,526,430 B1 | 2/2003 | Hung et al. |
| 6,526,461 B1 | 2/2003 | Cliff |
| 6,538,470 B1 | 3/2003 | Langhammer et al. |
| 6,539,438 B1 | 3/2003 | Ledzius et al. |
| 6,571,322 B2 | 5/2003 | Arimilli et al. |
| 6,587,939 B1 | 7/2003 | Takano |
| 6,633,181 B1 | 10/2003 | Rupp |
| 6,658,564 B1 | 12/2003 | Smith et al. |
| 6,665,758 B1 | 12/2003 | Frazier et al. |
| 6,708,325 B2 | 3/2004 | Cooke et al. |
| 6,757,892 B1 | 6/2004 | Gokhale et al. |
| 6,795,939 B2 | 9/2004 | Harris et al. |
| 6,799,265 B1 | 9/2004 | Dakhil |
| 6,865,662 B2 | 3/2005 | Wang |
| 6,871,341 B1 | 3/2005 | Shyr |
| 6,925,641 B1 | 8/2005 | Elabd |
| 7,000,161 B1 | 2/2006 | Allen et al. |
| 7,036,106 B1 | 4/2006 | Wang et al. |
| 7,188,234 B2 * | 3/2007 | Wu et al. ............... 712/225 |
| 7,210,129 B2 | 4/2007 | May et al. |
| 7,266,725 B2 | 9/2007 | Vorbach et al. |
| 7,340,596 B1 | 3/2008 | Crosland et al. |
| 7,581,076 B2 | 8/2009 | Vorbach |
| 7,924,837 B1 | 4/2011 | Shabtay et al. |
| 7,928,763 B2 | 4/2011 | Vorbach |
| 7,933,838 B2 | 4/2011 | Ye |
| 8,156,284 B2 | 4/2012 | Vorbach et al. |
| 2001/0003834 A1 | 6/2001 | Shimonishi |
| 2001/0032305 A1 | 10/2001 | Barry |
| 2002/0004916 A1 | 1/2002 | Marchand et al. |
| 2002/0010840 A1 | 1/2002 | Barroso et al. |
| 2002/0145545 A1 | 10/2002 | Brown |
| 2003/0014743 A1 | 1/2003 | Cooke et al. |
| 2003/0033514 A1 | 2/2003 | Appleby-Allis et al. |
| 2003/0046530 A1 | 3/2003 | Poznanovic |
| 2003/0101307 A1 | 5/2003 | Gemelli et al. |
| 2003/0120904 A1 | 6/2003 | Sudharsanan et al. |
| 2004/0093186 A1 | 5/2004 | Ebert et al. |
| 2005/0080994 A1 * | 4/2005 | Cohen et al. ............... 711/118 |
| 2005/0257179 A1 | 11/2005 | Stauffer et al. |
| 2006/0036988 A1 | 2/2006 | Allen et al. |
| 2006/0095716 A1 | 5/2006 | Ramesh |
| 2006/0259744 A1 | 11/2006 | Matthes |
| 2007/0043965 A1 * | 2/2007 | Mandelblat et al. ......... 713/324 |
| 2007/0143577 A1 | 6/2007 | Smith |
| 2007/0143578 A1 | 6/2007 | Horton et al. |
| 2010/0153654 A1 | 6/2010 | Vorbach et al. |
| 2011/0060942 A1 | 3/2011 | Vorbach |
| 2011/0145547 A1 | 6/2011 | Vorbach |
| 2012/0017066 A1 | 1/2012 | Vorbach et al. |
| 2014/0297914 A1 | 10/2014 | Vorbach Martin |
| 2014/0297948 A1 | 10/2014 | Vorbach et al. |

FOREIGN PATENT DOCUMENTS

| | | |
|---|---|---|
| DE | 4416881 A1 | 11/1994 |
| WO | WO9525306 | 9/1995 |
| WO | WO9528671 | 10/1995 |

OTHER PUBLICATIONS

Katherine Compton, Scott Hauck, Reconfigurable computing: a survey of systems and software, ACM Computing Surveys (CSUR), v.34 n. 2, p. 171-210, Jun. 2002.

File History of U.S. Appl. No. 08/388,230.

File History of U.S. Appl. No. 60/010,317.

File History of U.S. Appl. No. 60/022,131.

Chan, Pak K. , "A Field-Programmable Prototyping Board: XC4000 BORG User's Guide", University of California, Santa Cruz (Apr. 1994).

Schewel, John , "A Hardware/Software Co-Design System Using Configurable Computing Technology".

Hartenstein, Reiner W. et al. , "A New FPGA Architecture for Word-Oriented Datapaths", Lecture Notes in Computer Science, vol. 849 (1994).

Knittel, Guntar , "A PCI-Compatible FPGA-Coprocessor for 2D/3D Image Processing", IEEE 1996.

Schue, Rick , "A Simple DRAM Controller for 25/16 MHz i960® CA/CF Microprocessors", Intel Corporation, Application Note AP•704 (Feb. 20, 1995).

Alfke, Peter and New, Bernie , "Additional XC3000 Data", Xilinx, Inc., Xilinx Application Note, XAPP024.000 (1994).

Altera Corporation , "Altera 1996 Data Book", Altera Corporation (Jun. 1996).

Altera Corporation , "Altera Applications Handbook", Altera Corporation (Apr. 1992).

Electronic Engineering , "Altera puts memory into its FLEX PLDs", Electronic Engineering Times, Issue 840, Mar. 20, 1995.

ARM , "AABA: Advanced Microcontroller Bus Architecture Specification", Advanced RISC Machines, Ltd., Document No. ARM IHI 0001C, Sep. 1995.

Margolus, Norman , "An FPGA architecture for DRAM-based systolic computations", The 5th Annual IEEE Symposium on Field-Programmable Custom Computing Machines (Apr. 16, 1997).

Krishnamohan, K. , "Applying Rambus Technology to Desktop Computer Main Memory Subsystems, Version 1.0", Rambus Inc. (Mar. 1992).

New, Bernie , "Boundary-Scan Emulator for XC3000", Xilinx, Inc. ,Xilinx Application Note, XAPP007.001 (1994).

New, Bernie , "Bus-Structured Serial Input/Output Device", Xilinx Application Note, XAPP010.001 (1994).

Berkeley Design Technology Group , "Buyer's Guide to DSP Processors", Berkeley Design Technology Group (1995).

Algotronix, Ltd. , "CAL 4096 Datasheet", Algotronix, Ltd. (1992).

Algotronix, Ltd. , "CAL 64K Datasheet", Algotronix, Ltd. (Apr. 6, 1989).

Algotronix, Ltd. , "CHS2x4 User Manual", Algotronix, Ltd. (1991).

Altera Corporation , "ClockLock & ClockBoost Circuitry for High-Density PLDS", The Altera Advantage News & Views, Newsletter for Altera Customers, Third Quarter, Aug. 1996.

Altera Corporation , "Configuring FLEX 10K Devices", Altera Corporation, Dec. 1995, ver. 1, Application Note 59.

Schmidt, Ulrich, and Knut, Cesar, "Datawave: A Single-Chip Multiprocessor for Video Applications", IEEE Micro (1991).

Electronic Design, "Embedded Configurable Memory and Logic Boost FPGA Functionality", Electronic Design, vol. 43, No. 14, Jul. 10, 1995.

Xilinix, Inc., "Fully Compliant PCI Interface in an XC3164A-2 FPGA", Xilinx, Inc. Application Note (Jan. 1995).

Epstein, Dave, "IBM Extends DSP Performance with Mfast", Microprocessor Reports, vol. 9, No. 16 (Dec. 4, 1995).

IEEE, "IEEE Standard Test Access Port and Boundary-Scan Architecture", IEEE Std 1149.1 Approved Feb. 15, 1990.
Alfke, Peter and New, Bernie, "Implementing State Machines in LCA Devices", Xilinx, Inc., Xilinx Application Note, XAPP027.001 (1994).
Camilleri, Nick, and Lockhard, Chris, "Improving XC4000 Design Performance", Xilinx Application Note, XAPP043.000 (1994).
Intel Corporation, "Intel 82375EB/82375SB PCI-EISA Bridge (PCEB) Advance Information", Intel Corporation (Mar. 1996).
Wilkie, Bill, "Interfacing XC6200 to Microprocessors (MC68020 Example)", Xilinx Application Note, XAPP 063, v. 1.1 (Oct. 9, 1996).
Wilkie, Bill, "Interfacing XC6200 to Microprocessors (TMS320C50 Example)", Xilinx Application Note, XAPP064 (Oct. 9, 1996).
XCELL, "Introducing the XC6200 FPGA Architecture: The First FPGA Architecture Optimized for Coprocessing in Embedded System Applications", XCELL, Iss. 18, 3d Quarter, 1995.
Altera Corporation, "JTAG Boundary—Scan Testing in Altera Devices", Altera Corporation, Nov. 1995, ver. 3, Application Note 39.
Margolus, Norman, "Large-scale logic-array computation", Boston University Center for Computational Science, SPIE vol. 2914 (May 1996).
Alfke, Peter, "Megabit FIFO in Two Chips: One LCA Device and One DRAM", Xilinx Application Note, XAPP030.000 (1994).
del Corso, D. et al., "Microcomputer Buses and Links", Academic Press (1996).
Bakkes, P.J. and du Plessis, J.J., "Mixed Fixed and Reconfigurable Logic for Array Processing", IEEE (1996).
Altera Corporation, "PCI BUS Applications in Altera Devices", Altera Corporation, Apr. 1995, ver. 1, Application Note.
Altera Corporation, "PCI Bus Target Megafunction", Altera Corporation, Solution Brief 6, ver. 1, Nov. 1996.
Altera Corporation, "PCI Compliance of Altera Devices", Altera Corporation, May 1995, ver. 2, Application Brief 140.
SIG, "PCI Local Bus Specification", PCI Special Interest Group, Production Version, Revision 2.1 (Jun. 1, 1995).
Rambus Inc., "Rambus Architectural Overview", Rambus Inc. (1992).
Rambus Inc., "Rambus FPGA Proposal", Rambus Inc. (Jan. 4, 1994).
Rambus Inc., "Rambus Product Catalog", Rambus Inc. (1993).
Xilinx, Inc., "Series 6000 User Guide", Xilinx, Inc. (1997).
Cartier, Lois, "System Design with New XC4000EX I/O Features", Xilinx Application Note, XAPP056 (Feb. 21, 1996).
Xilinx, Inc., "Technical Data—XC5200 Logic Cell Array Family, Preliminary, v.1.0", Xilinx, Inc., (Apr. 1995).
Xilinx, Inc., "The Programmable Logic Data Book (1993)", Xilinx, Inc. (1993).
Xilinx, Inc., "The Programmable Logic Data Book (1994)", Xilinx, Inc. (1994).
Xilinx, Inc., "The Programmable Logic Data Book (1996)", Xilinx, Inc. (Jan. 1996).
Churcher, Stephen et al., "The XC6200 FastMap Processor Interface", FPL (Aug. 1995).
Texas Instruments Incorporated, "TMS320C80 (MVP) Parallel Processor User's Guide", Texas Instruments Incorporated (1995).
Texas Instruments Incorporated, "TMS320C8x System-Level Synopsis", Texas Instruments Incorporated (Sep. 1995).
Xilinx, Inc., "XC6200 Field Programmable Gate Arrays, Advance Product Specification, v. 1.0, Jun. 1, 1996", Xilinx, Inc. (Jun. 1, 1996).
Xilinx, Inc., "Xilinx XC6200 Field Programmable Gate Arrays, Product Specification, v.1.10, Apr. 24, 1997", Xilinx, Inc. (Apr. 24, 1997).
Altera Corporation, "Programmable Peripheral Interface Adapter a8255, Sep. 1996, ver. 1", Altera Corporation, Sep. 1996, ver. 1.
Altera Corporation, "Universal Asynchronous Receiver/Transmitter a16450, Sep. 1996, ver. 1", Altera Corporation, Sep. 1996, ver. 1.
Altera Corporation, "Asynchronous Communications Interface Adapter a6850, Sep. 1996, ver. 1", Altera Corporation, Sep. 1996, ver. 1.
Schmit, Herman et al., "Behavioral Synthesis for FPGA-based Computing", IEEE (1994).

Allaire, Bill and Knapp, Steve, "A Plug and Play Interface Using Xilinx FPGAs", Xilinx, Inc. (May 1995).
Goslin, Greg and Newgard, Bruce, "16-Tap, 8-Bit FIR Filter Applications Guide", Xilinx Application Note v. 1.01 (Nov. 21, 1994).
Veendrick, H., "A 1.5 GIPS Video Signal Processor (VSP)", IEEE 1994 Custom Integrated Circuits Conference (1994).
Yeung, Alfred K. and Rabaey, Jan M., "A 2.4GOPS Data-Driven Reconfigurable Multiprocessor IC for DSP", IEEE International Solid-State Circuits Conference (1995).
Duncan, Ann, "A 32×16 Reconfigurable Correlator for the XC6200", Xilinx Application Note, XAPP 084, v. 1.0 (Jul. 25, 1997).
Yeung, Kwok Wah, "A Data-Driven Multiprocessor Architecture for High Throughput Digital Signal Processing", U.C. Berkeley (Jul. 10, 1995).
Koren, Israel et al., "A Data-Driven VLSI Array for Arbitrary Algorithms", IEEE (1988).
Xilinx, Inc., "A Fast Constant Coefficient Multiplier", Xilinx, Inc., Xilinx Application Note, XAPP 082, v. 1.0 (Aug. 24, 1997).
Sutton, Roy A. et al., "A Multiprocessor DSP System Using PADDI -2", U.C. Berkeley (1998).
Chen, Dev C. and Rabaey, Jan M., "A Reconfigurable Multiprocessor IC for Rapid Prototyping of Algorithmic-Specific High-speed DSP Data Paths", IEEE Journal of Solid State Circuits (Dec. 1992).
Minnick, Robert, "A Survey of Microcellular Research", J. of the Association for Computing Machinery, vol. 14, No. 2 (Apr. 1967).
Trimberger, Steve et al., "A Time-Multiplexed FPGA", IEEE (1997).
New, Bernie, "Accelerating Loadable Counters in XC4000", Xilinx Application Note, XAPP 023.001 (1994).
Athanas, Peter, "An Adaptive Machine Architecture and Compiler for Dynamic Processor Reconfiguration", Brown University (May 1992).
Atmel Corporation, "Application Note AT6000 Series Configuration", Published in May 1993.
Agarwal, Anant et al., "APRIL: A Processor Architecture for Multiprocessing", IEEE (1990).
Allaire, Bill and Fischer, Bud, "Block Adaptive Filter", Xilinx Application Note, XAPP 055, v. 1.0 (Aug. 15, 1996).
Bittner, Jr., Ray A. et al., "Colt: An Experiment in Wormhole Run-Time Reconfiguration", Proc. of SPIE, vol. 2914 (Oct. 21, 1996).
New, Bernie, "Complex Digital Waveform Generator", Xilinx Application Note, XAPP 008.002 (1994).
Canadian Microelectronics Corp, "Field-Programmable Devices", 1994 Canadian Workshop on Field-Programmable Devices, Jun. 13-16, 1994, Kingston, Ontario.
Alfke, Peter, "Dynamic Reconfiguration", Xilinx Application Note, XAPP 093, v. 1.1 (Nov. 10, 1997).
S. Brown et al., Published by Kluwer Academic Publishers, "Field Programmable Gate Arrays", Atmel Corporation, 1992.
Atmel Corporation, "Field Programmable Gate Arrays, AT6000 Series", Atmel Corporation, 1993.
International Society for Optical Engineering, "Field Programmable Gate Arrays (FPGAs) for Fast Board Development and Reconfigurable Computing", International Society for Optical Engineering, vol. 2607, Oct. 25-26, 1995.
Trimberger, Stephen M., "Field-Programmable Gate Array Technology", Kluwer Academic Publishers (1994).
Hartenstein, Reiner Servit, Michal (Eds.), "Field-Programmable Logic—Architectures, Synthesis and Applications", 4th Intl Workshop on Field-Programmable Logic and Applications, FPL '94, Prague, Czech Republic, Sep. 7-9, 1994.
IEEE Computer Society, "FPGAs for Custom Computing Machines", FCCM '93, IEEE Computer Society, Apr. 5-7, 1993.
Cowie, Beth, "High Performance, Low Area, Interpolator Design for the XC6200", Xilinx Application Note, XAPP 081, v. 1.0 (May 7, 1997).
IEEE Computer Society Technical Committee on Computer Architecture, "IEEE Symposium on FPGAs for Custom Computing Machines", IEEE Computer Society Technical Committee on Computer Architecture, Apr. 19-21, 1995.
B. Schoner, C. Jones and J. Villasenor, "Issues in wireless video coding using run-time-reconfigurable FPGAs", Proceedings of the IEEE Symposium on FPGAs for Custom Computing Machines (Apr. 19, 1995).

Moore, Will and Luk, Wayne, "More FPGAs", Abingdon Ee&Cs Books (1994).
Fawcett, Bradly K., "New SRAM-Based FPGA Architectures Address New Applications", IEEE (Nov. 1995).
Department of Electrical and Computer Engineering, The University of Toronto, "Proceedings of the 4th Canadian Workshop on Field-Programmable Devices", Proceedings of the 4th Canadian Workshop on Field-Programmable Devices, Department of Electrical and Computer Engineering, The University of Toronto, May 13-14, 1996.
Chen, Devereaux C., "Programmable Arithmetic Devices for High Speed Digital Signal Processing", U.C. Berkeley (1992).
Vasell, Jasper, et al., "The Function Processor: A Data-Driven Processor Array for Irregular Computations", Future Generations Computer Systems, vol. 8, Issue 4 (Sep. 1992).
T. Korpiharju, J. Viitanen, H. Kiminkinen, J. Takala, K. Kaski, "TUTCA configurable logic cell array architecture", IEEE (1991).
New, Bernie, "Ultra-Fast Synchronous Counters", Xilinx Application Note, XAPP 014.001 (1994).
Bolotski, Michael, DeHon, André, and Knight, Thomas, "Unifying FPGAs and SIMD Arrays", 2nd International Workshop on Field-Programmable Gate Arrays, Feb. 13-15, 1994.
Knapp, Steven K., "Using Programmable Logic to Accelerate DSP Functions", Xilinx, Inc. (1995).
New, Bernie, "Using the Dedicated Carry Logic in XC4000", Xilinx Application Note, XAPP 013.001 (1994).
Iwanczuk, Roman, "Using the XC4000 RAM Capability", Xilinx Application Note, XAPP 031.000 (1994).
"IEEE Workshop on FPGAs for Custom Computing Machines", IEEE Computer Society Technical Committee on Computer Architecture, Apr. 10-13, 1994.
Nobuyuki Yamashita, et.al., "A 3.84 GIPS Integrated Memory Array Processor with 64 Processing Elements and a 2-Mb SRAM", IEEE Journal of Solid-State Circuits, vol. 29, Nov. 1994.
Athanas, Peter, "FUN with the XC6200, Presentation at Cornell University", Cornell University (Oct. 1996).
Achour, C., "A Multiprocessor Implementation of a Wavelet Transforms", Proceedings on the 4th Canadian Workshop on Field-Programmable Devices, May 13-14, 1996.
Electronic Engineering Times, "Altera ships 100,000-gate EPLD", Electronic Engineering Times, Issue 917, Sep. 2 20, 1996.
Altera Corporation, "Chipdata, Database Information for z1120a", Altera Corporation, Sep. 11, 2012.
Altera Corporation, "Embedded Programmable Logic Family Data Sheet", Altera Corporation, Jul. 1995, ver. 1.
Altera Corporation, "FLEX 10K 100, 000-Gate Embedded Array Programmable Logic Family", Altera Advantage News & Views, Newsletter for Altera Customers, Second Quarter, May 1995.
Altera Corporation, "Implementing Multipliers in FLEX 10K Devices", Altera Corporation, Mar. 1996, ver. 1, Application Note 53.
Intel 82375EB/82375SB PCI-EISA Bridge (PCEB) Advance Information, Xilinx Application Note, XAPP 063, v. 1.1 (Oct. 9, 1996).
Proceedings of the IEEE Symposium on FPGAs for Custom Computing Machines, IEEE Computer Society Technical Committee on Computer Architecture, Apr. 19, 1995.
Proceedings of the Parallel Systems Fair, The International Parallel Processing Symposium, IEEE Computer Society Technical Committee for Parallel Processing, Apr. 27, 1994.
Proceedings of the Workshop on Reconfigurable Architectures, 8th International Parallel Processing Symposium, IEEE Computer Society, Apr. 26, 1994.
The Programmable Logic Conference & Exhibit Proceedings, Electronic Engineering Times, Apr. 25-27, 1995.
Britton, Barry K. et al., "Optimized Reconfigurable Cell Array Architecture for High-Performance Field Programmable Gate Arrays", IEEE Custom Integrated Circuits Conference 1993.
Landers, George, "Special Purpose Processor Speeds up DSP Functions, Reconfigurable Arithmetic Datapath Device", Professional Program Proceedings, Electro Apr. 30-May 2, 1996.
Proceedings of the Third Workshop on Reconfigurable Architectures, at Sheraton Waikiki Hotel, Honolulu, Hawai, Apr. 15, 1996.
Proceedings of the Third Workshop on Reconfigurable Architectures, at Sheraton Waikiki Hotel, Honolulu, Hawaii, Apr. 15, 1996.
Atmel Corporation, "Configurable Logic Design and Application Book 1993-1994—PLD, PFGA, Gate Array", 1993.
Atmel Corporation, "Configurable Logic Design and Application Book 1994-1995—PLD, PFGA, Gate Array", 1994.
N. Wirth, "An Extension-Board with an FPGA for Experimental Circuit Design", ETH Zurich, Department Informatik, Jul. 1993.
F. Furtek et al. "Labyrinth: A Homogeneous Computational Medium", IEEE 1990 Custom Integrated Circuits Conference, 1990.
Altera Corporation, "Altera 1998 Data Book", Altera Corporation (Jan. 1998).
Altera Corporation, "FLEX 10K—Embedded Programmable Logic Family", Data Sheet, ver.3.13, Oct. 1998.
Altera Corporation, "Implementing RAM Functions in FLEX 10K Devices", Application Note 52, Ver. 1, Nov. 1995.
Altera Corporation, "Altera 1993 Data Book", Altera Corporation (Aug. 1993).
Altera Corporation, "Altera 1995 Data Book", Altera Corporation (Mar. 1995).
Altera Corporation, "User-Configurable Microprocessor Peripheral EPB1400", Rev. 1.0, 1987.
Altera Corporation, "EPB2001—Card Interface Chip for PS/2 Micro Channel", Data Sheet, Dec. 1989.
Altera Corporation, "FLEX 8000 Handbook", May 1994.
Goldberg D: "What Every Computer Scientist Should Know About Floating-Point Arithmetic", ACM Computing Surveys, ACM, New York, NY, US, US, vol. 23, No. 1, Mar. 1, 1991, pp. 5-48.
Hauser et al. "Garp: A MIPS Processor with a Reconfigurable Coprocessor", Apr. 1997, pp. 12-21.
Libo Huang et al: "A New Architecture for Multiple-Precision Floating-Point Multiply-Add Fused Unit Design" Computer Arithmetic, 2007. Arith '07. 18th IEEE Symposium on, IEEE, PI, Jun. 1, 2007, Seiten 69-76.
Manhwee Jo et al: "Implementation of floating-point operations for 3D graphics on a coarse-grained reconfigurable architecture" SOC Conference, 2007 IEEE International, IEEE, Piscataway, NJ, USA, Sep. 26, 2007, Seiten 127-130.
Mirsky E. et al., "Matrix: A Reconfigurable Computing Architecture with Configurable Instruction Distribution and Deployable Resources", 1996, IEEE, pp. 157-166.
Shirazi et al., "Quantitative analysis of floating point arithmetic on FPGA based custom computing machines," IEEE Symposium on FPGAs for Custom Computing Machines, I EEE Computer Society Press, Apr. 19-21, 1995, pp. 155-162.
Vermeulen et al., Silicon Debug of a Co-Processor Array for Video Applications, 2000, IEEExplore, 0/7695-0786-7/00, pp. 47-52, [retrieved on Feb. 1, 2015], retrieved from URL http://ieeexplore.ieee.org/stamp/stamp.jsp?tp=&arnumber=889558&tag=1>.

* cited by examiner

```
for(i=0; i<N; i=i+1) {
S:   a[i] = b[i] + 1;
S1:  c[i] = a[i] + 2;
}
```
$\delta^t{}_0$

FIG. 23

```
for(i=0; i<N; i=i+1) {
S:   a[i] = b[i] + 1;
S1:  b[i] = c[i] + 2;
}
```
$\delta^a{}_0$

FIG. 24

```
for(i=0; i<N; i=i+1) {
S:   a[i] = b[i] + 1;
S1:  a[i] = c[i] + 2;
}
```
$\delta^o{}_0$

FIG. 25

```
for(j=0; j<=N; j++)
    for(i=0; i<=N; i++)
    {
S1:     c[i][j] = 0;
        for(k=0; k<=N;k++)
S2:         c[i][j] = c[i][j] + a[i][k]*b[k][j];
    }
```
$\delta^t(=,=)$
$\delta^t(=,=,<)$

FIG. 26

```
for(i=0;i<=N;i++)
    for(j=0;j<=N;j++)
S:      a[i][j] = a[i][j+2] + b[i];
```
$\delta^a(0,2)$

FIG. 27

FIG. 38
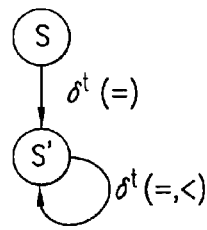
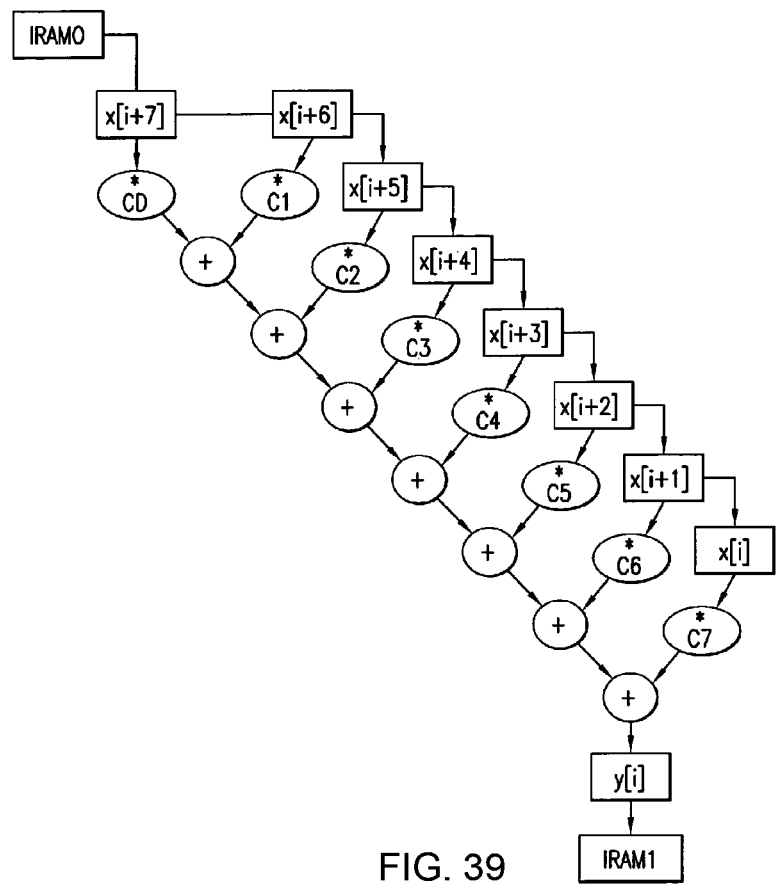
FIG. 39

FIG.41
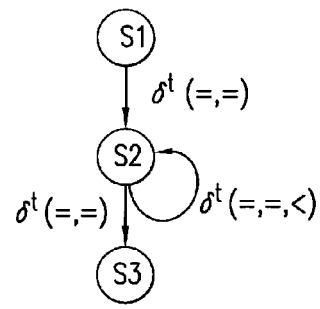
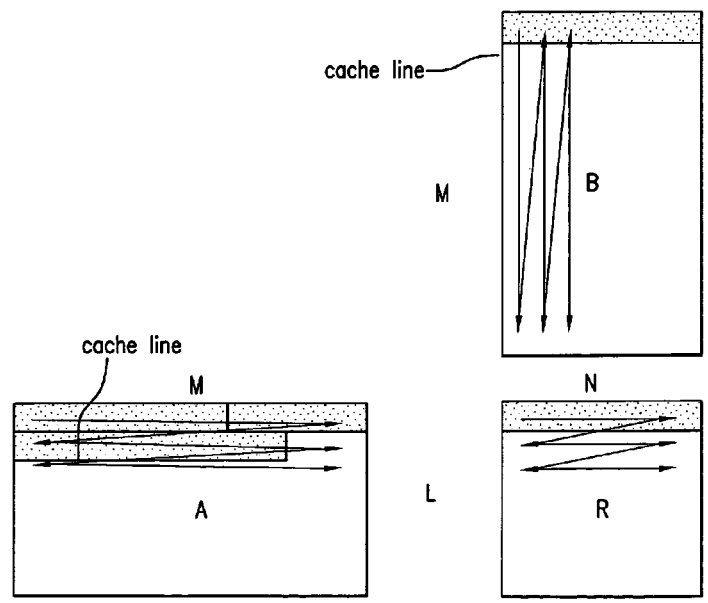
FIG. 42

```
// transform.c
..
for (n=0; n<block_count; n++) {
    idct(blocks[k*block_count+n]);  // block_count is 6 or 8 or 12
}
..

// idct.c
/* two dimensional inverse discreate cosine transform */
void idct(block)
short *block;
{
  int i;

for (i=0; i<8; i++)
      idctrow(block+8*i);

for (i=0; i<8; i++)
      idctcol(block+i);
}
```

(annotation: loop interchange)

FIG. 55

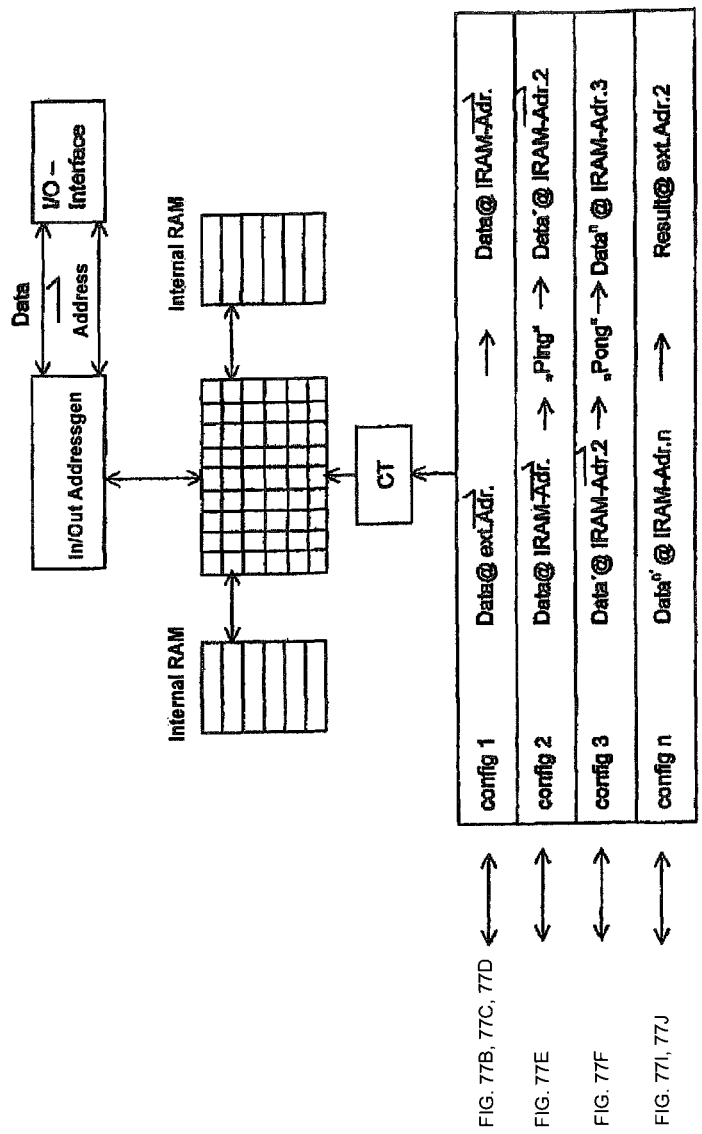

| Scheduler | MEM-Interface | CT Operation | XPP Operation |
|---|---|---|---|
| 1 Task 1 | NOP | NOP | NOP |
| 2 NOTask | Ld Task 1 Dat | Config Task 1 | NOP |
| 3 NOTask | NOP | NOP | Exec Task 1 |
| 4 NOTask | Stor Task 1 Dat | NOP | NOP |
| 5 Task 2 | Ld Task 2 Dat | Config Task 2 | NOP |
| 6 Task 3 | Pre-Ld Task 3 Dat | Preconfig Task 3 | Exec Task 2 |
| 7 Task 4 | Pre-Ld Task 4 Dat / Stor Task 2 Dat | Preconfig Task 4 | Exec Task 3 |
| 8 NOTask | Stor Task 3 Dat | NOP | Exec Task 4 |

FIG. 82A

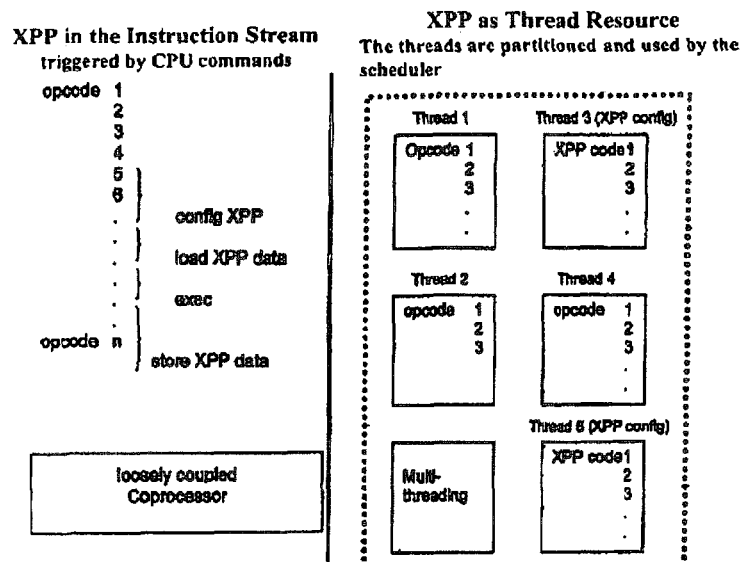
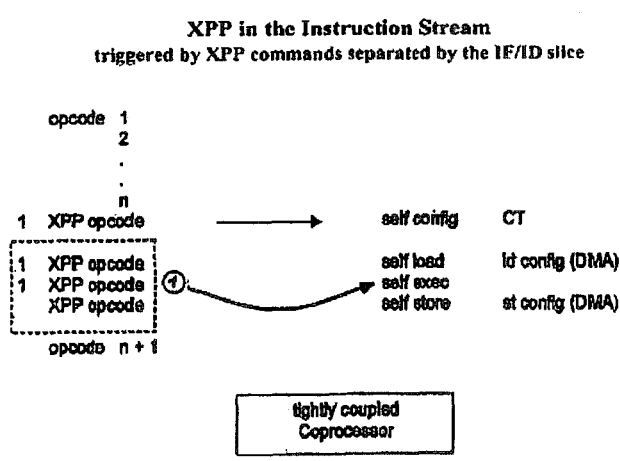
FIG. 82B

DATA PROCESSING SYSTEM HAVING INTEGRATED PIPELINED ARRAY DATA PROCESSOR

CROSS-REFERENCE TO RELATED APPLICATIONS

This application is a continuation-in-part of U.S. patent application Ser. No. 14/540,782, filed on Nov. 13, 2014, which is a continuation of U.S. patent application Ser. No. 12/729,090, filed on Mar. 22, 2010, which is a continuation of U.S. patent application Ser. No. 10/508,559, now abandoned, which has a 371(e) date of Jun. 20, 2005, which is the national stage entry of International Application Serial No. PCT/DE/03/00942, filed on Mar. 21, 2003, the entire contents of each of which are expressly incorporated herein by reference; which International Application Claims foreign priority to:

| | | |
|---|---|---|
| GERMANY | PCT/DE03/00489 | Feb. 18, 2003 |
| GERMANY | PCT/DE03/00152 | Jan. 20, 2003 |
| EUROPEAN PATENT OFFICE (EPO) | PCT/EP03/00624 | Jan. 20, 2003 |
| GERMANY | 103 00 380.0 | Jan. 7, 2003 |
| EUROPEAN PATENT OFFICE (EPO) | 02 027 277.9 | Dec. 6, 2002 |
| EUROPEAN PATENT OFFICE (EPO) | 02 022 692.4 | Oct. 10, 2002 |
| EUROPEAN PATENT OFFICE (EPO) | PCT/EP02/10572 | Sep. 19, 2002 |
| EUROPEAN PATENT OFFICE (EPO) | PCT/EP02/10464 | Sep. 18, 2002 |
| EUROPEAN PATENT OFFICE (EPO) | PCT/EP02/10479 | Sep. 18, 2002 |
| GERMANY | 102 41 812.8 | Sep. 6, 2002 |
| GERMANY | PCT/DE02/03278 | Sep. 3, 2002 |
| GERMANY | 102 40 000.8 | Aug. 27, 2002 |
| GERMANY | 102 40 022.9 | Aug. 27, 2002 |
| GERMANY | 102 38 172.0 | Aug. 21, 2002 |
| GERMANY | 102 38 173.9 | Aug. 21, 2002 |
| GERMANY | 102 38 174.7 | Aug. 21, 2002 |
| EUROPEAN PATENT OFFICE (EPO) | PCT/EP02/10065 | Aug. 16, 2002 |
| GERMANY | 102 36 269.6 | Aug. 7, 2002 |
| GERMANY | 102 36 272.6 | Aug. 7, 2002 |
| GERMANY | 102 36 271.8 | Aug. 7, 2002 |
| EUROPEAN PATENT OFFICE (EPO) | PCT/EP02/06865 | Jun. 20, 2002 |
| GERMANY | 102 27 650.1 | Jun. 20, 2002 |
| GERMANY | 102 26 186.5 | Jun. 12, 2002 |
| EUROPEAN PATENT OFFICE (EPO) | 02 009 868.7 | May 2, 2002 |
| GERMANY | 102 19 681.8 | May 2, 2002 |
| GERMANY | 102 12 621.6 | Mar. 21, 2002 |
| GERMANY | 102 12 622.4 | Mar. 21, 2002 |

This application is also a continuation-in-part of U.S. patent application Ser. No. 12/570,943, filed on Sep. 30, 2009, which is a continuation of U.S. patent application Ser. No. 10/523,764, filed on Aug. 2, 2005 (now U.S. Pat. No. 8,156,284), which is a national phase of International Application Serial No. PCT/EP03/08080, filed on Jul. 24, 2003, which claims priority to German Patent Application Serial No. DE 10236271.8, filed on Aug. 2, 2002, the entire contents of each of which are expressly incorporated herein by reference thereto.

This application is also a continuation-in-part of U.S. patent application Ser. No. 10/551,891, filed on Aug. 28, 2006, which is a national phase of International Application Serial No. PCT/EP2004/003603, filed on Apr. 5, 2004, which claims priority to German Patent Application Serial No. DE 103 15295.4, filed on Apr. 4, 2003, and which claims priority to German Patent Application Serial No. DE 10321 834.3, filed on May 15, 2003, the entire contents of each of which are expressly incorporated herein by reference thereto.

FIELD OF THE INVENTION

The present invention relates to the integration and/or snug coupling of reconfigurable processors with standard processors, data exchange and synchronization of data processing as well as compilers for them.

The present invention relates to methods of operating and optimum use of reconfigurable arrays of data processing elements.

The present invention relates to improvements in the use of reconfigurable processor technologies for data processing.

BACKGROUND INFORMATION

A reconfigurable architecture in the present context is understood to refer to modules or units (VPUs) having a configurable function and/or interconnection, in particular integrated modules having a plurality of arithmetic and/or logic and/or analog and/or memory and/or internal/external interconnecting modules in one or more dimensions interconnected directly or via a bus system.

Conventional types of such modules includes, for example, systolic arrays, neural networks, multiprocessor systems, processors having a plurality of arithmetic units and/or logic cells and/or communicative/peripheral cells (IO), interconnection and network modules such as crossbar switches, and conventional modules of FPGA, DPGA, Chameleon, XPUTER, etc. Reference is made in this connection to the following patents and patent applications: P 44 16 881 A1, DE 197 81 412 A1, DE 197 81 483 A1, DE 196 54 846 A1, DE 196 54 593 A1, DE 197 04 044.6 A1, DE 198 80 129 A1, DE 198 61 088 A1, DE 199 80 312 A1, PCT/DE 00/01869, DE 100 36 627 A1, DE 100 28 397 A1, DE 101 10 530 A1, DE 101 11 014 A1, PCT/EP 00/10516, EP 01 102 674 A1, DE 198 80 128 A1, DE 101 39 170 A1, DE 198 09 640 A1, DE 199 26 538.0 A1, DE 100 50 442 A1, PCT/EP 02/02398, DE 102 40 000, DE 102 02 044, DE 102 02 175, DE 101 29 237, DE 101 42 904, DE 101 35 210, EP 01 129 923, PCT/EP 02/10084, DE 102 12 622, DE 102 36 271, DE 102 12 621, EP 02 009 868, DE 102 36 272, DE 102 41 812, DE 102 36 269, DE 102 43 322, EP 02 022 692, DE 103 00 380, DE 103 10 195 and EP 02 001 331 and EP 02 027 277. The full content of these documents is herewith incorporated for disclosure purposes.

The architecture mentioned above is used as an example for clarification and is referred to below as a VPU. This architecture is composed of any, typically coarsely granular arithmetic, logic cells (including memories) and/or memory cells and/or interconnection cells and/or communicative/peripheral (IO) cells (PAEs) which may be arranged in a one-dimensional or multi-dimensional matrix (PA). The matrix may have different cells of any design; the bus systems are also understood to be cells here. A configuration unit (CT) which stipulates the interconnection and function of the PA through configuration is assigned to the matrix as a whole or parts thereof. A finely granular control logic may be provided. Various methods are known for coupling reconfigurable processors with standard processors. They usually involve a loose coupling. In many regards, the type and manner of coupling still need further improvement; the same is true for compiler methods and/or operating methods provided for joint execution of programs on combinations of reconfigurable processors and standard processors.

The limitations of conventional processors are becoming more and more evident. The growing importance of stream-based applications makes coarse-grain dynamically reconfigurable architectures an attractive alternative. See, e.g., R. Hartenstein, R. Kress, & H. Reinig, "A new FPGA architecture for word-oriented datapaths," *Proc. FPL '94*, Springer LNCS, September 1994, at 849; E. Waingold et al., "Baring it all to software: Raw machines," IEEE Computer, September 1997, at 86-93; PACT Corporation, "The XPP Communication System," Technical Report 15 (2000); see generally http://www.pactcorp.com. They combine the performance of ASICs, which are very risky and expensive (development and mask costs), with the flexibility of traditional processors. See, for example, J. Becker, "Configurable Systems-on-Chip (CSoC)," (Invited Tutorial), Proc. of $9^{th}$ *Proc. of XV Brazilian Symposium on Integrated Circuit, Design* (SBCCI 2002), (September 2002).

The datapaths of modern microprocessors reach their limits by using static instruction sets. In spite of the possibilities that exist today in VLSI development, the basic concepts of microprocessor architectures are the same as 20 years ago. The main processing unit of modern conventional microprocessors, the datapath, in its actual structure follows the same style guidelines as its predecessors. Although the development of pipelined architectures or superscalar concepts in combination with data and instruction caches increases the performance of a modern microprocessor and allows higher frequency rates, the main concept of a static datapath remains. Therefore, each operation is a composition of basic instructions that the used processor owns. The benefit of the processor concept lies in the ability of executing strong control dominant application. Data or stream oriented applications are not well suited for this environment. The sequential instruction execution isn't the right target for that kind of application and needs high bandwidth because of permanent retransmitting of instruction/data from and to memory. This handicap is often eased by use of caches in various stages. A sequential interconnection of filters, which perform data manipulation without writing back the intermediate results would get the right optimisation and reduction of bandwidth. Practically, this kind of chain of filters should be constructed in a logical way and configured during runtime. Existing approaches to extend instruction sets use static modules, not modifiable during runtime.

Customized microprocessors or ASICs are optimized for one special application environment. It is nearly impossible to use the same microprocessor core for another application without loosing the performance gain of this architecture.

A new approach of a flexible and high performance datapath concept is needed, which allows for reconfiguring the functionality and for making this core mainly application independent without losing the performance needed for stream-based applications.

When using a reconfigurable array, it is desirable to optimize the way in which the array is coupled to other units, e.g., to a processor if the array is used as a coprocessor. It is also desirable to optimize the way in which the array is configured.

Further, WO 00/49496 discusses a method for execution of a computer program using a processor that includes a configural functional unit capable of executing reconfigurable instructions, which can be redefined at runtime. A problem with conventionable processor architectures exists if a coupling of, for example, sequential processors is needed and/or technologies such as a data-streaming, hyper-threading, multi-threading, multi-tasking, execution of parts of configurations, etc., are to be a useful way for enhancing performance. Techniques discussed in prior art, such as WO 02/50665 A1, do not allow for a sufficiently efficient way of providing for a data exchange between the ALU of a CPU and the configurable data processing logic cell field, such as an FPGA, DSP, or other such arrangement. In the prior art, the data exchange is effected via registers. In other words, it is necessary to first write data into a register sequentially, then retrieve them sequentially, and restore them sequentially as well.

Another problem exists if an external access to data is requested in known devices used, inter alia, to implement functions in the configurable data processing logic cell field, DFP, FPGA, etc., that cannot be processed sufficiently on a CPU-integrated ALU. Accordingly, the data processing logic cell field is practically used to allow for user-defined opcodes that can process data more efficiently than is possible on the ALU of the CPU without further support by the data processing logic cell field. In the prior art, the coupling is generally word-based, not block-based. A more efficient data processing, in particular more efficient than possible with a close coupling via registers, is highly desirable.

Another method for the use of logic cell fields that include coarse- and/or fine-granular logic cells and logic cell elements provides for a very loose coupling of such a field to a conventional CPU and/or a CPU-core in embedded systems. In this regard, a conventional sequential program can be executed on the CPU, for example a program written in C, C++, etc., wherein the instantiation or the data stream processing by the fine- and/or coarse-granular data processing logic cell field is effected via that sequential program. However, a problem exists in that for programming said logic cell field, a program not written in C or another sequential high-level language must be provided for the data stream processing. It is desirable to allow for C-programs to run both on a conventional CPU-architecture as well as on the data processing logic cell field operated therewith, in particular, despite the fact that a quasi-sequential program execution should maintain the capability of data-streaming in the data processing logic cell fields, whereas simultaneously the capability exists to operate the CPU in a not too loosely coupled way.

It is already known to provide for sequential data processing within a data processing logic cell field. See, for example, DE 196 51 075, WO 98/26356, DE 196 54 846, WO 98/29952, DE 197 04 728, WO 98/35299, DE 199 26 538, WO 00/77652, and DE 102 12 621. Partial execution is achieved within a single configuration, for example, to reduce the amount of resources needed, to optimize the time of execution, etc. However, this does not lead automatically to allowing a programmer to translate or transfer high-level language code automatically onto a data processing logic cell field as is the case in common machine models for sequential processes. The compilation, transfer, or translation of a high-level language code onto data processing logic cell fields according to the methods known for models of sequentially executing machines is difficult.

In the prior art, it is further known that configurations that effect different functions on parts of the area respectively can be simultaneously executed on the processing array and that a change of one or some of the configuration(s) without disturbing other configurations is possible at run-time. Methods and hardware-implemented means for the implementation are known to ensure that the execution of partial configurations to be loaded onto the array is possible without deadlock. Reference is made to DE 196 54 593, WO 98/31102, DE 198 07 872, WO 99/44147, DE 199 26538, WO 00/77652, DE 100 28 397, and WO 02/13000. This technology allows in a certain way a certain parallelism and, given certain forms and interrelations of the configurations or partial configurations for a certain way of multitasking/multi-threading, in particular in such a way that the planning, i.e., the scheduling and/or the planning control for time use, can be provided for. Furthermore, from the prior art, time use planning control means and methods are known that, at least under a corresponding interrelation of configurations and/or assignment of configurations to certain tasks and/or threads to configurations and/or sequences of configurations, allow for a multi-tasking and/or multi-threading.

With respect to a design of logic cell fields, reference is made here to the XPP architecture and previously published patent applications as well as more recent patent applications by the present applicant, these documents being fully incorporated herewith for disclosure purposes. The following documents should thus be mentioned in particular: DE 44 16 881 A1, DE 197 81 412A1, DE 197 81 483A1, DE 196 54 846A1, DE 196 54 593A1, DE 197 04 044.6A1, DE 198 80 129 A1, DE 198 61 088 A1, DE 199 80 312 A1, PCT/DE 00/01869, now U.S. Pat. No. 8,230,411, DE 100 36 627 A1, DE 100 28 397 A1, DE 10110530A1, DE 10111 014A1, PCT/EP00/10516 (can't find it in WIPO), EP 01102 674A1, DE 198 80 128A1, DE 10139170A1, DE 198 09 640A1, DE 199 26 538.0A1, DE 100 50 442A1, PCT/EP 02/02398, now U.S. Pat. No. 7,581,076, DE 102 40 000, DE 102 02 044, DE 102 02 175, DE 101 29 237, DE 101 42 904, DE 101 35 210, EP 01 129 923, PCT/EP 02/10084, now U.S. Pat. No. 7,577, 822, DE 102 12 622, DE 102 36 271, DE 102 12 621, EP 02 009 868, DE 102 36 272, DE 102 41 812, DE 102 36 269, DE 102 43 322, EP 02 022 692, EP 02 001 331, and EP 02 027 277.

One problem in traditional approaches to reconfigurable technologies is encountered when the data processing is performed primarily on a sequential CPU using a configurable data processing logic cell field or the like and/or when data processing involving a plurality of processing steps and/or extensive processing steps to be performed sequentially is desired.

There are known approaches which are concerned with how data processing may be performed on both a CPU and a configurable data processing logic cell field.

WO 00/49496 describes a method for executing a computer program using a processor which includes a configurable functional unit capable of executing reconfigurable instructions, whose effect is redefinable in runtime by loading a configuration program, this method including the steps of selecting combinations of reconfigurable instructions, generating a particular configuration program for each combination, and executing the computer program. Each time an instruction from one of the combinations is needed during execution and the configurable functional unit is not configured using the configuration program for this combination, the configuration program for all the instructions of the combination is to be loaded into the configurable functional unit. In addition, a data processing device having a configurable functional unit is known from WO 02/50665 A1, where the configurable functional unit is used to execute instructions according to a configurable function. The configurable functional unit has a plurality of independent configurable logic blocks for executing programmable logic operations to implement the configurable function. Configurable connecting circuits are provided between the configurable logic blocks and both the inputs and outputs of the configurable functional unit. This allows optimization of the distribution of logic functions over the configurable logic blocks.

One problem with traditional architectures occurs when coupling is to be performed and/or technologies such as data streaming, hyperthreading, multithreading and so forth are to be utilized in a logical and performance-enhancing manner. A description of an architecture is given in "Exploiting Choice: Instruction Fetch and Issue on Implementable Simultaneous Multi-Threading Processor," Dean N. Tulson, Susan J. Eggers et al., Proceedings of the 23$^{rd}$ Annual International Symposium on Computer Architecture, Philadelphia, May 1996.

Hyperthreading and multithreading technologies have been developed in view of the fact that modern microprocessors gain their efficiency from many specialized functional units and functional units triggered like a deep pipeline as well as high memory hierarchies; this allows high frequencies in the function cores. However, due to the strictly hierarchical memory arrangements, there are major disadvantages in the event of faulty access to caches because of the difference between core frequencies and memory frequencies, since many core cycles may elapse before data is read out of the memory. Furthermore, problems occur with branchings and in particular incorrectly predicted branchings. It has therefore been proposed that a switch be performed between different tasks as a simultaneous multithreading (SMT) procedure whenever an instruction is not executable or does not use all functional units.

The technology of the above-cited exemplary documents (not by the present applicant) involves, among other things, an arrangement in which configurations are loadable into a configurable data processing logic cell field, but in which data exchange between the ALU of the CPU and the configurable data processing logic cell field, whether an FPGA, DSP or the like, takes place via registers. In other words, data from a data stream must first be written sequentially into registers and then stored in these registers sequentially again. Another problem occurs when there is to be external access to data, because even then there are still problems in the chronological data processing sequence in comparison with the ALU and in the allocation of configurations, and so forth. Traditional arrangements, such as those known from protective rights not held by the present applicant, are used, among other things, for processing functions in the configurable data processing logic cell field, DFP, FPGA or the like, which are not efficiently processable on the ALU of the CPU. The configurable data processing logic cell field is thus used in practical terms to permit user-defined opcodes which allow more efficient processing of algorithms than would be possible on the ALU arithmetic unit of the CPU without configurable data processing logic cell field support.

In the related art, as has been recognized, coupling is thus usually word-based but not block-based, as would be necessary for data streaming processing. It is initially desirable to permit more efficient data processing than would be the case with close coupling via registers.

Another possibility for using logic cell fields of logic cells having a coarse and/or fine granular structure and logic cells and logic cell elements having a coarse and/or fine granular structure involves a very loose coupling of such a field to a traditional CPU and/or a CPU core with embedded systems. A traditional sequential program, e.g., a program written in C, C++ or the like, may run on a CPU or the like, data stream processing calls being instantiated by this program on the finely and/or coarsely granular data processing logic cell field. It is then problematic that in programming for this logic cell field, a program not written in C or another sequential high-level language must be provided for data stream processing. It would be desirable here for C programs or the like to be processable on both the traditional CPU architecture and on a data processing logic cell field operated jointly together with it, i.e., a data streaming capability is nevertheless maintained in quasi-sequential program processing using the data processing logic cell field in particular, whereas CPU operation, in particular using a coupling which is not too loose, remains possible at the same time.

It is also already known that within a data processing logic cell field system such as that known in particular from PACT02 (DE 196 51 075.9-53, WO 98/26356, now U.S. Pat. No. 6,728,871), PACT04 (DE 196 54 846.2-53, WO 98/29952(no US)), PACT08 (DE 197 04 728.9, WO 98/35299 (no US)), PACT13 (DE 199 26 538.0, WO 00/77652, now U.S. Pat. No. 8,230,411), PACT31 (DE 102 12 621.6-53, PCT/EP 02/10572, now U.S. Pat. No. 8,429,385), sequential data processing may also be provided within the data processing logic cell field. However, for example to save resources, to achieve time optimization and so forth, partial processing is achieved within a single configuration without this resulting in a programmer being able to automatically and easily implement a piece of high-level language code on a data processing logic cell field, as is the case with traditional machine models for sequential processors. Implementation of high-level language code on data processing logic cell fields according to the models for sequentially operating machines still remains difficult.

It is also known from the related art that multiple configurations, each triggering a different mode of functioning of array parts, may be processed simultaneously on the processor array (PA) and that a switch in one or more configurations may take place without any disturbance in others during runtime. Methods and arrangements for their implementation in hardware are known; processing of partial configurations to be loaded into the field may be performed without a deadlock. Reference is made here in particular to the patent applications pertaining to the FILMO technology, e.g., PACT05 (DE 196 54 593.5-53, WO 98/31102 (no US)), PACT10 (DE 198 07 872.2, WO 99/44147, now U.S. Pat. No. 6,480,937, WO 99/44120, now U.S. Pat. No. 6,571,381), PACT13 (DE 199 26 538.0, WO 00/77652, now U.S. Pat. No. 8,230,411), PACT17 (DE 100 28 397.7), WO 02/13000, now U.S. Pat. No. 7,003,660); PACT31 (DE 102 12 621.6, WO 03/036507, now U.S. Pat. No. 8,429,385). This technology already permits parallelization to a certain extent and, with appropriate design and allocation of the configurations, also permits a type of multitasking/multithreading of such a type that planning, i.e., scheduling and/or time use planning control, is provided. Time use planning control arrangements and methods are thus known per se from the related art, allowing multitasking and/or multithreading at least with appropriate allocation of configurations to individual tasks and/or threads to configurations and/or configuration sequences.

SUMMARY OF THE INVENTION

An object of the present invention is to provide a novel approach for commercial use.

A standard processor, e.g., an RISC, CISC, DSP (CPU), may be connected to a reconfigurable processor (VPU). Described are two different embodiments of couplings. In one embodiment, the two described embodiments may be simultaneously implemented.

In one embodiment of the present invention, a direct coupling to the instruction set of a CPU (instruction set coupling) may be provided.

In a second embodiment of the present invention, a coupling via tables in the main memory may be provided.

These two embodiments may be simultaneously and/or alternatively implementable.

Embodiments of the present invention may improve upon the prior art with respect to optimization of the way in which a reconfigurable array is coupled to other units and/or the way in which the array is configured.

A way out of limitations of conventional microprocessors may be a dynamic reconfigurable processor datapath extension achieved by integrating traditional static datapaths with the coarse-grain dynamic reconfigurable XPP-architecture (eXtreme Processing Platform). Embodiments of the present invention introduce a new concept of loosely coupled implementation of the dynamic reconfigurable XPP architecture from PACT Corp. into a static datapath of the SPARC compatible LEON processor. Thus, this approach is different from those where the XPP operates as a completely separate (master) component within one Configurable System-on-Chip (CsoC), together with a processor core, global/local memory topologies, and efficient multi-layer Amba-bus interfaces. See, for example, J. Becker & M. Vorbach, "Architecture, Memory and Interface Technology Integration of an Industrial/Academic Configurable System-on-Chip (CSoC)," *IEEE Computer Society Annual Workshop on VLSI (WVLSI 2003)*, (February 2003). From the programmer's point of view, the extended and adapted datapath may seem like a dynamic configurable instruction set. It can be customized for a specific application and can accelerate the execution enormously. Therefore, the programmer has to create a number of configurations that can be uploaded to the XPP-Array at run time. For example, this configuration can be used like a filter to calculate stream-oriented data. It is also possible to configure more than one function at the same time and use them simultaneously. These embodiments may provide an enormous performance boost and the needed flexibility and power reduction to perform a series of applications very effective.

Embodiments of the present invention may provide a hardware framework, which may enable an efficient integration of a PACT XPP core into a standard RISC processor architecture.

Embodiments of the present invention may provide a compiler for a coupled RISC+XPP hardware. The compiler may decide automatically which part of a source code is executed on the RISC processor and which part is executed on the PACT XPP core.

In an example embodiment of the present invention, a C Compiler may be used in cooperation with the hardware framework for the integration of the PACT XPP core and RISC processor.

In an example embodiment of the present invention, the proposed hardware framework may accelerate the XPP core in two respects. First, data throughput may be increased by raising the XPP's internal operating frequency into the range of the RISC's frequency. This, however, may cause the XPP to run into the same pit as all high frequency processors, i.e., memory accesses may become very slow compared to processor internal computations. Accordingly, a cache may be provided for use. The cache may ease the memory access problem for a large range of algorithms, which are well suited for an execution on the XPP. The cache, as a second throughput increasing feature, may require a controller. A programmable cache controller may be provided for managing the cache contents and feeding the XPP core. It may decouple the XPP core computations from the data transfer so that, for instance, data preload to a specific cache sector may take place while the XPP is operating on data located in a different cache sector.

A problem which may emerge with a coupled RISC+XPP hardware concerns the RISC's multitasking concept. It may become necessary to interrupt computations on the XPP in order to perform a task switch. Embodiments of the present invention may provided for hardware and a compiler that supports multitasking. First, each XPP configuration may be considered as an uninterruptible entity. This means that the compiler, which generates the configurations, may take care that the execution time of any configuration does not exceed a predefined time slice. Second, the cache controller may be concerned with the saving and restoring of the XPP's state after an interrupt. The proposed cache concept may minimize the memory traffic for interrupt handling and frequently may even allow avoiding memory accesses at all.

In an example embodiment of the present invention, the cache concept may be based on a simple internal RAM (IRAM) cell structure allowing for an easy scalability of the hardware. For instance, extending the XPP cache size, for instance, may require not much more than the duplication of IRAM cells.

In an embodiment of the present invention, a compiler for a RISC+XPP system may provide for compilation for the RISC+XPP system of real world applications written in the C language. The compiler may remove the necessity of developing NML (Native Mapping Language) code for the XPP by hand. It may be possible, instead, to implement algorithms in the C language or to directly use existing C applications without much adaptation to the XPP system. The compiler may include the following three major components to perform the compilation process for the XPP:
 1. partitioning of the C source code into RISC and XPP parts;
 2. transformations to optimize the code for the XPP; and
 3. generating of NML code.

The generated NML code may be placed and routed for the XPP.

The partitioning component of the compiler may decide which parts of an application code can be executed on the XPP and which parts are executed on the RISC. Typical candidates for becoming XPP code may be loops with a large number of iterations whose loop bodies are dominated by arithmetic operations. The remaining source code—including the data transfer code—may be compiled for the RISC.

The compiler may transform the XPP code such that it is optimized for NML code generation. The transformations included in the compiler may include a large number of loop transformations as well as general code transformations. Together with data and code analysis the compiler may restructure the code so that it fits into the XPP array and so that the final performance may exceed the pure RISC performance. The compiler may generate NML code from the transformed program. The whole compilation process may be controlled by an optimization driver which selects the optimal order of transformations based on the source code.

Discussed below with respect to embodiments of the present invention are case studies, the basis of the selection of which is the guiding principle that each example may stand for a set of typical real-world applications. For each example is demonstrated the work of the compiler according to an embodiment of the present invention. For example, first partitioning of the code is discussed. The code transformations, which may be done by the compiler, are shown and explained. Some examples require minor source code transformations which may be performed by hand. These transformations may be either too expensive, or too specific to make sense to be included in the proposed compiler. Dataflow graphs of the transformed codes are constructed for each example, which may be used by the compiler to generate the NML code. In addition, the XPP resource usages are shown. The case studies demonstrate that a compiler containing the proposed transformations can generate efficient code from numerical applications for the XPP. This is possible because the compiler may rely on the features of the suggested hardware, like the cache controller.

Other embodiments of the present invention pertain to a realization that for data-streaming data-processing, block-based coupling is highly preferable. This is in contrast to a word-based coupling discussed above with respect to the prior art.

Further, embodiments of the present invention provide for the use of time use planning control means, discussed above with respect to their use in the prior art, for configuring and management of configurations for the purpose of scheduling of tasks, threads, and multi- and hyper-threads.

Embodiments of the present invention provide a novel device and method for commercial application.

In an example embodiment of the present invention, a device may be provided that includes a data processing logic cell field and one or more sequential CPUs. The logic cell field and the CPUs may be configured to be coupled to each other for data exchange. The data exchange may be, e.g., in block form using lines leading to a cache memory.

In an example embodiment of the present invention, a method for operating a reconfigurable unit having runtime-limited configurations may be provided. The configurations may be able to increase their maximum allowed runtime, e.g., by triggering a parallel counter. An increase in configuration runtime by the configurations may be suppressed in response to an interrupt.

BRIEF DESCRIPTION OF THE DRAWINGS

FIG. 5A is a diagram that illustrates example couplings of RAM-PAEs to a cache via a multiplexer, according to an example embodiment of the present invention.

FIG. 5B is a diagram that illustrates a system in which there is an implementation of one bus connection to cache, according to an example embodiment of the present invention.

FIG. 23 illustrates a code and diagram of an example of a true dependence with distance 0 on array 'a', according to an example embodiment of the present invention.

FIG. 24 illustrates a code and diagram of an example of an anti-dependence with distance 0 on array 'b', according to an example embodiment of the present invention.

FIG. 25 illustrates a code and diagram of an example of an output dependence with distance 0 on array 'a', according to an example embodiment of the present invention.

FIG. 26 illustrates a code and diagram of an example of a dependence with direction vector (=,=) between S1 and S2 and a dependence with direction vector (=,=,<) between S2 and S2, according to an example embodiment of the present invention.

FIG. 27 illustrates a code and diagram of an example of an anti-dependence with distance vector (0,2), according to an example embodiment of the present invention.

FIG. 38 is a data dependency graph relating to a FIR filter, according to an example embodiment of the present invention.

FIG. 39 is a dataflow graph that is achieved in an instance where values of x needed for computation of y are kept in registers, according to an example embodiment of the present invention.

FIG. 41 is a data dependency graph for matrix multiplication, according to an example embodiment of the present invention.

FIG. 42 is a visualization of array access sequences prior to optimization according to an example embodiment of the present invention.

FIG. 55 illustrates a loop interchange, according to an example embodiment of the present invention.

FIGS. 77A-77J include diagrams illustrating passing of data between a data processing logic cell field and memory, according to exemplary embodiments of the present invention.

FIGS. 82A to 82B include diagrams and a table that illustrate a task switch, a thread switch, and/or a hyperthread switch, according to exemplary embodiments of the present invention.

DETAILED DESCRIPTION OF THE INVENTION

Instruction Set Coupling

Figure 1:
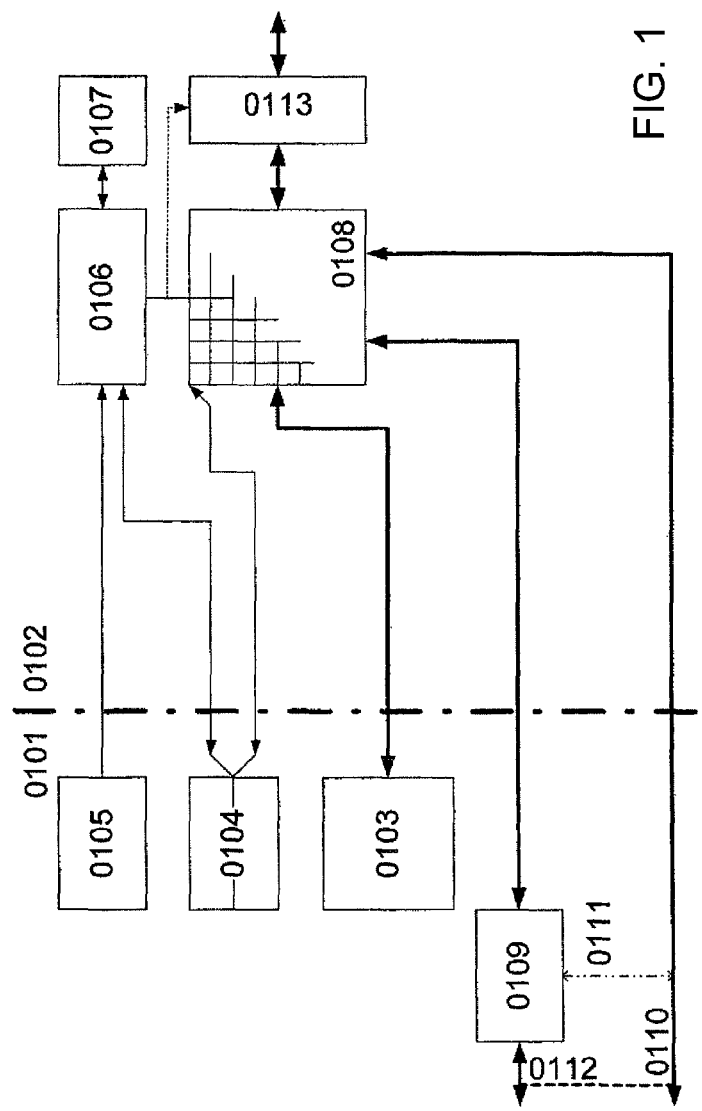
FIG. 1 is a diagram that illustrates components of an example system according to which a method of an example embodiment of the present invention may be implemented.

Free unused instructions may be available within an instruction set (ISA) of a CPU. One or a plurality of these free unused instructions may be used for controlling VPUs (VPU-CODE).

By decoding a VPUCODE, a configuration unit (CT) of a VPU may be triggered, executing certain sequences as a function of the VPUCODE.

For example, a VPUCODE may trigger the loading and/or execution of configurations by the configuration unit (CT) for a VPU.

Command Transfer to the VPU

In an one embodiment, a VPUCODE may be translated into various VPU commands via an address mapping table, e.g., which may be constructed by the CPU. The configuration table may be set as a function of the CPU program or code segment executed.

After the arrival of a load command, the VPU may load configurations from a separate memory or a memory shared with the CPU, for example. In particular, a configuration may be contained in the code of the program currently being executed.

After receiving an execution command, a VPU may execute the configuration to be executed and will perform the corresponding data processing. The termination of data processing may be displayed on the CPU by a termination signal (TERM).

VPUCODE Processing on the CPU

When a VPUCODE occurs, wait cycles may be executed on the CPU until the termination signal (TERM) for termination of data processing by the VPU arrives.

In one example embodiment, processing may be continued by processing the next code. If there is another VPUCODE, processing may then wait for the termination of the preceding code, or all VPUCODEs started may be queued into a processing pipeline, or a task change may be executed as described below.

Termination of data processing may be signaled by the arrival of the termination signal (TERM) in a status register. The termination signals may arrive in the sequence of a possible processing pipeline. Data processing on the CPU may be synchronized by checking the status register for the arrival of a termination signal.

In one example embodiment, if an application cannot be continued before the arrival of TERM, e.g., due to data dependencies, a task change may be triggered.

Coupling of Coprocessors (Loose Coupling)

According to DE 101 10 530, loose couplings, in which the VPUs work largely as independent coprocessors, may be established between processors and VPUs.

Such a coupling typically involves one or more common data sources and data sinks, e.g., via common bus systems and/or shared memories. Data may be exchanged between a CPU and a VPU via DMAs and/or other memory access controllers. Data processing may be synchronized, e.g., via an interrupt control or a status query mechanism (e.g., polling).

Coupling of Arithmetic Units (Snug Coupling)

A snug coupling may correspond to a direct coupling of a VPU into the instruction set of a CPU as described above.

In a direct coupling of an arithmetic unit, a high reconfiguration performance may be of import. Therefore the wave reconfiguration according to DE 198 07 872, DE 199 26 538, DE 100 28 397 may be used. In addition, the configuration words may be preloaded in advance according to DE 196 54 846, DE 199 26 538, DE 100 28 397, DE 102 12 621 so that on execution of the instruction, the configuration may be configured particularly rapidly (e.g., by wave reconfiguration in the optimum case within one clock pulse).

For the wave reconfiguration, the presumed configurations to be executed may be recognized in advance, i.e., estimated and/or predicted, by the compiler at the compile time and preloaded accordingly at the runtime as far as possible. Possible methods are described, for example, in DE 196 54 846, DE 197 04 728, DE 198 07 872, DE 199 26 538, DE 100 28 397, DE 102 12 621.

At the point in time of execution of the instruction, the configuration or a corresponding configuration may be selected and executed. Such methods are known according to the publications cited above. Configurations may be preloaded into shadow configuration registers, as is known, for example, from DE 197 04 728 (FIG. 6) and DE 102 12 621 (FIG. 14) in order to then be available particularly rapidly on retrieval.

Data Transfers

One possible embodiment of the present invention, e.g., as shown in FIG. 1, may involve different data transfers between a CPU (0101) and VPU (0102). Configurations to be executed on the VPU may be selected by the instruction decoder (0105) of the CPU, which may recognize certain instructions intended for the VPU and trigger the CT (0106) so the CT loads into the array of PAEs (PA, 0108) the corresponding configurations from a memory (0107) which may be assigned to the CT and may be, for example, shared with the CPU or the same as the working memory of the CPU.

It should be pointed out explicitly that for reasons of simplicity, only the relevant components (in particular the CPU) are shown in FIG. 1, but a substantial number of other components and networks may be present.

Three methods that may be used, e.g., individually or in combination, are described below.

Registers

In a register coupling, the VPU may obtain data from a CPU register (0103), process it and write it back to a CPU register or the CPU register.

Synchronization mechanisms may be used between the CPU and the VPU.

For example, the VPU may receive an RDY signal (DE 196 51 075, DE 110 10 530) due to the fact that data is written into a CPU register by the CPU and then the data written in may be processed. Readout of data from a CPU register by the CPU may generate an ACK signal (DE 196 51 075, DE 110 10 530), so that data retrieval by the CPU is signaled to the VPU. CPUs typically do not provide any corresponding mechanisms.

Two possible approaches are described in greater detail here.

One approach is to have data synchronization performed via a status register (0104). For example, the VPU may display in the status register successful readout of data from a register and the ACK signal associated with it (DE 196 51 075, DE 110 10 530) and/or writing of data into a register and the associated RDY signal (DE 196 51 075, DE 110 10 530). The CPU may first check the status register and may execute waiting loops or task changes, for example, until the RDY or ACK signal has arrived, depending on the operation. Then the CPU may execute the particular register data transfer.

In one embodiment, the instruction set of the CPU may be expanded by load/store instructions having an integrated status query (load_rdy, store_ack). For example, for a store_ack, a new data word may be written into a CPU register only when the register has previously been read out by the CPU and an ACK has arrived. Accordingly, load_rdy may read data out of a CPU register only when the VPU has previously written in new data and generated an RDY.

Data belonging to a configuration to be executed may be written into or read out of the CPU registers successively, more or less through block moves according to the related art. Block move instructions implemented, if necessary, may be expanded through the integrated RDY/ACK status query described above.

In an additional or alternative embodiment, data processing within the VPUs connected to the CPU may require exactly the same number of clock pulses as does data processing in the computation pipeline of the CPU. This concept may be used ideally in modern high-performance CPUs having a plurality of pipeline stages (>20) in particular. An advantage may be that no special synchronization mechanisms such as RDY/ACK are necessary. In this procedure, it may only be required that the compiler ensure that the VPU maintains the required number of clock pulses and, if necessary, balance out the data processing, e.g., by inserting delay stages such as registers and/or the fall-through FIFOs known from DE 110 10 530, FIGS. 9-10.

Another example embodiment permits a different runtime characteristic between the data path of the CPU and the VPU. To do so, the compiler may first re-sort the data accesses to achieve at least essentially maximal independence between the accesses through the data path of the CPU and the VPU. The maximum distance thus defines the maximum runtime difference between the CPU data path and the VPU. In other words, for example through a reordering method such as that known from the related art, the runtime difference between the CPU data path and the VPU data path may be equalized. If the runtime difference is too great to be compensated by re-sorting the data accesses, then NOP cycles (i.e., cycles in which the CPU data path is not processing any data) may be inserted by the compiler and/or wait cycles may be generated in the CPU data path by the hardware until the required data has been written from the VPU into the register. The registers may therefore be provided with an additional bit which indicates the presence of valid data.

It will be appreciated that a variety of modifications and of different embodiments of these methods are possible.

The wave reconfiguration mentioned above, e.g., preloading of configurations into shadow configuration registers, may allow successive starting of a new VPU instruction and the corresponding configuration as soon as the operands of the preceding VPU instruction have been removed from the CPU registers. The operands for the new instruction may be written to the CPU registers immediately after the start of the instruction. According to the wave reconfiguration method, the VPU may be reconfigured successively for the new VPU instruction on completion of data processing of the previous VPU instruction and the new operands may be processed.

Bus Accesses

In addition, data may be exchanged between a VPU and a CPU via suitable bus accesses on common resources.

Cache

If there is to be an exchange of data that has been processed recently by the CPU and that may therefore still be in the cache (0109) of the CPU and/or may be processed immediately thereafter by the CPU and therefore would logically still be in the cache of the CPU, it may be read out of the cache of the CPU and/or written into the cache of the CPU preferably by the VPU. This may be ascertained by the compiler largely in advance of the compile time of the application through suitable analyses, and the binary code may be generated accordingly.

Bus If there is to be an exchange of data that is presumably not in the cache of the CPU and/or will presumably not be needed subsequently in the cache of the CPU, this data may be read directly from the external bus (0110) and the associated data source (e.g., memory, peripherals) and/or written to the external bus and the associated data sink (e.g., memory, peripherals), e.g., preferably by the VPU. This bus may be, e.g., the same as the external bus of the CPU (0112 and dashed line). This may be ascertained by the compiler largely in advance of the compile time of the application through suitable analyses, and the binary code may be generated accordingly.

In a transfer over the bus, bypassing the cache, a protocol (0111) may be implemented between the cache and the bus, ensuring correct contents of the cache. For example, the MESI protocol from the related art may be used for this purpose.

Cache/RAM-PAE Coupling

In one example embodiment, a method may be implemented to have a snug coupling of RAM-PAEs to the cache of the CPU. Data may thus be transferred rapidly and efficiently between the memory databus and/or IO databus and the VPU. The external data transfer may be largely performed automatically by the cache controller.

This method may allow rapid and uncomplicated data exchange in task change procedures in particular, for realtime applications and multithreading CPUs with a change of threads.

Two example methods are described below:

a) RAM-PAE/Cache Coupling

The RAM-PAE may transmit data, e.g., for reading and/or writing of external data, e.g., main memory data, directly to and/or from the cache. In one embodiment, a separate databus may be used according to DE 196 54 595 and DE 199 26 538. Then, independently of data processing within the VPU and, for example, via automatic control, e.g., by independent address generators, data may then be transferred to or from the cache via this separate databus.

b) RAM-PAE as a Cache Slice

In one example embodiment, the RAM-PAEs may be provided without any internal memory but may be instead coupled directly to blocks (slices) of the cache. In other words, the RAM-PAEs may be provided with, e.g., only the bus triggers for the local buses plus optional state machines and/or optional address generators, but the memory may be within a cache memory bank to which the RAM-PAE may have direct access. Each RAM-PAE may have its own slice within the cache and may access the cache and/or its own slice independently and, e.g., simultaneously with the other RAM-PAEs and/or the CPU. This may be implemented by constructing the cache of multiple independent banks (slices).

If the content of a cache slice has been modified by the VPU, it may be marked as "dirty," whereupon the cache controller may automatically write this back to the external memory and/or main memory.

For many applications, a write-through strategy may additionally be implemented or selected. In this strategy, data newly written by the VPU into the RAM-PAEs may be directly written back to the external memory and/or main memory with each write operation. This may additionally eliminate the need for labeling data as "dirty" and writing it back to the external memory and/or main memory with a task change and/or thread change.

In both cases, it may be expedient to block certain cache regions for access by the CPU for the RAM-PAE/cache coupling.

An FPGA (0113) may be coupled to the architecture described here, e.g., directly to the VPU, to permit finely granular data processing and/or a flexible adaptable interface (0114) (e.g., various serial interfaces (V24, USB, etc.), various parallel interfaces, hard drive interfaces, Ethernet, telecommunications interfaces (a/b, T0, ISDN, DSL, etc.)) to other modules and/or the external bus system (0112). The FPGA may be configured from the VPU architecture, e.g., by the CT, and/or by the CPU. The FPGA may be operated statically, i.e., without reconfiguration at runtime and/or dynamically, i.e., with reconfiguration at runtime.

FPGAs in ALUs

FPGA elements may be included in a "processor-oriented" embodiment within an ALU-PAE. To do so, an FPGA data path may be coupled in parallel to the ALU or in a preferred embodiment, connected upstream or downstream from the ALU.

Within algorithms written in the high-level languages such as C, bit-oriented operations usually occur very sporadically and are not particularly complex. Therefore, an FPGA structure of a few rows of logic elements, each interlinked by a row of wiring troughs, may be sufficient. Such a structure may be easily and inexpensively programmably linked to the ALU. One essential advantage of the programming methods described below may be that the runtime is limited by the FPGA structure, so that the runtime characteristic of the ALU is not affected. Registers need only be allowed for storage of data for them to be included as operands in the processing cycle taking place in the next clock pulse.

In one example embodiment, additional configurable registers may be optionally implemented to establish a sequential characteristic of the function through pipelining, for example. This may be advantageous, for example when feedback occurs in the code for the FPGA structure. The compiler may then map this by activation of such registers per configuration and may thus correctly map sequential code. The state machine of the PAE which controls its processing may be notified of the number of registers added per configuration so that it may coordinate its control, e.g., also the PAE-external data transfer, to the increased latency time An FPGA structure which may be automatically switched to neutral in the absence of configuration, e.g., after a reset, i.e., passing the input data through without any modification, may be provided. Thus if FPGA structures are not used, configuration data to set them may be omitted, thus eliminating configuration time and configuration data space in the configuration memories.

Operating System Mechanisms

It may be that the methods described here do not at first provide any particular mechanism for operating system support. In other words, it may be desirable to ensure that an operating system to be executed behaves according to the status of a VPU to be supported. Schedulers may be required.

In a snug arithmetic unit coupling, it may be desirable to query the status register of the CPU into which the coupled VPU has entered its data processing status (termination signal). If additional data processing is to be transferred to the VPU, and if the VPU has not yet terminated the prior data processing, the system may wait or a task change may be implemented.

Sequence control of a VPU may essentially be performed directly by a program executed on the CPU, representing more or less the main program which may swap out certain subprograms with the VPU.

For a coprocessor coupling, mechanisms which may be controlled by the operating system, e.g., the scheduler, may be used, whereby the sequence control of a VPU may essentially be performed directly by a program executed on the CPU, representing more or less the main program which may swap out certain subprograms with the VPU.

After transfer of a function to a VPU, a scheduler
1. may have the current main program continue to run on the CPU if it is able to run independently and in parallel with the data processing on a VPU;
2. if or as soon as the main program must wait for the end of data processing on the VPU, the task scheduler may switch to a different task (e.g., another main program). The VPU may continue processing in the background regardless of the current CPU task.

It may be required of each newly activated task to check before use (if it uses the VPU) to determine whether the VPU is available for data processing or is still currently processing data. In the latter case, it may be required of the newly created task to wait for the end of data processing or a task change may be implemented.

An efficient method may be based on descriptor tables, which may be implemented as follows, for example:

On calling the VPU, each task may generate one or more tables (VPUPROC) having a suitable defined data format in the memory area assigned to it. This table may includes all the control information for a VPU such as the program/configuration(s) to be executed (or the pointer(s) to the corresponding memory locations) and/or memory location(s) (or the pointer(s) thereto) and/or data sources (or the pointer(s) thereto) of the input data and/or the memory location(s) (or the pointer(s) thereto) of the operands or the result data.

Figure 2:
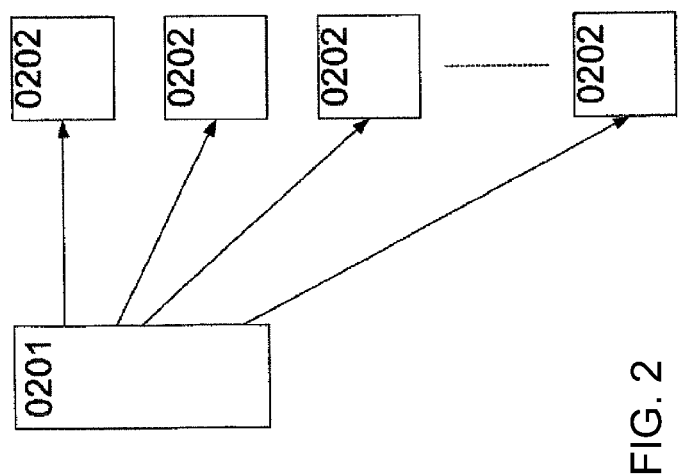
FIG. 2 is a diagram that illustrates an example interlinked list that may point to a plurality of tables in an order in which they were created or called, according to an example embodiment of the present invention.

According to FIG. 2, a table or an interlinked list (LINKLIST, 0201), for example, in the memory area of the operating system may point to all VPUPROC tables (0202) in the order in which they are created and/or called.

Data processing on the VPU may now proceed by a main program creating a VPUPROC and calling the VPU via the operating system. The operating system may then create an entry in the LINKLIST. The VPU may process the LINKLIST and execute the VPUPROC referenced. The end of a particular data processing run may be indicated through a corresponding entry into the LINKLIST and/or VPUCALL table. Alternatively, interrupts from the VPU to the CPU may also be used as an indication and also for exchanging the VPU status, if necessary.

In this method, the VPU may functions largely independently of the CPU. In particular, the CPU and the VPU may perform independent and different tasks per unit of time. It may be required only that the operating system and/or the particular task monitor the tables (LINKLIST and/or VPUPROC).

Alternatively, the LINKLIST may also be omitted by interlinking the VPUPROCs together by pointers as is known from lists, for example. Processed VPUPROCs may be removed from the list and new ones may be inserted into the list. This is conventional method, and further explanation thereof is therefore not required for an understanding of the present invention.

Multithreading/Hyperthreading

In one example embodiment, multithreading and/or hyperthreading technologies may be used in which a scheduler (preferably implemented in hardware) may distribute finely granular applications and/or application parts (threads) among resources within the processor. The VPU data path may be regarded as a resource for the scheduler. A clean separation of the CPU data path and the WU data path may have already been given by definition due to the implementation of multithreading and/or hyperthreading technologies in the compiler. In addition, an advantage may be that when the WU resource is occupied, it may be possible to simply change within one task to another task and thus achieve better utilization of resources. At the same time, parallel utilization of the CPU data path and WU data path may also be facilitated.

To this extent, multithreading and/or hyperthreading may constitute a method which may be preferred in comparison with the LINKLIST described above.

The two methods may operate in a particularly efficient manner with regard to performance, e.g., if an architecture that allows reconfiguration superimposed with data processing is used as the VPU, e.g., the wave reconfiguration according to DE 198 07 872, DE 199 26 538, DE 100 28 397.

It is may thus be possible to start a new data processing run and any reconfiguration associated with it immediately after reading the last operands out of the data sources. In other words, for synchronization, reading of the last operands may be required, e.g., instead of the end of data processing. This may greatly increase the performance of data processing.

Figure 3:
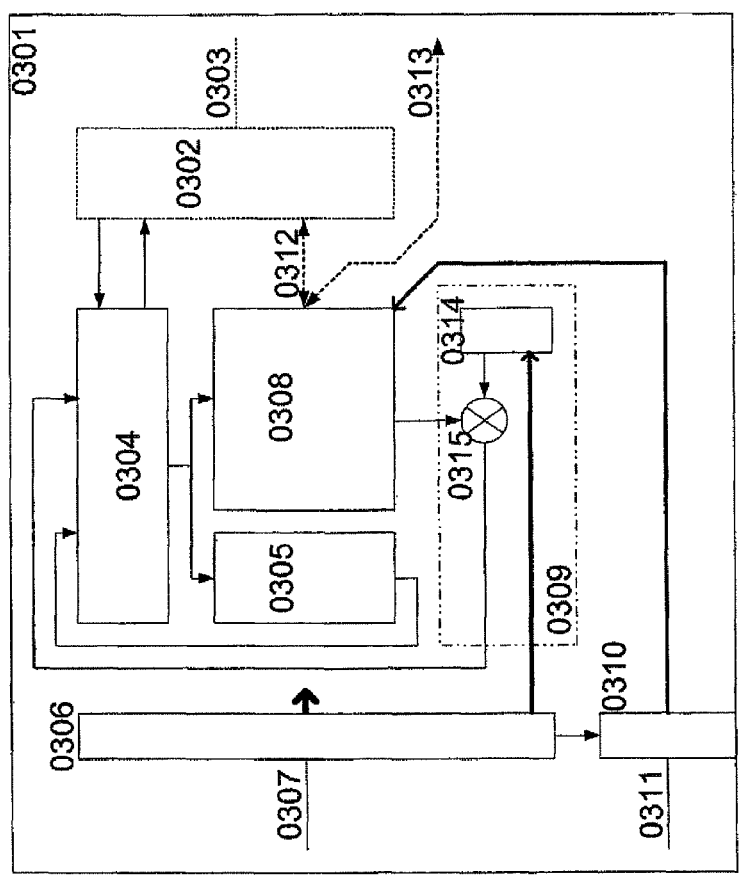
FIG. 3 is a diagram that illustrates an example internal structure of a microprocessor or microcontroller, according to an example embodiment of the present invention.

FIG. 3 shows a possible internal structure of a microprocessor or microcontroller. This shows the core (0301) of a microcontroller or microprocessor. The exemplary structure also includes a load/store unit for transferring data between the core and the external memory and/or the peripherals. The transfer may take place via interface 0303 to which additional units such as MMUs, caches, etc. may be connected.

In a processor architecture according to the related art, the load/store unit may transfer the data to or from a register set (0304) which may then store the data temporarily for further internal processing. Further internal processing may take place on one or more data paths, which may be designed identically or differently (0305). There may also be in particular multiple register sets, which may in turn be coupled to different data paths, if necessary (e.g., integer data paths, floating-point data paths, DSP data paths/multiply-accumulate units).

Data paths may take operands from the register unit and write the results back to the register unit after data processing. An instruction loading unit (opcode fetcher, 0306) assigned to the core (or contained in the core) may load the program code instructions from the program memory, translate them and then trigger the necessary work steps within the core. The instructions may be retrieved via an interface (0307) to a code memory with MMUs, caches, etc., connected in between, if necessary.

The VPU data path (0308) parallel to data path 0305 may have reading access to register set 0304 and may have writing access to the data register allocation unit (0309) described below. A construction of a VPU data path is described, for example, in DE 196 51 075, DE 100 50 442, DE 102 06 653 filed by the present applicant and in several publications by the present applicant.

The VPU data path may be configured via the configuration manager (CT) 0310 which may load the configurations from an external memory via a bus 0311. Bus 0311 may be identical to 0307, and one or more caches may be connected between 0311 and 0307 and/or the memory, depending on the design.

The configuration that is to be configured and executed at a certain point in time may be defined by opcode fetcher 0306 using special opcodes.

Therefore, a number of possible configurations may be allocated to a number of opcodes reserved for the VPU data path. The allocation may be performed via a reprogrammable lookup table (see 0106) upstream from 0310 so that the allocation may be freely programmable and may be variable within the application.

In one example embodiment, which may be implemented depending on the application, the destination register of the data computation may be managed in the data register allocation unit (0309) on calling a VPU data path configuration. The destination register defined by the opcode may be therefore loaded into a memory, i.e., register (0314), which may be designed as a FIFO—in order to allow multiple VPU data path calls in direct succession and without taking into account the processing time of the particular configuration. As soon as one configuration supplies the result data, it may be linked (0315) to the particular allocated register address and the corresponding register may be selected and written to 0304.

A plurality of VPU data path calls may thus be performed in direct succession and, for example, with overlap. It may be required to ensure, e.g., by compiler or hardware, that the operands and result data are re-sorted with respect to the data processing in data path 0305, so that there is no interference due to different runtimes in 0305 and 0308.

If the memory and/or FIFO 0314 is full, processing of any new configuration for 0308 may be delayed. Reasonably, 0314 may hold as much register data as 0308 is able to hold configurations in a stack (see DE 197 04 728, DE 100 28 397, DE 102 12 621). In addition to management by the compiler, the data accesses to register set 0304 may also be controlled via memory 0314.

If there is an access to a register that is entered into 0314, it may be delayed until the register has been written and its address has been removed from 0314.

Alternatively, the simple synchronization methods according to 0103 may be used, a synchronous data reception register optionally being provided in register set 0304; for reading access to this data reception register, it may be required that VPU data path 0308 has previously written new data to the register. Conversely, to write data by the VPU data path, it may be required that the previous data has been read. To this extent, 0309 may be omitted without replacement.

When a VPU data path configuration that has already been configured is called, it may be that there is no longer any reconfiguration. Data may be transferred immediately from register set 0304 to the VPU data path for processing and may then be processed. The configuration manager may save the configuration code number currently loaded in a register and compare it with the configuration code number that is to be loaded and that is transferred to 0310 via a lookup table (see 0106), for example. It may be that the called configuration may be reconfigured upon a condition that the numbers do not match.

Figure 4:
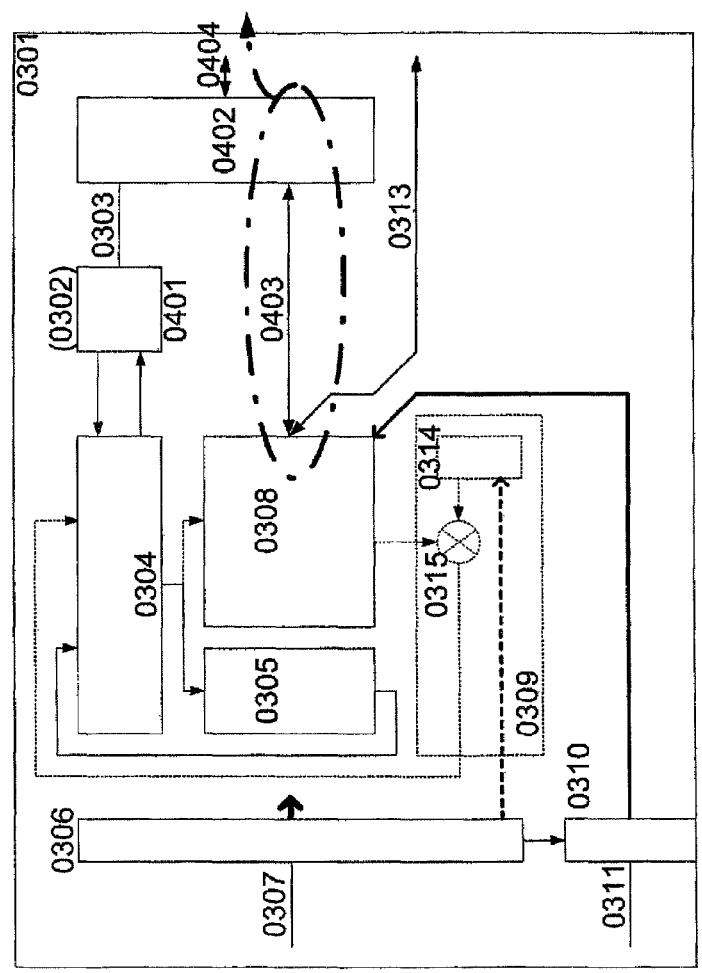
FIG. 4 is a diagram that illustrates an example load/store unit, according to an example embodiment of the present invention.
Figure 5:
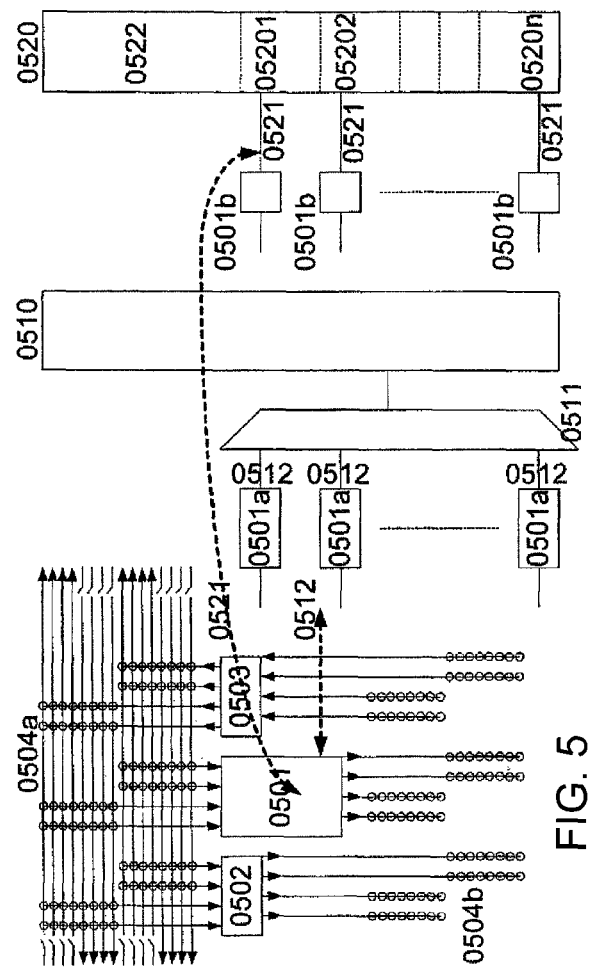
FIG. 5 is a diagram that illustrates example couplings of a VPU to an external memory and/or main memory via a cache, according to an example embodiment of the present invention.

The load/store unit is depicted only schematically and fundamentally in FIG. 3; one particular embodiment is shown in detail in FIGS. 4 and 5. The VPU data path (0308) may be able to transfer data directly with the load/store unit and/or the cache via a bus system 0312; data may be transferred directly between the VPU data path (0308) and peripherals and/or the external memory via another possible data path 0313, depending on the application.

FIG. 4 shows one example embodiment of the load/store unit.

According to a principle of data processing of the VPU architecture, coupled memory blocks which function more or less as a set of registers for data blocks may be provided on the array of ALU-PAEs. This method is known from DE 196 54 846, DE 101 39 170, DE 199 26 538, DE 102 06 653. As discussed below, it may be desirable here to process LOAD and STORE instructions as a configuration within the VPU, which may make interlinking of the VPU with the load/store unit (0401) of the CPU superfluous. In other words, the VPU may generate its read and write accesses itself, so a direct connection (0404) to the external memory and/or main memory may be appropriate. This may be accomplished, e.g., via a cache (0402), which may be the same as the data cache of the processor. The load/store unit of the processor (0401) may access the cache directly and in parallel with the VPU (0403) without having a data path for the VPU—in contrast with 0302.

FIG. 5 shows particular example couplings of the VPU to the external memory and/or main memory via a cache.

A method of connection may be via an IO terminal of the VPU, as is described, for example, in DE 196 51 075.9-53, DE 196 54 595.1-53, DE 100 50 442.6, DE 102 06 653.1; addresses and data may be transferred between the peripherals and/or memory and the VPU by way of this IO terminal. However, direct coupling between the RAM-PAEs and the cache may be particularly efficient, as described in DE 196 54 595 and DE 199 26 538. An example given for a reconfigurable data processing element is a PAE constructed from a main data processing unit (0501) which is typically designed as an ALU, RAM, FPGA, IO terminal and two lateral data transfer units (0502, 0503) which in turn may have an ALU structure and/or a register structure. In addition, the array-internal horizontal bus systems 0504 *a* and 0504 *b* belonging to the PAE are also shown.

In FIG. 5A, RAM-PAEs (0501 *a*) which each may have its own memory according to DE 196 54 595 and DE 199 26 538 may be coupled to a cache 0510 via a multiplexer 0511. Cache controllers and the connecting bus of the cache to the main memory are not shown. The RAM-PAEs may have in one example embodiment a separate databus (0512) having its own address generators (see also DE 102 06 653) in order to be able to transfer data independently to the cache.

FIG. 5B shows one example embodiment in which 0501 *b* does not denote full-quality RAM-PAEs but instead includes only the bus systems and lateral data transfer units (0502, 0503). Instead of the integrated memory in 0501, only one bus connection (0521) to cache 0520 may be implemented. The cache may be subdivided into multiple segments 05201, 05202 ... 0520 *n*, each being assigned to a 0501 *b* and, in one embodiment, reserved exclusively for this 0501 *b*. The cache thus more or less may represent the quantity of all RAM-PAEs of the VPU and the data cache (0522) of the CPU.

The VPU may write its internal (register) data directly into the cache and/or read the data directly out of the cache. Modified data may be labeled as "dirty," whereupon the cache controller (not shown here) may automatically update this in the main memory. Write-through methods in which modified data is written directly to the main memory and management of the "dirty data" becomes superfluous are available as an alternative.

Direct coupling according to FIG. 5B may be desirable because it may be extremely efficient in terms of area and may be easy to handle through the VPU because the cache controllers may be automatically responsible for the data transfer between the cache—and thus the RAM-PAE—and the main memory.

Figure 6:
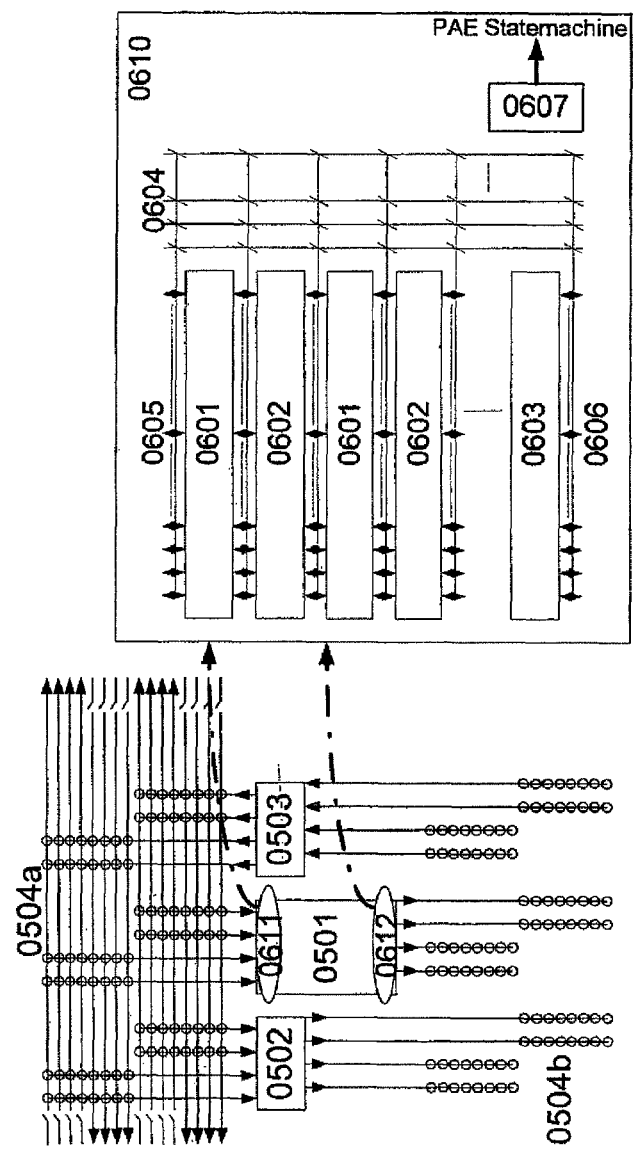
FIG. 6 is a diagram that illustrates a coupling of an FPGA structure to a data path considering an example of a VPU architecture, according to an example embodiment of the present invention.

FIG. 6 shows a coupling of an FPGA structure to a data path considering the example of the VPU architecture.

The main data path of a PAE may be 0501. FPGA structures may be inserted (0611) directly downstream from the input registers (see PACT02, PACT22) and/or inserted (0612) directly upstream from the output of the data path to the bus system.

Figure 35:
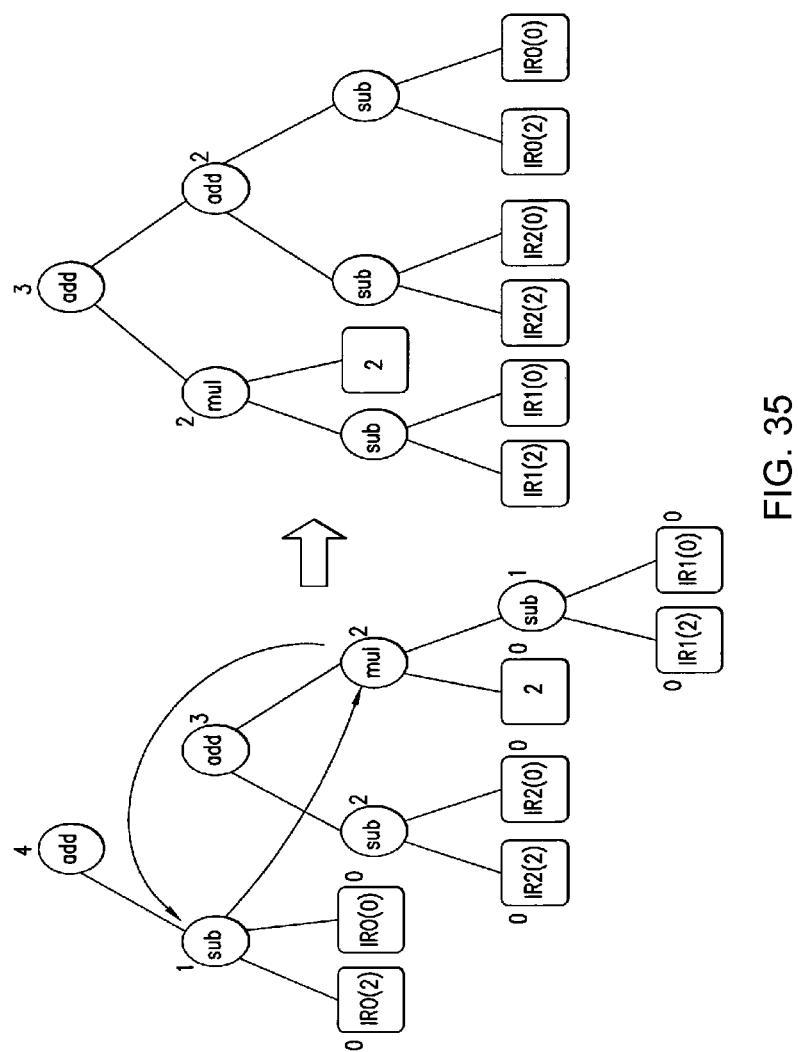
FIG. 35 is an expression tree showing the interchanging of operands of commutative add expressions to reduce an overall tree depth, according to an example embodiment of the present invention.

One possible FPGA structure is shown in 0610, the structure being based on PACT13, FIG. 35.

The FPGA structure may be input into the ALU via a data input (0605) and a data output (0606). In alternation a) logic elements may be arranged in a row (0601) to perform bit-by-bit logic operations (AND, OR, NOT, XOR, etc.) on incoming data. These logic elements may additionally have local bus connections; registers may likewise be provided for data storage in the logic elements;

b) memory elements may be arranged in a row (0602) to store data of the logic elements bit by bit. Their function may be to represent as needed the chronological uncoupling—i.e., the cyclical behavior—of a sequential program if so required by the compiler. In other words, through these register stages the sequential performance of a program in the form of a pipeline may be simulated within 0610.

Horizontal configurable signal networks may be provided between elements 0601 and 0602 and may be constructed according to the known FPGA networks. These may allow horizontal interconnection and transmission of signals.

In addition, a vertical network (0604) may be provided for signal transmission; it may also be constructed like the known FPGA networks. Signals may also be transmitted past multiple rows of elements 0601 and 0602 via this network.

Since elements 0601 and 0602 typically already have a number of vertical bypass signal networks, 0604 is only optional and may be necessary for a large number of rows.

For coordinating the state machine of the PAE to the particular configured depth of the pipeline in 0610, i.e., the number (NRL) of register stages (0602) configured into it between the input (0605) and the output (0606), a register 0607 may be implemented into which NRL may be configured. On the basis of this data, the state machine may coordinate the generation of the PAE-internal control cycles and may also coordinate the handshake signals (PACT02 PACT16, PACT18) for the PAE-external bus systems.

Additional possible FPGA structures are known from Xilinx and Altera, for example. In an embodiment of the present invention, these may have a register structure according to 0610.

Figure 7C:
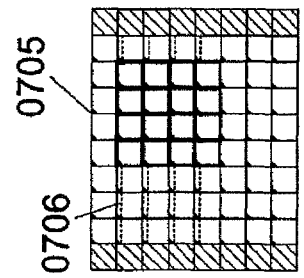
FIGS. 7A-7C illustrate example groups of PAEs of one or more VPUs for application of example methods, according to example embodiments of the present invention.
Figure 7B:
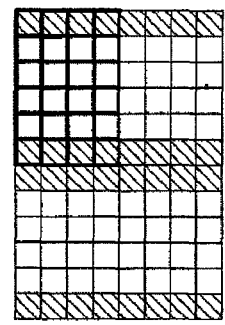
Figure 7A:
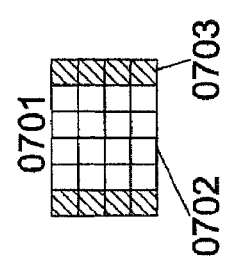

FIGS. 7A-7C show several strategies for achieving code compatibility between VPUs of different sizes:

0701 is an ALU-PAE (0702) RAM-PAE (0703) device which may define a possible "small" VPU. It is assumed in the following discussion that code has been generated for this structure and is now to be processed on other larger VPUs.

In a first possible embodiment, new code may be compiled for the new destination VPU. This may offer an advantage in that functions no longer present may be simulated in a new destination VPU by having the compiler instantiate macros for these functions which then simulate the original function. The simulation may be accomplished, e.g., through the use of multiple PAEs and/or by using sequencers as described below (e.g., for division, floating point, complex mathematics, etc.) and as known from PACT02 for example. However, with this method, binary compatibility may be lost.

The methods illustrated in FIGS. 7A-7C may have binary code compatibility.

According to a first method, wrapper code may be inserted (0704), lengthening the bus systems between a small ALU-PAE array and the RAM-PAEs. The code may contain, e.g., only the configuration for the bus systems and may be inserted from a memory into the existing binary code, e.g., at the configuration time and/or at the load time.

However, this method may result in a lengthy information transfer time over the lengthened bus systems. This may be disregarded at comparatively low frequencies (FIG. 7A, a)).

FIG. 7A, b) shows one example embodiment in which the lengthening of the bus systems has been compensated and thus is less critical in terms of frequency, which halves the runtime for the wrapper bus system compared to FIG. 7A, a).

For higher frequencies, the method according to FIG. 7B may be used; in this method, a larger VPU may represent a superset of compatible small VPUs (0701) and the complete structures of 0701 may be replicated. This is a method of providing direct binary compatibility.

In one example method according to FIG. 7C, additional high-speed bus systems may have a terminal (0705) at each PAE or each group of PAEs. Such bus systems are known from other patent applications by the present applicant, e.g., PACT07. Data may be transferred via terminals 0705 to a high-speed bus system (0706) which may then transfer the data in a performance-efficient manner over a great distance. Such high-speed bus systems may include, for example, Ethernet, RapidIO, USB, AMBA, RAMBUS and other industry standards.

The connection to the high-speed bus system may be inserted either through a wrapper, as described for FIG. 7A, or architectonically, as already provided for 0701. In this case, at 0701 the connection may be relayed directly to the adjacent cell and without use thereof. The hardware abstracts the absence of the bus system here.

Reference was made above to the coupling between a processor and a VPU in general and/or even more generally to a unit that is completely and/or partially and/or rapidly reconfigurable in particular at runtime, i.e., completely in a few clock cycles. This coupling may be supported and/or achieved through the use of certain operating methods and/or through the operation of preceding suitable compiling. Suitable compiling may refer, as necessary, to the hardware in existence in the related art and/or improved according to the present invention.

Parallelizing compilers according to the related art generally use special constructs such as semaphores and/or other methods for synchronization. Technology-specific methods are typically used. Known methods, however, are not suitable for combining functionally specified architectures with the particular time characteristic and imperatively specified algorithms. The methods used therefore offer satisfactory approaches only in specific cases.

Compilers for reconfigurable architectures, in particular reconfigurable processors, generally use macros which have been created specifically for the certain reconfigurable hardware, usually using hardware description languages (e.g., Verilog, VHDL, system C) to create the macros. These macros are then called (instantiated) from the program flow by an ordinary high-level language (e.g., C, C++).

Compilers for parallel computers are known, mapping program parts on multiple processors on a coarsely granular structure, usually based on complete functions or threads. In addition, vectorizing compilers are known, converting extensive linear data processing, e.g., computations of large terms, into a vectorized form and thus permitting computation on superscalar processors and vector processors (e.g., Pentium, Cray).

This patent therefore describes a method for automatic mapping of functionally or imperatively formulated computation specifications onto different target technologies, in particular onto ASICs, reconfigurable modules (FPGAs, DPGAs, VPUs, ChessArray, KressArray, Chameleon, etc., hereinafter referred to collectively by the term VPU), sequential processors (CISC-/RISC-CPUs, DSPs, etc., hereinafter referred to collectively by the term CPU) and parallel processor systems (SMP, MMP, etc.).

VPUs are essentially made up of a multidimensional, homogeneous or inhomogeneous, flat or hierarchical array (PA) of cells (PAEs) capable of executing any functions, e.g., logic and/or arithmetic functions (ALU-PAEs) and/or memory functions (RAM-PAEs) and/or network functions. The PAEs may be assigned a load unit (CT) which may determine the function of the PAEs by configuration and reconfiguration, if necessary.

This method is based on an abstract parallel machine model which, in addition to the finite automata, also may integrate imperative problem specifications and permit efficient algorithmic derivation of an implementation on different technologies.

The present invention is a refinement of the compiler technology according to DE 101 39 170.6, which describes in particular the close XPP connection to a processor within its data paths and also describes a compiler particularly suitable for this purpose, which also uses XPP stand-alone systems without snug processor coupling.

At least the following compiler classes are known in the related art: classical compilers, which often generate stack machine code and are suitable for very simple processors that are essentially designed as normal sequencers (see N. Wirth, Compilerbau, Teubner Verlag).

Vectorizing compilers construct largely linear code which is intended to run on special vector computers or highly pipelined processors. These compilers were originally available for vector computers such as CRAY. Modern processors such as Pentium require similar methods because of the long pipeline structure. Since the individual computation steps proceed in a vectorized (pipelined) manner, the code is therefore much more efficient. However, the conditional jump causes problems for the pipeline. Therefore, a jump prediction which assumes a jump destination may be advisable. If the assumption is false, however, the entire processing pipeline must be deleted. In other words, each jump is problematical for these compilers and there is no parallel processing in the true sense. Jump predictions and similar mechanisms require a considerable additional complexity in terms of hardware.

Coarsely granular parallel compilers hardly exist in the true sense; the parallelism is typically marked and managed by the programmer or the operating system, e.g., usually on the thread level in the case of MMP computer systems such as various IBM architectures, ASCII Red, etc. A thread is a largely independent program block or an entirely different program. Threads are therefore easy to parallelize on a coarsely granular level. Synchronization and data consistency must be ensured by the programmer and/or operating system. This is complex to program and requires a significant portion of the computation performance of a parallel computer. Furthermore, only a fraction of the parallelism that is actually possible is in fact usable through this coarse parallelization.

Finely granular parallel compilers (e.g., VLIW) attempt to map the parallelism on a finely granular level into VLIW arithmetic units which are able to execute multiple computation operations in parallel in one clock pulse but have a common register set. This limited register set presents a significant problem because it must provide the data for all computation operations. Furthermore, data dependencies and inconsistent read/write operations (LOAD/STORE) make parallelization difficult.

Reconfigurable processors have a large number of independent arithmetic units which are not interconnected by a common register set but instead via buses. Therefore, it is easy to construct vector arithmetic units while parallel operations may also be performed easily. Contrary to traditional register concepts, data dependencies are resolved by the bus connections.

With respect to embodiments of the present invention, it has been recognized that the concepts of vectorizing compilers and parallelizing compilers (e.g., VLIW) are to be applied simultaneously for a compiler for reconfigurable processors and thus they are to be vectorized and parallelized on a finely granular level.

An advantage may be that the compiler need not map onto a fixedly predetermined hardware structure but instead the hardware structure may be configured in such a way that it may be optimally suitable for mapping the particular compiled algorithm.

Description of the Compiler and Data Processing Device Operating Methods According to Embodiments of the Present Invention Modern processors usually have a set of user-definable instructions (UDI) which are available for hardware expansions and/or special coprocessors and accelerators. If UDIs are not available, processors usually at least have free instructions which have not yet been used and/or special instructions for coprocessors—for the sake of simplicity, all these instructions are referred to collectively below under the heading UDIs.

A quantity of these UDIs may now be used according to one embodiment of the present invention to trigger a VPU that has been coupled to the processor as a data path. For example, UDIs may trigger the loading and/or deletion and/or initialization of configurations and specifically a certain UDI may refer to a constant and/or variable configuration.

Configurations may be preloaded into a configuration cache which may be assigned locally to the VPU and/or preloaded into configuration stacks according to DE 196 51 075.9-53, DE 197 04 728.9 and DE 102 12 621.6-53 from which they may be configured rapidly and executed at runtime on occurrence of a UDI that initializes a configuration. Preloading the configuration may be performed in a configuration manager shared by multiple PAEs or PAs and/or in a local configuration memory on and/or in a PAE, in which case it may be required for only the activation to be triggered.

A set of configurations may be preloaded. In general, one configuration may correspond to a load UDI. In other words, the load UDIs may be each referenced to a configuration. At the same time, it may also be possible with a load UDI to refer to a complex configuration arrangement with which very extensive functions that may require multiple reloading of the array during execution, a wave reconfiguration, and/or even a repeated wave reconfiguration, etc., referenceable by an individual UDI.

During operation, configurations may also be replaced by others and the load UDIs may be re-referenced accordingly. A certain load UDI may thus reference a first configuration at a first point in time and at a second point in time it may reference a second configuration that has been newly loaded in the meantime. This may occur by the fact that an entry in a reference list which is to be accessed according to the UDI is altered.

Within the scope of the present invention, a LOAD/STORE machine model, such as that known from RISC processors, for example, may be used as the basis for operation of the VPU. Each configuration may be understood to be one instruction. The LOAD and STORE configurations may be separate from the data processing configurations.

A data processing sequence (LOAD-PROCESS-STORE) may thus take place as follows, for example:

1. LOAD Configuration

Loading the data from an external memory, for example, a ROM of an SOC into which the entire arrangement may be integrated and/or from peripherals into the internal memory bank (RAM-PAE, see DE 196 54 846.2-53, DE 100 50 442.6). The configuration may include, for example if necessary, address generators and/or access controls to read data out of processor-external memories and/or peripherals and enter it into the RAM-PAEs. The RAM-PAEs may be understood as multidimensional data registers (e.g., vector registers) for operation.

2.—(n−1) Data Processing Configurations

The data processing configurations may be configured sequentially into the PA. The data processing may take place exclusively between the RAM-PAEs—which may be used as multidimensional data registers—according to a LOAD/STORE (RISC) processor.

STORE Configuration

Writing the data from the internal memory banks (RAM-PAEs) to the external memory and/or to the peripherals. The configuration may include address generators and/or access controls to write data from the RAM-PAEs to the processor-external memories and/or peripherals.

Reference is made to PACT11 for the principles of LOAD/STORE operations.

The address generating functions of the LOAD/STORE configurations may be optimized so that, for example, in the case of a nonlinear access sequence of the algorithm to external data, the corresponding address patterns may be generated by the configurations. The analysis of the algorithms and the creation of the address generators for LOAD/STORE may be performed by the compiler.

This operating principle may be illustrated easily by the processing of loops. For example, a VPU having 256-entry-deep RAM-PAEs shall be assumed:

Example A for i:=1 to 10,000
1. LOAD-PROCESS-STORE cycle: load and process 1 . . . 256
2. LOAD-PROCESS-STORE cycle: load and process 257 . . . 512
3. LOAD-PROCESS-STORE cycle: load and process 513 . . . 768

Example B for i:=1 to 1000
  for j:=1 to 256
1. LOAD-PROCESS-STORE cycle: load and process i=1; j=1 . . . 256
2. LOAD-PROCESS-STORE cycle: load and process i=2; j=1 . . . 256
3. LOAD-PROCESS-STORE cycle: load and process i=3; j=1 . . . 256
. . .

Example C for i:=1 to 1000
  for j:=1 to 512
1. LOAD-PROCESS-STORE cycle: load and process i=1; j=1 . . . 256
2. LOAD-PROCESS-STORE cycle: load and process i=1; j=257 . . . 512
3. LOAD-PROCESS-STORE cycle: load and process i=2; j=1 . . . 256
. . .

It may be desirable for each configuration to be considered to be atomic, i.e., not interruptable. This may therefore solve the problem of having to save the internal data of the PA and the internal status in the event of an interruption. During execution of a configuration, the particular status may be written to the RAM-PAEs together with the data.

However, with this method, it may be that initially no statement is possible regarding the runtime behavior of a configuration. This may result in disadvantages with respect to the realtime capability and the task change performance.

Therefore, in an embodiment of the present invention, the runtime of each configuration may be limited to a certain maximum number of clock pulses. Any possible disadvantage of this embodiment may be disregarded because typically an upper limit is already set by the size of the RAM-PAEs and the associated data volume. Logically, the size of the RAM-PAEs may correspond to the maximum number of data processing clock pulses of a configuration, so that a typical configuration is limited to a few hundred to one thousand clock pulses. Multithreading/hyperthreading and realtime methods may be implemented together with a VPU by this restriction.

The runtime of configurations may be monitored by a tracking counter and/or watchdog, e.g., a counter (which runs with the clock pulse or some other signal). If the time is exceeded, the watchdog may trigger an interrupt and/or trap which may be understood and treated like an "illegal opcode" trap of processors.

Alternatively, a restriction may be introduced to reduce reconfiguration processes and to increase performance:

Running configurations may retrigger the watchdog and may thus proceed more slowly without having to be changed. A retrigger may be allowed, e.g., only if the algorithm has reached a "safe" state (synchronization point in time) at which all data and states have been written to the RAM-PAEs and an interruption is allowed according to the algorithm. A disadvantage of this may be that a configuration could run in a deadlock within the scope of its data processing but may continue to retrigger the watchdog properly and it may be that it thus does not terminate the configuration.

A blockade of the VPU resource by such a zombie configuration may be prevented by the fact that retriggering of the watchdog may be suppressed by a task change and thus the configuration may be changed at the next synchronization point in time or after a predetermined number of synchronization times. Then although the task having the zombie is no longer terminated, the overall system may continue to run properly.

Optionally multithreading and/or hyperthreading may be introduced as an additional method for the machine model and/or the processor. All VPU routines, i.e., their configurations, are preferably considered then as a separate thread. With a coupling to the processor of the VPU as the arithmetic unit, the VPU may be considered as a resource for the threads. The scheduler implemented for multithreading according to the related art (see also P 42 21 278.2-09) may automatically distribute threads programmed for VPUs (VPU threads) to them. In other words, the scheduler may automatically distribute the different tasks within the processor.

This may result in another level of parallelism. Both pure processor threads and VPU threads may be processed in parallel and may be managed automatically by the scheduler without any particular additional measures.

This method may be particularly efficient when the compiler breaks down programs into multiple threads that are processable in parallel, as is usually possible, thereby dividing all VPU program sections into individual VPU threads.

To support a rapid task change, in particular including realtime systems, multiple VPU data paths, each of which is considered as its own independent resource, may be implemented. At the same time, this may also increase the degree of parallelism because multiple VPU data paths may be used in parallel.

To support realtime systems in particular, certain VPU resources may be reserved for interrupt routines so that for a response to an incoming interrupt it is not necessary to wait for termination of the atomic non-interruptable configurations. Alternatively, VPU resources may be blocked for interrupt routines, i.e., no interrupt routine is able to use a VPU resource and/or contain a corresponding thread. Thus rapid interrupt response times may be also ensured. Since typically no VPU-performing algorithms occur within interrupt routines, or only very few, this method may be desirable. If the interrupt results in a task change, the VPU resource may be terminated in the meantime. Sufficient time is usually available within the context of the task change.

One problem occurring in task changes may be that it may be required for the LOAD-PROCESS-STORE cycle described previously to be interrupted without having to write all data and/or status information from the RAM-PAEs to the external RAMS and/or peripherals.

According to ordinary processors (e.g., RISC LOAD/STORE machines), a PUSH configuration is now introduced; it may be inserted between the configurations of the LOAD-PROCESS-STORE cycle, e.g., in a task change. PUSH may save the internal memory contents of the RAM-PAEs to external memories, e.g., to a stack; external here means, for example, external to the PA or a PA part but it may also refer to peripherals, etc. To this extent PUSH may thus correspond to the method of traditional processors in its principles. After execution of the PUSH operation, the task may be changed, i.e., the instantaneous LOAD-PROCESS-STORE cycle may be terminated and a LOAD-PROCESS-STORE cycle of the next task may be executed. The terminated LOAD-PROCESS-STORE cycle may be incremented again after a subsequent task change to the corresponding task in the configuration (KATS) which may follow after the last configuration implemented. To do so, a POP configuration may be implemented before the KATS configuration and thus the POP configuration in turn may load the data for the RAM-PAEs from the external memories, e.g., the stack, according to the methods used with known processors.

An expanded version of the RAM-PAEs according to DE 196 54 595.1-53 and DE 199 26 538.0 may be particularly efficient for this purpose; in this version the RAM-PAEs may have direct access to a cache (DE 199 26 538.0) (case A) or may be regarded as special slices within a cache and/or may be cached directly (DE 196 54 595.1-53) (case B).

Due to the direct access of the RAM-PAEs to a cache or direct implementation of the RAM-PAEs in a cache, the memory contents may be exchanged rapidly and easily in a task change.

Case A: the RAM-PAE contents may be written to the cache and loaded again out of it, e.g., via a separate and independent bus. A cache controller according to the related art may be responsible for managing the cache. Only the RAM-PAEs that have been modified in comparison with the original content need be written into the cache. A "dirty" flag for the RAM-PAEs may be inserted here, indicating whether a RAM-PAE has been written and modified. It should be pointed out that corresponding hardware means may be provided for implementation here.

Case B: the RAM-PAEs may be directly in the cache and may be labeled there as special memory locations which are not affected by the normal data transfers between processor and memory. In a task change, other cache sections may be referenced. Modified RAM-PAEs may be labeled as dirty. Management of the cache may be handled by the cache controller.

In application of cases A and/or B, a write-through method may yield considerable advantages in terms of speed, depending on the application. The data of the RAM-PAEs and/or caches may be written through directly to the external memory with each write access by the VPU. Thus the RAM-PAE and/or the cache content may remain clean at any point in time with regard to the external memory (and/or cache). This may eliminate the need for updating the RAM-PAEs with respect to the cache and/or the cache with respect to the external memory with each task change.

PUSH and POP configurations may be omitted when using such methods because the data transfers for the context switches are executed by the hardware.

By restricting the runtime of configurations and supporting rapid task changes, the realtime capability of a VPU-supported processor may be ensured.

The LOAD-PROCESS-STORE cycle may allow a particularly efficient method for debugging the program code according to DE 101 42 904.5. If each configuration is considered to be atomic and thus uninterruptible, then the data and/or states relevant for debugging may be essentially in the RAM-PAEs after the end of processing of a configuration. It may thus only be required that the debugger access the RAM-PAEs to obtain all the essential data and/or states.

Thus the granularity of a configuration may be adequately debuggable. If details regarding the process configurations must be debugged, according to DE 101 42 904.5 a mixed mode debugger is used with which the RAM-PAE contents are read before and after a configuration and the configuration itself is checked by a simulator which simulates processing of the configuration.

If the simulation results do not match the memory contents of the RAM-PAEs after the processing of the configuration processed on the VPU, then the simulator might not be consistent with the hardware and there may be either a hardware defect or a simulator error which must then be checked by the manufacturer of the hardware and/or the simulation software.

It should be pointed out in particular that the limitation of the runtime of a configuration to the maximum number of cycles may promote the use of mixed-mode debuggers because then only a relatively small number of cycles need be simulated.

Due to the method of atomic configurations described here, the setting of breakpoints may be simplified because monitoring of data after the occurrence of a breakpoint condition is necessary only on the RAM-PAEs, so that it may be that only they need be equipped with breakpoint registers and comparators.

In an example embodiment of hardware according to the present invention, the PAEs may have sequencers according to DE 196 51 075.9-53 (FIGS. 17, 18, 21) and/or DE 199 26 538.0, with entries into the configuration stack (see DE 197 04 728.9, DE 100 28 397.7, DE 102 12 621.6-53) being used as code memories for a sequencer, for example.

It has been recognized that such sequencers are usually very difficult for compilers to control and use. Therefore, it may be desirable for pseudocodes to be made available for these sequencers with compiler-generated assembler instructions being mapped on them. For example, it may be inefficient to provide opcodes for division, roots, exponents, geometric operations, complex mathematics, floating point instructions, etc. in the hardware. Therefore, such instructions may be implemented as multicyclic sequencer routines, with the compiler instantiating such macros by the assembler as needed.

Sequencers are particularly interesting, for example, for applications in which matrix computations must be performed frequently. In these cases, complete matrix operations such as a 2×2 matrix multiplication may be compiled as macros and made available for the sequencers.

If in an example embodiment of the architecture, FPGA units are implemented in the ALU-PAEs, then the compiler may have the following option:

When logic operations occur within the program to be translated by the compiler, e.g., &, |, >>, <<, etc., the compiler may generate a logic function corresponding to the operation for the FPGA units within the ALU-PAE. To this extent the compiler may be able to ascertain that the function does not have any time dependencies with respect to its input and output data, and the insertion of register stages after the function may be omitted.

If a time independence is not definitely ascertainable, then registers may be configured into the FPGA unit according to the function, resulting in a delay by one clock pulse and thus triggering the synchronization.

On insertion of registers, the number of inserted register stages per FPGA unit on configuration of the generated configuration on the VPU may be written into a delay register which may trigger the state machine of the PAE. The state machine may therefore adapt the management of the handshake protocols to the additionally occurring pipeline stage.

After a reset or a reconfiguration signal (e.g., Reconfig) (see PACT08, PACT16) the FPGA units may be switched to neutral, i.e., they may allow the input data to pass through to the output without modification. Thus, it may be that configuration information is not required for unused FPGA units.

All the PACT patent applications cited here are herewith incorporated fully for disclosure purposes.

Any other embodiments and combinations of the inventions referenced here are possible and will be obvious to those skilled in the art, and those skilled in the art can appreciate from the foregoing description that the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

Instruction datapaths of modern microprocessors are constrained by certain limitations because they use static instruction sets driven by the traditional von Neumann or Harvard architectural principles. These limitations may be avoided via a dynamic reconfigurable processor datapath extension achieved by integrating traditional static datapaths with the coarse-grain dynamic reconfigurable XPP architecture. Therefore, a loosely asynchronous coupling mechanism of the corresponding instruction datapath or datapath units has been developed and integrated onto a CMOS 0.13 µm standard cell technology from UMC. In embodiments of the present invention, the SPARC compatible LEON RISC processor may be used, with its static pipelined instruction datapath extended to be configured and personalized for specific applications. This compiler-compatible instruction set extension allows various and efficient uses, e.g., in streaming application domains like MPEG-4, digital filters, mobile communication modulation, etc.

Discussed below is a coupling technique by flexible dual-clock FIFO interfaces that allows asynchronous concurrency of the additionally configured compound instructions, which are integrated into the programming and compilation environment of the LEON processor, and that allows adaption of the frequency of the configured XPP datapath, dependent on actual performance requirements, e.g., for avoiding unneeded cycles and reducing power consumption.

The coupling technique of embodiments of the present invention discussed below combines the flexibility of a general purpose microprocessor with the performance and power consumption of coarse-grain reconfigurable datapath structures, nearly comparable to ASIC performance. Two programming and computing paradigms (control-driven von Neumann and transport-triggered XPP) are unified within one hybrid architecture with the option of two clock domains. The ability to reconfigure the transport-triggered XPP makes the system independent from standards or specific applications. This concept creates potential to develop multi-standard communication devices like software radios by using one extended processor architecture with adapted programming and compilation tools. Thus, new standards can be easily implemented through software updates. The system is scalable during design time through the scalable array-structure of the used XPP extension. This extends the range of suitable applications from products with less multimedia functions to complex high performance systems.

LEON RISC Microprocessor

Embodiments of the present invention may be implemented using a 32-bit SPARC V8 compatible LEON microprocessor. See SPARC International Inc., The SPARC Architecture Manual, Version 8, at http://www.sparc.com; Jiri Gaisler, *The LEON Processor User's Manual*, at http://www.gaisler.com. This microprocessor is a synthesisable, freely available VHDL model which has a load/store architecture and has a five stages pipeline implementation with separated instruction and data caches.

Figure 8:
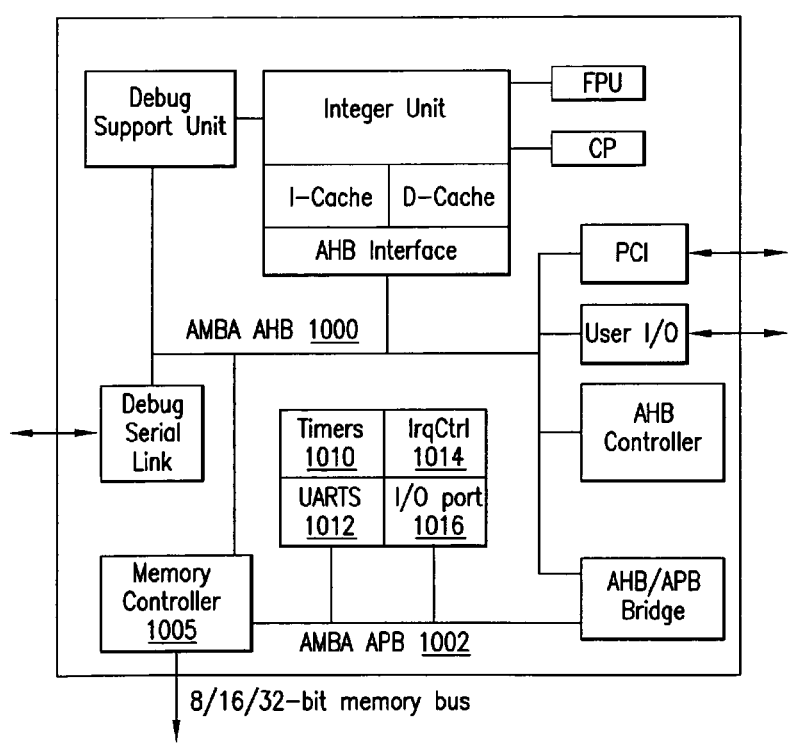
FIG. 8 illustrates components of a LEON architecture.

FIG. 8 illustrates components of a LEON architecture. The LEON may be provided with a full implementation of an AMBA 2.0 AHB and APB on-chip bus (1000, 1002), a hardware multiplier and divider, programmable 8/16/32-bit memory controller 1005 for external PROM, static RAM and SDRAM, and several on-chip peripherals such as timers 1010, UARTs 1012, an interrupt controller 1014, and a 16-bit I/O port 1016. A simple power down mode may be implemented as well.

Figure 9:
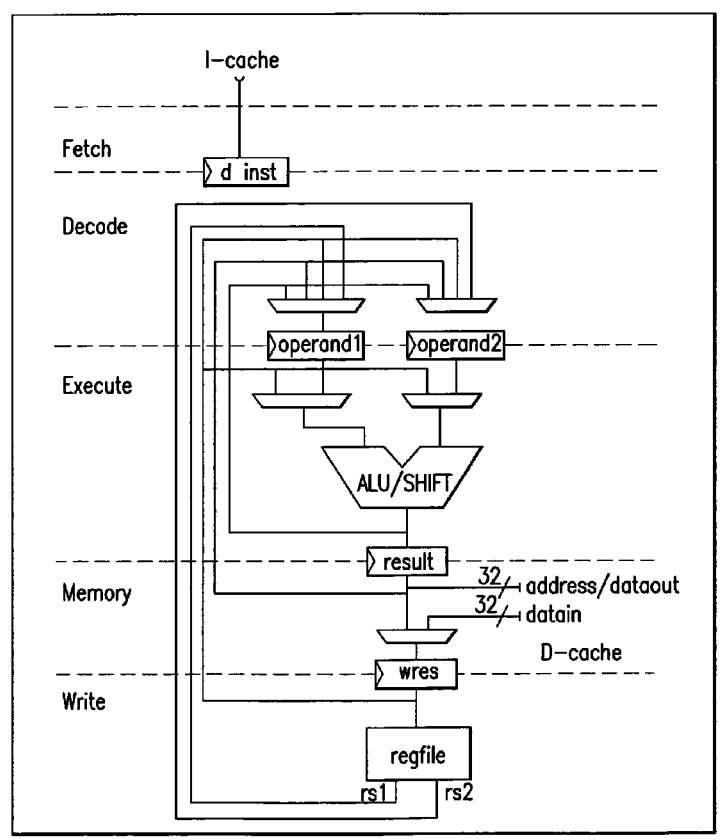
FIG. 9 shows the pipelined datapath structure of the LEON integer unit.

LEON is developed by the European Space Agency (ESA) for future space missions. The performance of LEON is close to an ARM 19 series but does not have a memory management unit (MMU) implementation, which limits the use to single memory space applications. FIG. 9 shows the pipelined datapath structure of the LEON integer unit.

eXtreme Processing Platform—XPP

Embodiments of the present invention may be implemented using the XPP architecture. Regarding the XPP architecture, see http://www.pactcorp.com; "The XPP Communication System," supra; and V. Baumgarte et al., "A Self-Reconfigurable Data Processing Architecture," The 1*st Intl. Conference of Engineering of Reconfigurable Systems and Algorithms* (ERSA '01), Las Vegas, Nev. (June 2001). The XPP architecture is based on a hierarchical array of coarse-grain, adaptive computing elements called Processing Array Elements (PAEs) and a packet-oriented communication network. The strength of the XPP technology originates from the combination of array processing with unique, powerful run-time reconfiguration mechanisms. Since configuration control is distributed over a Configuration Manager (CM) embedded in the array, PAEs can be configured rapidly in parallel while neighboring PAEs are processing data. Entire applications can be configured and run independently on different parts of the array. Reconfiguration may be triggered externally or even by special event signals originating within the array, enabling self-reconfiguring designs. By utilizing protocols implemented in hardware, data and event packets may be used to process, generate, decompose and merge streams of data.

The XPP has some similarities with other coarse-grain reconfigurable architectures like the KressArray (see R. Hartenstein et al., supra) or Raw Machines (see E. Waingold et al., supra), which are specifically designed for stream-based applications. XPP's main distinguishing features are its automatic packet-handling mechanisms and its sophisticated hierarchical configuration protocols for runtime and self reconfiguration.

Array Structure

A CM may include a state machine and internal RAM for configuration caching. The PAE itself (see top right-hand side of FIG. 10) may include a configuration bus which connects the CM with PAEs and other configurable objects. Horizontal busses may carry data and events. They can be segmented by configurable switch-objects, and can be connected to PAEs and special I/O objects at the periphery of the device.

Figure 10:
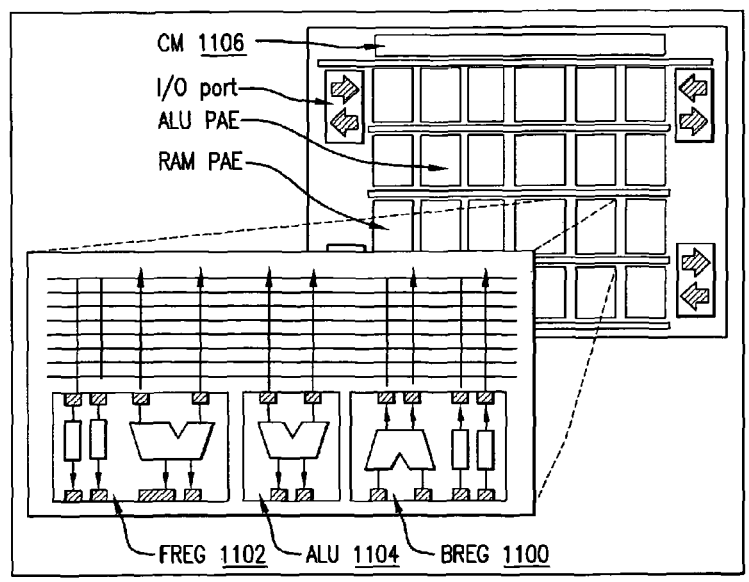
FIG. 10 illustrates components of a typical PAE.

A PAE is a collection of PAE objects. FIG. 10 illustrates components of a typical PAE, which may include a BREG object (back registers) 1100 and an FREG object (forward registers) 1102, which are used for vertical routing, as well as an ALU object 1104 which performs the actual computations. The ALU 1104 may perform common fixed-point arithmetical and logical operations as well as several special three input opcodes, such as multiply-add, sort, and counters. Events generated by ALU objects depend on ALU results or exceptions, very similar to the state flags of a conventional microprocessor. A counter, e.g., generates a special event only after it has terminated. How these events are used is discussed below. Another PAE object implemented in the XPP is a memory object which can be used in FIFO mode or as RAM for lookup tables, intermediate results, etc. However, any PAE object functionality can be included in the XPP architecture.

Packet Handling and Synchronization

PAE objects, as defined above, may communicate via a packet-oriented network. Two types of packets may be sent through the array: data packets and event packets. Data packets have a uniform bit width specific to the device type. In normal operation mode, PAE objects are self-synchronizing. An operation is performed as soon as all necessary data input packets are available. The results are forwarded as soon as they are available, provided the previous results have been used. Thus, it is possible to map a signal-flow graph directly to ALU objects. Event packets are one bit wide. They transmit state information which controls ALU execution and packet generation.

Configuration

Every PAE stores locally its current configuration state, i.e., if it is part of a configuration or not (states "configured" or "free"). Once a PAE is configured, it changes its state to "configured." This prevents the CM from reconfiguring a PAE which is still used by another application. The CM caches the configuration data in its internal RAM until the required PAEs become available.

While loading a configuration, all PAEs start to compute their part of the application as soon as they are in state "configured." Partially configured applications are able to process data without loss of packets. This concurrency of configuration and computation hides configuration latency.

XPP Application Mapping

The NML language, a PACT proprietary structural language with reconfiguration primitives, was developed by PACT to map applications to the XPP array. It gives the programmer direct access to all hardware features.

In NML, configurations consist of modules which are specified as in a structural hardware description language, similar to, for example, structural VHDL. PAE objects are explicitly allocated, optionally placed, and their connections specified. Hierarchical modules allow component reuse, especially for repetitive layouts. Additionally, NML includes statements to support configuration handling. A complete NML application program may include one or more modules, a sequence of initially configured modules, differential changes, and statements which map event signals to configuration and prefetch requests. Thus, configuration handling is an explicit part of the application program.

XPP-based architectures and development tools, such as the PACT XPP Development Suite (XDS) are discussed in detail at http://www.pactcorp.com.

LEON Instruction Datapath Extension

Figure 11:
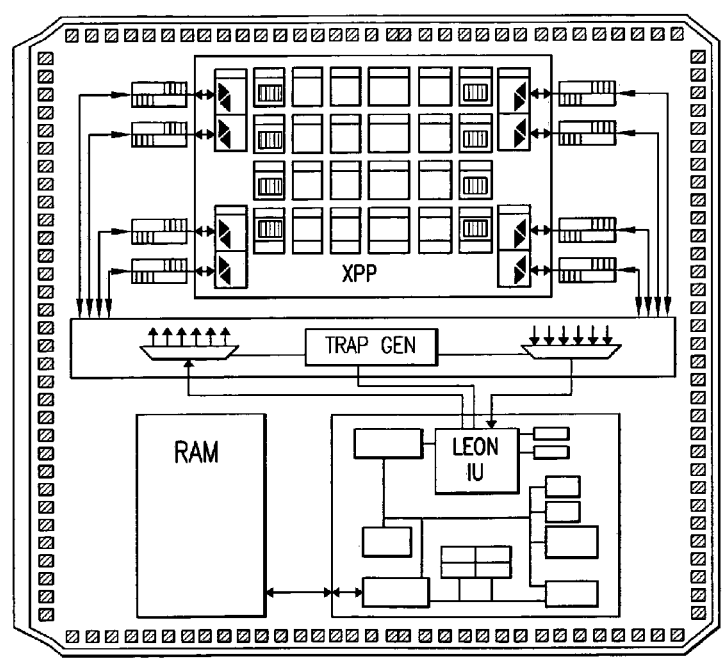
FIG. 11 is a diagram that illustrates an extended datapath according to an example embodiment of the present invention.

LEON and XPP should be able to communicate with each other in a simple and high performance manner. While the XPP is a dataflow orientated device, the LEON is a general purpose processor, suitable for handling control flow. See, for example, *The SPARC Architecture Manual*, supra; Jiri Gaisler, supra. Therefore, LEON may be used for system control. To do this, the XPP is integrated into the datapath of the LEON integer unit, which is able to control the XPP. FIG. 11 is a diagram that illustrates this extended datapath.

Due to unpredictable operation time of the XPP algorithm, integration of XPP into LEON data-path is done in a loosely-coupled way. Thus, the XPP array can operate independently of the LEON, which is able to control and reconfigure the XPP during runtime. Since the configuration of XPP is handled by LEON, the CM 1106 of the XPP is unnecessary and can be left out of the XPP array. The configuration codes are stored in the LEON RAM. LEON transfers the needed configuration from its system RAM into the XPP and creates the needed algorithm on the array.

Figure 12:
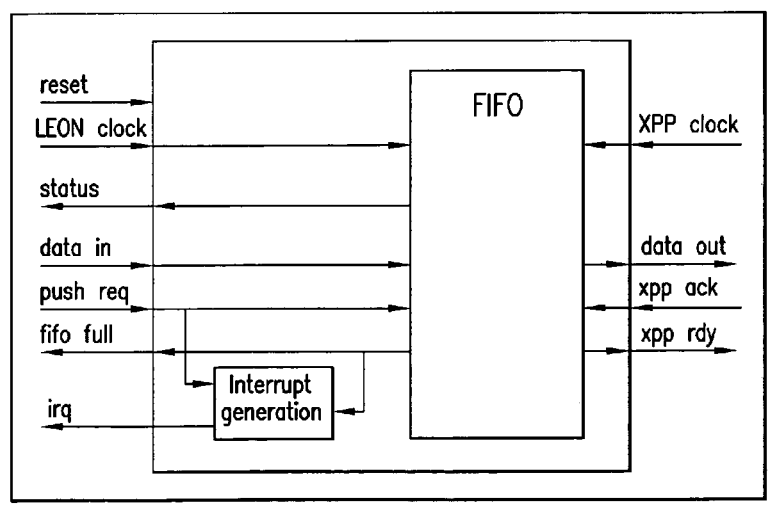
FIG. 12 illustrates transmission of data to an extended XPP-based datapath by passing the data through an IO-Port, according to an example embodiment of the present invention.

To enable a maximum of independence of XPP from LEON, all ports of the XPP—input ports as well as output ports—are buffered using dual clock FIFOs. Dual-clocked FIFOs are implemented into the IO-Ports between LEON and XPP. To transmit data to the extended XPP-based datapath, the data are passed through an IO-Port as shown in FIG. 12. In addition to the FIFO, the IO-Ports include logic to generate handshake signals and an interrupt request signal. The IO-Port for receiving data from XPP is similar to FIG. 12 except with a reversed direction of the data signals. This enables XPP to perform completely independently of LEON as long as there are input data available in the input port FIFOs and free space for result date in the output port FIFOs. There are a number of additional features implemented in the LEON pipeline to control the data transfer between LEON and XPP.

When LEON tries to write to an TO-Port containing a full FIFO or read from an IO-Port containing an empty FIFO, a trap is generated. This trap can be handled through a trap handler. A further mechanism, e.g., pipeline-holding, may be implemented to allow LEON to hold the pipeline and wait for free FIFO space during XPP write access or wait for a valid FIFO value during XPP read access. When using pipeline-holding, the software developer has to avoid reading from an IO-Port with an empty FIFO while the XPP, or the XPP input IO-Ports, includes no data to produce output. In this case a deadlock will occur requiring a reset of the complete system.

XPP can generate interrupts for the LEON when trying to read a value from an empty FIFO port or to write a value to a full FIFO port. The occurrence of interrupts indicates that the XPP array cannot process the next step because it has either no input values or it cannot output the result value. The interrupts generated by the XPP are maskable.

The interface provides information about the FIFOs. LEON can read the number of valid values that are in the FIFO.

Figure 13:
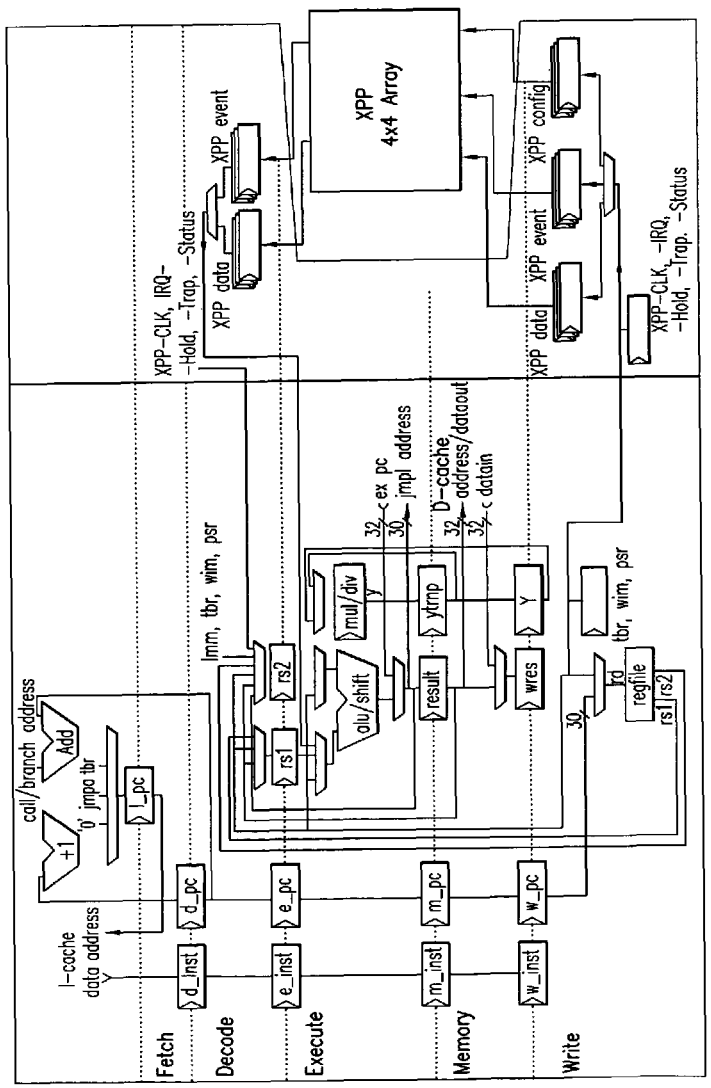
FIG. 13 illustrates an extended LEON instruction pipeline, according to an example embodiment of the present invention.

FIG. 13 illustrates an extended LEON instruction pipeline. The interface, shown in FIG. 13, to the XPP appears to the LEON as a set of special registers. These XPP registers can be divided into a communication register category and a status register category.

For data exchange, the XPP communication registers are used. Since XPP provides three different types of communication ports, there are also three types of communication registers each type is split into an input part and an output part.

Communication Registers

The data for the process are accessed through XPP data registers. The number of data input and data output ports, as well as the data bit-width depends on the implemented XPP array.

XPP can generate and consume events. Events are one bit signals. The number of input events and output events also depends on the implemented XPP array.

Configuration of the XPP is done through the XPP configuration register. LEON reads the required configuration value from a file stored in its system RAM and writes it to the XPP configuration register.

Status Resisters

There are a number of XPP status registers implemented to control the behavior and get status information of the interface. Switching between the usage of trap handling and pipeline holding can be done in the hold register. An XPP clock register includes a clock frequency ratio between LEON and XPP. By writing to this register, LEON software can set the XPP clock relative to the LEON clock. This allows adaptation of the XPP clock frequency to the required XPP performance and consequently allows for influencing the power consumption of the system. Writing zero to the XPP clock register turns off the XPP. There is also a status register for every FIFO including the number of valid values actually available in the FIFO.

This status registers provide a high degree of flexibility in communication between LEON and XPP and enables different communication modes.

Modes

If there is only one application running on the system at a particular time, software may be developed in pipeline-hold mode. In this instance, LEON initiates data read or write from or to XPP. If there is no value to read or no value to write, LEON pipeline will be stopped until read or write is possible. This can be used to reduce power consumption of the LEON part.

In interrupt mode, XPP can influence the LEON program flow. Thus, the IO-Ports generate an interrupt depending on the actual number of values available in the FIFO. The communication between LEON and XPP is via interrupt service routines.

Polling mode is a way to access the XPP. Initiated by a timer event, LEON reads XPP ports including data and writes to XPP ports including free FIFO space. Between these phases, LEON can compute other calculations.

It is possible to switch between these strategies anytime within one application.

A conventional XPP includes a configuration manager to handle configuration and reconfiguration of the array. However, in combination with the LEON, the configuration manager is dispensable because the configuration as well as any reconfiguration is controlled by the LEON through the XPP configuration register. All XPP configurations used for an application are stored in the LEON's system RAM.

Tool and Compiler Integration

To make the new XPP registers accessible through software, the LEON's SPARC 8 instruction set (see The SPARC Architecture Manual, supra) is extended by a new subset of instructions. These instructions are based on the SPARC instruction format, but do not conform to the SPARC V8 standard. Corresponding to the SPARC conventions of a load/store architecture, the instruction subset can be divided into two categories. Load/store instructions can exchange data between the LEON memory and the XPP communication registers. The number of cycles per instruction is similar to the standard load/store instructions of the LEON. Read/write instructions are used for communications between LEON registers. Since the LEON register-set is extended by the XPP registers, the read/write instructions are also extended to access XPP registers. Status registers can only be accessed with read/write instructions. Execution of arithmetic instructions on XPP registers are not possible. Values have to be written to standard LEON registers before they can be targets of arithmetic operations.

The complete system can still execute any SPARC V8 compatible code. Doing this, the XPP is completely unused.

The LEON is provided with the LECCS cross compiler system (see LEON/ERC32 *Crass Compilation System* (*LECCS*) at http://www.gaisler.com/cms4-5-3/index.php?option=com_content&task=view&id=62&Itemid=149) under the terms of LGPL. This system includes modified-versions of the binutils 2.11 and gcc 2.95.2. To make the new instruction subset available to software developers, the assembler of the binutils has been extended by a number of instructions according to the implemented instruction subset. The new instructions have the same mnemonic as the regular SPARC V8 load, store, read, and write instructions. Only the new XPP registers have to be used as a source or target operand. Since the modifications of LECCS are straightforward extensions, the cross compiler system is backward compatible to the original version. The availability of the source code of LECCS has allowed for extending the tools by the new XPP operations in the described way.

The development of the XPP algorithms have to be done with separate tools, provided by PACT Corp.

Application Results

As a first analysis application, an inverse Discrete Cosine Transform (DCT) applied to an 8×8 pixel block was implemented. For all simulations, a 2.50 MHz clock frequency for the LEON processor and a 50 MHZ clock frequency for XPP was used. The usage of XPP accelerates the computation of the iDCT by about a factor of four, depending on the communication mode. However, XPP has to be configured before computing the iDCT on it. The following table shows the configuration time for this algorithm.

|  | LEON alone | LEON with XPP in IRQ Mode | LEON with XPP in Poll Mode | LEON with XPP in Hold Mode |
|---|---|---|---|---|
| Configuration of XPP 2D iDCT (8 × 8) | —<br>14.672 ns<br>3.668 cycles | 71.308 ns<br>17.827 cycles<br>3.272 ns<br>818 cycles | 84.364 ns<br>21.091 cycles<br>3.872 ns<br>968 cycles | 77.976 ns<br>19.494 cycles<br>3.568 ns<br>892 cycles |

Figure 14:
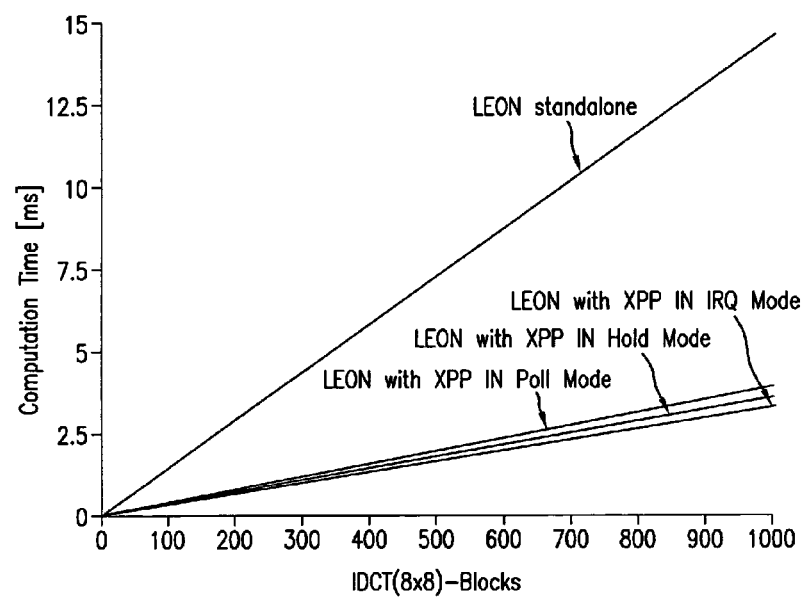
FIG. 14 is a graph that shows that the benefit brought by XPP rises with the number of iDCT blocks computed by it before reconfiguration.

As shown in FIG. 14, the benefit brought by XPP rises with the number of iDCT blocks computed by it before reconfiguration. Accordingly, the number of reconfigurations during complex algorithms should be minimized.

Figure 15:
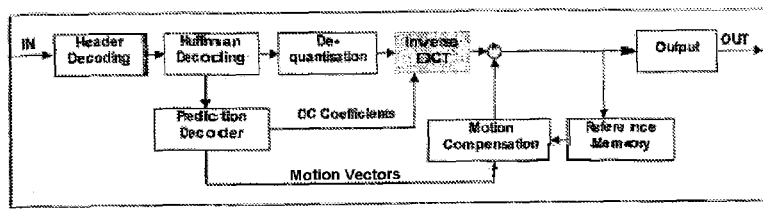
FIG. 15 is a block diagram of an MPEG-4 decoding algorithm, according to an example embodiment of the present invention.

A first complex application implemented on the system is MPEG-4 decoding. The optimization of the algorithm partitioning on LEON and XPP is still in progress. FIG. 15 is a block diagram of the MPEG-4 decoding algorithm. Frames with 320×240 pixels were decoded. LEON, by using SPARC V8 standard instructions, decodes one frame in 23.46 seconds. In a first implementation of MPEG-4 using the XPP, only the iDCT is computed by XPP. The rest of the MPEG-4 decoding is still done with LEON. With the help of XPP, one frame is decoded in 17.98 s. This is a performance boost of more then twenty percent. Since the XPP performance gain by accelerating the iDCT algorithm only is very low at the moment, we work on XPP implementations of Huffmann-decoding, dequantization, and prediction decoding. So the performance boost of this implementation against the standalone LEON will be increased.

Hardware Design Parameter Changes

For integration of the XPP core as a functional unit into a standard RISC core, some system parameters may be reconsidered as follows:

Pipelining/Concurrency/Synchronicity

RISC instructions of totally different type (Ld/St, ALU, MuL/Div/MAC, FPALU, FPMul, etc.) may be executed in separate specialized functional units to increase the fraction of silicon that is busy on average. Such functional unit separation has led to superscalar RISC designs that exploit higher levels of parallelism.

Each functional unit of a RISC core may be highly pipelined to improve throughput. Pipelining may overlap the execution of several instructions by splitting them into unrelated phases, which may be executed in different stages of the pipeline. Thus, different stages of consecutive instructions can be executed in parallel with each stage taking much less time to execute. This may allow higher core frequencies.

With an approximate subdivision of the pipelines of all functional units into sub-operations of the same size (execution time), these functional units/pipelines may execute in a highly synchronous manner with complex floating point pipelines being the exception.

Since the XPP core uses data flow computation, it is pipelined by design. However, a single configuration usually implements a loop of the application, so the configuration remains active for many cycles, unlike the instructions in every other functional unit, which typically execute for one or two cycles at most. Therefore, it is still worthwhile to consider the separation of several phases, (e.g., Ld/Ex/Store), of an XPP configuration, (i.e., an XPP instruction), into several functional units to improve concurrency via pipelining on this coarser scale. This also may improve throughput and response time in conjunction with multi tasking operations and implementations of simultaneous multithreading (SMT).

The multi cycle execution time may also forbid a strongly synchronous execution scheme and may rather lead to an asynchronous scheme, e.g., like for floating point square root units. This in turn may necessitate the existence of explicit synchronization instructions.

Core Frequency/Memory Hierarchy

As a functional unit, the XPP's operating frequency may either be half of the core frequency or equal to the core frequency of the RISC. Almost every RISC core currently on the market exceeds its memory bus frequency with its core frequency by a larger factor. Therefore, caches are employed, forming what is commonly called the memory hierarchy, where each layer of cache is larger but slower than its predecessors.

This memory hierarchy does not help to speed up computations which shuffle large amounts of data, with little or no data reuse. These computations are called "bounded by memory bandwidth." However, other types of computations with more data locality (another term for data reuse) may gain performance as long as they fit into one of the upper layers of the memory hierarchy. This is the class of applications that gains the highest speedups when a memory hierarchy is introduced.

Classical vectorization can be used to transform memory-bounded algorithms, with a data set too big to fit into the upper layers of the memory hierarchy. Rewriting the code to reuse smaller data sets sooner exposes memory reuse on a smaller scale. As the new data set size is chosen to fit into the caches of the memory hierarchy, the algorithm is not memory bounded anymore, yielding significant speed-ups.

Software/Multitasking Operating Systems

As the XPP is introduced into a RISC core, the changed environment—higher frequency and the memory hierarchy—may necessitate, not only reconsideration of hardware design parameters, but also a reevaluation of the software environment.

Memory Hierarchy

The introduction of a memory hierarchy may enhance the set of applications that can be implemented efficiently. So far, the XPP has mostly been used for algorithms that read their data sets in a linear manner, applying some calculations in a pipelined fashion and writing the data back to memory. As long as all of the computation fits into the XPP array, these algorithms are memory bounded. Typical applications are filtering and audio signal processing in general.

But there is another set of algorithms that have even higher computational complexity and higher memory bandwidth requirements. Examples are picture and video processing, where a second and third dimension of data coherence opens up. This coherence is, e.g., exploited by picture and video compression algorithms that scan pictures in both dimensions to find similarities, even searching consecutive pictures of a video stream for analogies. These algorithms have a much higher algorithmic complexity as well as higher memory requirements. Yet they are data local, either by design or by transformation, thus efficiently exploiting the memory hierarchy and the higher clock frequencies of processors with memory hierarchies.

Multi Tasking

The introduction into a standard RISC core makes it necessary to understand and support the needs of a multitasking operating system, as standard RISC processors are usually operated in multitasking environments. With multitasking, the operating system may switch the executed application on a regular basis, thus simulating concurrent execution of several applications (tasks). To switch tasks, the operating system may have to save the state, (e.g., the contents of all registers), of the running task and then reload the state of another task. Hence, it may be necessary to determine what the state of the processor is, and to keep it as small as possible to allow efficient context switches.

Modern microprocessors gain their performance from multiple specialized and deeply pipelined functional units and high memory hierarchies, enabling high core frequencies. But high memory hierarchies mean that there is a high penalty for cache misses due to the difference between core and memory frequency. Many core cycles may pass until the values are finally available from memory. Deep pipelines incur pipeline stalls due to data dependencies as well as branch penalties for mispredicted conditional branches. Specialized functional units like floating point units idle for integer-only programs. For these reasons, average functional unit utilization is much too low.

The newest development with RISC processors, Simultaneous MultiThreading (SMT), adds hardware support for a finer granularity (instruction/functional unit level) switching of tasks, exposing more than one independent instruction stream to be executed. Thus, whenever one instruction stream stalls or doesn't utilize all functional units, the other one can jump in. This improves functional unit utilization for today's processors.

With SMT, the task (process) switching is done in hardware, so the processor state has to be duplicated in hardware. So again it is most efficient to keep the state as small as possible. For the combination of the PACT XPP and a standard RISC processor, SMT may be very beneficial, since the XPP configurations may execute longer than the average RISC instruction. Thus, another task can utilize the other functional units, while a configuration is running. On the other hand, not every task will utilize the XPP, so while one such non-XPP task is running, another one will be able to use the XPP core.

Communication Between the RISC Core and the XPP Core

The following are several possible embodiments that are each a possible hardware implementation for accessing memory.

Streaming

Since streaming can only support (number_of_IO_ports*width_of_IO_port) bits per cycle, it may be well suited for only small XPP arrays with heavily pipelined configurations that feature few inputs and outputs. As the pipelines take a long time to fill and empty while the running time of a configuration is limited (as described herein with respect to "context switches"), this type of communication does not scale well to bigger XPP arrays and XPP frequencies near the RISC core frequency.

Streaming from the RISC Core

In this setup, the RISC may supply the XPP array with the streaming data. Since the RISC core may have to execute several instructions to compute addresses and load an item from memory, this setup is only suited if the XPP core is reading data with a frequency much lower than the RISC core frequency.

Streaming Via DMA

In this mode the RISC core only initializes a DMA channel which may then supply the data items to the streaming port of the XPP core.

Shared Memory (Main Memory)

In this configuration, the XPP array configuration may use a number of PAEs to generate an address that is used to access main memory through the IO ports. As the number of IO ports may be very limited, this approach may suffer from the same limitations as the previous one, although for larger XPP arrays there is less impact of using PAEs for address generation. However, this approach may still be useful for loading values from very sparse vectors.

Shared Memory (IRAM)

This data access mechanism uses the IRAM elements to store data for local computations. The IRAMs can either be viewed as vector registers or as local copies of main memory.

The following are several ways in which to fill the IRAMs with data:

1. The IRAMs may be loaded in advance by a separate configuration using streaming.

This method can be implemented with the current XPP architecture. The IRAMs act as vector registers. As explicated above, this may limit the performance of the XPP array, especially as the IRAMs will always be part of the externally visible state and hence must be saved and restored on context switches.

2. The IRAMs may be loaded in advance by separate load-instructions.

This is similar to the first method. Load-instructions may be implemented in hardware which loads the data into the IRAMs. The load-instructions can be viewed as a hard coded load configuration. Therefore, configuration reloads may be reduced. Additionally, the special load instructions may use a wider interface to the memory hierarchy. Therefore, a more efficient method than streaming can be used.

3. The IRAMs can be loaded by a "burst preload from memory" instruction of the cache controller. No configuration or load-instruction is needed on the XPP. The IRAM load may be implemented in the cache controller and triggered by the RISC processor. But the IRAMs may still act as vector registers and may be therefore included in the externally visible state.

4. The best mode, however, may be a combination of the previous solutions with the extension of a cache:

A preload instruction may map a specific memory area defined by starting address and size to an IRAM. This may trigger a (delayed, low priority) burst load from the memory hierarchy (cache). After all IRAMs are mapped, the next configuration can be activated. The activation may incur a wait until all burst loads are completed. However, if the preload instructions are issued long enough in advance and no interrupt or task switch destroys cache locality, the wait will not consume any time.

To specify a memory block as output-only IRAM, a "preload clean" instruction may be used, which may avoid loading data from memory. The "preload clean" instruction just indicates the IRAM for write back.

A synchronization instruction may be needed to make sure that the content of a specific memory area, which is cached in IRAM, is written back to the memory hierarchy. This can be done globally (full write back), or selectively by specifying the memory area, which will be accessed.

State of the XPP Core

As discussed above, the size of the state may be crucial for the efficiency of context switches. However, although the size of the state may be fixed for the XPP core, whether or not they have to be saved may depend on the declaration of the various state elements.

The state of the XPP core can be classified as:

1. Read only (instruction data)

configuration data, consisting of PAE configuration and routing configuration data; and 2. Read-Write
   the contents of the data registers and latches of the PAEs, which are driven onto the busses
   the contents of the IRAM elements.

Limiting Memory Traffic

There are several possibilities to limit the amount of memory traffic during context switches, as follows:

do not Save Read-Only Data

This may avoid storing configuration data, since configuration data is read only. The current configuration may be simply overwritten by the new one.

Save Less Data

If a configuration is defined to be uninterruptible (non pre-emptive), all of the local state on the busses and in the PAEs can be declared as scratch. This means that every configuration may get its input data from the IRAMs and may write its output data to the IRAMs. So after the configuration has finished, all information in the PAEs and on the buses may be redundant or invalid and saving of the information might not be required.

Save Modified Data Only

To reduce the amount of R/W data which has to be saved, the method may keep track of the modification state of the different entities. This may incur a silicon area penalty for the additional "dirty" bits.

Use Caching to Reduce the Memory Traffic

The configuration manager may handle manual preloading of configurations. Preloading may help in parallelizing the memory transfers with other computations during the task switch. This cache can also reduce the memory traffic for frequent context switches, provided that a Least Recently Used (LRU) replacement strategy is implemented in addition to the preload mechanism.

The IRAMs can be defined to be local cache copies of main memory as discussed above under the heading "Shared Memory (IRAM)." Then each IRAM may be associated with a starting address and modification state information. The IRAM memory cells may be replicated. An IRAM PAE may contain an IRAM block with multiple IRAM instances. It may be that only the starting addresses of the IRAMs have to be saved and restored as context. The starting addresses for the IRAMs of the current configuration select the IRAM instances with identical addresses to be used.

If no address tag of an IRAM instance matches the address of the newly loaded context, the corresponding memory area may be loaded to an empty IRAM instance.

If no empty IRAM instance is available, a clean (unmodified) instance may be declared empty (and hence it may be required for it to be reloaded later on).

If no clean IRAM instance is available, a modified (dirty) instance may be cleaned by writing its data back to main memory. This may add a certain delay for the write back.

This delay can be avoided if a separate state machine (cache controller) tries to clean inactive IRAM instances by using unused memory cycles to write back the IRAM instances' contents.

Context Switches

Usually a processor is viewed as executing a single stream of instructions. But today's multi-tasking operating systems support hundreds of tasks being executed on a single processor. This is achieved by switching contexts, where all, or at least the most relevant parts, of the processor state which belong to the current task—the task's context—is exchanged with the state of another task, that will be executed next.

There are three types of context switches: switching of virtual processors with simultaneous multithreading (SMT, also known as HyperThreading), execution of an Interrupt Service Routine (ISR), and a Task Switch.

SMT Virtual Processor Switch

This type of context switch may be executed without software interaction, totally in hardware. Instructions of several instruction streams are merged into a single instruction stream to increase instruction level parallelism and improve functional unit utilization. Hence, the processor state cannot be stored to and reloaded from memory between instructions from different instruction streams. For example, in an instance of alternating instructions from two streams and hundreds to thousands of cycles might be needed to write the processor state to memory and read in another state.

Hence hardware designers have to replicate the internal state for every virtual processor. Every instruction may be executed within the context (on the state) of the virtual processor whose program counter was used to fetch the instruction. By replicating the state, only the multiplexers, which have to be inserted to select one of the different states, have to be switched.

Thus the size of the state may also increase the silicon area needed to implement SMT, so the size of the state may be crucial for many design decisions.

Interrupt Service Routine

This type of context switch may be handled partially by hardware and partially by software. It may be required for all of the state modified by the ISR to be saved on entry and it may be required for it to be restored on exit.

The part of the state which is destroyed by the jump to the ISR may be saved by hardware, (e.g., the program counter). It may be the ISR's responsibility to save and restore the state of all other resources, that are actually used within the ISR.

The more state information to be saved, the slower the interrupt response time may be and the greater the performance impact may be if external events trigger interrupts at a high rate.

The execution model of the instructions may also affect the tradeoff between short interrupt latencies and maximum throughput. Throughput may be maximized if the instructions in the pipeline are finished and the instructions of the ISR are chained. This may adversely affect the interrupt latency. If, however, the instructions are abandoned (pre-empted) in favor of a short interrupt latency, it may be required for them to be fetched again later, which may affect throughput. The third possibility would be to save the internal state of the instructions within the pipeline, but this may require too much hardware effort. Usually this is not done.

Task Switch

This type of context switch may be executed totally in software. It may be required for all of a task's context (state) to be saved to memory, and it may be required for the context of the new task to be reloaded. Since tasks are usually allowed to use all of the processor's resources to achieve top performance, it may be required to save and restore all of the processor state. If the amount of state is excessive, it may be required for the rate of context switches to be decreased by less frequent rescheduling, or a severe throughput degradation may result, as most of the time may be spent in saving and restoring task contexts. This in turn may increase the response time for the tasks.

A Load Store Architecture

In an example embodiment of the present invention, an XPP integration may be provided as an asynchronously pipelined functional unit for the RISC. An explicitly preloaded cache may be provided for the IRAMs, on top of the memory hierarchy existing within the RISC (as discussed above under the heading "Shared Memory (IRAM)." Additionally a decentralized explicitly preloaded configuration cache within the PAE array may be employed to support preloading of configurations and fast switching between configurations.

Since the IRAM content is an explicitly preloaded memory area, a virtually unlimited number of such IRAMs can be used. They may be identified by their memory address and their size. The IRAM content may be explicitly preloaded by the application. Caching may increase performance by reusing data from the memory hierarchy. The cached operation may also eliminate the need for explicit store instructions; they may be handled implicitly by cache write back operations but can also be forced to synchronize with the RISC.

The pipeline stages of the XPP functional unit may be Load, Execute, and Write Back (Store). The store may be executed delayed as a cache write back. The pipeline stages may execute in an asynchronous fashion, thus hiding the variable delays from the cache preloads and the PAE array.

The XPP functional unit may be decoupled of the RISC by a FIFO fed with the XPP instructions. At the head of this FIFO, the XPP PAE may consume and execute the configurations and the preloaded IRAMs. Synchronization of the XPP and the RISC may be done explicitly by a synchronization instruction.

Instructions

Embodiments of the present invention may require certain instruction formats. Data types may be specified using a C style prototype definition. The following are example instruction formats which may be required, all of which execute asynchronously, except for an XPPSync instruction, which can be used to force synchronization.

XPPPreloadConfig (void *ConfigurationStartAddress)

The configuration may be added to the preload FIFO to be loaded into the configuration cache within the PAE array.

Note that speculative preloads is possible since successive preload commands overwrite the previous.

The parameter is a pointer register of the RISC pointer register file. The size is implicitly contained in the configuration.

XPPPreload (int IRAM, void *StartAddress, int Size)
XPPPreloadClean (int IRAM, void *StartAddress, int Size)

This instruction may specify the contents of the IRAM for the next configuration execution. In fact, the memory area may be added to the preload FIFO to be loaded into the specified IRAM.

The first parameter may be the IRAM number. This may be an immediate (constant) value.

The second parameter may be a pointer to the starting address. This parameter may be provided in a pointer register of the RISC pointer register file.

The third parameter may be the size in units of 32 bit words. This may be an integer value. It may reside in a general purpose register of the RISC's integer register file.

The first variant may actually preload the data from memory.

The second variant may be for write-only accesses. It may skip the loading operation. Thus, it may be that no cache misses can occur for this IRAM. Only the address and size are defined. They are obviously needed for the write back operation of the IRAM cache.

Note that speculative preloads are possible since successive preload commands to the same IRAM overwrite each other (if no configuration is executed in between). Thus, only the last preload command may be actually effective when the configuration is executed.

XPPExecute ( )

This instruction may execute the last preloaded configuration with the last preloaded IRAM contents. Actually, a configuration start command may be issued to the FIFO. Then the FIFO may be advanced. This may mean that further preload commands will specify the next configuration or parameters for the next configuration.

Whenever a configuration finishes, the next one may be consumed from the head of the FIFO; if its start command has already been issued.

XPPSync (void *StartAddress, int Size)

This instruction may force write back operations for all IRAMs that overlap the given memory area. If overlapping IRAMs are still in use by a configuration or preloaded to be used, this operation will block. Giving an address of NULL (zero) and a size of MAX INT (bigger than the actual memory), this instruction can also be used to wait until all issued configurations finish.

A Basic Implementation

Figure 16:
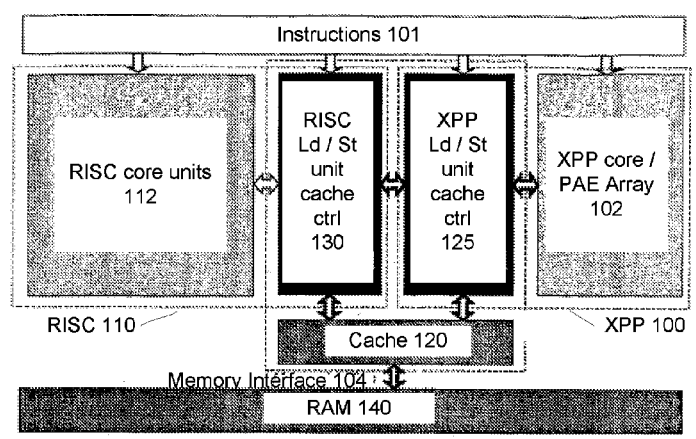
FIG. 16 is a block diagram illustrating components of an example embodiment of the present invention, where an XPP core and a RISC core share a memory hierarchy.

As shown in FIG. 16, the XPP core 102 may share a memory hierarchy with the RISC core 112 using a special cache controller 125-130.

Figure 17:
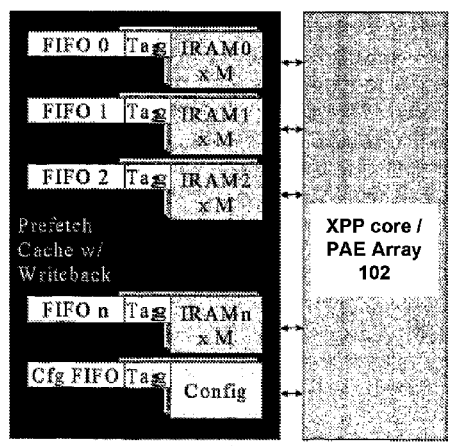
FIG. 17 shows an IRAM and configuration cache controller data structures and a usage example, according to an example embodiment of the present invention.

FIG. 17 shows an IRAM and configuration cache controller data structures and a usage example (instructions).

The preload-FIFOs in FIG. 17 may contain the addresses and sizes for already issued IRAM preloads, exposing them to the XPP cache controller. The FIFOs may have to be duplicated for every virtual processor in an SMT environment. "Tag" is the typical tag for a cache line containing starting address, size, and state (empty/clean/dirty I in-use). The additional in-use state signals usage by the current configuration. The cache controller cannot manipulate these IRAM instances.

The execute configuration command may advance all preload FIFOs, copying the old state to the newly created entry. This way the following preloads may replace the previously used IRAMs and configurations. If no preload is issued for an IRAM before the configuration is executed, the preload of the previous configuration may be retained. Therefore, it may be that it is not necessary to repeat identical preloads for an IRAM in consecutive configurations.

Figure 18:
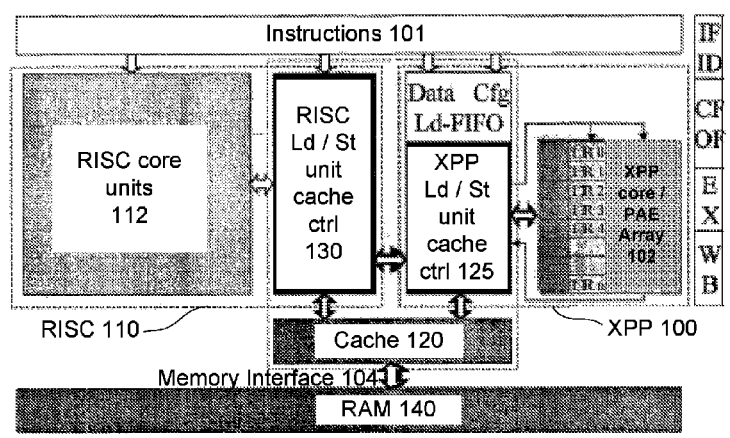
FIG. 18 shows an asynchronous pipeline of an XPP, according to an example embodiment of the present invention.

Each configuration's execute command may have to be delayed (stalled) until all necessary preloads are finished, either explicitly by the use of a synchronization command or implicitly by the cache controller. Hence the cache controller (XPP Ld/St unit) 125 may have to handle the synchronization and execute commands as well, actually starting the configuration as soon as all data is ready. After the termination of the configuration, dirty IRAMs may be written back to memory as soon as possible if their content is not reused in the same IRAM. Therefore the XPP PAE array (XPP core 102) and the XPP cache controller 125 can be seen as a single unit since they do not have different instruction streams. Rather, the cache controller can be seen as the configuration fetch (CF), operand fetch (OF) (IRAM preload) and write back (WB) stage of the XPP pipeline, also triggering the execute stage (EX) (PAE array). FIG. 18 shows the asynchronous pipeline of the XPP 100.

Due to the long latencies, and their non-predictability (cache misses, variable length configurations), the stages can be overlapped several configurations wide using the configuration and data preload FIFO, (i.e., pipeline), for loose coupling. If a configuration is executing and the data for the next has already been preloaded, the data for the next but one configuration may be preloaded. These preloads can be speculative. The amount of speculation may be the compiler's trade-off. The reasonable length of the preload FIFO can be several configurations. It may be limited by diminishing returns, algorithm properties, the compiler's ability to schedule preloads early and by silicon usage due to the IRAM duplication factor, which may have to be at least as big as the FIFO length. Due to this loosely coupled operation, the interlocking (to avoid data hazards between IRAMs) cannot be done optimally by software (scheduling), but may have to be enforced by hardware (hardware interlocking). Hence the XPP cache controller and the XPP PAE array can be seen as separate but not totally independent functional units.

Figure 19:
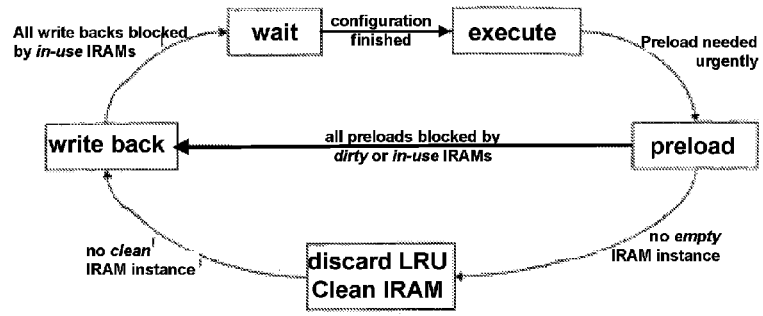
FIG. 19 is a diagram that illustrates tasks of an XPP cache controller as states, according to an example embodiment of the present invention.

The XPP cache controller may have several tasks. These are depicted as states in FIG. 19. State transitions may take place along the edges between states, whenever the condition for the edge is true. As soon as the condition is not true any more, the reverse state transition may take place. The activities for the states may be as follows.

At the lowest priority, the XPP cache controller 125 may have to fulfill already issued preload commands, while writing back dirty IRAMs as soon as possible.

As soon as a configuration finishes, the next configuration can be started. This is a more urgent task than write backs or future preloads. To be able to do that, all associated yet unsatisfied preloads may have to be finished first. Thus, they may be preloaded with the high priority inherited from the execute state.

A preload in turn can be blocked by an overlapping in-use or dirty IRAM instance in a different block or by the lack of empty IRAM instances in the target IRAM block. The former can be resolved by waiting for the configuration to finish and/or by a write back. To resolve the latter, the least recently used clean IRAM can be discarded, thus becoming empty. If no empty or clean IRAM instance exists, a dirty one may have to be written back to the memory hierarchy. It cannot occur that no empty, clean, or dirty IRAM instances exist, since only one instance can be in-use and there should be more than one instance in an IRAM block; otherwise, no caching effect is achieved.

Figure 20:
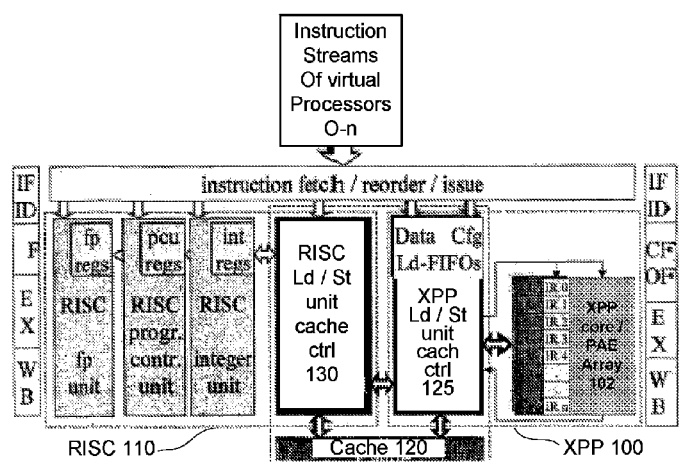
FIG. 20 shows simultaneous multithreading according to an example embodiment of the present invention.

In an SMT environment the load FIFOs may have to be replicated for every virtual processor. The pipelines of the functional units may be fed from the shared fetch/reorder/issue stage. All functional units may execute in parallel. Different units can execute instructions of different virtual processors. FIG. 20 shows adding of simultaneous multithreading.

So the following design parameters, with their smallest initial value, may be obtained:
IRAM length: 128 words
  The longer the IRAM length, the longer the running time of the configuration and the less influence the pipeline startup has.
FIFO length: 1
  This parameter may help to hide cache misses during preloading. The longer the FIFO length, the less disruptive is a series of cache misses for a single configuration.
IRAM duplication factor: (pipeline stages+caching factor)*virtual processors: 3
  Pipeline stages is the number of pipeline stages LD/EX/WB plus one for every FIFO stage above one: 3
  Caching factor is the number of IRAM duplicates available for caching: 0
  Virtual processors is the number of virtual processors with SMT: 1
The size of the state of a virtual processor is mainly dependent on the FIFO length. It is
FIFO length*#IRAM ports*(32 bit (Address)+32 bit (Size)).

This may have to be replicated for every virtual processor. The total size of memory used for the IRAMs may be:
IRAM ports*IIRAM duplication factor*IRAM length*32 bit.

A first implementation will probably keep close to the above-stated minimum parameters, using a FIFO length of one, an IRAM duplication factor of four, an IRAM length of 128 and no simultaneous multithreading.

Implementation Improvements

Write Pointer

To further decrease the penalty for unloaded IRAMs, a simple write pointer may be used per IRAM, which may keep track of the last address already in the IRAM. Thus, no stall is required, unless an access beyond this write pointer is encountered. This may be especially useful if all IRAMs have to be reloaded after a task switch. The delay to the configuration start can be much shorter, especially, if the preload engine of the cache controller chooses the blocking IRAM next whenever several IRAMs need further loading.

Longer FIFOs

The frequency at the bottom of the memory hierarchy (main memory) cannot be raised to the same extent as the frequency of the CPU core. To increase the concurrency between the RISC core 112 and the PACT XPP core 102, the prefetch FIFOs in FIG. 20 can be extended. Thus, the IRAM contents for several configurations can be preloaded, like the configurations themselves. A simple convention makes clear which IRAM preloads belong to which configuration. The configuration execute switches to the next configuration context. This can be accomplished by advancing the FIFO write pointer with every configuration execute, while leaving it unchanged after every preload. Unassigned IRAM FIFO entries may keep their contents from the previous configuration, so every succeeding configuration may use the preceding configuration's IRAMx if no different IRAMx was preloaded.

If none of the memory areas to be copied to IRAMs is in any cache, extending the FIFOs does not help, as the memory is the bottleneck. So the cache size should be adjusted together with the FIFO length.

A drawback of extending the FIFO length is the increased likelihood that the IRAM content written by an earlier configuration is reused by a later one in another IRAM. A cache coherence protocol can clear the situation. Note, however, that the situation can be resolved more easily. If an overlap between any new IRAM area and a currently dirty IRAM contents of another IRAM bank is detected, the new IRAM is simply not loaded until the write back of the changed IRAM has finished. Thus, the execution of the new configuration may be delayed until the correct data is available.

For a short (single entry) FIFO, an overlap is extremely unlikely, since the compiler will usually leave the output IRAM contents of the previous configuration in place for the next configuration to skip the preload. The compiler may do so using a coalescing algorithm for the IRAMs I vector registers. The coalescing algorithm may be the same as used for register coalescing in register allocation.

Read Only IRAMS

Whenever the memory that is used by the executing configuration is the source of a preload command for another IRAM, an XPP pipeline stall may occur. The preload can only be started when the configuration has finished and, if the content was modified, the memory content has been written to the cache. To decrease the number of pipeline stalls, it may be beneficial to add an additional read only IRAM state. If the IRAM is read only, the content cannot be changed, and the preload of the data to the other IRAM can proceed without delay. This may require an extension to the preload instructions. The XppPreload and the XppPreloadClean instruction formats can be combined to a single instruction format that has two additional bits stating whether the IRAM will be read and/or written. To support debugging, violations should be checked at the IRAM ports, raising an exception when needed.

Support for Data Distribution and Data Reorganization

The IRAMs may be block-oriented structures, which can be read in any order by the PAE array. However, the address generation may add complexity, reducing the number of PAEs available for the actual computation. Accordingly, the IRAMs may be accessed in linear order. The memory hierarchy may be block oriented as well, further encouraging linear access patterns in the code to avoid cache misses.

As the IRAM read ports limit the bandwidth between each IRAM and the PAE array to one word read per cycle, it can be beneficial to distribute the data over several IRAMs to remove this bottleneck. The top of the memory hierarchy is the source of the data, so the number of cache misses never increases when the access pattern is changed, as long as the data locality is not destroyed.

Many algorithms access memory in linear order by definition to utilize block reading and simple address calculations. In most other cases and in the cases where loop tiling is needed to increase the data bandwidth between the IRAMs and the PAE array, the code can be transformed in a way that data is accessed in optimal order. In many of the remaining cases, the compiler cam modify the access pattern by data layout rearrangements, (e.g., array merging), so that finally the data is accessed in the desired pattern. If none of these optimizations can be used because of dependencies, or because the data layout is fixed, there are still two possibilities to improve performance, which are data duplication and data reordering.

Data Duplication

Data may be duplicated in several IRAMs. This may circumvent the IRAM read port bottleneck, allowing several data items to be read from the input every cycle.

Several options are possible with a common drawback. Data duplication can only be applied to input data. Output IRAMs obviously cannot have overlapping address ranges.

Using several IRAM preload commands specifying just different target IRAMs:
 This way cache misses may occur only for the first preload. All other preloads may take place without cache misses. Only the time to transfer the data from the top of the memory hierarchy to the IRAMs is needed for every additional load. This is only beneficial if the cache misses plus the additional transfer times do not exceed the execution time for the configuration.

Using an IRAM preload instruction to load multiple IRAMs concurrently:
 As identical data is needed in several IRAMs, they can be loaded concurrently by writing the same values to all of them. This amounts to finding a clean IRAM instance for every target IRAM, connecting them all to the bus, and writing the data to the bus. The problem with this instruction may be that it requires a bigger immediate field for the destination (16 bits instead of 4 for the XPP 64). Accordingly, this instruction format may grow at a higher rate when the number of IRAMs is increased for bigger XPP arrays.

The interface of this instruction is for example:
 XPPPreloadMultiple (int IRAMS, void *StartAddress, int Size).

This instruction may behave as the XPPPreload/XPPPreloadClean instructions with the exception of the first parameter. The first parameter is IRAMS. This may be an immediate (constant) value. The value may be a bitmap. For every bit in the bitmap, the IRAM with that number may be a target for the load operation.

There is no "clean" version, since data duplication is applicable for read data only.

Data Reordering

Data reordering changes the access pattern to the data only. It does not change the amount of memory that is read. Thus, the number of cache misses may stay the same.

Adding additional functionality to the hardware:
 Adding a vector stride to the preload instruction.
  A stride (displacement between two elements in memory) may be used in vector load operations to load, e.g., a column of a matrix into a vector register.
  This is still a linear access pattern. It can be implemented in hardware by giving a stride to the preload instruction and adding the stride to the IRAM identification state. One problem with this instruction may be that the number of possible cache misses per IRAM load rises. In the worst case it can be one cache miss per loaded value if the stride is equal to the cache line size and all data is not in the cache. But as already stated, the total number of misses stays the same. Just the distribution changes. Still, this is an undesirable effect.
  The other problem may be the complexity of the implementation and a possibly limited throughput, as the data paths between the layers of the memory hierarchy are optimized for block transfers. Transferring non-contiguous words will not use wide busses in an optimal fashion.
  The interface of the instruction is for example:
   XPPPreloadStride (int IRAN, void *StartAddress, int Size, int Stride)
   XPPPreloadCleanStride (int IRAN, void *StartAddress, int Size, int Stride).
  This instruction may behave as the XPPPreload/XPPPreloadClean instructions with the addition of another parameter. The fourth parameter is the vector stride. This may be an immediate (constant) value. It may tell the cache controller to load only every $n^{th}$ value to the specified IRAM.
Reordering the data at run time, introducing temporary copies.
 On the RISC:
  The RISC can copy data at a maximum rate of one word per cycle for simple address computations and at a somewhat lower rate for more complex ones.
  With a memory hierarchy, the sources may be read from memory (or cache, if they were used recently) once and written to the temporary copy, which may then reside in the cache, too. This may increase the pressure in the memory hierarchy by the amount of memory used for the temporaries. Since temporaries are allocated on the stack memory, which may be re-used frequently, the chances are good that the dirty memory area is redefined before it is written back to memory. Hence the write back operation to memory is of no concern.

Via an XPP configuration:
The PAE array can read and write one value from every IRAM per cycle. Thus, if half of the IRAMs are used as inputs and half of the IRAMs are used as outputs, up to eight (or more, depending on the number of IRAMs), values can be reordered per cycle, using the PAE array for address generation. As the inputs and outputs reside in IRAMs, it does not matter if the reordering is done before or after the configuration that uses the data. The IRAMs can be reused immediately.

IRAM Chaining

If the PAEs do not allow further unrolling, but there are still IRAMs left unused, it may be possible to load additional blocks of data into these IRAMs and chain two IRAMs via an address selector. This might not increase throughput as much as unrolling would do, but it still may help to hide long pipeline startup delays whenever unrolling is not possible.

Software/Hardware Interface

According to the design parameter changes and the corresponding changes to the hardware, according to embodiments of the present invention, the hardware/software interface has changed. In the following, some prominent changes and their handling are discussed.

Explicit Cache

The proposed cache is not a usual cache, which would be, without considering performance issues, invisible to the programmer/compiler, as its operation is transparent. The proposed cache is an explicit cache. Its state may have to be maintained by software.

Cache Consistency and Pipelining of Preload/Configuration/Write back

The software may be responsible for cache consistency. It may be possible to have several IRAMs caching the same or overlapping memory areas. As long as only one of the IRAMs is written, this is perfectly ok. Only this IRAM will be dirty and will be written back to memory. If, however, more than one of the IRAMs is written, which data will be written to memory is not defined. This is a software bug (non-deterministic behavior).

As the execution of the configuration is overlapped with the preloads and write backs of the IRAMs, it may be possible to create preload/configuration sequences that contain data hazards. As the cache controller and the XPP array can be seen as separate functional units, which are effectively pipelined, these data hazards are equivalent to pipeline hazards of a normal instruction pipeline. As with any ordinary pipeline, there are two possibilities to resolve this, which are hardware interlocking and software interlocking.

Hardware interlocking:
Interlocking may be done by the cache controller. If the cache controller detects that the tag of a dirty or in-use item in IRAMx overlaps a memory area used for another IRAM preload, it may have to stall that preload, effectively serializing the execution of the current configuration and the preload.

Software interlocking:
If the cache controller does not enforce interlocking, the code generator may have to insert explicit synchronize instructions to take care of potential interlocks. Inter-procedural and inter-modular alias and data dependency analyses can determine if this is the case, while scheduling algorithms may help to alleviate the impact of the necessary synchronization instructions.

In either case, as well as in the case of pipeline stalls due to cache misses, SMT can use the computation power that would be wasted otherwise.

Code Generation for the Explicit Cache

Apart from the explicit synchronization instructions issued with software interlocking, the following instructions may have to be issued by the compiler.

Configuration preload instructions, preceding the IRAM preload instructions, that will be used by that configuration. These should be scheduled as early as possible by the instruction scheduler.

IRAM preload instructions, which should also be scheduled as early as possible by the instruction scheduler.

Configuration execute instructions, following the IRAM preload instructions for that configuration. These instructions should be scheduled between the estimated minimum and the estimated maximum of the cumulative latency of their preload instructions.

IRAM synchronization instructions, which should be scheduled as late as possible by the instruction scheduler. These instructions must be inserted before any potential access of the RISC to the data areas that are duplicated and potentially modified in the IRAMs. Typically, these instructions will follow a long chain of computations on the XPP, so they will not significantly decrease performance.

Asynchronicity to Other Functional Units

An XppSync( ) must be issued by the compiler, if an instruction of another functional unit (mainly the Ld/St unit) can access a memory area that is potentially dirty or in-use in an IRAM. This may force a synchronization of the instruction streams and the cache contents, avoiding data hazards. A thorough inter-procedural and inter-modular array alias analysis may limit the frequency of these synchronization instructions to an acceptable level.

Another Implementation

For the previous design, the IRAMs are existent in silicon, duplicated several times to keep the pipeline busy. This may amount to a large silicon area, that is not fully busy all the time, especially, when the PAE array is not used, but as well whenever the configuration does not use all of the IRAMs present in the array. The duplication may also make it difficult to extend the lengths of the IRAMs, as the total size of the already large IRAM area scales linearly.

For a more silicon efficient implementation, the IRAMs may be integrated into the first level cache, making this cache bigger. This means that the first level cache controller is extended to feed all IRAM ports of the PAE array. This way the XPP and the RISC may share the first level cache in a more efficient manner. Whenever the XPP is executing, it may steal as much cache space as it needs from the RISC. Whenever the RISC alone is running it will have plenty of additional cache space to improve performance.

The PAE array may have the ability to read one word and write one word to each IRAM port every cycle. This can be limited to either a read or a write access per cycle, without limiting programmability. If data has to be written to the same area in the same cycle, another IRAM port can be used. This may increase the number of used IRAM ports, but only under rare circumstances.

This leaves sixteen data accesses per PAE cycle in the worst case. Due to the worst case of all sixteen memory areas for the sixteen IRAM ports mapping to the same associative bank, the minimum associativity for the cache may be a 16-way set associativity. This may avoid cache replacement for this rare, but possible, worst-case example.

Two factors may help to support sixteen accesses per PAE array cycle:
The clock frequency of the PAE array generally has to be lower than for the RISC by a factor of two to four. The reasons lie in the configurable routing channels with switch matrices which cannot support as high a frequency as solid point-to-point aluminum or copper traces.

This means that two to four IRAM port accesses can be handled serially by a single cache port, as long as all reads are serviced before all writes, if there is a potential overlap. This can be accomplished by assuming a potential overlap and enforcing a priority ordering of all accesses, giving the read accesses higher priority.

A factor of two, four, or eight is possible by accessing the cache as two, four, or eight banks of lower associativity cache.

For a cycle divisor of four, four banks of four-way associativity will be optimal. During four successive cycles, four different accesses can be served by each bank of four way associativity. Up to four-way data duplication can be handled by using adjacent IRAM ports that are connected to the same bus (bank). For further data duplication, the data may have to be duplicated explicitly, using an XppPreloadMultiple( ) cache controller instruction. The maximum data duplication for sixteen read accesses to the same memory area is supported by an actual data duplication factor of four—one copy in each bank. This does not affect the RAM efficiency as adversely as an actual data duplication of 16 for the embodiment discussed above under the heading "A Load Store Architecture."

Figure 21:
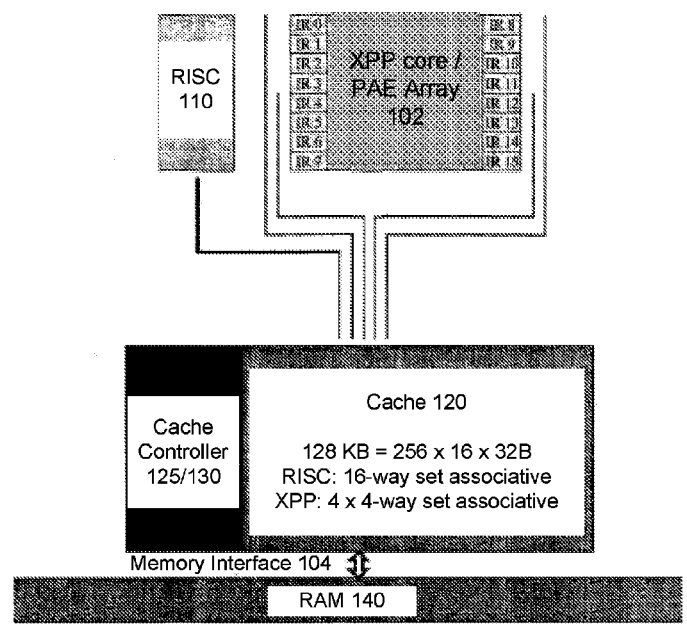
FIG. 21 shows an example of a cache structure according to an example embodiment of the present invention.

FIG. 21 shows an example of a cache structure according to an example embodiment of the present invention. The cache controller may run at the same speed as the RISC. The XPP may run at a lower, (e.g., quarter), speed. Accordingly, in the worst case, sixteen read requests from the PAE array may be serviced in four cycles of the cache controller, with an additional four read requests from the RISC. Accordingly, one bus at full speed can be used to service four IRAM read ports. Using four-way associativity, four accesses per cycle can be serviced, even in the case that all four accesses go to addresses that map to the same associative block.

a) The RISC still has a 16-way set associative view of the cache, accessing all four four-way set associative banks in parallel. Due to data duplication, it is possible that several banks return a hit. This may be taken care of with a priority encoder, enabling only one bank onto the data bus.
b) The RISC is blocked from the banks that service IRAM port accesses. Wait states are inserted accordingly.
c) The RISC shares the second cache access port of a two-port cache with the RAM interface, using the cycles between the RAM transfers for its accesses.
d) The cache is extended by a fifth 4-way set associative bank, used exclusively by the RISC. (The other banks are only accessed when they are not used by the current XPP configuration. PROBLEM: dirty line in a blocked bank).

With respect to a 2 port RAM, concurrent reads may be accommodated. Concurrent R/W to a same cache line may be avoided by software synchronization/hardware arbiter.

A problem is that a read could potentially address the same memory location as a write. The value read may depend on the order of the operation so that the order is fixed, i.e., all writes have to take place after all reads, but before the reads of the next cycle, except, if the reads and writes actually do not overlap. This can only be a problem with data duplication, when only one copy of the data is actually modified. Therefore, modifications are forbidden with data duplication.

Programming Model Changes
Data Interference

According to an example embodiment of the present invention that is without dedicated IRAMs, it is not possible anymore to load input data to the IRAMs and write the output data to a different IRAM, which is mapped to the same address, thus operating on the original, unaltered input data during the whole configuration.

As there are no dedicated IRAMs anymore, writes directly modify the cache contents, which will be read by succeeding reads. This changes the programming model significantly. Additional and more in-depth compiler analyses are accordingly necessary.

Hiding Implementation Details

The actual number of bits in the destination field of the XppPreloadMultiple instruction is implementation dependent. It depends on the number of cache banks and their associativity, which are determined by the clock frequency divisor of the XPP PAE array relative to the cache frequency. However, this can be hidden by the assembler, which may translate IRAM ports to cache banks, thus reducing the number of bits from the number of IRAM ports to the number of banks. For the user, it is sufficient to know that each cache bank services an adjacent set of IRAM ports starting at a power of two. Thus, it may be best to use data duplication for adjacent ports, starting with the highest power of two greater than the number of read ports to the duplicated area.

Program Optimizations Code Analysis

Analyses may be performed on programs to describe the relationships between data and memory location in a program. These analyses may then be used by different optimizations. More details regarding the analyses are discussed in Michael Wolfe, "High Performance Compilers for Parallel Computing" (Addison-Wesley 1996); Hans Zima & Barbara Chapman, "Supercompilers for parallel and vector computers" (Addison-Wesley 1991); and Steven Muchnick, "Advanced Compiler Design and Implementation" (Morgan Kaufmann 1997).

Data-Flow Analysis

Data-flow analysis examines the flow of scalar values through a program to provide information about how the program manipulates its data. This information can be represented by dataflow equations that have the following general form for object i, that can be an instruction or a basic block, depending on the problem to solve:

$$Ex[i]=Prod[i]/Y(In[i]-Supp[i]).$$

This means that data available at the end of the execution of object i, Ex[I], are either produced by i, Prod[i] or were alive at the beginning of i, In[i], but were not deleted during the execution of i, Supp[i].

These equations can be used to solve several problems, such as, e.g.,
  the problem of reaching definitions;
  the Def-Use and Use-Def chains, describing respectively, for a definition, all uses that can be reached from it, and, for a use, all definitions that can reach it;
  the available expressions at a point in the program; and/or
  the live variables at a point in the program, whose solutions
    are then used by several compilation phases, analysis, or optimizations.

Figure 22:
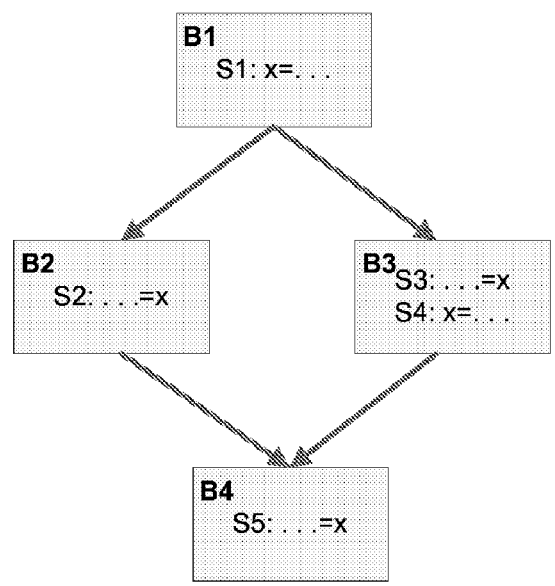
FIG. 22 is a control-flow graph of a piece of a program, according to an example embodiment of the present invention.

For example, with respect to a problem of computing the Def-Use chains of the variables of a program, this information can be used for instance by the data dependence analysis for scalar variables or by the register allocation. A Def-Use chain is associated to each definition of a variable and is the set of all visible uses from this definition. The data-flow equations presented above may be applied to the basic blocks to detect the variables that are passed from one block to another along the control flow graph. In FIG. 22, which shows a control-flow graph of a piece of a program, two definitions for variable x are produced: S1 in B1 and S4 in B3. Hence, the variable that can be found at the exit of B1 is Ex(B1)= {x(S1)}; and at the exit of B4 is Ex(B4)={x(S4)}. Moreover, Ex(B2)=Ex(B1) as no variable is defined in B2. Using these sets, it is the case that the uses of x in S2 and S3 depend on the definition of x in B1 and that the use of x in S5 depends on the definitions of x in B1 and B3. The Def-use chains associated with the definitions are then D(S1)={S2, S3, S5} and D(S4)={S5}.

Data Dependence Analysis

A data dependence graph represents the dependencies existing between operations writing or reading the same data. This graph may be used for optimizations like scheduling, or certain loop optimizations to test their semantic validity. The nodes of the graph represent the instructions, and the edges represent the data dependencies. These dependencies can be of three types: true (or flow) dependence when a variable is written before being read, anti-dependence when a variable is read before being written, and output dependence when a variable is written twice. A more formal definition is provided in Hans Zima et al., supra and is presented below.

DEFINITION

Let S and S' be two statements. Then S' depends on S, noted SδS' iff:
(1) S is executed before S'
(2)
ɔ
v ∈ E VAR: v ∈ DEF(S)I USE(S) v v ∈ USE(S)I DEF(S') v
    v ∈ DEF(S)I DEF(S')
(3) There is no statement T such that S is executed before T and T is executed before S', and v ∈ DEF(T),
where VAR is the set of the variables of the program, DEF(S) is the set of the variables defined by instruction S, and USE(S) is the set of variables used by instruction S.

Moreover, if the statements are in a loop, a dependence can be loop independent or loop carried. This notion introduces the definition of the distance of a dependence. When a dependence is loop independent, it occurs between two instances of different statements in the same iteration, and its distance is equal to 0. By contrast, when a dependence is loop carried, it occurs between two instances in two different iterations, and its distance is equal to the difference between the iteration numbers of the two instances.

The notion of direction of dependence generalizes the notion of distance, and is generally used when the distance of a dependence is not constant, or cannot be computed with precision. The direction of a dependence is given by < if the dependence between S and S' occurs when the instance of S is in an iteration before the iteration of the instance of S',= if the two instances are in the same iteration, and > if the instance of S is in an iteration after the iteration of the instance of S'.

In the case of a loop nest, there are distance and direction vector, with one element for each level of the loop nest. FIGS. 23 to 27 illustrate these definitions. FIG. 23 illustrates a code and diagram of an example of a true dependence with distance 0 on array 'a'. FIG. 24 illustrates a code and diagram of an example of an anti-dependence with distance 0 on array 'b'. FIG. 25 illustrates a code and diagram of an example of an output dependence with distance 0 on array 'a'. FIG. 26 illustrates a code and diagram of an example of a dependence with direction vector (=,=) between S1 and S2 and a dependence with direction vector (=,=,<) between S2 and S2. FIG. 27 illustrates a code and diagram of an example of an anti-dependence with distance vector (0,2).

The data dependence graph may be used by a lot of optimizations, and may also be useful to determine if their application is valid. For instance, a loop can be vectorized if its data dependence graph does not contain any cycle.

Interprocedural Alias Analysis

An aim of alias analysis is to determine if a memory location is aliased by several objects, e.g., variables or arrays, in a program. It may have a strong impact on data dependence analysis and on the application of code optimizations. Aliases can occur with statically allocated data, like unions in C where all fields refer to the same memory area, or with dynamically allocated data, which are the usual targets of the analysis. A typical case of aliasing where p alias b is:

```
int b[100], *p;
for (p=b;p < &b[100];p++)
    *p=0;
```

Figure 28:
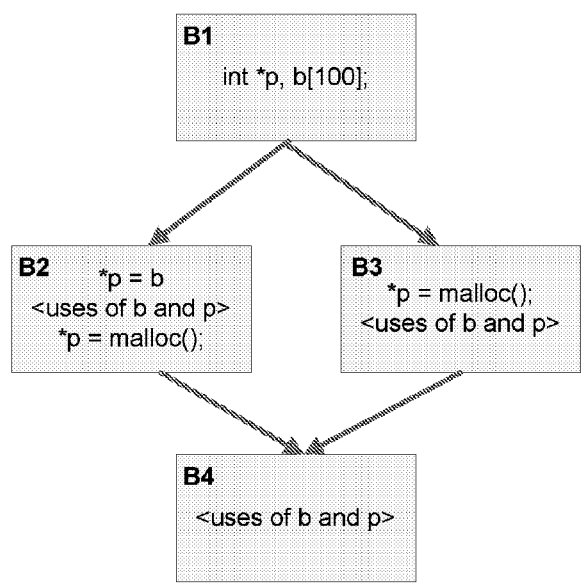
FIG. 28 is a graph illustrating information of a flow-sensitive alias analysis versus a flow insensitive alias analysis, according to an example embodiment of the present invention.

Alias analysis can be more or less precise depending on whether or not it takes the control-flow into account. When it does, it is called flow-sensitive, and when it does not, it is called flow insensitive. Flow-sensitive alias analysis is able to detect in which blocks along a path two objects are aliased. As it is more precise, it is more complicated and more expensive to compute. Usually flow insensitive alias information is sufficient. This aspect is illustrated in FIG. 28 where a flow-insensitive analysis would find that p alias b, but where a flow-sensitive analysis would be able to find that p alias b only in block B2.

Furthermore, aliases are classified into must-aliases and may-aliases. For instance, considering flow-insensitive may-alias information, x alias y, iff x and y may, possibly at different times, refer to the same memory location. Considering flow-insensitive must-alias information, x alias y, if x and y must, throughout the execution of a procedure, refer to the same storage location. In the case of FIG. 28, if flow-insensitive may-alias information is considered, p alias b holds, whereas if flow-insensitive must-alias information is considered, p alias b does not hold. The kind of information to use depends on the problem to solve. For instance, if removal of redundant expressions or statements is desired, must-aliases must be used, whereas if build of a data dependence graph is desired, may-aliases are necessary.

Finally this analysis must be interprocedural to be able to detect aliases caused by non-local variables and parameter passing. The latter case is depicted in the code below, which is an example for aliasing parameter passing, where i and j are aliased through the function call where k is passed twice as parameter.

```
void foo (int *i, int* j)
{
    *i = *j+1;
}
...
foo (&k, &k);
```

Interprocedural Value Range Analysis

This analysis can find the range of values taken by the variables. It can help to apply optimizations like dead code elimination, loop unrolling and others. For this purpose, it can use information on the types of variables and then consider operations applied on these variables during the execution of the program. Thus, it can determine, for instance, if tests in conditional instruction are likely to be met or not, or determine the iteration range of loop nests.

This analysis has to be interprocedural as, for instance, loop bounds can be passed as parameters of a function, as in the following example. It is known by analyzing the code that in the loop executed with array 'a', N is at least equal to 11, and that in the loop executed with array 'b', N is at most equal to 10.

```
void foo (int *c, int N)
{
  int i;
  for (i=O; i<N; i++)
    c[i] = g(i,2);
}
...
if (N > 10)
  foo (a,N);
else
  foo (b,N);
```

The value range analysis can be supported by the programmer by giving further value constraints which cannot be retrieved from the language semantics. This can be done by pragmas or a compiler known assert function.

Alignment Analysis

Figure 29:
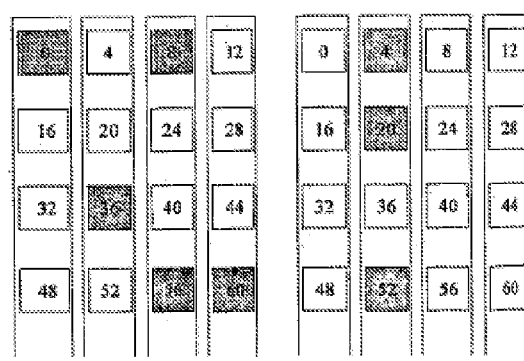
FIG. 29 is a diagram that illustrates aligned and misaligned memory accesses.

Alignment analysis deals with data layout for distributed memory architectures. As stated by Saman Amarasinghe, "Although data memory is logically a linear array of cells, its realization in hardware can be viewed as a multi-dimensional array. Given a dimension in this array, alignment analysis will identify memory locations that always resolve to a single value in that dimension. For example, if the dimension of interest is memory banks, alignment analysis will identify if a memory reference always accesses the same bank." This is the case in the second part of FIG. 29, which is a reproduction of a figure that can be found in Sam Larsen, Emmet Witchel & Saman Amarasinghe, "Increasing and Detecting Memory Address Congruence," *Proceedings of the 2002 IEEE International Conference on Parallel Architectures and Compilation Techniques* (PACT '02), 18-29 (September 2002). All accesses, depicted in dark squares, occur to the same memory bank, whereas in the first part, the accesses are not aligned. Saman Amarasinghe adds that "Alignment information is useful in a variety of compiler-controlled memory optimizations leading to improvements in programmability, performance, and energy consumption."

Alignment analysis, for instance, is able to help find a good distribution scheme of the data and is furthermore useful for automatic data distribution tools. An automatic alignment analysis tool can be able to automatically generate alignment proposals for the arrays accessed in a procedure and thus simplifies the data distribution problem. This can be extended with an interprocedural analysis taking into account dynamic realignment.

Alignment analysis can also be used to apply loop alignment that transforms the code directly rather than the data layout in itself, as discussed below. Another solution can be used for the PACT XPP, relying on the fact that it can handle aligned code very efficiently. It includes adding a conditional instruction testing if the accesses in the loop body are aligned followed by the necessary number of peeled iterations of the loop body, then the aligned loop body, and then some compensation code. Only the aligned code is then executed by the PACT XPP. The rest may be executed by the host processor. If the alignment analysis is more precise (inter-procedural or inter-modular), less conditional code has to be inserted.

Code Optimizations

Discussion regarding many of the optimizations and transformations discussed below can be found in detail in David F. Bacon, Susan L. Graham & Oliver J. Sharp, "Compiler Transformations for High-Performance Computing," *ACM Computing Surveys*, 26(4):325-420 (1994); Michael Wolfe, supra; Hans Zima et al., supra; and Steven Muchnick, supra.

General Transformations

Discussed below are a few general optimizations that can be applied to straightforward code and to loop bodies. These are not the only ones that appear in a compiler.

Constant Propagation

A constant propagation may propagate the values of constants into the expressions using them throughout the program. This way a lot of computations can be done statically by the compiler, leaving less work to be done during the execution. This part of the optimization is also known as constant folding.

An example of constant propagation is:

```
N = 256;                      for(i=O; i<=256; i++)
c = 3;                          a[i] = b [i] + 3;
for (i=0; i<=N; i++)
  a[i] = b[i] + c;
```

Copy Propagation

A copy propagation optimization may simplify the code by removing redundant copies of the same variable in the code. These copies can be produced by the programmer or by other optimizations. This optimization may reduce the register pressure and the number of register-to-register move instructions.

An example of copy propagation is:

```
t = i*4;                      t = i*4;
r = t;                        for (i=0; i<=N; i++)
for (i=0; i<=N; i++)            a[t] = b[t] + a[i];
  a[r] = b[r] + a[i];
```

Dead Code Elimination

A dead code elimination optimization may remove pieces of code that will never be executed. Code is never executed if it is in the branch of a conditional statement whose condition is always evaluated to true or false, or if it is a loop body, whose number of iterations is always equal to 0.

Code updating variables that are never used is also useless and can be removed as well. If a variable is never used, then the code updating it and its declaration can also be eliminated.

An example of dead code elimination is:

```
for (i = 0; i<=N; i++){       for (i=0; i<=N; i++){
  for (j=0; j<O; j++)           for (j=0; j<10; j++)
    a[j] = b[j] + a[i];           a[j+1] = a[j] + b[j];
  for (j=0; j<10; j++)        }
    a[j+1] = a[j] + b[j];
}
```

Forward Substitution

A forward substitution optimization is a generalization of copy propagation. The use of a variable may be replaced by its defining expression. It can be used for simplifying the data dependency analysis and the application of other transformations by making the use of loop variables visible.

An example of forward substitution is:

```
c = N + 1;                    for (i=0; i<=N; i++)
for (i=0; i<= N; i++)           a[N+1] = b[N+1] + a[i];
    a[c] = b[c] + a[i];
```

Idiom Recognition

An idiom recognition transformation may recognize pieces of code and can replace them by calls to compiler known functions, or less expensive code sequences, like code for absolute value computation.

An example of idiom recognition is:

```
for (i=0; i<N; i++){   for (i=0; i<N; i++){
    c = a[i] - b[i];       c = a[i] - b[i];
    if (c<0)               c = abs(c);
        c = -c;            d[i] = c;
    d[i] = c;          }
}
```

Loop Transformations
Loop Normalization

A loop normalization transformation may ensure that the iteration space of the loop is always with a lower bound equal to 0 or 1 (depending on the input language), and with a step of 1. The array subscript expressions and the bounds of the loops are modified accordingly. It can be used before loop fusion to find opportunities, and ease inter-loop dependence analysis, and it also enables the use of dependence tests that need a normalized loop to be applied:

An example of loop normalization is:

```
for (i=2; i<N; i=i+2)    for (i=0; i<(N-2)/2; i++)
    a[i] = b[i];             a[2*i+2] = b[2*i+2];
```

Loop Reversal

A loop reversal transformation may change the direction in which the iteration space of a loop is scanned. It is usually used in conjunction with loop normalization and other transformations, like loop interchange, because it changes the dependence vectors.

An example of loop reversal is:

```
for (i=N; i>=0; i--)     for (i=0; i<=N; i++)
    a[i] = b[i];             a[i] = b[i];
```

Strength Reduction

A strength reduction transformation may replace expressions in the loop body by equivalent but less expensive ones. It can be used on induction variables, other than the loop variable, to be able to eliminate them.

An example of strength reduction is:

```
for (i=0; i<N; i++)      t = c;
    a[i] = b[i] + c*i;   for (i=0; i<N; i++){
                             a[i] = b[i] + t;
                             t = t + c;
                         }
```

Variable Elimination

An induction variable elimination transformation can use strength reduction to remove induction variables from a loop, hence reducing the number of computations and easing the analysis of the loop. This may also remove dependence cycles due to the update of the variable, enabling vectorization.

An example of induction variable elimination is:

```
for (i=0; i<=N; i++){    for (i=0; i<=N; i++){
    k = k+3;                 a[i] = b[i] + a[k+(i+1)*3];
    a[i] = b[i] + a[k]; }
}                        k = k + (N+1)*3;
```

Loop-Invariant Code Motion

A loop-invariant code motion transformation may move computations outside a loop if their result is the same in all iterations. This may allow a reduction of the number of computations in the loop body. This optimization can also be conducted in the reverse fashion in order to get perfectly nested loops, that are easier to handle by other optimizations.

An example of loop-invariant code motion is:

```
for (i=0; i<N; i++)   if (N >= 0)
    a [i] = b[i] + x*y;       c = x*y;
                          for (i=0; i<N; i++)
                              a[i] = b[i] + c;
```

Loop Unswitching

A loop unswitching transformation may move a conditional instruction outside of a loop body if its condition is loop invariant. The branches of the condition may then be made of the original loop with the appropriate original statements of the conditional statement. It may allow further parallelization of the loop by removing control-flow in the loop body and also removing unnecessary computations from it.

An example of loop unswitching is:

```
for (i=0; i<N; i++){   if (x > 2)
    a[i] = b[i] + 3;        for (i=0; i<N; i++){
    if (x > 2)                  a[i] = b[i] +3;
        b[i] = c[i] +2;         b[i] = c[i] +2;
    else                    }
        b[i]=c[i] - 2;   else
}                           for (i=0; i<N; i++){
                                a[i] = b[i] + 3;
                                b[i] = c[i] - 2;
                            }
```

If-Conversion

An if-conversion transformation may be applied on loop bodies with conditional instructions. It may change control dependencies into data dependencies and allow then vectorization to take place. It can be used in conjunction with loop unswitching to handle loop bodies with several basic blocks. The conditions where array expressions could appear may be replaced by boolean terms called guards. Processors with predicated execution support can execute directly such code.

An example of if-conversion is:

```
for (i=0; i<N; i++){          for (i=0; i<N; i++){
    a[i] = a[i] + b[i];           a[i] = a[i] + b[i];
    if (a[i] != 0)                c2 = (a[i] != 0);
        if (a[i] > c[i])          if (c2) c4 = (a[i] > c[i]);
            a[i] = a[i] - 2;      if (c2 && c4) a[i] = a[i] - 2;
        else                      if (c2 && ! c4) a[i] = a[i] + 1;
            a[i] = a[i] + 1;      d[i] = a[i] * 2;
    d[i] = a[i] * 2;          }
}
```

Strip-Mining

A strip-mining transformation may enable adjustment of the granularity of an operation. It is commonly used to choose the number of independent computations in the inner loop nest. When the iteration count is not known at compile time, it can be used to generate a fixed iteration count inner loop satisfying the resource constraints. It can be used in conjunction with other transformations like loop distribution or loop interchange. It is also called loop sectioning. Cycle shrinking, also called stripping, is a specialization of strip-mining.

An example of strip-mining is:

```
for (i=0; i<N; i++) up = (N/16)*16;
    a[i] = b[i] + C; for(i=0; i<up; i = i + 16)
        a[i:1+16] = b[i:i+16] + c;
    for (j=i+1; j<N; j++)
        a[i] = b[i] + c;
```

Loop Tiling

A loop tiling transformation may modify the iteration space of a loop nest by introducing loop levels to divide the iteration space in tiles. It is a multi-dimensional generalization of strip-mining. It is generally used to improve memory reuse, but can also improve processor, register, TLB, or page locality. It is also called loop blocking.

The size of the tiles of the iteration space may be chosen so that the data needed in each tile fit in the cache memory, thus reducing the cache misses. In the case of coarse-grain computers, the size of the tiles can also be chosen so that the number of parallel operations of the loop body fits the number of processors of the computer.

An example of loop tiling is:

```
for (i=0; i<N; i++)              for (ii=0; ii<N; ii = ii+16)
    for (j=0; j<N; j++)              for (jj=0; jj<N; jj = jj+16)
        a[i][j] = b[j][i];               for (i=ii; i<min(ii+15,N); j++)
                                             for (j=jj; j<min(jj+15,N); j++)
                                                 a[i][j] = b[j][i];
```

Loop Interchange

A loop interchange transformation may be applied to a loop nest to move inside or outside (depending on the searched effect) the loop level containing data dependencies. It can:
- enable vectorization by moving inside an independent loop and outside a dependent loop,
- improve vectorization by moving inside the independent loop with the largest range,
- deduce the stride,
- increase the number of loop-invariant expressions in the inner-loop, or
- improve parallel performance by moving an independent loop outside of a loop nest to increase the granularity of each iteration and reduce the number of barmier synchronizations.

An example of a loop interchange is:

```
for (i=0; i<N; i++)              for (j=0; j<N; j++)
    for (j=0; j<N; j++)              for (i=0; i<N; i++)
        a[i] = a[i] + b[i][j];           a[i] = a[i] + b[i][j];
```

Loop Coalescing/Collapsing

A loop coalescing/collapsing transformation may combine a loop nest into a single loop. It can improve the scheduling of the loop, and also reduces the loop overhead. Collapsing is a simpler version of coalescing in which the number of dimensions of arrays is reduced as well. Collapsing may reduce the overhead of nested loops and multidimensional arrays. Collapsing can be applied to loop nests that iterate over memory with a constant stride.

Otherwise, loop coalescing may be a better approach. It can be used to make vectorizing profitable by increasing the iteration range of the innermost loop.

An example of loop coalescing is:

```
for (i=0; i<N; i++)              for (k=0; k<N*M; k++) {
    for (j=0; j<M; j++)              i = ((k-1)/m)*m+1;
        a[i][j] = a[i][j] + c; j = ((T-1)%m) + 1;
                                     a[i][j] = a[i][j] + c;
                                 }
```

Loop Fusion

A loop fusion transformation, also called loop jamming, may merge two successive loops. It may reduce loop overhead, increases instruction-level parallelism, improves register, cache, TLB or page locality, and improves the load balance of parallel loops. Alignment can be taken into account by introducing conditional instructions to take care of dependencies.

An example of loop fusion is:

```
for (i=0; i<N; i++) for (i=0; i<N; i++){
    a[i] = b[i] + c;             a[i] = b[i] + c;
    for (i=0; i<N; i++)          d[i] = e[i] + c;
        d[i] = e[i] + c; }
```

Loop Distribution

A loop distribution transformation, also called loop fission, may allow to split a loop in several pieces in case the loop body is too big, or because of dependencies. The iteration space of the new loops may be the same as the iteration space of the original loop. Loop spreading is a more sophisticated distribution.

An example of loop distribution is:

```
for (i=0; i<N; i++){ for (i=0; i<N; i++)
    a[i] = b[i] + c;         a[i] = b[i] + c;
    d[i] = e[i] + c;     for (i=0; i<N; i++)
}                            d[i] = e[i] + c;
```

Loop Unrolling/Unroll-and-Jam

A loop unrolling/unroll-and-jam transformation may replicate the original loop body in order to get a larger one. A loop can be unrolled partially or completely. It may be used to get more opportunity for parallelization by making the loop body bigger. It may also improve register or cache usage and reduces loop overhead. Loop unrolling the outer loop followed by merging the induced inner loops is referred to as unroll-and-jam.

An example of loop unrolling is:

```
for (i=0; i<N; i++) for (i=0; i<N; i = i+2){
    a[i] = b[i] + c;         a[i] = b[i] + c;
                             a[i+1] = b[i+1] + c;
                         }
                         if ((N-1)%2) == 1)
                             a[N-1] = b[N-1] + c;
```

Loop Alignment

A loop alignment optimization may transform the code to get aligned array accesses in the loop body. Its effect may be to transform loop-carried dependencies into loop-independent dependencies, which allows for extraction of more parallelism from a loop. It can use different transformations, like loop peeling or introduce conditional statements, to achieve its goal. This transformation can be used in conjunction with loop fusion to enable this optimization by aligning the array accesses in both loop nests. In the example below, all accesses to array 'a' become aligned.

An example of loop alignment is:

```
for (i=2; i<=N; i++){            for (i=1; i<=N; i++){
    a[i] = b[i] + c[i];              if (i>1) a[i] = b[i] + c[i];
    d[i] = a[i-1] * 2;               if (i<N) d[i+1] = a[i] * 2
    e[i] = a[i-1] + d[i+1];          if (i<N) e[i+1] = a[i] + d[i+2];
}                                }
```

Loop Skewing

A loop skewing transformation may be used to enable parallelization of a loop nest. It may be useful in combination with loop interchange. It may be performed by adding the outer loop index multiplied by a skew factor, f, to the bounds of the inner loop variable, and then subtracting the same quantity from every use of the inner loop variable inside the loop.

An example of loop skewing is:

```
for (i=1; i<=N; i++){            for (i=1; i<=N; i++){
    for (j=1; j<=N; j++)             for (j=i+1; j<=i+N; j++)
        a[i] = a[i+j] + c;               a[i] = a[j] + c;
```

Loop Peeling

A loop peeling transformation may remove a small number of beginning or ending iterations of a loop to avoid dependences in the loop body. These removed iterations may be executed separately. It can be used for matching the iteration control of adjacent loops to enable loop fusion.

An example of loop peeling is:

```
for (i=0; i<=N; i++)             a[0][N] = a[0][N] + a[N][N];
    a[i][N] = a[0][N] + a[N][N];  for (i=1; i<=N-1; i++)
                                      a[i][N] = a[0][N] + a[N][N];
                                  a[N][N] = a[0][N] + a[N][N];
```

Loop Splitting

A loop splitting transformation may cut the iteration space in pieces by creating other loop nests. It is also called Index Set Splitting and is generally used because of dependencies that prevent parallelization. The iteration space of the new loops may be a subset of the original one. It can be seen as a generalization of loop peeling.

An example of loop splitting is:

```
for (i=0; i<=N; i++)             for (i=0; i<(N+1)/2; i++)
    a[i] = a[N-i+1] + c;             a[i] = a[N-i+1] + c;
                                  for (i = (N+1)/2; i<=N; i++)
                                      a[i] = a[N-i+1] + c;
```

Node Splitting

A node splitting transformation may split a statement in pieces. It may be used to break dependence cycles in the dependence graph due to the too high granularity of the nodes, thus enabling vectorization of the statements.

An example of node splitting is:

```
for (i=0; i<N; i++){             for (i=0; i<N; i++){
    b[i] = a[i] + c[i] * d[i];       t1[i] = c[i] * d[i];
    a[i+1] = b[i] * (d[i] - c[i]);   t2[i] = d[i] - c[i];
}                                    b[i] = a[i] + t1[i];
                                     a[i+1] = b[i] * t2[i];
                                 }
```

Scalar Expansion

A scalar expansion transformation may replace a scalar in a loop by an array to eliminate dependencies in the loop body and enable parallelization of the loop nest. If the scalar is used after the loop, a compensation code must be added.

An example of scalar expansion is:

```
for (i=0; i<N; i++){   for (i=0; i<N; i++){
    c = b[i];              tmp[i] = b[i];
    a[i] = a[i] + c;       a[i] = a[i] + tmp[i];
}                      }
                       c = tmp[N-1];
```

Array Contraction/Array Shrinking

An array contraction/array shrinking transformation is the reverse transformation of scalar expansion. It may be needed if scalar expansion generates too many memory requirements.

An example of array contraction is:

```
for (i=0; i<N; i++)              for (i=0; i<N; i++)
    for (j=0; j<N; j++){             for (j=0; j<N; j++){
        t[i][j] = a[i][j] * 3;           t[j] = a[i][j] * 3;
        b[i][j] = t[i][j] + c[j];        b[i][j] = t[j] + c[j];
    }                                }
```

Scalar Replacement

A scalar replacement transformation may replace an invariant array reference in a loop by a scalar. This array element may be loaded in a scalar before the inner loop and stored again after the inner loop if it is modified. It can be used in conjunction with loop interchange.

An example of scalar replacement is:

```
for (i=0; i<N; i++)              for (i=0; i<N; i++){
    for (j=0; j<N; j++)              tmp = a[i];
        a[i] = a[i] + b[i][j];       for (j=0; j<N; j++)
                                         tmp = tmp + b[i][j];
                                     a[i] = tmp;
                                 }
```

Reduction Recognition

A reduction recognition transformation may allow handling of reductions in loops. A reduction may be an operation that computes a scalar value from arrays. It can be a dot product, the sum or minimum of a vector for instance. A goal is then to perform as many operations in parallel as possible. One way may be to accumulate a vector register of partial results and then reduce it to a scalar with a sequential loop. Maximum parallelism may then be achieved by reducing the vector register with a tree, i.e., pairs of dements are summed; then pairs of these results are summed; etc.

An example of reduction recognition is:

```
for (i=0; i<N; i++)         for (i=0; i<N; i=i+64)
    s = s + a[i];               tmp[0:63] = tmp[0:63] + a[i:i+63];
```

Loop Pushing/Loop Embedding

A loop pushing/loop embedding transformation may replace a call in a loop body by the loop in the called function. It may be an interprocedural optimization. It may allow the parallelization of the loop nest and eliminate the overhead caused by the procedure call. Loop distribution can be used in conjunction with loop pushing.

An example of loop pushing is:

```
for (i=0; i<N; i++)                f2(x)
    f(x,i);
                                   void f2(int* a){
void f(int* a, int j){                 for (i=0; i<N; i++)
    a[j] = a[j] + c;                       a[i] = a[i] + c;
}                                  }
```

Procedure Inlining

A procedure inlining transformation replaces a call to a procedure by the code of the procedure itself. It is an interprocedural optimization. It allows a loop nest to be parallelized, removes overhead caused by the procedure call, and can improve locality.

An example of procedure inlining is:

```
for (i=0; i<N; i++)    for(i=0; i<N; i++)
    f(a,i);                a[i] = a[i] + c;
void f(int* x, int j){
    x[j] = x[j] + c;
}
```

Statement Reordering

A statement reordering transformation schedules instructions of the loop body to modify the data dependence graph and enable vectorization.

An example of statement reordering is:

```
for (i=0; i<N; i++){    for(i=0; i<N; i++){
    a[i] = b[i] * 2;        c[i] = a[i-1] - 4;
    c[i] = a[i-1] - 4;      a[i] = b[i] * 2;
}                       }
```

Software Pipelining

A software pipelining transformation may parallelize a loop body by scheduling instructions of different instances of the loop body. It may be a powerful optimization to improve instruction-level parallelism. It can be used in conjunction with loop unrolling. In the example below, the preload commands can be issued one after another, each taking only one cycle. This time is just enough to request the memory areas. It is not enough to actually load them. This takes many cycles, depending on the cache level that actually has the data. Execution of a configuration behaves similarly. The configuration is issued in a single cycle, waiting until all data are present. Then the configuration executes for many cycles. Software pipelining overlaps the execution of a configuration with the preloads for the next configuration. This way, the XPP array can be kept busy in parallel to the Load/Store unit.

An example of software pipelining is:

```
Issue Cycle Command
    XPPPreloadConfig (CFG1);
    for (i=0; i<100; ++i){
1:      XPPPreload (2,a+10*i,10);
2:      XPPPreload (5,b+20*i,20);
3:
4:      //delay
5:
6:      XPPExecute (CFG1);
    }
Issue Cycle Command
    Prologue XPPPreloadConfig (CFG1);
        XPPPreload (2,a,10);
        XPPPreload (5,b,20);
        // delay
        for (i=1; i<100; ++i){
Kernel                                 1:      XPPExecute (CFG1);
                                       2:      XPPPreload (2,a+10*i,10);
                                       3:      XPPPreload (5,b+20*i,20);
                                       4:      }
        XPPExecute (CFG1);
Epilog // delay
```

Vector Statement Generation

A vector statement generation transformation may replace instructions by vector instructions that can perform an operation on several data in parallel.

An example of vector statement generation is:

```
for (i=0; i<N; i++) [0:N] = b[0:N];
    [i] = b[i];
```

Data-Layout Optimizations

Optimizations may modify the data layout in memory in order to extract more parallelism or prevent memory problems like cache misses. Examples of such optimizations are scalar privatization, array privatization, and array merging.

Scalar Privatization

A scalar privatization optimization may be used in multiprocessor systems to increase the amount of parallelism and avoid unnecessary communications between the processing elements. If a scalar is only used like a temporary variable in a loop body, then each processing element can receive a copy of it and achieve its computations with this private copy.

An example of scalar privatization is:

```
for (i=0; i<=N; i++){
    c = b[i];
    a[i] = a[i] + c;
}
```

Array Privatization

An array privatization optimization may be the same as scalar privatization except that it may work on arrays rather than on scalars.

Array Merging

Figure 30:
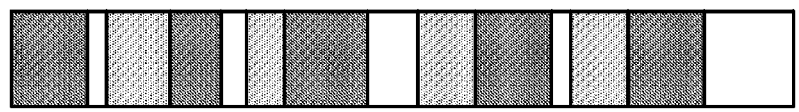
FIG. 30 illustrates merging of arrays, according to an example embodiment of the present invention.

An array merging optimization may transform the data layout of arrays by merging the data of several arrays following the way they are accessed in a loop nest. This way, memory cache misses can be avoided. The layout of the arrays can be different for each loop nest. The example code for array merging presented below is an example of a crossfilter, where the accesses to array 'a' are interleaved with accesses to array 'b'. FIG. 30 illustrates a data layout of both arrays, where blocks of 'a' 2300 (the dark highlighted portions) are merged with blocks of 'b' 2302 (the lighter highlighted portions). Unused memory space 2304 is represented by the white portions. Thus, cache misses may be avoided as data blocks containing arrays 'a' and 'b' are loaded into the cache when getting data from memory. More details can be found in Daniela Genius & Sylvain Lelait, "A Case for Array Merging in Memory Hierarchies," Proceedings of the 9*th* International Workshop on Compilers for Parallel Computers, CPC '01 (June 2001).

```
for (j=1; j<=N-1; i++)
    for (j=1; j<=N; j++)
        b[i][j] = 0.25*(a[i-1][j]+a[i]+[j-1]+a[i+1][j]+a[i][j+1]);
```

Example of Application of the Optimizations

In accordance with that which is discussed above, it will be appreciated that a lot of optimizations can be performed on loops before and also after generation of vector statements. Finding a sequence of optimizations that would produce an optimal solution for all loop nests of a program is still an area of research. Therefore, in an embodiment of the present invention, a way to use these optimizations is provided that follows a reasonable heuristic to produce vectorizable loop nests. To vectorize the code, the Allen-Kennedy algorithm, that uses statement reordering and loop distribution before vector statements are generated, can be used. It can be enhanced with loop interchange, scalar expansion, index set splitting, node splitting, loop peeling. All these transformations are based on the data dependence graph. A statement can be vectorized if it is not part of a dependence cycle. Hence, optimizations may be performed to break cycles or, if not completely possible, to create loop nests without dependence cycles.

The whole process may be divided into four majors steps. First, the procedures may be restructured by analyzing the procedure calls inside the loop bodies. Removal of the procedures may then be tried. Then, some high-level dataflow optimizations may be applied to the loop bodies to modify their control-flow and simplify their code. The third step may include preparing the loop nests for vectorization by building perfect loop nests and ensuring that inner loop levels are vectorizable. Then, optimizations can be performed that target the architecture and optimize the data locality. It should also be noted that other optimizations and code transformations can occur between these different steps that can also help to further optimize the loop nests.

Hence, the first step may apply procedure inlining and loop pushing to remove the procedure calls of the loop bodies. Then, the second step may include loop-invariant code motion, loop unswitching, strength reduction and idiom recognition. The third step can be divided in several subsets of optimizations. Loop reversal, loop normalization and if-conversion may be initially applied to get normalized loop nests. This may allow building of the data dependency graph. Then, if dependencies prevent the loop nest to be vectorized, transformations may be applied. For instance, if dependencies occur only on certain iterations, loop peeling or loop splitting may be applied. Node splitting, loop skewing, scalar expansion or statement reordering can be applied in other cases. Then, loop interchange may move inwards the loop levels without dependence cycles. A goal is to have perfectly nested loops with the loop levels carrying dependence cycles as much outwards as possible. Then, loop fusion, reduction recognition, scalar replacement/array contraction, and loop distribution may be applied to further improve the following vectorization. Vector statement generation can be performed at last using the Allen-Kennedy algorithm for instance. The last step can include optimizations such as loop tiling, stripmining, loop unrolling and software pipelining that take into account the target processor.

The number of optimizations in the third step may be large, but it may be that not all of them are applied to each loop nest. Following the goal of the vectorization and the data dependence graph, only some of them are applied. Heuristics may be used to guide the application of the optimizations that can be applied several times if needed. The following code is an example of this:

```
void f(int** a, int** b, int *c, int i, int j){
    a[i][j] = a[i] [j-1] - b[i+1][j-1];
}
void g(int* a , int* c, int i){
    a[i] = c[i] + 2;
}
for(i=0; i<N; i++){
    for (j=1; j<9; j=j++){
        if (k>0)
            f(a, b, i, j);
        else
            g(d, c, j);
    }
    d[i] = d[i +1] + 2;
}
for (i=0; i<N; i++)
    a[i][i] = b[i] + 3;
```

The first step will find that inlining the two procedure calls is possible. Then loop unswitching can be applied to remove the conditional instruction of the loop body. The second step may begin by applying loop normalization and analyses of the data dependence graph. A cycle can be broken by applying loop interchange as it is only carried by the second level. The two levels may be exchanged so that the inner level is vectorizable. Before that or also after, loop distribution may be applied. Loop fusion can be applied when the loop on i is pulled out of the conditional instruction by a traditional redundant code elimination optimization. Finally, vector code can be generated for the resulting loops.

In more detail, after procedure inlining, the following may be obtained:

```
for (i=0; i<N; i++){
    for (j=1; j<9; j=j++)
        if (k>0)
            a[i][j] = a[i][j-1] - b[i+1][j-1];
        else
            d[j] = c[j] + 2;
    }
    d[i] = d[i+1] + 2;
}
for (i=0; i<N; i++)
    a[i][i] = b [i] + 3;
```

After loop unswitching, the following may be obtained:

```
if (k>0)
    for (i=0; i<N; i++){
        for (j=1; j<9; j=j++)
            a[i][j] = a[i][j-1] - b[i+1][j-1];
        d[i] = d[i+1] + 2;
    }
else
    for (i=0; i<N; i++){
        for (j=1; j<9; j=j++)
            d[j] = c[j] + 2;
        d[i] = d[i+1] + 2;
    }
```

```
          for (i=0; i<N; i++)
              a[i][i] = b[i] + 3;
```

After loop normalization, the following may be obtained:

```
    if (k>0)
        for (i=0; i<N; i++){
            for (j=0; j<8; j=j++)
                a[i][j+1] = a[i][j] - b[i+1][j];
            d[i] = d[i+1] + 2;
        }
    else
        for (i=0; i<N; i++){
            for (j=0; j<8; j = j++)
                d[j] = c[j+1] + 2;
            d[i] = d[i+1] + 2;
        }
    for (i=0; i<N; i++)
        a[i][i] = b[i] + 3;
```

After loop distribution and loop fusion, the following may be obtained:

```
    if (k>0)
        for(i=0; i<N; i++)
            for (j=0; j<8; j=j++)
                a[i][j+1] = a[i][j] - b[i+1][j];
    else
        for (i=0; i<N; i++)
            for (j=0; j<8; j=j++)
                d[j] = c[j+1] + 2;
    for (i=0; i<N; i++){
        d[i] = d[i+1] + 2;
        a[i][i] = b[i] + 3;
    }
```

After loop interchange, the following may be obtained:

```
    if (k>0)
        for (j=0; j<8; j=j++)
            for (i=0; i<N; i++)
                a[i][j+1] = a[i][j] - b[i+1][j];
    else
        for (i=0; i<N; i++)
            for (j=0; j<8; j=j++)
                d[j] = c[j+1] + 2;
    for (i=0; i<N; i++){
        d[i] = d[i+1] + 2;
        a[i][i] = b[i] + 3;
    }
```

After vector code generation, the following may be obtained:

```
    if (k>0)
        for (j=0; j<8; j=j++)
            a[0:N-1][j+1] = a[0:N-1][j] - b[0:N][j];
    else
        for (i=0; i<N; i++)
            d[0:8] = c[1:9] + 2;
    d[0:N-1] = d[1:N] + 2;
    a[0:N-1][0:N-1] = b[0:N] + 3;
```

Compiler Specification for the Pact XPP

A cached RISC-XPP architecture may exploit its full potential on code that is characterized by high data locality and high computational effort. A compiler for this architecture has to consider these design constraints. The compiler's primary objective is to concentrate computational expensive calculations to innermost loops and to make up as much data locality as possible for them.

The compiler may contain usual analysis and optimizations. As interprocedural analysis, e.g., alias analysis, are especially useful, a global optimization driver may be necessary to ensure the propagation of global information to all optimizations. The way the PACT XPP may influence the compiler is discussed in the following sections.

Compiler Structure

Figure 31:
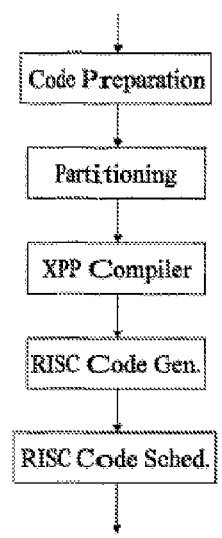
FIG. 31 is a flowchart that illustrates a global view of a compiling procedure, according to an example embodiment of the present invention.

FIG. 31 provides a global view of the compiling procedure and shows main steps the compiler may follow to produce code for a system containing a RISC processor and a PACT XPP. The next sections focus on the XPP compiler itself, but first the other steps are briefly described.

Code Preparation

Code preparation may take the whole program as input and can be considered as a usual compiler front-end. It may prepare the code by applying code analysis and optimizations to enable the compiler to extract as many loop nests as possible to be executed by the PACT XPP. Important optimizations are idiom recognition, copy propagation, dead code elimination, and all usual analysis like dataflow and alias analysis.

Partitioning

Partitioning may decide which part of the program is executed by the host processor and which part is executed by the PACT XPP.

A loop nest may be executed by the host in three cases:
if the loop nest is not well-formed,
if the number of operations to execute is not worth being executed on the PACT XPP, or
if it is impossible to get a mapping of the loop nest on the PACT XPP.

A loop nest is said to be well-formed if the loop bounds and the step of all loops are constant, the loop induction variables are known and if there is only one entry and one exit to the loop nest.

Another problem may arise with loop nests where the loop bounds are constant but unknown at compile time. Loop tiling may allow for overcoming this problem, as will be described below. Nevertheless, it could be that it is not worth executing the loop nest on the PACT XPP if the loop bounds are too low. A conditional instruction testing if the loop bounds are large enough can be introduced, and two versions of the loop nest may be produced. One would be executed on the host processor, and the other on the PACT XPP when the loop bounds are suitable. This would also ease applications of loop transformations, as possible compensation code would be simpler due to the hypothesis on the loop bounds.

RISC Code Generation and Scheduling

After the XPP compiler has produced NML code for the loops chosen by the partitioning phase, the main compiling process may handle the code that will be executed by the host processor where instructions to manage the configurations have been inserted. This is an aim of the last two steps:
RISC Code Generation and
RISC Code Scheduling.

The first one may produce code for the host processor and the second one may optimize it further by looking for a better scheduling using software pipelining for instance.

XPP Compiler for Loops

Figure 32:
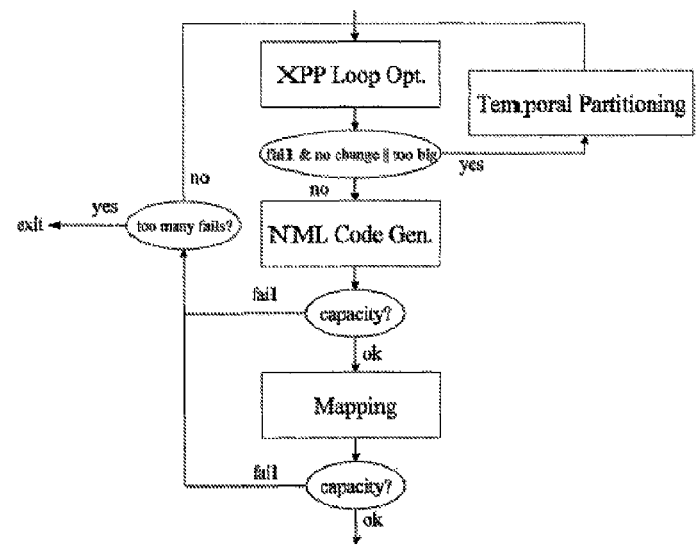
FIG. 32 is a flowchart that illustrates a detailed architecture and an internal processing of an XPP Compiler.

FIG. 32 illustrates a detailed architecture and an internal processing of the XPP Compiler. It is a complex cooperation between program transformations, included in the XPP Loop optimizations, a temporal partitioning phase, NML code generation and the mapping of the configuration on the PACT XPP.

First, loop optimizations targeted at the PACT XPP may be applied to try to produce innermost loop bodies that can be executed on the array of processors. If this is the case, the NML code generation phase may be called. If not, then temporal partitioning may be applied to get several configurations for the same loop. After NML code generation and the mapping phase, it can also happen that a configuration will not fit on tike PACT XPP. In this case, the loop optimizations may be applied again with respect to the reasons of failure of the NML code generation or of the mapping. If this new application of loop optimizations does not change the code, temporal partitioning may be applied. Furthermore, the number of attempts for the NML Code Generation and the mapping may be kept track of. If too many attempts are made and a solution is still not obtained, the process may be broken and the loop nest may be executed by the host processor.

Temporal Partitioning

Temporal partitioning may split the code generated for the PACT XPP into several configurations if the number of operations, i.e., the size of the configuration, to be executed in a loop nest exceeds the number of operations executable in a single configuration. This transformation is called loop dissevering. See, for example, João M. P. Cardoso & Markus Weinhardt, "XPP-VC: A C Compiler with Temporal Partitioning for the PACT-XPP Architecture," *Proceedings of the 12th International Conference on Field-Programmable Logic and Applications, FPL* 2002, 2438 LNCS, 864-874 (2002). These configurations may be then integrated in a loop of configurations whose number of execution corresponds to the iteration range of the original loop.

Generation of NML Code

Generation of NML code may take as input an intermediate form of the code produced by the XPP Loop optimizations step, together with a dataflow graph built upon it. NML code can then be produced by using tree or DAG-pattern matching techniques.

Mapping Step

A mapping step may take care of mapping the NML modules on the PACT XPP by placing the operations on the ALUs, FREGs, and BREGs, and routing the data through the buses.

XPP Loop Optimizations Driver

A goal of loop optimizations used for the PACT XPP is to extract as much parallelism as possible from the loop nests in order to execute them on the PACT XPP by exploiting the ALU-PAEs as effectively as possible and to avoid memory bottlenecks with the IRAMs. The following sections explain how they may be organized and how to take into account the architecture for applying the optimizations.

Organization of the System

Figure 33:
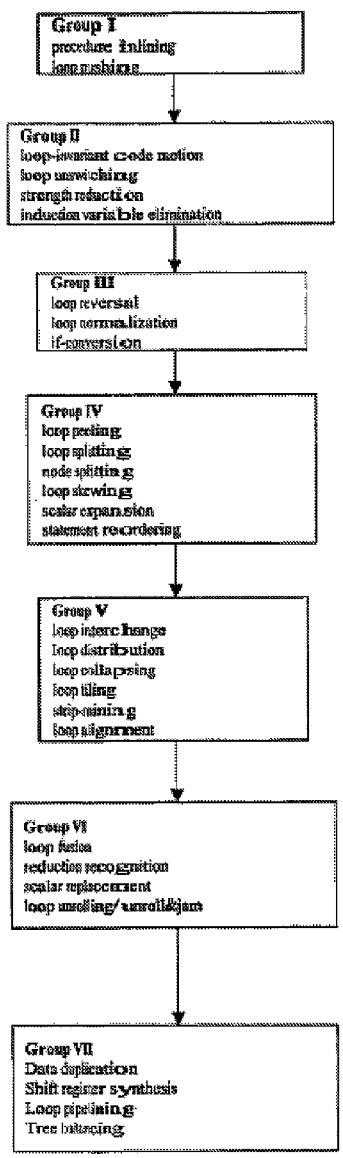
FIG. 33 is a diagram that illustrates details of XPP loop optimizations, including their organization, according to an example embodiment of the present invention.

FIG. 33 provides a detailed view of the XPP loop optimizations, including their organization. The transformations may be divided in six groups. Other standard optimizations and analysis may be applied in-between. Each group could be called several times. Loops over several groups can also occur if needed. The number of iterations for each driver loop can be of constant value or determined at compile time by the optimizations themselves, (e.g., repeat until a certain code quality is reached). In the first iteration of the loop, it can be checked if loop nests are usable for the PACT XPP. It is mainly directed to check the loop bounds etc. For instance, if the loop nest is well-formed and the data dependence graph does not prevent optimization, but the loop bounds are unknown, then, in the first iteration loop, tiling may be applied to get an innermost that is easier to handle and can be better optimized, and in the second iteration, loop normalization, if conversion, loop interchange and other optimizations can be applied to effectively optimize the inner-most loops for the PACT XPP. Nevertheless, this has not been necessary until now with the examples presented below.

With reference to FIG. 33, Group I may ensure that no procedure calls occur in the loop nest. Group II may prepare the loop bodies by removing loop-invariant instructions and conditional instruction to ease the analysis. Group III may generate loop nests suitable for the data dependence analysis. Group IV may contain optimizations to transform the loop nests to get data dependence graphs that are suitable for vectorization. Group V may contain optimizations that ensure that the innermost loops can be executed on the PACT XPP. Group VI may contain optimizations that further extract parallelism from the loop bodies. Group VII may contain optimizations more towards optimizing the usage of the hardware itself.

In each group, the application of the optimizations may depend on the result of the analysis and the characteristics of the loop nest. For instance, it is clear that not all transformations in Group IV are applied. It depends on the data dependence graph computed before.

Loop Preparation

The optimizations of Groups I, II and III of the XPP compiler may generate loop bodies without procedure calls, conditional instructions and induction variables other than loop control variables. Thus, loop nests, where the innermost loops are suitable for execution on the PACT XPP, may be obtained. The iteration ranges may be normalized to ease data dependence analysis and the application of other code transformations.

Transformation of the Data Dependence Graph

The optimizations of Group IV may be performed to obtain innermost loops suitable for vectorization with respect to the data dependence graph. Nevertheless, a difference with usual vectorization is that a dependence cycle, which would normally prevent any vectorization of the code, does not prevent the optimization of a loop nest for the PACT XPP. If a cycle is due to an anti-dependence, then it could be that it will not prevent optimization of the code as stated in Markus Weinhardt & Wayne Luk, "Pipeline Vectorization," *IEEE Transactions on Computer-Aided Design of integrated Circuits and Systems,* 20(2):234-248 (February 2001). Furthermore, dependence cycles will not pre-vent vectorization for the PACT XPP when it consists only of a loop-carried true dependence on the same expression. If cycles with distance k occur in the data dependence graph, then this can be handled by holding k values in registers. This optimization is of the same class as cycle shrinking.

Nevertheless, limitations due to the dependence graph exist. Loop nests cannot be handled if some dependence distances are not constant or unknown. If only a few dependencies prevent the optimization of the whole loop nest, this could be overcome by using the traditional vectorization algorithm that sorts topologically the strongly connected components of the data dependence graph (statement reordering), and then applying loop distribution. This way, loop nests, which can be handled by the PACT XPP and some by the host processor, can be obtained.

Influence of the Architectural Parameters

Some hardware specific parameters may influence the application of the loop transformations. The number of operations and memory accesses that a loop body performs may be estimated at each step. These parameters may influence loop unrolling, strip-mining, loop tiling and also loop interchange (iteration range).

The table below lists the parameters that may influence the application of the optimizations. For each of them, two data are given: a starting value computed from the loop and a restriction value which is the value the parameter should reach or should not exceed after the application of the optimizations. Vector length depicts the range of the innermost loops, i.e., the number of elements of an array accessed in the loop body. Reused data set size represents the amount of data that must fit in the cache. I/O IRAMs, ALU, FREG, BREG stand for the number of IRAMs, ALUs, FREGs, and BREGs, respectively, of the PACT XPP. The dataflow graph width represents the number of operations that can be executed in parallel in the same pipeline stage. The dataflow graph height represents the length of the pipeline. Configuration cycles amounts to the length of the pipeline and to the number of cycles dedicated to the control. The application of each optimization may decrease a parameter's value (−),
increase a parameter's value (+),
not influence a parameter (id), or
adapt a parameter's value to fit into the goal size (make fit).

Furthermore, some resources must be kept for control in the configuration. This means that the optimizations should not make the needs exceed more than 70-80% each resource.

| Parameter | Goal | Starting Value |
|---|---|---|
| Vector length | IRAM size (256 words) | Loop count |
| Reused data set size | Approx. cache size | Algorithm analysis/loop sizes |
| I/O IRAMs | PACT size (16) | Algorithm inputs + outputs |
| ALU | PACT size (<64) | ALU opcode estimate |
| BREG | PACT size (<80) | BREG opcode estimate |
| FREG | PACT size (<80) | FREG opcode estimate |
| Data flow graph width | High | Algorithm data flow graph |
| Data flow graph height | Small | Algorithm data flow graph |
| Configuration cycles | ≤command line parameter | Algorithm analysis |

Additional notations used in the following descriptions are as follows. n is the total number of processing elements available, r is the width of the dataflow graph, in is the maximum number of input values in a cycle, and out is the maximum number of output values possible in a cycle. On the PACT XPP, n is the number of ALUs, FREGs and BREGs available for a configuration, r is the number of ALUs, FREGs and BREGs that can be started in parallel in the same pipeline stage, and in and out amount to the number of available IRAMs. As IRAMs have 1 input port and 1 output port, the number of IRAMs yields directly the number of input and output data.

The number of operations of a loop body may be computed by adding all logic and arithmetic operations occurring in the instructions. The number of input values is the number of operands of the instructions regardless of address operations. The number of output values is the number of output operands of the instructions regardless of address operations. To determine the number of parallel operations, input and output values, and the dataflow graph must be considered. The effects of each transformation on the architectural parameters are now presented in detail.

Loop Interchange

Loop interchange may applied when the innermost loop has a too narrow iteration range. In that case, loop interchange may allow for an innermost loop with a more profitable iteration range. It can also be influenced by the layout of the data in memory. It can be profitable to data locality to interchange two loops to get a more practical way to access arrays in the cache and therefore prevent cache misses. It is of course also influenced by data dependencies as explained above.

| Parameter | Effect |
|---|---|
| Vector length | + |
| Reused data set size | make fit |
| I/O IRAMs | id |
| ALU | id |
| BREG | id |
| FREG | id |
| Data flow graph width | id |
| Data flow graph height | id |
| Configuration cycles | − |

Loop Distribution

Loop distribution may be applied if a loop body is too big to fit on the PACT XPP. A main effect of loop distribution is to reduce the processing elements needed by the configuration. Reducing the need for IRAMs can only be a side effect.

| Parameter | Effect |
|---|---|
| Vector length | id |
| Reused data set size | id |
| I/O IRAMs | make fit |
| ALU | make fit |
| BREG | make fit |
| FREG | make fit |
| Data flow graph width | − |
| Data flow graph height | − |
| Configuration cycles | − |

Loop Collapsing

Loop collapsing can be used to make the loop body use more memory resources. As several dimensions are merged, the iteration range is increased and the memory needed is increased as well.

| Parameter | Effect |
|---|---|
| Vector length | + |
| Reused data set size | + |
| I/O IRAMs | + |
| ALU | id |
| BREG | id |
| FREG | id |
| Data flow graph width | + |
| Data flow graph height | + |
| Configuration cycles | + |

Loop Tiling

Loop tiling, as multi-dimensional strip-mining, is influenced by all parameters. It may be especially useful when the iteration space is by far too big to fit in the IRAM, or to guarantee maximum execution time when the iteration space is unbounded. See the discussion below under the heading "Limiting the Execution Time of a Configuration." It can then make the loop body fit with respect to the resources of the PACT XPP, namely the IRAM and cache line sizes. The size of the tiles for strip-mining and loop tiling can be computed as:

tile size=resources available for the loop body/resources necessary for the loop body.

The resources available for the loop body are the whole resources of the PACT XPP for this configuration. A tile size can be computed for the data and another one for the processing elements. The final tile size is then the minimum between these two. For instance, when the amount of data accessed is larger than the capacity of the cache, loop tiling may be applied according to the following example code for loop tiling for the PACT XPP.

```
for (i=0; i<=1048576; i++)     for (i=0; i<=1048576; i+= CACHE_SIZE)
    <loop body>                    for (j=0; j<CACHE_SIZE;
                                        j+=IRAM_SIZE)
                                        for (k=0; k<IRAM_SIZE; k++)
                                            <tiled loop body>
```

| Parameter | Effect |
|---|---|
| Vector length | make fit |
| Reused data set size | make fit |
| I/O IRAMs | id. |
| ALU | id |
| BREG | id |
| FREG | id |
| Data flow graph width | + |
| Data flow graph height | + |
| Configuration cycles | + |

Strip-Mining

Strip-mining may be used to make the amount of memory accesses of the innermost loop fit with the IRAMs capacity. The processing elements do not usually represent a problem as the PACT XPP has 64 ALU-PAEs which should be sufficient to execute any single loop body. Nevertheless, the number of operations can be also taken into account the same way as the data.

| Parameter | Effect |
|---|---|
| Vector length- | make fit |
| Reused data set size | id |
| I/O IRAMs | id |
| ALU | id |
| BREG | id |
| FREG | id |
| Data flow graph width | + |
| Data flow graph height | − |
| Configuration cycles | − |

Loop Fusion

Loop fusion may be applied when a loop body does not use enough resources. In this case, several loop bodies can be merged to obtain a configuration using a larger part of the available resources.

| Parameter | Effect |
|---|---|
| Vector length | id |
| Reused data set size | id |
| I/O IRAMs | + |
| ALU | + |
| BREG | + |
| FREG | + |
| Data flow graph width | id |
| Data flow graph height: | + |
| Configuration cycles | + |

Scalar Replacement

The amount of memory needed by the loop body should always fit in the IRAMs. Due to a scalar replacement optimization, some input or output data represented by array references that should be stored in IRAMs may be replaced by scalars that are either stored in FREGs or kept on buses.

| Parameter | Effect |
|---|---|
| Vector length | + |
| Reused data set size | id |
| I/O IRAMs | id |
| ALU | id |
| BREG | id |
| FREG | id |
| Data flow graph width | + |
| Data flow graph height | − |
| Configuration cycles | id |

Loop Unrolling

Loop unrolling, loop collapsing, loop fusion and loop distribution may be influenced by the number of operations of the body of the loop nest and the number of data inputs and outputs of these operations, as they modify the size of the loop body. The number of operations should always be smaller than n, and the number of input and output data should always be smaller than in and out.

| Parameter | Effect |
|---|---|
| Vector length | id |
| Reused data set size | id |
| I/O IRAMs | + |
| ALU | + |
| BREG | + |
| FREG | + |
| Data flow graph width | id |
| Data flow graph height | + |
| Configuration cycles | + |

Unroll-and-Jam

Unroll-and-Jam may include unrolling an outer loop and then merging the inner loops. It must compute the unrolling degree u with respect to the number of input memory accesses m and output memory accesses p in the inner loop. The following inequality must hold: u*min≤in u*p≤out. Moreover, the number of operations of the new inner loop must also fit on the PACT XPP.

| Parameter | Effect |
|---|---|
| Vector length | id |
| Reused data set size | + |
| I/O IRAMs | + |
| ALU | + |
| BREG | + |
| FREG | + |
| Data flow graph width | id |
| Data flow graph height | + |
| Configuration cycles | + |

Optimizations Towards Hardware Improvements

At this step other optimizations, specific to the PACT XPP, can be made. These optimizations deal mostly with memory problems and dataflow considerations. This is the case of shift register synthesis, input data duplication (similar to scalar privatization), or loop pipelining.

Shift Register Synthesis

A shift register synthesis optimization deals with array accesses that occur during the execution of a loop body. When several values of an array are alive for different iterations, it can be convenient to store them in registers, rather than accessing memory each time they are needed. As the same value must be stored in different registers depending on the number of iterations it is alive, a value shares several registers and flows from a register to another at each iteration. It is similar to a vector register allocated to an array access with the same value for each element. This optimization is performed directly on the dataflow graph by inserting nodes representing registers when a value must be stored in a register. In the PACT XPP, it amounts to storing it in a data register. A detailed explanation can be found in Markus Weinhardt & Wayne Luk, "Memory Access Optimization for Reconfigurable Systems," *IEEE Proceedings Computers and Digital Techniques*, 48(3) (May 2001).

Shift register synthesis may be mainly suitable for small to medium amounts of iterations where values are alive. Since the pipeline length increases with each iteration for which the value has to be buffered, the following method is better suited for medium to large distances between accesses in one input array.

Nevertheless, this method may work very well for image processing algorithms which mostly alter a pixel by analyzing itself and its surrounding neighbors.

| Parameter | Effect |
| --- | --- |
| Vector length | + |
| Reused data set size | id |
| I/O IRAMs | id |
| ALU | id |
| BREG | id |
| FREG | id |
| Data flow graph width | + |
| Data flow graph height | - |
| Configuration cycles | id |

Input Data Duplication

An input data duplication optimization is orthogonal to shift register synthesis. If different elements of the same array are needed concurrently, instead of storing the values in registers, the same values may be copied in different IRAMs. The advantage against shift register synthesis is the shorter pipeline length, and therefore the increased parallelism, and the unrestricted applicability. On the other hand, the cache-IRAMM bottle-neck can affect the performance of this solution, depending on the amounts of data to be moved. Nevertheless, it is assumed that cache IRAM transfers are negligible to transfers in the rest of the memory hierarchy.

| Parameter | Effect |
| --- | --- |
| Vector length | + |
| Reused data set size | id |
| I/O IRAMs | id |
| ALU | id |
| BREG | id |
| FREG | id |
| Data flow graph width | + |
| Data flow graph height | - |
| Configuration cycles | id |

Loop Pipelining

A loop optimization pipelining optimization may include synchronizing operations by inserting delays in the dataflow graph. These delays may be registers. For the PACT XPP, it amounts to storing values in data registers to delay the operation using them. This is the same as pipeline balancing performed by xmap.

| Parameter | Effect |
| --- | --- |
| Vector length | + |
| Reused data set size | id |
| I/O IRAMs | id |
| ALU | id |
| BREG | id |
| FREG | id |
| Data flow graph width | + |
| Data flow graph height | - |
| Configuration cycles | + |

Tree Balancing

A tree balancing optimization may include balancing the tree representing the loop body. It may reduce the depth of the pipeline, thus reducing the execution time of an iteration, and may increase parallelism.

| Parameter | Effect |
| --- | --- |
| Vector length | + |
| Reused data set size | id |
| I/O IRAMs | id |
| ALU | id |
| BREG | id |
| FREG | id |
| Data flow graph width | + |
| Data flow graph height | - |
| Configuration cycles | - |

Limiting the Execution Time of a Configuration

The execution time of a configuration must be controlled. This is ensured in the compiler by strip-mining and loop tiling that take care that not more input data than the IRAM's capacity come in the PACT XPP in a cycle. This way the iteration-range of the innermost loop that is executed on the PACT XPP is limited, and therefore its execution time. Moreover, partitioning ensures that loops, whose execution count can be computed at run time, are going to be executed on the PACT XPP. This condition is trivial for-loops, but for while-loops, where the execution count cannot be determined statically, a transformation exemplified by the code below can be applied. As a result, the inner for-loop can be handled by the PACT XPP.

```
while (ok){              while (ok)
    <loop body>              for (i=0; i<100 && ok; i++){
}                                <loop body>
                             }
```

Case Studies 3×3 Edge Detector

Original Code

The following is source code:

```
#define VERLEN 16
#define HORLEN 16
main( ){
    int v, h, inp;
    int p1[VERLEN][HORLEN];
    int p2[VERLEN][HORLEN];
    int htmp, vtmp, sum;
    for(v=0; v<VERLEN; v++)          //loop nest 1
        for(h=0; h<HORLEN; h++){
            scanf("%d", &p1[v][h]);  //read input pixels to p1
            p2[v][h] = 0;            //initialize p2
        }
```

-continued

```
for(v=0; v<=VERLEN-3; v++){                    //loop nest 2
    for(h=0; h<=HORLEN-3; h++) {
        htmp =                                  (p1[v+2][h] - p1[v][h]) +
                                                (p1[v+2][h+2] - p1[v][h+2]) +
                                                2 * (p1[v+2][h+1] -
                                                p1[v][h+1]);
        if(htmp < 0)
            htmp = -htmp;
        vtmp =                                  (p1[v][h+2] - p1[v][h]) +
                                                (p1[v+2][h+2] - p1[v+2][h]) +
                                                2 * (p1[v+1][h+2] -
                                                p1[v+1][h]);
        if (vtmp < 0)
            vtmp = -vtmp;
        sum = htmp + vtmp;
        if (sum > 255)
            sum = 255;
        p2[v+1][h+1] = sum;
    }
}
for(v=0; v<VERLEN; v++)                         //loop nest 3
    for(h=0; h<HORLEN; h++)
        printf("%d\n", p2[v][h]);               //print output pixels from p2
}
```

Preliminary Transformations
Interprocedural Optimizations

The first step normally invokes interprocedural transformations like function dining and loop pushing. Since no procedure calls are within the loop body, these transformations are not applied to this example.

Partitioning

The partitioning algorithm chooses which code runs on the RISC processor and which code runs on the XPP. Since only inner loops are considered to run on the XPP, the basic blocks are annotated with the loop nest depth. Thus, basic blocks which are not in a loop are separated out. Furthermore, function calls within a loop body prevent a loop to be considered for running on the XPP.

In our benchmark, the loop nests 1 and 3 are marked as to run on the RISC host because of the function call. In the following sections they are not considered any further.

It is to say that at this compilation stage it is not predictable if the remaining loop nests can be synthesized for the XPP. Just the ones which definitely cannot run on it were separated. Others may follow, since running the code on the RISC CPU is always the reassurance in this strategy.

Loop Analysis and Normalization

The code upon has already normalized loops. Nevertheless, it is more likely that human written code would be approximately as follows:

```
for(v=1; v<VERLEN - 1; v++){
    for(h=1; h<HORLEN - 1; h++){
        htmp =                                  (p1[v+1][h-1] - p1[v-1][h-1]) +
                                                (p1[v+1][h+1] - p1[v-1][h+1]) +
                                                2 * (p1[v+1] [h] - p1[v-1][h]);
        if(htmp < 0)
            htmp = -htmp;
        vtmp =                                  (p1[v-1][h+1] - p1[v-1][h-1]) +
                                                (p1[v+1][h+1] - p1[v+1][h-1]) +
                                                2 * (p1[v][h+1] - p1[v][h-1]);
        if(vtmp < 0)
            vtmp = -vtmp;
        sum = htmp + vtmp;
        if(sum > 255)
            sum = 255;
        p2[v+1][h+1] = sum;
    }
}
```

Although seen at first sight by a human reader, it is not obvious for the compiler that the loop is well formed. Therefore, normalizing of the loop is attempted.

If the original loop induction variable is called i with the increment value and lower and upper loop bounds/and u, respectively, then the normalized loop with the induction variable i' and the upper bound u' (the lower bound l' is 0 by definition) is transformed as follows:

The upper bound calculates to u'=(u−l)/s.

All occurrences of i are replaced by l+i'*s.

Applied to the code above, the loop statement for (v=1; v<VERLEN−1; v++) with the lower bound vl=1, the upper bound vu=14 (<15 means<=14 in integer arithmetic) and the increment vs=1 transforms to for(vn=0; vn<=(vu−vl)/vs; vn++)

or simplified for(vn=0; vn<=13; vn++)

The 'h-loop' is transformed equally, issuing the original code.

Idiom Recognition

In the second step, idiom recognition finds the abs( ) and min( ) structures in the loop body. Note that although the XPP has no abs opcode, it can easily be synthesized and should therefore be produced to simplify the internal representation. (Otherwise, if-conversion has to handle this case which increases the complexity.)

Therefore, the code after idiom recognition is approximately as follows (abs( ) and min( ) are compiler known functions which are directly mapped to XPP opcodes or predefined NML modules):

```
for(v=0; v<=16-3; v++){
    for(h=0; h<=16--3; h++){
        htmp =                                  (p1[v+2][h] - p1[v][h]) +
                                                (p1[v+2][h+2] - p1[v][h+2]) +
                                                2 * (p1[v+2][h+1] - p1[v][h+1]);
        htmp = abs(htmp);
        vtmp =                                  (p1[v][h+2] - p1[v][h]) +
                                                (p1 [v+2] [h+2] - p1 [v+2] [h]) +
                                                2 * (p1[v+1][h+2] - p1[v+1][h]);
        vtmp = abs(vtmp);
        sum = min(htmp + vtmp, 255);
        p2[v+1][h+1] = sum;
    }
}
```

Dependency Analysis

```
for(v=0; v<=16-3;
v++){
    for(h=0; h<=16-3;
h++){
    S1      htmp =                              (p1[v+2][h] - p1[v][h]) +
                                                (p1[v+2][h+2] -
                                                p1[v][h+2]) +
                                                2 * (p1[v+2][h+1] -
                                                p1[v][h+1]);
    S2      htmp = abs(htmp);
    S3      vtmp =                              (p1[v][h+2] - p1[v][h]) +
                                                (p1[v+2][h+2] -
                                                p1[v+2][h]) +
                                                2 * (p1[v+1][h+2] -
                                                p1[v+1][h]);
    S4      vtmp = abs(vtmp);
    S5      sum = min(htmp +
                                                vtmp, 255);
    S6      p2[v+1][h+1] = sum;
    }
}
```

There are no loop carried dependencies which prevent pipeline vectorization. The loop independent scalar dependencies do not prevent pipeline vectorization since the transformation does not disturb the order of reads and writes. Furthermore, forward expression substitution/dead code elimination will remove the scalars completely.

Pre Code Generation Transformations
Forward Expression Substitution/Dead Code Elimination The lack of uses of htmp, vtmp and sum after the loop nest allows forward expression substitution along with dead code elimination to place the whole calculation into one statement.

```
p2[v+1][h+1] = min(abs((p1[v+2][h1] – p1[v][h]) +
        (p1[v+2][h+2] p1[v][h+2]) +
        2 * (p1[v+2][h+1] – p1[v][h+1])) +
    abs((p1[v][h+2] – p1[v][h]) +
        (p1[v+2][h+2] – p1[v+2][h]) +
        2 * (p1[v+1][h+2] – p1[v+1][h])), 255);
```

The scalar accesses then disappear completely.

Mapping to IRAMs

The array accesses are mapped to IRAMs. At this stage the IRAM numbers are chosen arbitrarily. The actual mapping to XPP IRAMs is done later.

Therefore, p1[v+x][h+y] and p2[v+X][h+y] are renamed to iramN[y], (e.g., p1[v+2][h] to iram2[0]). Accordingly, the code is

```
iram3[1] = mins(abs   (iram2[0] – iram0[0]) +
                      (iram2[2] – iram0[2]) +
              2 *     (iram2[1] – iram0[1]) +
              abs     (iram0[2] – iram0[0]) +
                      (iram2[2] – iram2[0]) +
              2 *     (iram1[2] – iram1[0]), 255);
```

Tree Balancing

Figure 34:
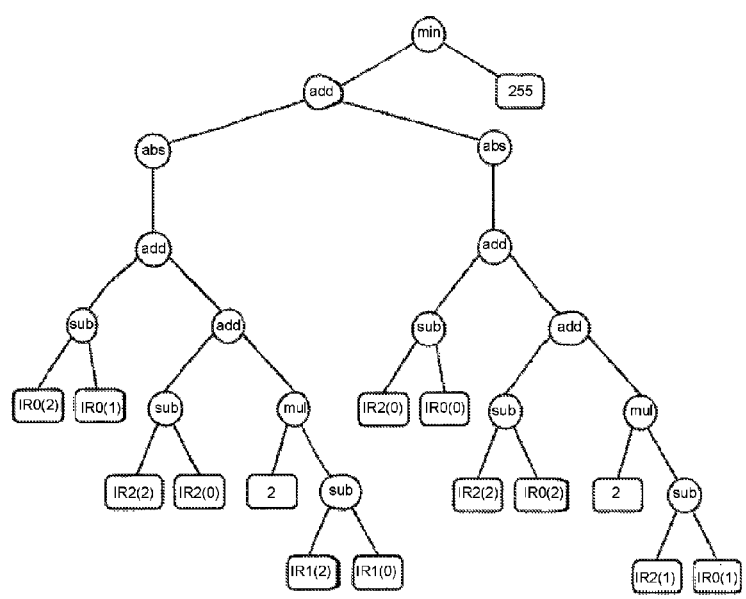
FIG. 34 is an expression tree of an edge 3×3 inner loop body, according to an example embodiment of the present invention.

FIG. 34 shows an expression tree of an edge 3×3 inner loop body. The visualized expression tree of FIG. 34 shows another valuable optimization before matching the tree. Since the depth of the tree determines the length of the synthesized pipeline, another simplification can decrease this depth. In both of the main sub trees, the operands of the commutative add expressions can be interchanged to reduce the overall tree depth. A resulting expression tree is shown in FIG. 35. In FIG. 35, one of the sub trees is shown before and after balancing. The numbers represent the annotated maximum tree depth from the node to its deepest child leaf node.

XPP Code Generation
Pipeline Synthesis

Figure 36:
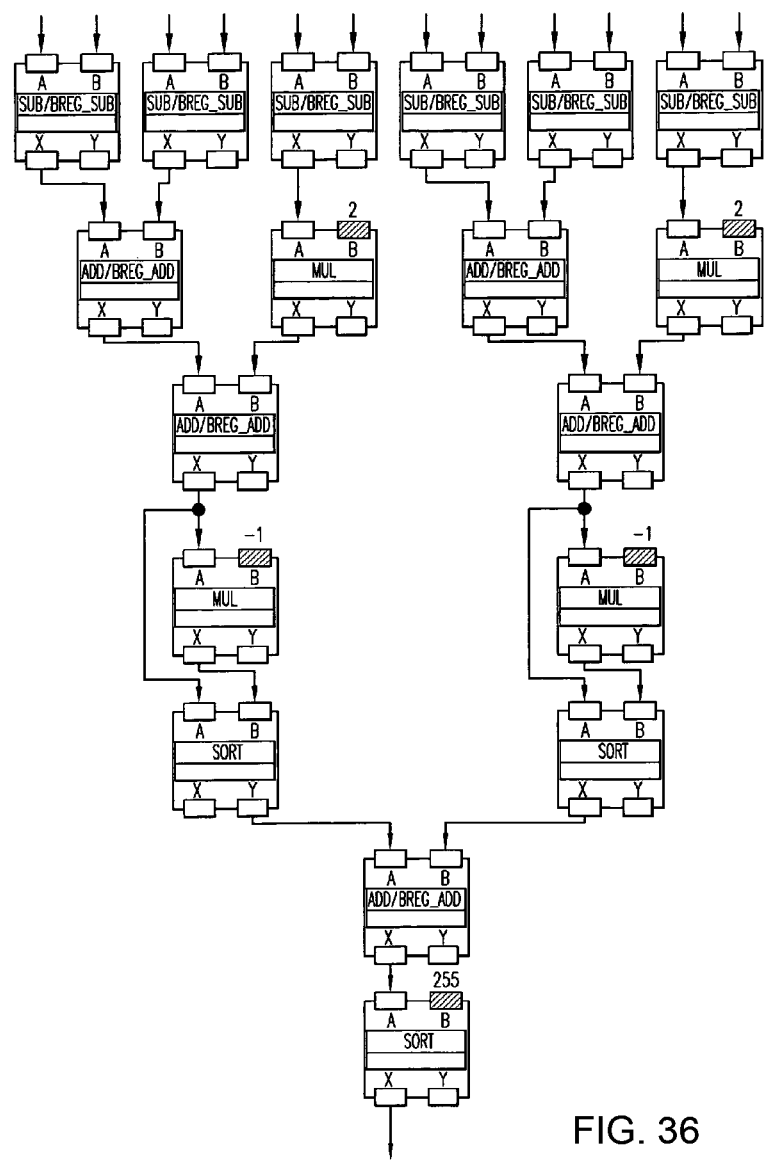
FIG. 36 shows a main calculation network of an edge 3×3 configuration, according to an example embodiment of the present invention.
Figure 37:
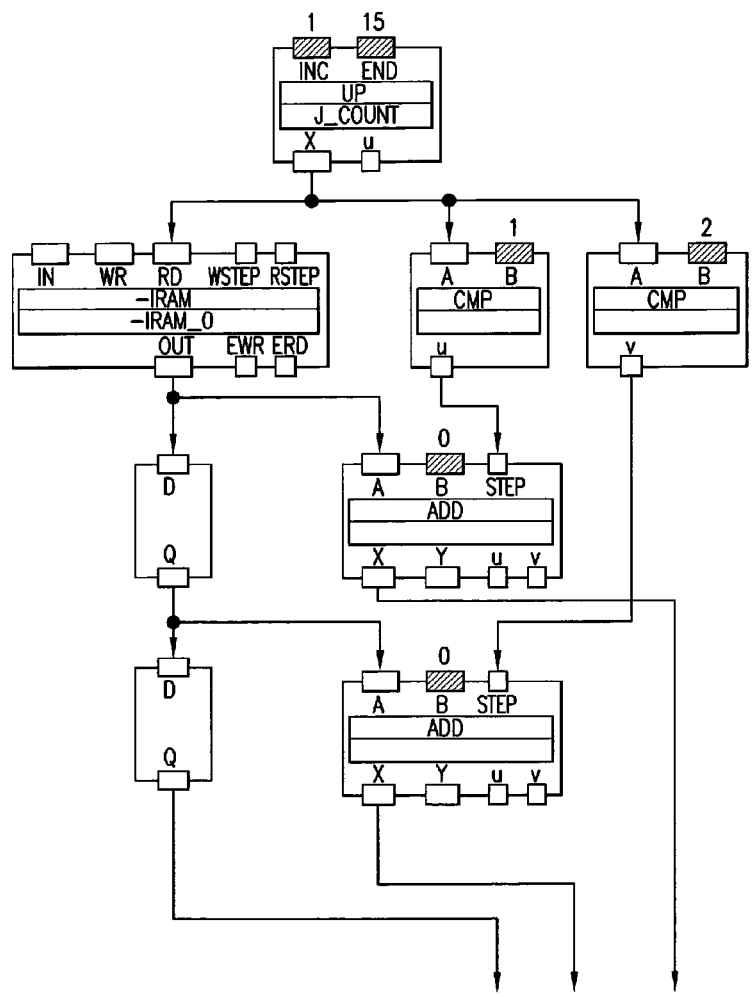
FIG. 37 shows a case of synthesized shift registers, according to an example embodiment of the present invention.

As already stated, the pipeline is synthesized by a dynamic programming tree matcher. In contrast to sequential processors, it does not generate instructions and register references, but PAE opcodes and port connections. FIG. 36 shows the main calculation network of the edge 3×3 configuration. The MULTI-SORT combination does the abs( ) calculation, while the SORT does the min( ) calculation. The input data preparation network is not shown in FIG. 36. FIG. 37 shows the case of synthesized shift registers, while the variant with duplicated input data simply includes an IRAM for each input channel in FIG. 36. With respect to FIG. 37, there is one input after the shift register synthesis. The leftmost input contains p1 [ ][h], the middle one contains p1 [ ][h+1], and the rightmost one contains p1 [ ][h+2].

Although this is straight forward, there remains the question how to access the different offsets of the vector register accesses. Although the RAM-PAEs are dual ported, it is obvious that it is not possible to read different addresses concurrently.

Since it is not efficient to synthesize a configuration which generates the different addresses sequentially and demultiplexes the read operands into different branches of the data flow, other arrangements have to be made.

The two possibilities to access input data discussed above under the heading "Optimizations Towards Hardware Improvements" yield the following in RISC pseudo code and XPP utilization. The pseudo code running on the RISC core is approximately:

```
XPPPreload(config)
for(v=0; v<=16–3; v++){
    XPPPreload(0, &p1[v], 16)
    XPPPreload(1, &p1[v+1], 16)
    XPPPreload(2, &p1[v+2], 16)
    XPPPreloadClean(3, &p2[v+1], 16)
    XPPExecute(config, IRAM(0), IRAM(1), IRAM(2), IRAM(3))
}
``` for shift register synthesis and approximately:

```
XPPPreload(config)
for(v=0; v<=16–3; v++){
    XPPPreload(0, &p1[v], 16)
    XPPPreload(1, &p1[v], 16)
    XPPPreload(2, &p1[v], 16)
    XPPPreload(3, &p1[v+1], 16)
    XPPPreload(4, &p1[v+1], 16)
    XPPPreload(5, &p1[v+2], 16)
    XPPPreload(6, &p1[v+2], 16)
    XPPPreload(7, &p1[v+2], 16)
    XPPPreloadClean(3, &p2[v+1], 16)
    XPPExecute(config, IRAM(0), IRAM(1), IRAM(2), IRAM(3),
        IRAM(4), IRAM(5), IRAM(6), IRAM(7))
}
``` for data duplication.

The values for place & route and simulation are compared in the following table. Note that a common RISC DSP with two MAC units and hardware loop support needs about 4000 cycles for the same code. This comparison does not account for cache misses. Furthermore, it is obvious that the number of input values is very small in this example and the DSP calculation time is proportional to that number. The XPP performance on the other hand will improve with the number of input values. Therefore, the XPP performance will be more impressive with bigger image sizes.

| Parameter | Value (shift register synthesis) | Value (data duplication) |
|---|---|---|
| Vector length | 16 | 16 |
| Reused data set size | 256 | 256 |
| I/O IRAMs | 3 I + 1 O = 4 | 8 I + 1 O = 9 |
| ALU | 27 | 21 |
| BREG | 21 (1 defined + 20 route) | 10 (1 defined + 9 route) |

-continued

| Parameter | Value (shift register synthesis) | Value (data duplication) | | | | |
|---|---|---|---|---|---|---|
| FREg | 22 (9 defined + 23 route) | 19 (3 defined + 16 route) | | | | |
| Data flow graph width | 14 | 14 | | | | |
| Data flow graph height | 3 (shift registers) + 8 (calculation) | 8 (calculation) | | | | |
| Configuration cycles (simulated) (assuming 4 words/ cycle burst transfer) | configuration preloads cycles sum | | 2262 168 798 3228 | configuration preloads cycles sum | 8 * 8 * 4 14 * 52 | 2145 256 728 3129 |
|  |  | 14 * 3 * 4 14 * 57 |  |  |  |  |

Enhancing Parallelism

After the synthesis, the configuration calculating the inner loop utilizes 27 ALUs and 4 IRAMs for shift register synthesis and 21 ALUs and 9 IRAMs for data duplication, respectively. Assuming an XPP64 core, this leaves plenty of room for further optimizations. Nevertheless, since all optimizations enhancing parallelism are performed before the synthesis takes place, it is crucial that they estimate the needed resources and the benefit of the transformation very carefully. Furthermore, they have to account for both input preparation strategies to estimate correct values.

Loop Unrolling

Fully unrolling the inner loop would not lead to satisfying results because the number of inputs and outputs increases dramatically. This means data duplication would not be applicable and shift register synthesis would exhaust most of the benefits of the parallelism by producing a very long pipeline for each data flow graph. Although partial unrolling of the inner loop would be applicable, it promises not much benefit for the area penalty introduced.

Loop unrolling the outer loop is also not applicable since it produces a further configuration. Nevertheless, a related transformation could do a good job on this loop nest.

Unroll-and-Jam

The unroll-and-jam algorithm enhances parallelism and also improves IRAM usage. It brings pairs of iterations together ideally reusing IRAM outputs and calculation results. The algorithm partially unrolls the outer loop and fuses the originated inner loops. Before the unroll-and-jam is performed, the so-called unroll-and-jam factor must be determined, which denominates the unrolling factor of the outer loop. This is mainly influenced by the number of ALUs n(=64 assuming XPP64) and calculates to $$c\ unroll\text{—}and\text{—}jam = n\ XPP\ n\ inner\ loop = 64\ 27 = 2$$

(integer division.

Thus the source code would be transformed to:

```
for(v=0; v<=VERLEN-3; v+=2){
    for(h=0; h<=HORLEN-3; h++){
        p2[v+1][h+1] = min(abs((p1[v+2][h] -
p1[v][h]) +
                                                (p1[v+2][h+2] - p1[v][h+2]) +
                        2 *                     (p1[v+2][h+1] - p1[v][h+1]))
                                                +
            abs((p1[v][h+2] - p1[v][h]) +
                                                (p1[v+2][h+2] - p1[v+2][h]) +
                        2 *                     (p1[v+1][h+2] - p1[v+1][h])),
                                                255);
        p2[v+2][h+1] = min(abs((p1[v+3][h] -
p1[v+1][h]) +
                                                (p1[v+3][h+2] -
                                                p1[v+1][h+2]) +
                        2*                      (p1[v+3][h+1] -
                                                p1[v+1][h+1])) +
            abs((p1[v+1][h+2] - p1[v+1][h])
                +
                                                (p1[v+3][h+2] - p1[v+3][h]) +
                        2 *                     (p1[v+2][h+2] - p1[v+2][h])),
                                                255);
    }
}
```

The transformation introduces additional accesses to p1[v+3][h], p1[v+3] [h+2], p1[v+3] [h+1], and p1[v+1] [h+1] (the former hole in the access pattern) as well as a write access to p2[v+2][h+1]. This means 2 IRAMs more for shift register synthesis (one input, one output) and 5 IRAMs more for data duplication (4 input, 1 output), while performance is doubled.

| Parameter | Value (shift register synthesis) | | Value (data duplication - no IRAM placement) | | Value data duplications - with IRAM placement) | |
|---|---|---|---|---|---|---|
| Vector length | 16 | | 16 | | 16 | |
| Reused data set size | 256 | | 256 | | 256 | |
| I/O, IRAMS | 4 I + 2 O = 6 | | 12 I + 2 O = 14 | | 12 I + 2 O = 14 | |
| ALU | 45 | | 37 | | 37 | |
| BREG | 31 (12 defined + 19 route) | | 42 (4 defined + 38 route) | | 36 (4 defined + 32 route) | |
| FREG | 29 (1 defined + 28 route) | | 18 (1 defined + 17 route) | | 24 (1 defined + 23 route) | |
| Data flow graph width | 14 | | 14 | | 14 | |
| Data flow graph height | 3 (shift registers) + 8 (calculation) | | 8 (calculation) | | 3 (shift registers) + 8 (calculation) | |
| Configuration cycles (simulated) | configuration | | 2753 configuration | | 2754 configuration | 2768 |
| | preloads 7 * 4 * 4 | 112 | preloads 7 * 12 * 4 | 336 | preloads 7 * 12 * 4 | 336 |
| | cycles 7 * 53 | 371 | cycles 7 * 69 | 483 | cycles 7 * 51 | 357 |
| | sum | 3236 | sum | 3573 | sum | 3461 |

The simulated results are shown in the table above. Note the differences of the two columns labeled with "data duplication." The first used xmap to place the IRAMs, while in the second, the IRAMs were placed by hand using a greedy algorithm which places IRAMs that are operands of the same operator in one line (as long as this is possible). The second solution improved the iteration cycles by 18. This shows that IRAM placement has a great impact to the final performance.

The traditional unroll-and-jam algorithm uses loop peeling to split the outer loop in a preloop and an unroll-able main loop to handle odd loop counts. When, for instance, n=128 is assumed, the unroll-and-jam factor would calculate to $$c \text{ unroll-and-jam} = 128 \; 27 = 4.$$

Since the outer loop count (14) is not a multiple of 4, the algorithm virtually peels off the first two iterations and fuses the two loops at the end adding guards to the inner loop body. Then the code looks approximately as follows (guards emphasized):

```
for(v=0; v<=VERLEN-5; v+=4){
  for(h=0; h<=HORLEN-3; h++){
    p2 [v+1] [h+1] = min(abs((p1 [v+2] [h] - p1 [v] [h]) +
       (p1 [v+2] [h+2] - p1 [v] [h+2]) +
```

-continued

```
       2 * (p1 [v+2] [h+1] - p1 [v] [h+1])) +
       abs((p1 [v] [h+2] - p1 [v] [h]) +
       (p1 [v+2] [h+2] - p1 [v+2] [h]) +
       2 * (p1 [v+1] [h+2] - p1 [v+1] [h])), 255);
    p2 [v+2] [h+1] = min(abs((p1 [v+3] [h] - p1 [v+1] [h]) +
       (p1 [v+3] [h+2] - p1 [v+1] [h+2]) +
       2 * (p1 [v+3] [h+1] - p1 [v+1] [h+1])) +
       abs((p1 [v+1] [h+2] - p1 [v+1] [h]) +
       (p1(v [+3] [h+2] - p1 [v+3] [h]) +
       2 * (p1 [v+2] [h+2] - p1 [v+2] [h])), 255);
    if (v>0) p2 [v+3] [h+1] = min(abs((p1 [v+4] [h] - p1 [v+2] [h]) +
       (p1 [v+4] [h+2] - p1 [v+2] [h+2]) +
       2 * (p1 [v+4] [h+1] - p1 [v+2] [h+1])) +
       abs((p1 [v+2] [h+2] - p1 [v+2] [h]) +
       (p1 [v+4] [h+2] - p1 [v+4] [h]) +
       2 * (p1 [v+3] [h+2] - p1 [v+3] [h])), 255);
    if (v>1) p2 [v+4] [h+1] = min(abs((p1 [v+5] [h] - p1 [v+3] [h]) +
       (p1 [v+5] [h+2] - p1 [v+3] [h+2]) +
       2 * (p1 [v+5] [h+1] - p1 [v+3] [h+1])) +
       abs((p1 [v+3] [h+2] - p1 [v+3] [h]) +
       (p1 [v+5] [h+2] - p1 [v+5] [h]) +
       2 * (p1 [v+4] [h+2] - p1 [v+4] [h])), 255);
  }
}
```

Parameterized Function Source Code

The benchmark source code is not very likely to be written in that form in real world applications. Normally, it would be encapsulated in a function with parameters for input and output arrays along with the sizes of the picture to work on.

Therefore the source code would look similar to the following:

```
void edge3x3(int *p1, int *p2, int HORLEN, int VERLEN)
{
    for(v=0; v<=VERLEN-3; v++){
        for(h=0; h<=HORLEN-3; h++){
            htmp = (**(p1 + (v+2) * HORLEN + h) - **(p1 + v * HORLEN + h)) +
                (**(p1 + (v+2) * HORLEN + h+2) - **(p1 + v * HORLEN + h+2)) +
                2 * (**(p1 + (v+2) * HORLEN + h+1) - **(p1 + v * HORLEN + h+1));
            if (htmp < 0)
                htmp = htmp;
            vtmp = (**(p1 + v * HORLEN + h+2) - **(p1 + v * HORLEN + h)) +
                (**(p1 + (v+2) * HORLEN + h+2) -**(p1 + (v+2) * HORLEN + h)
)+
                2 * (**(p1 + (v+1) * HORLEN + h+2) -**(p1 + (v+1) * HORLEN + h));
            if (vtmp < 0)
                vtmp = vtmp;
            sum = htmp + vtmp;
            if (sum > 255)
                sum = 255;
            ** (p2 + (v+1) * HORLEN + h+1) = sum;
        }
    }
}
```

This requires some additional features from the compiler.
interprocedural optimizations and analysis
hints by the Programmer, (e.g., a compiler known assert (VERLEN % 2=0) makes unroll-and-jam actually possible without peeling off iterations and running them conditionally).

Fitting the Algorithm Optimally to the Array

Since HORLEN and VERLEN are not known at compile time these unknown parameters introduce some constraints which prevent pipeline vectorization. The compiler must assume that the IRAMs cannot hold all HORLEN input values in a row, so pipeline vectorization would not be possible.

Strip Mining Inner Loop

Strip mining partitions the inner loop into a loop that runs over a strip, which is chosen to be of the same size as the IRAMs can hold and a by strip loop iterating over the strips. The strip loops upper bound must be adjusted for the possible incomplete last strip. After the strip mining, the original code would be approximately as follows (outer v-loop neglected):

```
for(h=0; h<=HORLEN-3; h+=stripsize)
    for(hh=h; h<=min(h+stripsize-1, HORLEN-3); hh++){
        htmp = (**(p1 + (v+2) * HORLEN + hh) -
            **(p1 + v * HORLEN + hh)) +
        ...
    }
}
```

Assuming an IRAM size strip size of 256, the following simulated results cart be obtained for one strip. The values must be multiplied with the number of strips to be calculated.

| Parameter | Value (shift register synthesis) | | Value (data duplication - IRAM placement) | |
|---|---|---|---|---|
| Vector length | 16 | | 16 | |
| Reused data set size | 256 | | 256 | |
| I/O, IRAMS | 4 I + 2 O = 6 | | 12 I + 2 O = 14 | |
| ALU | 45 | | 37 | |
| BREG | 31 (12 defined + 19 route) | | 42 (4 defined + 38 route) | |
| FREG | 29 (1 defined + 28 route) | | 18 (1 defined + 17 route) | |
| Data flow graph width | 14 | | 14 | |
| Data flow graph height | 3 (shift registers) + 8 (calculation) | | 8 (calculation) | |
| Configuration cycles (simulated) | configuration | | 2753 configuration | 2754 |
| | preloads | 7 * 4 * 64 | 1792 preloads | 7 * 12 * 64  5376 |
| | cycles | 128 * 530 | 67480 cycles | 128 * 553  70784 |
| | sum | | 72385 sum | 78914 |

The RISC DSP needs about 1.47 million cycles for this amount of data. As mentioned above, these values do not include cache miss penalties and truly underestimate the real values. Furthermore, it can be seen that data duplication does not improve the performance. The reason for this seems to be a worse placement and routing.

FIR Filter
Original Code
Source code:
```
#define N 256
#define M 8
for (i = 0; i < N-M+1; i++) {
    S:                  y[i] = 0;
                        for (j = 0; j < M; j++)
    S':                 y[i] += c[j] *
                        x[i+M-j-1);
}
```

The constants N and M are replaced by their values by the pre-processor. The data dependency graph is shown in FIG. 38.

```
for (i =0; i < 269; i++) {
    S:                  y[i] = 0;
                        for (j = 0; j < 8; j++)
    S':                 y[i] += c[j] *
                        x[i+7-j];
}
```

The following is a corresponding table:

| Parameter | Value |
| --- | --- |
| Vector length | 269 |
| Reused data set size | — |
| I/O IRAMs | 3 |
| ALU | 2 |
| BREG | 0 |
| FREG | 0 |
| Data flow graph width | 1 |
| Data flow graph height | 2 |
| Configuration cycles | 2 + 8 = 10 |

First Solution

In a case in which it is desired to save memory, a straightforward solution is to unroll the inner loop and to use shift register synthesis to delay the values of array x in the pipeline. No other optimization is applied before as either they do not have an effect on the loop or they increase the need for IRAMs. After loop unrolling, the following code is obtained:

```
for (i = 0; i < 269; i++){
    Y[i] = 0;
    Y[i] += c[0] * x[i+7];
    Y[i] += c[1] * x[i+6];
    Y[i] += c[2] * x[i+5];
    Y[i] += c[3] * x[i+4];
    Y[i] += c[4] * x[i+3];
    Y[i] += c[5] * x[i+2];
    Y[i] += c[6] * x[i+1];
    Y[i] += c[7] * x[i];
}
```

The following is a corresponding table:

| Parameter | Value |
| --- | --- |
| Vector length | 269 |
| Reused data set size | — |
| I/O IRAMs | 9 |
| ALU | 16 |
| BREG | 0 |
| FREG | 0 |
| Data flow graph width | 2 |
| Data flow graph height | 9 |
| Configuration cycles | 9 + 269 = 278 |

Dataflow analysis reveals that $y[0]=f(x[0], \ldots, x[7], y[1]=f(x.[1], \ldots, x[8]), \ldots, y[i]=f(x[i], \ldots, x[i+7])$. Successive values of y depend on almost the same successive values of x. To prevent unnecessary accesses to the IRAMs, the values of x needed for the computation of the next values of y are kept in registers. In this case, this shift register synthesis needs 7 registers. This will be achieved on the PACT XPP by keeping them in FREGs. Then the dataflow graph of FIG. 39 is obtained. An IRAM is used for the input values and an IRAM for the output values. The first 8 cycles are used to fill the pipeline and then the throughput is of one output value/cycle. The code may be represented as follows:

```
r0 = x[0];
r1 = x[1];
r2 = x[2];
r3 = x[3];
```

```
r4 = x[4];
r5 = x[5];
r6 = x[6];
r7 = x[7];
for (i = 0; i < 269; i++) {
    y[i] = c7*r0 + c6*r1 + c5*r2 + c4*r3 + c3*r4 + c2*r5 + c1*r6 + c0*r7;
    r0 = r1;
    r1 = r2;
    r2 = r3;
    r3 = r4;
    r4 = r5;
    r5 = r6;
    r6 = r7;
    r7 = x[i+7];
}
```

A final table is shown below, and the expected speedup with respect to a standard superscalar processor with 2 instructions issued per cycle is 13.6.

| Parameter | Value |
| --- | --- |
| Vector length | 269 |
| Reused data set size | — |
| I/O IRAMs | 2 |
| ALU | 16 |
| BREG | 0 |
| FREG | 7 |
| Data flow graph width | 3 |
| Data flow graph height | 9 |
| Configuration cycles | 8 + 269 = 277 |

| Ops | Number |
| --- | --- |
| LD/ST (2 cycles) | 2 |
| ADDRCOMP (1 cycle) | 0 |
| ADD/SUB (1 cycle) | 8 |
| MUL (2 cycles) | 8 |
| SHIFT (1 cycle) | 0 |
| Cycles per iteration | 28 |
| Cycles needed for the loop (2-way) | (28 * 269)/2 = 3766 |

Variant with Larger Loop Bounds

Taking larger loop bounds and setting the values of N and M to 1024 and 64:

```
for (i = 0; i < 961; i++){
    y[i] = 0;
    for (j = 0; j < 64; j++)
        y[i] += c[j] * x[i+63−j];
}
```

Following the loop optimizations driver given before, loop tiling is applied to reduce the iteration range of the inner loop. The following loop nest is obtained:

```
for (i = 0; i < 961; i++) {
    y[i] = 0;
    for (jj = 0; jj < 8; jj++)
        for (j = 0; j < 8; j++)
            y[i] ++ c[8*jj+j] * x[i+63−8*jj−j];
}
```

A subsequent application of loop unrolling on the inner loop yields:

```
for (i = 0; i < 961; i++) {
    y[i] = 0;
    for (jj = 0; jj < 8; jj++) {
        y[i] += c[8*jj]   * x[i+63−8*jj];
        y[i] += c[8*jj+1] * x[i+62−8*jj];
        y[i] += c[8*jj+2] * x[i+61−8*jj];
        y[i] += c[8*jj+3] * x[i+60−8*jj];
        y[i] += c[8*jj+4] * x[i+59−8*jj];
        y[i] += c[8*jj+5] * x[i+58−8*jj];
        y[i] += c[8*jj+6] * x[i+57−8*jj];
        y[i] += c[8*jj+7] * x[i+56−8*jj];
    }
}
```

Finally, the same dataflow graph as above is obtained, except that the coefficients must be read from another IRAM rather than being-directly handled like constants by the multiplications. After shift register synthesis, the code may be the following:

```
for (i = 0; i < 961; i++) {
    r0 = x[i+56];
    r1 = x[i+57];
    r2 = x[i+58];
    r3 = x[i+59];
    r4 = x[i+60];
    r5 = x[i+61];
    r6 = x[i+62];
    r7 = x[i+63];
    for (jj = 0; jj < 8; jj++)
        Y[i] = c[8*jj]*r0 + c[8*jj+1]*r1 + c[8*jj+2]*r2 +
               c[8*jj+3]*r3 +
               c[8*jj+4]*r4 + c[8*jj+5]*r5 + c[8*jj+6]*r6 +
               c[8*jj+7]*r7;
    r0 = r1;
    r1 = r2;
    r2 = r3;
    r3 = r4;
    r4 = r5;
    r5 = r6;
```

-continued

```
    r6 = r7;
    r7 = x[i+63-8*jj];
    }
}
```

The following table is the same as above except for the vector length and the expected speedup with respect to a standard superscalar processor with 2 instructions issued per cycle is 17.5.

| Parameter | Value |
|---|---|
| Vector length | 8 |
| Reused data set size | — |
| I/O IRAMs | 2 |
| ALU | 16 |
| BREG | 0 |
| FREG | 7 |
| Data flow graph width | 3 |
| Data flow graph height | 9 |
| Configuration cycles | 8 + 8 = 16 |

| Ops | Number |
|---|---|
| LD/ST (2 cycles) | 10 |
| ADDRCOMP (1 cycle) | 0 |
| ADD/SUB (1 cycle) | 16 |
| MUL (2 cycles) | 17 |
| SHIFT (1 cycle) | 0 |
| Cycles per iteration | 70 |
| Cycles needed for the loop (2-way) | (70 * 8)/2 = 280 |

More Parallel Solution

The solution presented above does not expose a lot of parallelism in the loop. To explicitly parallelize the loop before generating the dataflow graph can be tried. Exposing more parallelism may mean more pressure on the memory hierarchy.

In the data dependence graph presented above, the only loop-carried dependence is the dependence on S' and it is only caused by the reference to y[i]. Hence, node splitting is applied to get a more suitable data dependence graph. Accordingly, the following may be obtained:

```
for (i = 0; i < 249; i++) {
    y[i] = 0;
    for (j = 0; j < 8; j++)
    {
        tmp = c[j] * x[i+7-j];
        y[i] += tmp;
    }
}
```

Then scalar expansion may be performed on tmp to remove the anti loop-carried dependence caused by it, and the following code may be obtained:

```
for (i = 0; i < 249; i++) {
    y[i] = 0;
    for (j = 0; j < 8; j++)
    {
        tmp[j] = c[j] * x[i+7-j];
        Y[i] += tmp[j];
    }
}
```

The parameter table is the following:

| Parameter | Value |
|---|---|
| Vector length | 249 |
| Reused data set size | — |
| I/O IRAMs | 3 |
| ALU | 2 |
| BREG | 0 |
| FREG | 1 |
| Data flow graph width | 2 |
| Data flow graph height | 2 |
| Configuration cycles | 2 + 8 = 10 |

Loop distribution may then be applied to get a vectorizable and a not vectorizable loop.

```
for (i = 0; i < 249; i++) {
    y[i] = 0;
    for (j = 0; j < 8; j++)
        tmp[j] = c[j] * x[i+7-j];
    for (j = 0; j < 8; j++)
        y[i] += tmp [j];
}}
```

The following parameter table corresponds to the two inner loops in order to be compared with the preceding table.

| Parameter | Value |
|---|---|
| Vector length | 249 |
| Reused data set size | — |
| I/O IRAMs | 5 |
| ALU | 2 |
| BREG | 0 |
| FREG | 1 |
| Data flow graph width | 1 |
| Data flow graph height | 3 |
| Configuration cycles | 1 * 8 + 1 * 8 = 16 |

The architecture may be taken into account. The first loop is fully parallel, which means that we would need 2*8=16 input values at a time. This is all right, as it corresponds to the number of IRAMS of the PACT XPP. Hence, to strip-mine the first inner loop is not required. To strip-mine the second loop is also not required. The second loop is a reduction. It computes the sum of a vector. This may be easily found by the reduction recognition optimization and the following code may be obtained.

```
for (i = 0; i < 249; i++) {
    y[i] = 0;
    for (j = 0; j < 8; j++)
        tmp[j] = c[j] * x[i+7-j];
    /* load the partial sums from memory using a shorter vector length */
    for (j = 0; j < 4; j++)
        aux[j] = tmp[2*j] + tmp[2*j+1];
    /* accumulate the short vector */
    for (j = 0; j < 1; j++)
        aux[2*j] = aux[2*j] + aux[2*j+1];
    /* sequence of scalar instructions to add up the partial sums */
    y[i] = aux[0] + aux[2];
}
```

Like above, only one table is given below for all innermost loops and the last instruction computing y[i].

| Parameter | Value |
|---|---|
| Vector length | 249 |
| Reused data set size | — |
| I/O IRAMs | 12 |
| ALU | 4 |
| BREG | 0 |
| FREG | 0 |
| Data flow graph width | 1 |
| Data flow graph height | 4 |
| Configuration cycles | 1 * 8 + 1 * 4 + 1 * 1 = 13 |

Finally, loop unrolling may be applied on the inner loops. The number of operations is always less than the number of processing elements of the PACT XPP.

```
for (i = 0; i < 961; i++)
{
    tmp[0] = c[0] * x[i+7];
    tmp[1] = c[1] * x[i+6];
    tmp[2] = c[2] * x[i+5];
    tmp[3] = c[3] * x[i+4];
    tmp[4] = c[4] * x[i+3];
    tmp[5] = c[5] * x[i+2];
    tmp[6] = c[6] * x[i+1];
    tmp[7] = c[7] * x[i];
    aux[0] = tmp[0] + tmp[1];
    aux[1] = tmp[2] + tmp[3];
    aux[2] = tmp[4] + tmp[5];
    aux[3] = tmp[6] + tmp[7];
    aux[0] = aux[0] + aux[1];
    aux[2] = aux[2] + aux[3];
    y[i] = aux[0] + aux[2]
}
```

Figure 40:
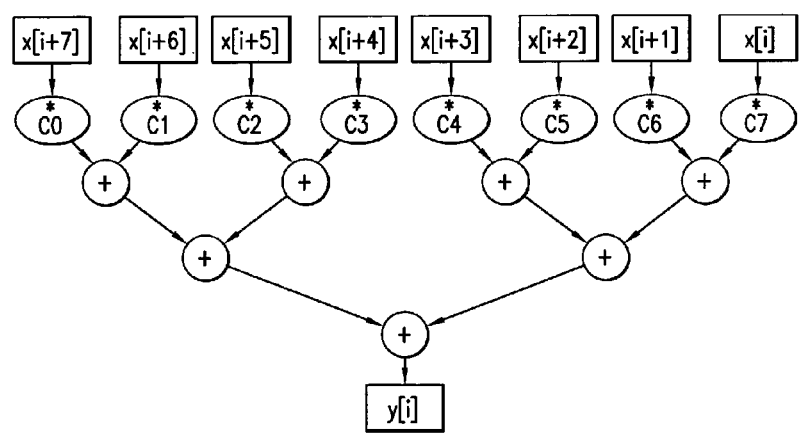
FIG. 40 is a dataflow graph representing an inner loop with loop unrolling, according to an example embodiment of the present invention.

The dataflow graph illustrated in FIG. 40, representing the inner loop, may be obtained.

It could be mapped on the PACT XPP with each layer executed in parallel, thus requiring 4 cycles/iteration and 15 ALU-PAEs, 8 of which are needed in parallel. As the graph is already synchronized, the throughput reaches one iteration/cycle after 4 cycles to fill the pipeline. The coefficients are taken as constant inputs by the ALUs performing the multiplications.

A drawback of this solution may be that it uses 16 IRAMs, and that the input data must be stored in a special order. The number of needed IRAMs can be reduced if the coefficients are handled like constant for each ALU. But due to data locality of the program, it can be assumed that the data already reside in the cache. As the transfer of data from the cache to the IRAMs can be achieved efficiently, the configuration can be executed on the PACT XPP without waiting for the data to be ready in the IRAMs. Accordingly, the parameter table may be the following:

| Parameter | Value |
|---|---|
| Vector length | 249 |
| Reused data set size | — |
| I/O IRAMs | 16 |
| ALU | 15 |
| BREG | 0 |
| FREG | 0 |
| Data flow graph width | 8 |
| Data flow graph height | 4 |
| Configuration cycles | 4 + 961 |

Variant with Larger Bounds

To make the things a bit more interesting, in one case, the values of N and M were set to 1024 and 64.

```
for (i = 0; i < 961; i++) {
    y[i] = 0;
    for (j = 0; j < 64; j++)
        y[i] += c[j] * x[i+63-j];
}
```

The data dependence graph is the same as above. Node splitting may then be applied to get a more convenient data dependence graph.

```
for (i = 0; i < 961; i++) {
    y[i] = 0;
    for (j = 0; j < 64; j++)
    {
        tmp = c[j] * x[i+63-j];
        y[i] += tmp;
    }
}
```

After scalar expansion:

```
for (i = 0; i < 961; i++) {
    y[i] = 0,
    for (j = 0; j < 64; j++)
    {
        tmp[j] = c[j] * x[i+63-j];
        y[i] += tmp [j];
    }
}
```

After loop distribution:

```
for (i = 0; i < 961; i++) {
    y[i] = 0;
    for (j = 0; j < 64; j++)
        tmp[j] = c[j] * x[i+63-j];
    for (j = 0; j < 64; j++)
        y[i] += tmp[j];
}}
```

After going through the compiling process, the set of optimizations that depends upon architectural parameters may be arrived at. It might be desired to split the iteration space, as too many operations would have to be performed in parallel, if it is kept as such. Hence, strip-mining may be performed on the 2 loops. Only 16 data can be accessed at a time, so, because of the first loop, the factor will be 64*2/16=8 for the 2 loops (as it is desired to execute both at the same time on the PACT XPP).

```
for (i = 0; i < 961; i++) {
    y[i] = 0
    for (jj = 0; jj < 8; jj++)
        for (j = 0; j < 8; j++)
            tmp[8*jj+j] = c[8*jj+j] * x[i+63-8*jj-j];
    for (jj = 0; jj < 8; jj++)
        for (j= 0; j < 8; j++)
            y[i] += tmp[8*jj+j];
}
```

Then, loop fusion on the jj loops may be performed.

```
for (i = 0; i < 961; i++) {
    y[i] = 0;
    for (jj = 0; jj < 8; jj++) {
        for (j = 0; j < 8; j++)
            tmp[8*jj+j] = c[8*jj+j] * x[i+63-8*jj-j];
        for (j = 0; j < 8; j++)
            y[i] += tmp[8*jj+j];
    }
}
```

Reduction recognition may then be applied on the second innermost loop.

```
for (i = 0; i < 961; i++) {
    tmp = 0;
    for (jj = 0; jj < 8; jj++)
    {
        for (j = 0; j < 8; j++)
            tmp[8*jj+j] = c[8*jj+j] * x[i+63-8*jj-j];
        /* load the partial sums from memory using a shorter vector length */
        for (j = 0; j < 4; j++)
            aux[j] = tmp[8*jj+2*j] + tmp[8*jj+2*j+1];
        /* accumulate the short vector */
        for (j = 0; j < 1; j++)
            aux[2*j] = aux[2*j] + aux[2*j+1];
        /* sequence of scalar instructions to add up the partial sums */
        y[i] = aux[0] + aux[2];
```

Loop unrolling may then be performed:

```
for (i = 0; i < 961; i++)
    for (jj = 0; jj < 8; jj++)
    {
        tmp[8*jj] = c[8*jj] * x[i+63-8*jj];
        tmp[8*jj+1] = c[8*jj+1] * x[i+62-8*jj];
        tmp[8*jj+2] = c[8*jj+2] * x[i+61-8*jj];
        tmp[8*jj+3] = c[8*jj+3] * x[i+59-8*jj];
        tmp[8*jj+4] = c[8*jj+4] * x[i+58-8*jj];
        tmp[8*jj+5] = c[8*jj+5] * x[i+57-8*jj];
        tmp[8*jj+6] = c[8*jj+6] * x[i+56-8*jj];
        tmp[8*jj+7] = c[8*jj+7] * x[i+55-8*jj];
        aux[0] = tmp[8*jj] + tmp[8*jj+1];
        aux[1] = tmp[8*jj+2] + tmp[8*jj+3];
        aux[2] = tmp[8*jj+4] + tmp[8*jj+5];
        aux[3] = tmp[8*jj+6] + tmp[8*jj+7];
        aux[0] = aux[0] + aux[1];
        aux[2] = aux[2] + aux[3];
        y[i] = aux[0] + aux[2];
    }
```

The innermost loop may be implemented on the PACT XPP directly with a counter. The IRAMs may be used in FIFO mode, and filled according to the addresses of the arrays in the loop. IRAM0, IRAM2, IRAM4, IRAM6 and IRAM8 contain array 'c'. IRAM1, IRAM3, IRAM5 and IRAM7 contain array 'x'. Array 'c' contains 64 elements, i.e., each IRAM contains 8 elements. Array 'x' contains 1024 elements, i.e., 128 elements for each IRAM. Array 'y' is directly written to memory, as it is a global array and its address is constant. This constant is used to initialize the address counter of the configuration. A final parameter table is the following:

| Parameter | Value |
| --- | --- |
| Vector length | 8 |
| Reused data set size | — |
| I/O IRAMs | 16 |
| ALU | 15 |

-continued

| Parameter | Value |
| --- | --- |
| BREG | 0 |
| FREG | 0 |
| Data flow graph width | 8 |
| Data flow graph height | 4 |
| Configuration cycles | 4 + 8 = 12 |

Nevertheless, it should be noted that this version should be less efficient than the previous one. As the same data must be loaded in the different IRAMs from the cache, there are a lot of transfers to be achieved before the configuration can begin the computations. This overhead must be taken into account by the compiler when choosing the code generation strategy. This means also that the first solution is the solution that will be chosen by the compiler.

Other Variant

Source

Code

```
for (i = 0; i < N-M+1; i++) {
    tmp = 0;
    for (j = 0; j < M; j++)
        tmp += c[j] *
    x[i+M-j-1];
    x[i] = tmp;
}
```

In this case, the data dependence graph is cyclic due to dependences on tmp. Therefore, scalar expansion is applied on the loop, and, in fact, the same code as the first version of the FIR filter is obtained as shown below.

```
for (i = 0; i < N-M+1; i++) {
    tmp[i] = 0;
    for (j = 0; j < M; j++)
        tmp[i] += c[j] * x[i+M-j-1];
    x[i] = tmp[i];
}
```

Matrix Multiplication

Original Code

Source code:

```
#define L 10
#define M 15
#define N 20
int A[L][M];
int B[M][N];
int R[L][N];
main( ) {
    int i, j, k, tmp, aux;
    /* input A (L*M values) */
    for (i=0; i<L; i++)
        for (j=0; j<M; j++)
```

Source code:

```
            scanf("%d", &A[i][j]);
        /* input B (M*N values) */
        for (i=0; i<M; i++)
            for (j=0; j<N; j++)
                scanf("%d", &B[i][j]);
        /* multiply */
```

-continued

```
       for (i=0; i<L; i++)
          for (j=0; j<N; j++) {
             aux = 0;.
                for (k=0; k<M; k++)
                   aux += A[i][k] *
B[k][j];
                R[i][j] = aux;
             }
       /* write data stream */
       for (i=0; i<L; i++)
          for (j=0; j<N; j++)
             printf("%d\n", R [i][j]);
    }
```

Preliminary Transformations

Since no inline-able function calls are present, no interprocedural code movement is done.

Of the four loop nests, the one with the "/*multiply*/" comment is the only candidate for running partly on the XPP. All others have function calls in the loop body and are therefore discarded as candidates very early in the compiler.

Dependency Analysis

```
       for (i=0; i<L; i++)
          for (j=0; j<N; j++) {
    S1       aux = 0;
                for (k=0; k<M; k++)
    S2          aux += A[i][k] *
B[k][j];
    S3       R[i][j] = aux;
          }
```

FIG. 41 shows a data dependency graph for matrix multiplication. The data dependency graph shows no dependencies that prevent pipeline vectorization. The loop carried true dependence from S2 to itself can be handled by a feedback of aux as described in Markus Weinhardt et al., "Memory Access Optimization for Reconfigurable Systems," supra.

Reverse Loop-Invariant Code Motion

To get a perfect loop nest, S1 and S3 may be moved inside the k-loop. Therefore, appropriate guards may be generated to protect the assignments. The code after this transformation is as follows:

```
       for (i=0; i<L; i++)
          for(j=0; j<N; j++)
             for (k=0; k<M; k++) {
                if (k == 0) aux[j] = 0;
                aux[j] += A[i][k] * B[k][j];
                if (k == M-1) R[i][j] = aux[j];
             }
```

Scalar Expansion

A goal may be to interchange the loop nests to improve the array accesses to utilize the cache best. However, the guarded statements involving 'aux' may cause backward loop carried anti-dependencies carried by the j loop. Scalar expansion may break these dependencies, allowing loop interchange.

```
       for (i=0; i<L; i++)
          for (j=0; j<N; j++)
             for (k=0; k<M; k++) {
                if (k == 0) aux[j] = 0;
                aux[j] += A[i][k] * B[k][j];
                if (k == M-1) R[i][j] = aux[j];
             }
```

Loop Interchange for Cache Reuse

Visualizing the main loop shows the iteration spaces for the array accesses. FIG. 42 is a visualization of array access sequences. Since C arrays are placed in row major order, the cache lines are placed in the array rows. At first sight, there seems to be no need for optimization because the algorithm requires at least one array access to stride over a column. Nevertheless, this assumption misses the fact that the access rate is of interest, too. Closer examination shows that array R is accessed in every j iteration, while B is accessed every k iteration, always producing a cache miss. ("aux" is not currently discussed since it is not expected that it would be written to or read from memory, as there are no defs or uses outside the loop nest.) This leaves a possibility for loop interchange to improve cache access as proposed by Kennedy and Allen in Markus Weinhardt et al., "Pipeline Vectorization," supra.

To find the best loop nest, the algorithm may interchange each loop of the nests into the innermost position and annotate it with the so-called innermost memory cost term. This cost term is a constant for known loop bounds or a function of the loop bound for unknown loop bounds. The term may be calculated in three steps.

First, the cost of each reference in the innermost loop body may be calculated to:

1, if the reference does not depend on the loop induction variable of the (current) innermost loop;

the loop count, if the reference depends on the loop induction variable and strides over a non-contiguous area with respect of the cache layout;

$N \cdot s \: b$, if the reference depends on the loop induction variable and strides over a contiguous dimension. In this case, N is the loop count, s is the step size and b is the cache line size, respectively.

In this case, a "reference" is an access to an array. Since the transformation attempts to optimize cache access, it must address references to the same array within small distances as one. This may prohibit over-estimation of the actual costs.

Second, each reference cost may be weighted with a factor for each other loop, which is:

1, if the reference does not depend on the loop index;

the loop count, if the reference depends on the loop index.

Third, the overall loop nest cost may be calculated by summing the costs of all reference costs.

After invoking this algorithm for each loop as the innermost, the one with the lowest cost may be chosen as the innermost, the next as the next outermost, and so on.

| Innermost loop | R[i][j] | A[i][k] | B[k][j] | Memory access cost |
|---|---|---|---|---|
| k | $1 \cdot L \cdot N Mb$ | $L \cdot M \cdot N$ | $L \cdot N + Mb \cdot L + M \cdot N$ | |
| i | $1 \cdot L \cdot N 1$ | $L \cdot M 1$ | $M \cdot NL$ | $N + L \cdot M + M \cdot N$ |
| j | Nb | $LL \cdot M$ | Nb | MNb $(L + M) + L \cdot M$ |

The preceding table shows the values for the matrix multiplication. Since the j term is the smallest (assuming b>1), the j-loop is chosen to be the innermost. The next outer loop then is k, and the outermost is i. Thus, the resulting code after loop interchange may be:

```
for (i=0; i<L; i++)
    for (k=0; k<M; k++) ,
        for (j=0; j<N; j++) {
            if (k == 0) aux[j] = 0;
            aux[j] += A[i][k] * B[k][j];
            if (k == M-1) R[i][j] = aux[j];
        }
```

Figure 43:
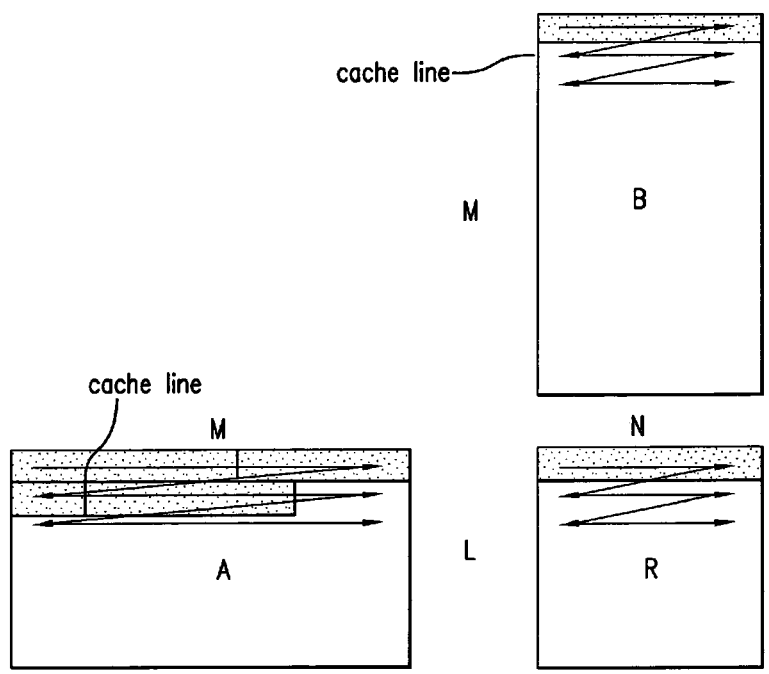
FIG. 43 is a visualization of array access sequences subsequent to optimization according to an example embodiment of the present invention.
Figure 44A:
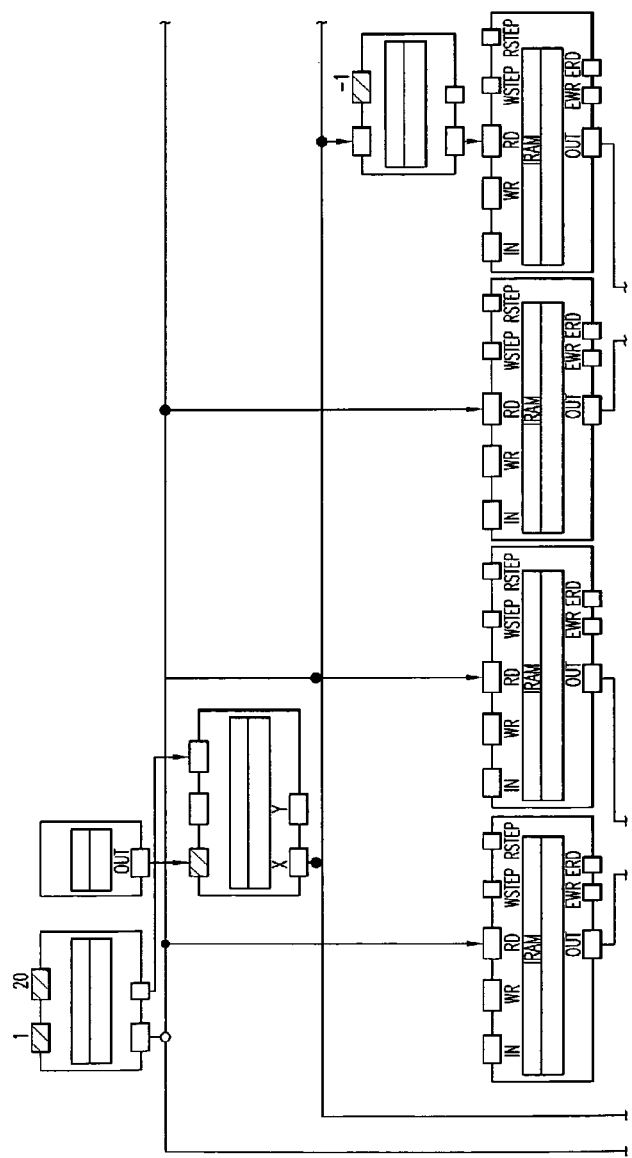
FIG. 44A shows the top-left section of a dataflow graph of a synthesized configuration for showing matrix multiplication after unroll and jam, according to an example embodiment of the present invention.
Figure 44B:
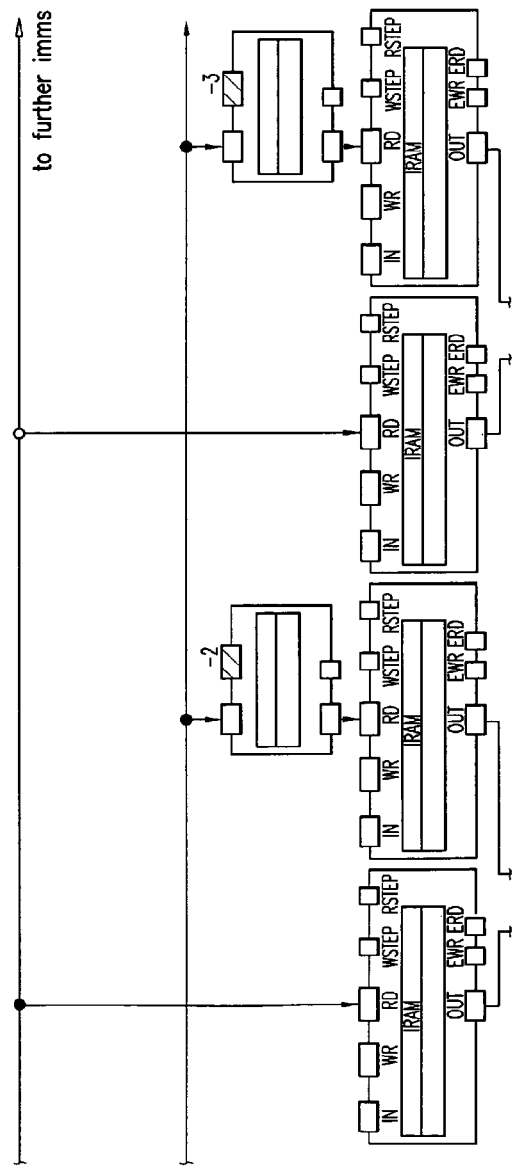
FIG. 44B shows the top-right section of a dataflow graph of a synthesized configuration for showing matrix multiplication after unroll and jam, according to an example embodiment of the present invention.
Figure 44C:
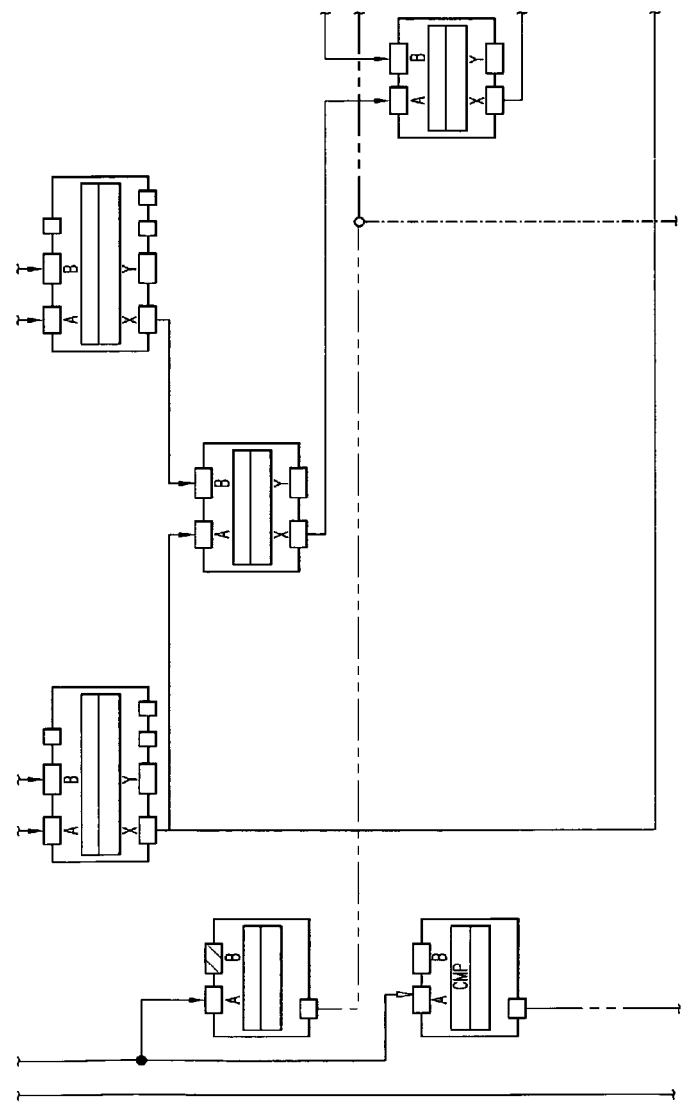
FIG. 44C shows the middle-left section of a dataflow graph of a synthesized configuration for showing matrix multiplication after unroll and jam, according to an example embodiment of the present invention.
Figure 44D:
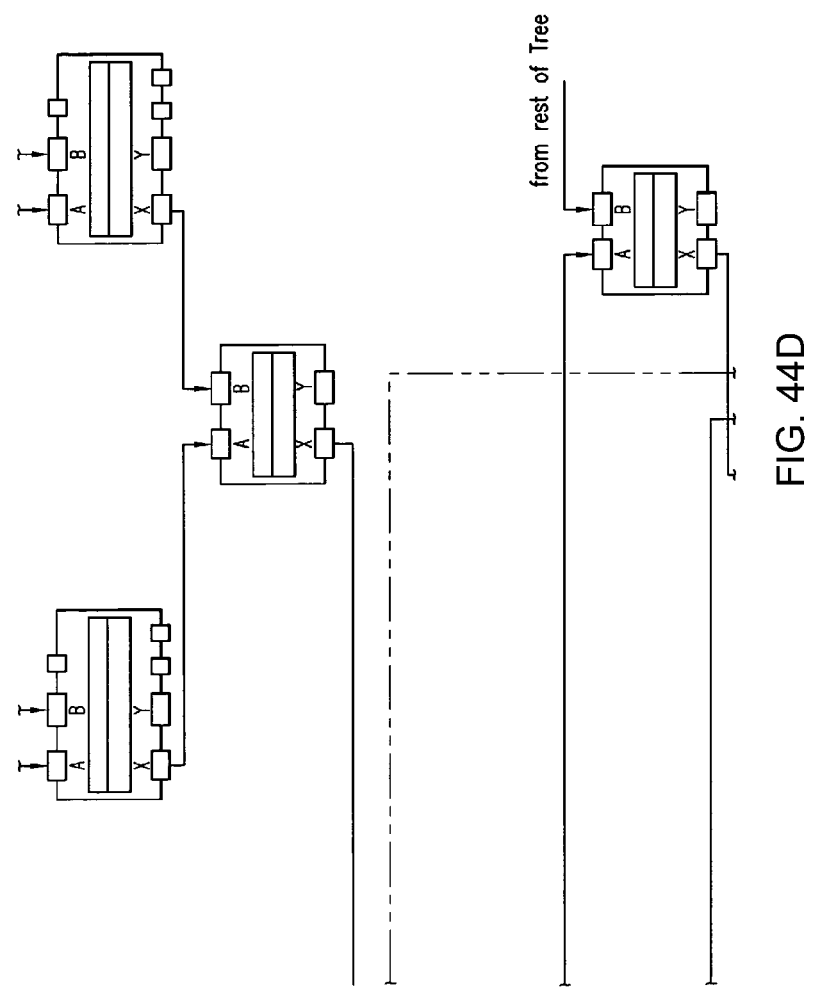
FIG. 44D shows the middle-right section of a dataflow graph of a synthesized configuration for showing matrix multiplication after unroll and jam, according to an example embodiment of the present invention.
Figure 44E:
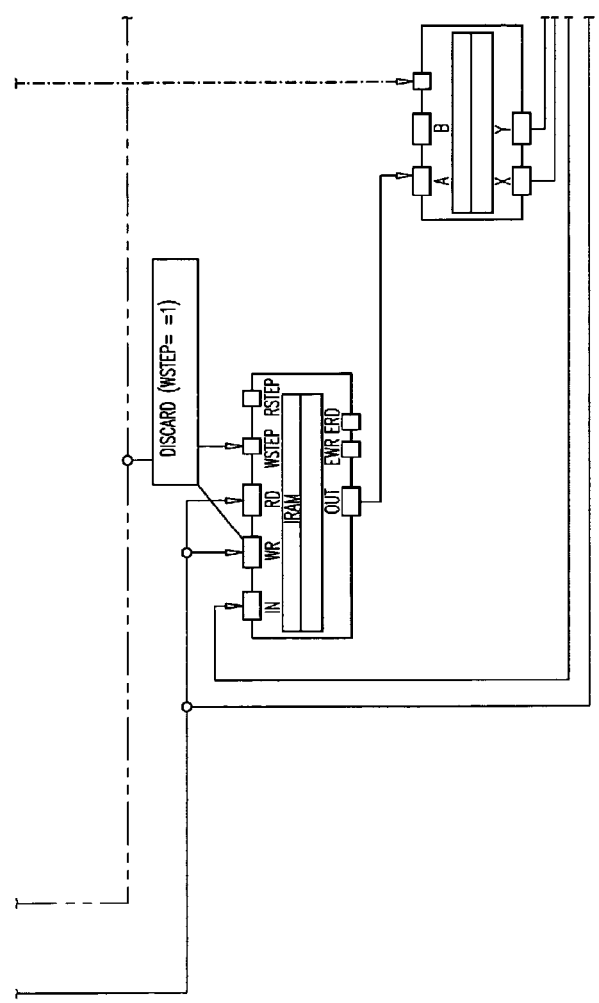
FIG. 44E shows the bottom-left section of a dataflow graph of a synthesized configuration for showing matrix multiplication after unroll and jam, according to an example embodiment of the present invention.
Figure 44F:
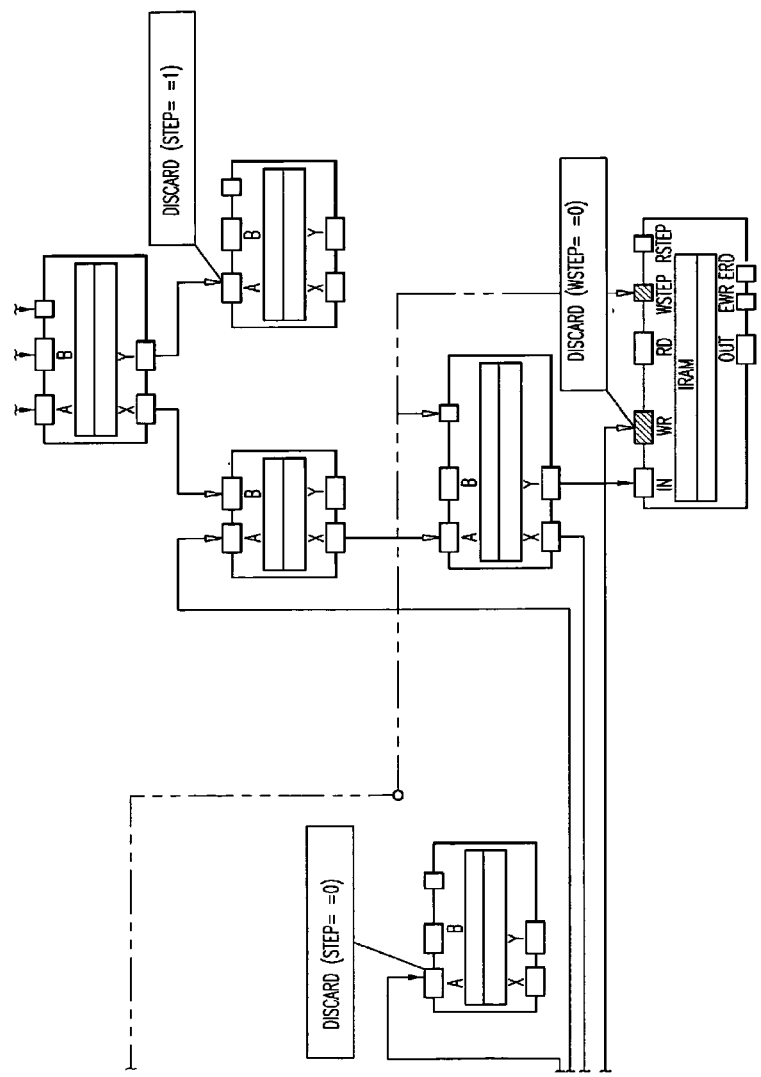
FIG. 44F shows the bottom-right section of a dataflow graph of a synthesized configuration for showing matrix multiplication after unroll and jam, according to an example embodiment of the present invention

FIG. 43 shows the improved iteration spaces. It shows array access sequences after optimization. The improvement is visible to the naked eye since array B is now read following the cache lines. This optimization does not optimize primarily for the XPP; but mainly optimizes the cache-hit rate, thus improving the overall performance.

Unroll and Jam

After improving the cache access behavior, the possibility for reduction recognition has been destroyed. This is a typical example for transformations where one excludes the other. Nevertheless, more parallelism may be obtained by doing unroll-and-jam. Therefore, the outer loop may be partially unrolled with the unroll factor. This factor is mainly chosen by the minimum of two calculations:

available IRAMs/# used IRAMs in the inner loop body available ALU resources/# used ALU resources in the inner loop.

In this example embodiment, the accesses to "A" and "B" depend on k (the loop which will be unrolled). Therefore, they are considered in the calculation. The accesses to "aux" and "R" do not depend on k. Thus, they can be subtracted from the available IRAMs, but do not need to be added to the denominator. Therefore, (assuming an XPP64) 14/2=7 is calculated for the unroll factor obtained by the IRAM resources.

On the other hand, the loop body involves two ALU operations (1 add, 1 mult), which may yield an unrolling factor of approximately 64/2=32. (This is an inaccurate estimation since it neither estimates the resources spent by the controlling network, which may decrease the unroll factor, nor takes into account that, e.g., the BREG-PAEs also have an adder, which may increase the unroll factor. Although it does not influence this example, the unroll factor calculation should account for this in a production compiler.) The constraint generated by the IRAMs therefore dominates by far.

Having chosen the unroll factor, the loop trip count is trimmed to be a multiple of that factor. Since the k loop has a loop count of 15, the first iteration may be peeled off and the remaining loop may be unrolled.

```
for (i=0; i<L; i++) {
    for (k=0; k<1; k++) {
        for (j=0; j<N; j++) {
            if (k==0) aux[j] = 0;
            aux[j] += A[i][k] * B[k][j];
            if (k==M-1) R[i][j] = aux[j];
        }
    }
    for (k=1; k<M; k+=7) {
        for (j=0; j<N; j++) {
            if (k==0) aux[j] = 0;
            aux[j] += A[i][k] * B[k][j];
            if (k==M-1) R[i][j] = aux[j];
        }
        for (j=0; j<N; j++) {
            if (k+1==0) aux[j] = 0;
            aux[j] += A[i][k+1] * B[k+1][j];
            if (k+1==M-1) R[i][j] = aux[j];
        }
        for (j=0; j<N; j++) {
            if (k+2==0) aux[j] = 0;
            aux[j] += A[i][k+2] * B[k+2][j];
            if (k+2==M-1) R[i][j] = aux[j];
        }
        for (j=0; j<N; j++) {
            if (k+3==0) aux[j] = 0;
            aux[j] += A[i][k+3] * B[k+3][j];
            if (k+3==M-1) R[i][j] = aux[j];
        }
        for (j=0; j<N; j++) {
            if (k+4==0) aux[j] = 0;
            aux[j] += A[i][k+4] * B[k+4][j];
            if (k+4==M-1) R[i][j] = aux[j];
        }
        for (j=0; j<N; j++) {
            if (k+5==0) aux[j] = 0;
            aux[j] += A[i][k+5] * B[k+5][j];
            if (k+5==M-1) R[i][j] = aux[j];
        }
        for(j=0; j<N; j++) {
            if (k+6==0) aux[j] = 0;
            aux[j] += A[i][k+6] * B[k+6][j];
            if (k+6==M-1) R[i][j] = aux[j];
        }
    }
}
```

Due to placement by the reverse loop invariant code motion of the loop invariant code into the inner loop, which is duplicated seven times, it is very likely that dead code elimination can get rid of some of these duplicates. Thus, the code may be shortened to:

```
for (i=0; i<L; i++) {
    for (k=0; k<1; k++) {
        for(j=0; j<N; j++) {
            if (k==0) aux[j] = 0;
            aux[j] += A[i][k] * B[k][j];
        }
    }
    for (k=1; k<M; k+=7) {
        for (j=0; j<N; j++) {
            aux[j] += A[i][k] * B[k][j];
        }
        for (j=0; j<N; j++) {
            aux[j] += A[i][k+1] * B[k+1][j];
        }
        for(j=0; j<N; j++) {
            aux[j] += A[i][k+2] * B[k+2][j];
        }
        for (j=0; j<N; j++) {
            aux[j] += A[i][k+3] * B[k+3][j];
        }
        for (j=0; j<N; j++) {
            aux[j] += A[i][k+4] * B[k+4][j];
        }
        for (j=0; j<N; j++) {
            aux[j] += A[i][k+5] * B[k+5][j];
        }
        for (j=0; j<N; j++) {
            aux[j] += A[i][k+6] * B[k+6][j];
            if (k+6==M-1) R[i][j]
        }
    }
}
```

Before jamming of the inner loops, it may be taken into account that the first iteration of the k loop was peeled of which would produce an own configuration. Since the unroll-and-jam factor is calculated to fit into one configuration, this side effect should be prevented. Because it should be no problem to run the k loop with variable step sizes, the k loops may be fused again, the step size may be adjusted, and the statements may be guarded. This may yield:

```
for (i=0; i<L; i++) {
    for (k=0; k<M; k+= k<1 ? 1 : 7) {
        for (j=0; j<N; j++) {
            if (k==0) aux[j] = 0;
            if (k==0) aux[j] += A[i][k] * B[k][j];
        }
        for(j=0; j<N; j++) {
            if (k>0) aux[j] += A[i][k] * B[k][j];
        }
        for(j=0; j<N; j++) {
            if (k>0) aux[j] += A[i][k+1] * B[k+1][j];
        }
        for(j=0; j<N; j++) {
            if (k>0) aux[j] += A[i][k+2] * B[k+2][j];
        }
        for(j=0; j<N; j++) {
            if (k>0) aux[j] += A[i][k+3] * B[k+3][j];
        }
        for(j=0; j<N; j++) {
            if (k>0) aux[j] += A[i][k+4] * B[k+4][j];
        }
        for(j=0; j<N; j++) {
            if (k>0) aux[j] += A[i][k+5] * B[k+5][j];
        }
        for(j=0; j<N; j++) {
            if (k>0) aux[j] += A[i][k+6] * B[k+6][j];
            if (k+6==M-1) R[i][j] = aux[j];
        }
    }
}
```

Now, the inner loops may be jammed, and the following may be obtained.

```
for (i=0; i<L; i++) {
    for (k=0; k<M; k+= k<1 ? 1 : 7) {
        for (j=0; j<N; j++) {
            if (k==0) aux[j] = 0;
            if (k==0) aux[j] += A[i][k] * B[k][j];
            if (k>0) {
                aux[j] += A[i][k]     * B[k][j];
                aux[j] += A[i][k+1]   * B[k+1][j];
                aux[j] += A[i][k+2]   * B[k+2][j];
                aux[j] += A[i][k+3]   * B[k+3][j];
                aux[j] += A[i][k+4]   * B[k+4][j];
                aux[j] += A[i][k+5]   * B[k+5][j];
                aux[j] += A[i][k+6]   * B[k+6][j];
            }
            if (k+6==M-1) R[i][j] = aux[j];
        }
    }
}
```

XPP Code Generation

The innermost loop can be synthesized in a configuration which uses 14 IRAMs for the input data, one IRAM to temporary store aux, and one IRAM for the output may R. Furthermore, it may be necessary to pass the value of k to the XPP to direct the dataflow. This may be done by a streaming input. FIG. 44A-44F shows the dataflow graph of the synthesized configuration and shows matrix multiplication after unroll and jam. The rightmost 3 branches are omitted from the graph and event connections are highlighted.

The following code shows the pseudo code that may be executed on the RISC processor.

```
XPPPreload(config)
for (i=0; i<L; i++) {
    XPPPreload(0, &A[i][0], M)
    XPPPreload(1, &A[i][0], M)
    XPPPreload(2, &A[i][0], M)
    XPPPreload(3, &A[i][0], M)
    XPPPreload(4, &A[i][0], M)
    XPPPreload(5, &A[i][0], M)
    XPPPreload(6, &A[i][0], M)
    XPPPreloadClean(15, &R[i][0], M)
    for (k=0; k<M; k+= k<1 ? 1 : 7) {
        XPPPreload(7, &B[k][0], N)
        XPPPreload(8, &B[k+1][0],N)
        XPPPreload(9, &B[k+2][0],N)
        XPPPreload(10, &B[k+3][0],N)
        XPPPreload(11, &B[k+4][0],N)
        XPPPreload(12, &B[k+5][0],N)
        XPPPreload(13, &B[k+6][0],N)
        XPPExecute(config,    IRAM(0), IRAM(1), IRAM(2), IRAM(3),
                              IRAM(4), IRAM(5), IRAM(6), IRAM(7),
                              IRAM(8), IRAM(9), IRAM(10),
                              IRAM(11), IRAM(12), IRAM(13),
                              IRAM(15), k)
    }
}
```

The following table shows the simulated configuration. The complete multiplication needs about 3120 cycles without the preloading and configuration. A typical RISC-DSP core with two MAC units and hardware loop support needs over 26000 cycles (when data is in zero-latency internal memory). Although the time for preloads and cache misses is neglected here, the values according to an embodiment of the present invention may result in improvements of 200-300 percent compared to a standalone RISC core.

The following is a corresponding parameter table.

| Parameter | Value | | |
|---|---|---|---|
| Vector length | 20 | | |
| Reused data set size | 20 | | |
| I/O IRAMs | 14 I + 1 O + 1 internal | | |
| ALU | 20 | | |
| BREG | 26 (8 defined + 18 route) | | |
| FREG | 28 (4 defined + 24 route) | | |
| Data flow graph width | 14 | | |
| Data flow graph height | 6 (without routing and balancing) | | |
| Configuration cycles (simulated) | configuration | | 2633 |
| | preloads | 10 * 3 * 7 * 5 | 1050 |
| | cycles | 10 * 7 * 15 | 1050 |
| | sum | (k == 0) | 3120 |
| | | 112+ | |
| | | (k == 1) | 7853 |
| | | 100+ | |
| | | (k == 7) | |
| | | 100* | |
| | | 10= | |

Viterbi Encoder
Original Code
Source Code:

```
/* C-language butterfly */
#define BFLY(i) {\
    unsigned char metric, m0, m1, decision; \
    metric = ((Branchtab29_1[i] {circumflex over ( )}sym1) +
```

Source Code:

```
    (Branchtab29_2[i] {circumflex over ( )} sym2) + 1)/2; \
    m0 = vp->old_metrics[i] + metric; \
    m1 = vp->old_metrics[i+128] + (15 - metric); \
    decision = (m0-m1) >= 0; \
    vp->new_metrics[2*i] = decision ? m1 : m0; \
```

```
vp->dp->w[i/16] |= decision << ((2*i)&31); \
m0 -= (metric+metric-15); \
m1 += (metric+metric-15); \
decision = (m0-m1) >= 0; \
vp->new_metrics[2*i+1]=decision ? m1 : m0; \
vp->dp->w[i/16] |= decision <<((2*i+1)&31); \
}
int update_viterbi29(void *p,unsigned char sym1,unsigned char sym2) {
    int i;
    struct v29 *vp = p;
    unsigned char *tmp;
    int normalize = 0;
    for (i=0; i<8; i++)
        vp->dp->w[i] = 0;
    for (i=0; i<128; i++)
        BFLY(i);
    /* Renormalize metrics */
    if (vp->new_metrics[0] > 150) {
        int i;
        unsigned char minmetric = 255;
```

Source Code:

```
        for (i=0; i<64; i++)
            if (vp->new_metrics[i] < minmetric)
                minmetric = vp->new_metrics[i];
        for (i=0; i<64; i++)
            vp->new_metrics[i] -= minmetric;
        normalize = minmetric;
    }
    vp->dp++;
    tmp = vp->old_metrics;
    vp->old_metrics = vp->new_metrics;
    vp->new_metrics = tmp;
    return normalize;
}
```

Interprocedural Optimizations and Scalar Transformations

Since no inline-able function calls are present, in an embodiment of the present invention, no interprocedural code movement is done.

After expression simplification, strength reduction, SSA renaming, copy coalescing and idiom recognition, the code may be approximately as presented below (statements are reordered for convenience). Note that idiom recognition may find the combination of min( ) and use the comparison result for decision and _decision. However, the resulting computation cannot be expressed in C, so it is described below as a comment.

```
int update_viterbi29 (void
*p,unsigned char sym1,unsigned
char sym2) {
    int i;
    struct v29 *vp = p;
    unsigned char *tmp;
    int normalize = 0;
    char *_vpdpw = vp->dp->w;
    for (i=0; i<8; i++)
        *_vpdpw_++ = 0;
    char *_bt29_1= Branchtab29_1;
    char *_bt29_2= Branchtab29_2;
    char *_vpom0= vp->old_metrics;
    char *_vpom128= vp->old_metrics+128;
    char * vpnm= vp->new_metrics;
    char *_vpdpw= vp->dp->w;
    for (i=0; i<128; i++) {
        unsigned char metric, _tmp, m0,
m1, _m0, _m1, decision,
_decision;
        metric = ((*_bt29_1++ {circumflex over ( )} sym1) +
                (*_bt29_2++ {circumflex over ( )} sym2) + 1)/2;
        _tmp= (metric+metric-15);
        m0 = *_vpom++ + metric;
        m1 = *_vpom128++ + (15 - metric);
        _m0 = m0 - _tmp;
        _m1 = m1 + _tmp;
        // decision = m0 >= m1;
        // _decision = _m0 >= _m1;

*_vpnm++ = min(m0,m1);            // = decision ?
                                          ml : m0
                                          // = _decision
        *_vpnm++ = min(_m0,_m1);
                                          ? _m1 : _m0
                                                       /* decision*/ <<
        _vpdpw[i >> 4]                 |= ( m0 >= m1)
                                                       ((2*i) & 31)
                                          | (_mO >=    /* decision*/ <<
                                          _m1)         ((2*i+1)&31);
}
/* Renormalize metrics */
if(vp->new_metrics[0] > 150) {
    int i;
    unsigned char minmetric = 255;
    char *_vpnm= vp->new_metrics;
    for (i=0; i<64; i++)
        minmetric = min(minmetric,
*vpnm++);
    char *_vpnm= vp->new_metrics;
    for (i=0; i<64; i++)
        *vpnm++ -= minmetric;
    normalize = minmetric;
}
vp->dp++;
tmp = vp->old_metrics;
    vp->old_metrics = vp->new_metrics;
    vp->new_metrics = tmp;
    return normalize;
}
```

Initialization

The first loop (setting vp->dp->w[0.7] to zero) may be most efficiently executed on the RISC.

Butterfly Loop

The second loop (with the BFLY( ) macro expanded) is of interest for the XPP compiler and needs further examination:

```
char*iram0=                    // XPPPreload(0,
Branchtab29_1;                 Branchtab29_1, 128/4);
char*iram2=                    // XPPPreload(2,
Branchtab29_2;                 Branchtab29_2, 128/4);
char*iram4= vp-                // XPPPreload(4, vp->old
>old_metrics;                  metrics, 128/4);
char*iram5= vp-                // XPPPreload(5, vp-
>old_metrics+128;              >old_metrics+128,128/4);
short *iram6= vp-              // XPPPreload(6, vp-
```

-continued

```
>new_metrics;                    >new_metrics, 128/2);
   unsigned long *iram7=         // XPPPreload(7, vp->dp->w,
vp->dp->w;                       8);
// sym1 & sym2 are in
IRAM 1 & 3
   for (1=0; i<128; i++) {
      unsigned char metric,
_tmp, m0, m1, _m0, _m1
      metric = ((*iram0++
{circumflex over ( )} sym1) +
         (*iram1++
{circumflex over ( )} sym2) +
1)/2;
      _tmp= (metric << 1)
−15;
      m0 = *iram2++ +
metric;
      m1 = *iram3++ + (15 −
metric);
      _m0 = m0 − _tmp;
      _m1 = m1 + _tmp;
      // assuming big
endian; little endian has
the shift on the latter min(
)
      *iram6++ =
(min(m0,m1) << 8) |
min(_m0,_m1);

*iram7[i >> 4]          |=                    (m0 >= m1) <<
                                                    ((2*i) & 31)
                                                    (_m0 >= _m1)
                                |                   <<
                                                    ((2*i+1)&31);
}
```

Figure 45:
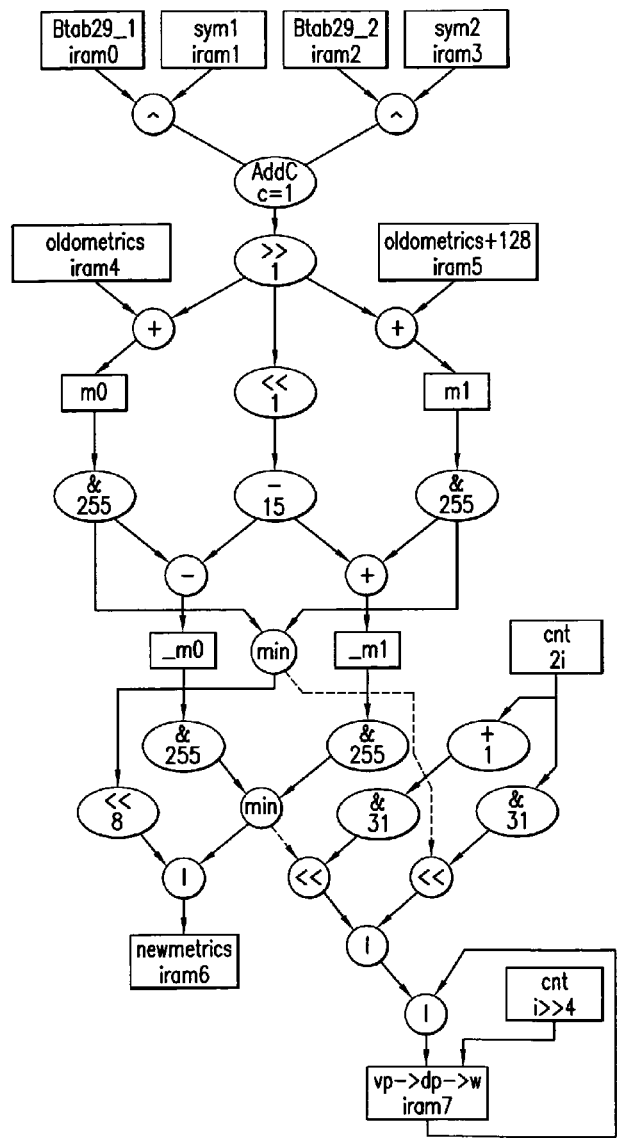
FIG. 45 is a data flow graph corresponding to a butterfly loop, according to an example embodiment of the present invention.

The corresponding data flow graph is shown in FIG. 45 (for now ignoring that the IRAM accesses are mostly char accesses). The solid lines represent data flow, while the dashed lines represent event flow.

The following is a corresponding parameter table.

| Parameter | Value |
|---|---|
| Vector length | 128 |
| Reused data set size | — |
| I/O IRAMs | 6 I + 2 O |
| ALU | 25 |
| BREG | few |
| FREG | few |
| Data flow graph width | 4 |
| Data flow graph height | 11 |
| Configuration cycles | 11 + 128 |

Some problems are immediately noticed: IRAM7 is fully busy reading and rewriting the same address sixteen times. Loop tiling to a tile size of sixteen gives the redundant load store elimination a chance to read the value once and accumulate the bits temporarily, writing the value to the IRAM at the end of this inner loop. Loop Fusion with the initialization loop then may allow propagation of the zero values set in the first loop to the reads of vp->dp->w[i] (IRAM7), eliminating the first loop altogether. Loop tiling with a tile size of 16 may also eliminate the & 31 expressions for the shift values. Since the new inner loop only runs from 0 to 16, the value range analysis now finds that the & 31 expression is not limiting the value range any further.

All remaining input IRAMs are character (8 bit) based. So it may be required for split networks to split the 32-bit stream into four 8-bit streams which are then merged. This adds 3 shifts, 3 ands, and 3 merges for every character IRAM. The merges could be eliminated when unrolling the loop body. However, unrolling may be limited to unrolling twice due to ALU availability as well as due to that IRAM6 is already 16 bit based. Unrolling once requires a shift by 16 and an or to write 32 bits in every cycle. Unrolling further cannot increase pipeline throughput any more. So the body is only unrolled once, eliminating one layer of merges. This may yield two separate pipelines that each handle two eight bit slices of the 32-bit value from the IRAM, serialized by merges.

The modified code may be approximately as follows (unrolling and splitting omitted for simplicity):

```
char*iram0= Branchtab29_1;        // XPPPreload(0, Branchtab29_1,
                                  128/4);
char*iram2= Branchtab29_2;        // XPPPreload(2, Branchtab29_2,
                                  128/4);
char*iram4= vp->old_metrics;      // XPPPreload(4, vp->old metrics,
                                  128/4);
char*iram5= vp-                   // XPPPreload(5, vp-
>old_metrics+128;                 >old_metrics+128,128/4);
```

-continued

```
    short *iram6= vp->new_metrics;       // XPPPreload(6, vp->new_metrics,
                                            128/2);
    unsigned long *iram7= vp->dp->w;     // XPPPreload(7, vp->dp->w, 8);
// sym1 & sym2 are in IRAM 1 & 3
    for (_i=0;_i<8;_i++) {
        rlse= 0;
        for (i2=0; i2<32; i2+=2) {
            unsigned char metric, _tmp,
m0, m1, _m0, _m1;
            metric = ((*iram0++ {circumflex
over ( )} sym1) +
                (*iram1 ++ {circumflex
over ( )} sym2) + 1)/2;
            _tmp= (metric << 1) –15;
            m0 = *iram2++ + metric;
            m1 = *iram3++ + (15 – metric);
            _m0 = m0 – _tmp;
            _m1 = m1 + _tmp;
            *iram6++ = (min(m0,m1) << 8)
| min(_m0, _m1);
            rlse = rlse                  | ( m0 >= m1) << i2
                                          | (_m0 >= _m1) << (i2+1);
        }
    *iram7++ = rlse;
    }
```

Figure 46:
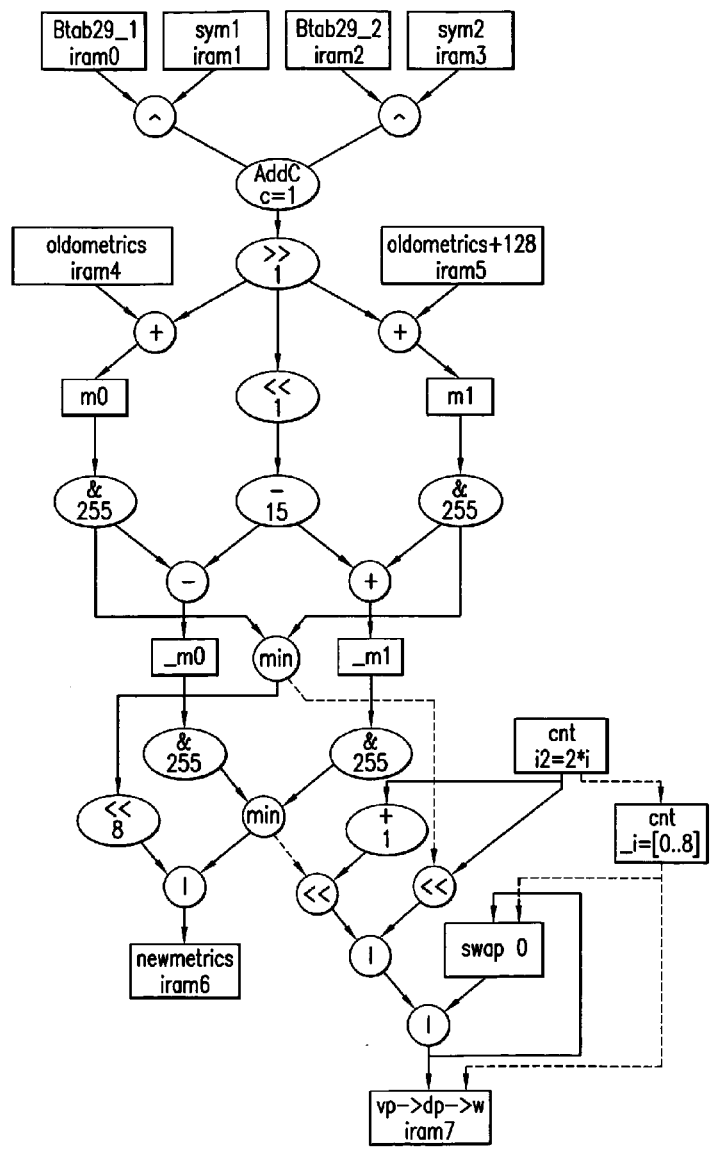
FIG. 46 is a data flow graph showing modifications to code corresponding to the graph of FIG. 45, according to an example embodiment of the present invention.
Figure 47:
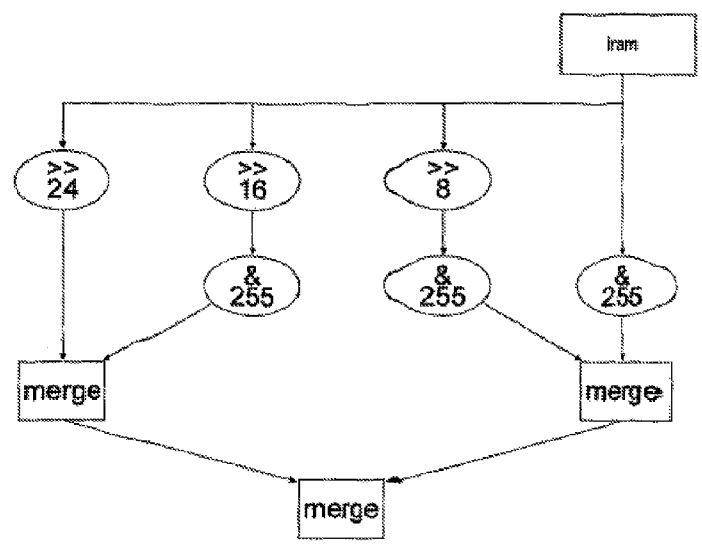
FIG. 47 illustrates a splitting network, according to an example embodiment of the present invention.

The modified data flow graph (unrolling and splitting omitted for simplicity) is shown in FIG. 46. The splitting network is shown in FIG. 47. The bottom most level merge is omitted for each level of unrolling.

The following is a corresponding parameter table.

| Parameter | Value |
| --- | --- |
| Vector length | 128 |
| Reused data set size | — |
| I/O IRAMs | 6 I + 2 O |
| ALU | 2 * 24 + 4 * 3 (split) + 2 (join) = 62 |
| BREG | few |
| FREG | few |
| Data flow graph width | 4 |
| Data flow graph height | 11 + 3 (split) |
| Configuration cycles | 14 + 64 |

Re-Normalization

The Normalization consists of a loop scanning the input for the minimum and a second loop that subtracts the minimum from all elements. There is a data dependency between all iterations of the first loop and all iterations of the second loop. Therefore, the two loops cannot be merged or pipelined. They may be handled individually.

Minimum Search

The third loop is a minimum search on a byte array.

```
char *iram0 = vp->new_metrics; //XPPPzeload(0, vp->new_metrics,
64/4);
for (i=0; i<64; i++)
    minmetric = min(minmetric, *iram0++);
```

The following is a corresponding parameter table.

| Parameter | Value |
| --- | --- |
| Vector length | 64 |
| Reused data set size | — |
| I/O IRAMs | 1 + 1 |
| ALU | 1 |
| BREG | 0 |
| FREG | 0 |
| Data flow graph width | 1 |
| Data flow graph height | 1 |
| Configuration cycles | 64 |

Reduction recognition may eliminate the dependence for minmetric, enabling a four-times unroll to utilize the IRAM width of 32 bits. A split network has to be added to separate the 8 bit streams using 3 SHIFT and 3 AND operations. Tree balancing may re-distribute the min( ) operations to minimize the tree height.

```
char *iram0 = vp->new metrics; // XPPPreload(0, vp->new_metrics, 16);
for (i=0; i<16; i++)
    minmetric = min(minmetric, min(min(*iram0++, *iram0++),
                         min(*iram0++, *iram0++)));
```

The following is a corresponding parameter table.

| Parameter | Value |
| --- | --- |
| Vector length | 16 |
| Reused data set size | — |
| I/O IRAMs | 1 I + 1 O |
| ALU | 4 * min |
| BREG | 3 * shln + 3 * shrn |
| FREG | 0 |
| Data flow graph width | 4 |
| Data flow graph height | 5 |
| Configuration cycles | 5 + 16 |

Reduction recognition again may eliminate the loop carried dependence for minmetric, enabling loop tiling and then unroll and jam to increase parallelism. The maximum for the tiling size is 16 IRAMs/2 IRAMS=8. Constant propagation and tree rebalancing may reduce the dependence height of the final merging expression:

```
char *iram0= vp->new_metrics;           // XPPPreload(0, vp->new_metrics, 2);
char *iram1= vp->new_metrics+8;         // XPPPreload(1, vp->new_metrics+8, 2);
char *iram2 = vp->new_metrics+16;       // XPPPreload(2, vp->new_metrics+16, 2);
char *iram3= vp->new_metrics+24;        // XPPPreload(3, vp->new_metrics+24, 2);
char *iram4= vp->new_metrics+32;        // XPPPreload(4, vp->new_metrics+32, 2);
char *iram5= vp->new_metrics+40;        // XPPPreload(5, vp->new_metrics+40, 2);
char *iram6= vp->new_metrics+48;        // XPPPreload(6, vp->new_metrics+48, 2);
char *iram7= vp->new_metrics+56;        // XPPPreload(7, vp->new_metrics+56, 2);
for (i=0;_i<2; i++) {
    minmetric0 = min (minmetric0, min( min(*iram0++, *iram0++),
                                        min(*iram0++, *iram0++)));
    minmetric1 = min (minmetric1, min( min(*iram1++, *iram1++),
                                        min(*iram1++, *iram1++)));
    minmetric2 = min (minmetric2, min( min(*iram2++, *iram2++),
                                        min(*iram2++, *iram2++)));
    minmetric3 = min (minmetric3, min( min(*iram3++, *iram3++),
                                        min(*iram3++, *iram3++)));
    minmetric4 = min (minmetric4, min( min(*iram4++, *iram4++),
                                        min(*iram4++, *iram4++)));
    minmetric5 = min (minmetric5, min( min(*iram5++, *iram5++),
                                        min(*iram5++, *iram5++)));
    minmetric6 = min (minmetric6, min( min(*iram6++, *iram6++),
                                        min(*iram6++, *iram6++)));
    minmetric7 = min (minmetric7, min( min(*iram7++, *iram7++),
                                        min(*iram7++, *iram7++)));
}
minmetric = min(min((
    min(minmetric_0, minmetric_1),
        min(minmetric_2, minmetric_3)),
            min(( min(minmetric_4, minmetric_5),
                min(minmetric_6, minmetric_7));
```

The following is a corresponding parameter table.

| Parameter | Value |
| --- | --- |
| Vector length | 2 |
| Reused data set size | — |
| I/O IRAMs | 8 I + 1 O |
| ALU | 8 * 4 * min = 32 |
| BREG | 8 * (3 * shln + 3 * shrn) = 48 |
| FREG | 0 |
| Data flow graph width | 8 * 4 = 32 |
| Data flow graph height | 5 |
| Configuration cycles | 8 + 2 |

Re-Normalization

The fourth loop subtracts the minimum of the third loop from each element in the array. The read-modify-write operation has to be broken up into two IRAMs. Otherwise, the IRAM ports will limit throughput.

```
char *iram0= vp->new_metrics;    // XPPPreload
    (0, vp->new_metrics, 64/4)
char *iram1= vp->new_metrics;    // XPPPreloadClean(1, vp->new_metrics, 64/4)
for (i=0; i<64; i++)
    *iram1++ = *iram0++ – minmetric;
```

The following is a corresponding parameter table.

| Parameter | Value |
| --- | --- |
| Vector length | 64 |
| Reused data set size | — |
| I/O IRAMs | 2 I + 1 O |
| ALU | 1 |
| BREG | 0 |
| FREG | 0 |
| Data flow graph width | 1 |
| Data flow graph height | 1 |
| Configuration cycles | 64 |

There are no loop carried dependencies. Since the data size is bytes, the inner loop can be unrolled four times without exceeding the IRAM bandwidth requirements. Networks splitting the 32-bit stream into 4 8-bit streams and rejoining the individual results to a common 32-bit result stream are inserted.

```
char *iram0= vp->new_metrics; // XPPPreload
    (0, vp->new_metrics, 16)
char *iram1= vp->new_metrics; // XPPPreloadClean
    (1, vp->new metrics, 16)
for (i=0; i<16; i++) {
    *iram1++ = *iram0++ – minmetric;
    *iram1++ = *iram0++ – minmetric;
    *iram1++ = *iram0++ – minmetric;
    *iram1++ = *iram0++ – minmetric;
}
```

The following is a corresponding parameter table.

| Parameter | Value |
| --- | --- |
| Vector length | 16 |
| Reused data set size | — |
| 110 IRAMs | 2 I + 1 O |
| ALU | 4 * 4(sub) = 16 |
| BREG | 6 * shln + 6 * shrn = 12 |
| FREG | 0 |
| Data flow graph width | 4 |
| Data flow graph height | 5 |
| Configuration cycles | 2(split) + 4 * 1(sub) + 2(join) = 8 |

Unroll and jam can be applied after loop tiling, in analogy to the third loop, but loop tiling is now limited by the BREGs used by the split and join networks. The computed tiling size (unroll factor) is 64 BREGs/12 BREGs=5, which is replaced by 4, since the same throughput is achieved with less overhead.

```
char *iram0= vp->        // XPPPreload    (0, vp->new_metrics, 4)
new_metrics;
char *iram1= vp->        // XPPPreloadClean (1, vp->new_metrics, 4)
new_metrics;
char *iram2= vp->        // XPPPreload    (2, vp->new_metrics+16, 4)
new_metrics+16;
```

-continued

```
char *iram3= vp->        //XPPPreloadClean    (3, vp->new_metrics+16, 4)
new_metrics+16;
char *iram4= vp->        //XPPPreload         (4, vp->new_metrics+32, 4)
new_metrics+32;
char *iram5= vp->        //XPPPreloadClean    (5, vp->new_metrics+32, 4)
new_metrics+32;
char *iram6= vp->        //XPPPreload         (6, vp->new_metrics+48, 4)
new_metrics+48;
char *iram7= vp->        //XPPPreloadClean    (7, vp->new_metrics+48, 4)
new_metrics+48;
for (i=0; i<4; i++) {
            *iram1++ = *iram0++ -    //first pipeline
            minmetric;
            *iram1++ = *iram0++ -
            minmetric;
            *iram1++ = *iram0++ -
            minmetric;
            *iram1++ = *iram0++ -
            minmetric;
            *iram3++ = *iram2++ -    //second pipeline
            minmetric;
            *iram3++ = *iram2++ -
            minmetric;
            *iram3++ = *iram2++ -
            minmetric;
            *iram3++ = *iram2++ -
            minmetric;
            *iram5++ = *iram4++ -    //third pipeline
            minmetric;
            *iram5++ = *iram4++ -
            minmetric;
            *iram5++ = *iram4++ -
            minmetric;
            *iram5++ = *iram4++ -
            minmetric;
            *iram7++ = *iram6++ -    //fourth pipeline
            minmetric;
            *iram7++ = *iram6++ -
            minmetric;
            *iram7++ = *iram6++ -
            minmetric;
            *iram7++ = *iram6++ -
            minmetric;
}
```

The following is a corresponding parameter table.

| Parameter | Value |
|---|---|
| Vector length | 4 |
| Reused data set size | — |
| I/O IRAMs | 51 + 40 |
| ALU | 4 * (6(split) + 4(sub) + 6(join)) = 64 |
| BREG | 4 * (6 * shln + 6 * shrn) = 48 |
| FREG | 0 |
| Data flow graph width | 16 |
| Data flow graph height | 1 |
| Configuration cycles | 2(split) + 4 * 1(sub) + 2(join) = 8 |

Final Code

Finally the following code may be obtained:

```
int update_viterbi29
(void *p, unsigned char
sym 1, unsigned char
sym2) {
    int i;
    struct v29 *vp = p;
    unsigned char *tmp;
    int normalize = 0;
    //initialization loop
    eliminated
    //for (i=0; i<8; i++)
    //    vp->dp->w[i] = 0;
    //Configuration for
    butterfly loop
    char*iram0=              //XPPPreload(0,
    Branchtab29_1;           Branchtab29_1, 128/4);
    char*iram2=              //XPPPreload(2,
    Branchtab29_2;           Branchtab29_2, 128/4);
    char*iram4= vp->         //XPPPreload(4, vp->old
    old_metrics;             metrics, 128/4);
    char*iram5= vp->         //XPPPreload(5,
    old_metrics+128;         vp->old_metrics+128,128/4);
    short*iram6= vp->        //XPPPreload(6,
    new_metrics;             vp->new_metrics, 128/2);
    unsigned long *iram7=    //XPPPreload(7, vp->dp->w, 8);
    vp->dp->w;
    //sym1 & sym2 are in
    IRAM 1 & 3
    for (_i=0;_i<8;_i++) {
        rlse= 0;
        for (i2=0; i<32; i2+=2)
    {//unrolled once
        unsigned char
    metric, _tmp, m0, m1,
    _m0, _m1
            metric = ((*iram0++
```

```
{circumflex over ( )}
sym1) +
                       (*iram1++
{circumflex over ( )}
sym2) + 1)/2;
      _tmp= (metric << 1) −15;
      m0 = *iram2++ +
metric;
      m1 = *iram3++ +
(15 − metric);
      _m0 = m0 − _tmp;
      _m1 = m1 + _tmp;
      *iram6++ =
(min(m0,m1) << 8) |
min(_m0,_m1;
      rlse = rlse                  | ( m0 >= m1) << i2
                                   | (_m0 >= _m1) << (i2+1);
}
   *iram7++ = rlse;
}
/* Renormalize metrics
*/
if (vp->new_metrics[0]
> 150) {
   int 1;
// Configuration for loop
3
   char *iram0=                   // XPPPreload(0,
vp->new_metrics;                  vp->new_metrics, 8);
   char *iram1=                   // XPPPreload(1,
vp->new_metrics+8;                vp->new_metrics+8,
8);
   char *iram2=                   // XPPPreload(2,
vp->new_metrics+16;               vp->new_metrics+16, 8);
   char *iram3=                   // XPPPreload(3,
vp->new_metrics+24;               vp->new_metrics+24, 8);
   char *iram4=                   // XPPPreload(4,
vp->new_metrics+32;               vp->new_metrics+32, 8);
   char *iram5=                   // XPPPreload(5,
vp->new_metrics+40;               vp->new_metrics+40, 8);
   char *iram6=                   // XPPPreload(6,
vp->new_metrics+48;               vp->new_metrics+48, 8);
   char *iram7=                   // XPPPreload(7,
vp->new_metrics+56;               vp->new_metrics+56, 8);
   for (i=0;_ i<2; i++) {
      minmetric0 = min
(minmetric0, min(
min(*iram0++,
*iram0++),
                                   min(*iram0++, *iram0++)));
      minmetric1 = min
(minmetric1, min(
min(*iram1++,
*iram1++),
                                   min(*iram1++, *iram1++)));
      minmetric2 = min
(minmetric2, min(
min(*iram2++,
*iram2++),
                                   min(*iram2++, *iram2++)));
      minmetric3 = min
(minmetric3, min(
min(*iram3++,
*iram3++),
                                   min(*iram3++, *iram3++)));
      minmetric4 = min
(minmetric4, min(
min(*iram4++,
*iram4++),
                                   min(*iram4++, *iram4++)));
      minmetric5 = min
(minmetric5, min(
min(*iram5++,
*iram5++),
                                   min(*iram5++, *iram5++)));
      minmetric6 = min
(minmetric6, min(
min(*iram6++,
*iram6++),
                                   min(*iram6++, *iram6++)));
      minmetric7 = min
(minmetric7, min(
min(*iram7++,
*iram7++),
                                   min(*iram7++, *iram7++)));
   }
   minmetric = min(min((
min(minmetric_0,
minmetric_1),
                      min(minmetric_2,
                      minmetric_3)),
                   min(( min(minmetric_4,
                      minmetric_5),
                      min(minmetric_6,
                      minmetric_7));
// minmetric is written
to the output IRAM
// Configuration for loop
4, minmetric is in an
input IRAM
   char *iram0= vp->       // XPPPreload      (0, vp->
new_metrics;                                    new_metrics,
   4)
   char *iram1= vp->       // XPPPreloadClean (1, vp->
new_metrics;                                    new_metrics,
   4)
   char *iram2= vp->       // XPPPreload      (2, vp->
new_metrics+16;                                 new_metrics+16,
   4)
   char *iram3= vp->       // XPPPreloadClean (3, vp->
new_metrics+16;                                 new_metrics+16,
   4)
   char *iram4= vp->       // XPPPreload      (4, vp->
new_metrics+32;                                 new_metrics+32,
   4)
   char *iram5= vp->       // XPPPreloadClean (5, vp->
new_metrics+32;                                 new_metrics+32,
   4)
   char *iram6= vp->       // XPPPreload      (6, vp->
new_metrics+48;                                 new_metrics+48,
   4)
   char *iram7= vp->       // XPPPreloadClean (7, vp->
new_metrics+48;                                 new_metrics+48,
   4)
   for (i=0; i<4; i++) {
      *iram1++ = *iram0++ −   // first pipeline
minmetric;
      *iram1++ = *iram0++ −
minmetric;
      *iram1++ = *iram0++ −
minmetric;
      *iram1++ = *iram0++ −
minmetric;
      *iram3++ = *iram2++ −   // second pipeline
minmetric;
      *iram3++ = *iram2++ −
minmetric;
      *iram3++ = *iram2++ −
minmetric;
      *iram3++ = *iram2++ −
minmetric;
      *iram5++ = *iram4++ −   // third pipeline
minmetric;
      *iram5++ = *iram4++ −
minmetric;
      *iram5++ = *iram4++ −
minmetric;
      *iram5++ = *iram4++ −
minmetric;
      *iram7++ = *iram6++ −   // fourth pipeline
minmetric;
      *iram7++ = *iram6++ −
minmetric;
```

-continued

```
    *iram7++ = *iram6++ -
minmetric;
    *iram7++ = *iram6++ -
minmetric;
    }
  normalize = minmetric;
  }
  vp->dp++;
  tmp = vp->old_metrics;
  vp->old_metrics = vp->
new_metrics;
  vp->new_metrics =
tmp;
  return normalize;
}
```

Performance Considerations

In this example there is not a high data locality. Every input data item is read exactly once. Only in the case of re-normalization, the new metric array is re-read and re-written. To fully utilize the PAE array, loop tiling was used in conjunction with reduction recognition to break dependencies using algebraic identities. In some cases (minimum search) this may lead to extremely short vector lengths. This is not a problem as it still does reduce the running time of the configuration and the transfer time from the top of the memory hierarchy to the IRAMs stays the same. The vector length can be increased if the outer loop that calls the function is known. The additional data can be used to increase the fill grade of the IRAMs by unrolling the outer loop, keeping the vector length longer. This would further increase configuration performance by reducing overall pipeline setup times.

Performance of XPP for this example is compared to a hypothetical superscalar RISC-architecture. An average issue width of two is assumed, which means that the RISC on average executes two operations in parallel. The estimate is achieved by counting instructions for the source code presented under the heading "Interprocedural Optimizations and Scalar Transformations." See the table below.

MPEG2 Encoder/Decoder
Quantization/Inverse Quantization (quant.c)

The quantization file may include routines for quantization and inverse quantization of 8×8 macro blocks. These functions may differ for intra and non-intra blocks. Furthermore, the encoder may distinguish between MPEG1 and MPEG2 inverse quantization.

This may give a total of 6 functions, which are all candidates for function inlining, since they do not use the XPP capacity by far.

Since all functions may have the same layout (some checks, one main loop running over the macro block quantizing with a quantization matrix), focus is placed on "iquant_intra," the inverse quantization of intra-blocks, since it may include all elements found in the other procedures. (The non_intra quantization loop bodies are more complicated, but add no compiler complexity). In the source code the mpeg part is already inlined, which is straightforward since the function is statically defined and includes no function calls itself. Therefore, the compiler may inline it and dead function elimination may remove the whole definition.

Original Code

```
void iquant_intra(src,dst,dc_prec,quant_mat,mquant)
short *src, *dst;
int dc_prec;
unsigned char *quant_mat;
int mquant;
{
  int i, val, sum;
  if (mpeg1) {
    dst[0] = src[0] << (3-dc_prec);
```

Original Code

```
for (i=1; i<64; i++)
{
  val = (int)(src[i]*quant_mat[i]*mquant)/16;
  /* mismatch control */
  if ((val&1)==0 && val!=0)
```

| Operation | Cycles | Bfly Setup | Butterfly | Min Setup | Min Search | Norm Setup | Normalize | |
|---|---|---|---|---|---|---|---|---|
| ADRCOMP | 1 | 6 | 7 | | 1 | | | |
| LD/ST | 2 | 5 | 8 | 2 | | 1 | 2 | |
| LDI | 1 | 3 | 4 | 1 | | 1 | | |
| MOVE | 1 | | 4 | | 1 | | | |
| BITOP | 1 | | 10 | | | | | |
| ADD/SUB | 1 | | 20 | | 3 | 1 | 3 | |
| MULT | 2 | 2 | | | | | | |
| CJMP | 3 | | 3 | | 2 | | 1 | |
| Cycles | | 23 | 70 | 5 | 11 | 4 | 10 | |
| Count | | 1 | 126 | 1 | 64 | 1 | 64 | |
| Issue Width | 2 | | | | | | | Est. RISC cycles |
| Total Cycles | | 12 | 4480 | 3 | 352 | 2 | 320 | 5168 RISC Cycles |

-continued
```
        val+= (val>0) ? -1 : 1;
        /* saturation */
        dst[i] = (val>2047) ? 2047: ((val<-2048) ? -2048 : val);
      }
    }
    else
    {
      sum = dst[0] = src[0] << (3-dc_prec);
      for (i=1; i<64; i++)
      {
        val = (int) (src[i]*quant_mat[i]*mquant)/16;
        sum+= dst[i] = (val>2047) ? 2047 : ((val<-2048) ? -2048 : val);
      }
      /* mismatch control */
      if ((sum&1)==0)
        dst[63] {circumflex over ( )}=1;
    }
  }
```

Interprocedural Optimizations

Analyzing the loop bodies, it can be seen that they may easily fit to the XPP and do not use the maximum of resources by far. The function is called three times from module putseq.c. With inter-module function inlining, the code for the function call may disappear and may be replaced with the function. Therefore, it may be as follows:

```
for (k=0; k<mb_height*mb_width; k++) {
  if (mbinfo[k].mb_type & MB_INTRA)
    for (j=0; j<block_count; j++)
      if (mpeg1) {
        blocks[k*block_count+j][0] = blocks[k*block_count+j][0]
<<
                                      (3-dc_prec);
        for (i=1; i<64; i++) {
          val = (int)(blocks[k*block_count+j][i] *
          intra_q[i]*mquant)/ 16;
          ...
        }
      }else {
        sum = blocks[k*block_count+j][0] =
        blocks[k*block_count+j][0] <<       (3-dc_prec);
        for (i=1; i<64; i++) {
          val = (int)(blocks[k*block_count+j][i] *
          intra_q[i]*mquant) / 16;
          ...
        }
      }else {
        ...
      }
}
```

Basic Transformations

Since global mpeg1 does not change within the loop, unswitching may move the control statement outside the j loop and may produce two loop nests.

```
    for (k=0; k<mb_height*mb_width; k++) {
      if (mbinfo[k].mb_type & MB_INTRA)
        if (mpeg1)
          for (j=0; j<block_count; j++) {
            blocks[k*block_count+j][0] =
blocks [k*block_count+j][0]<<
                                      (3-
                                      dc_prec);
            for (i=1; i<64; i++) {
              val = (int)(blocks[k*block_count+j][i] *
              intra_q[i]*mquant)/16;
              ...
            }
          }
```

```
        else
          for (j=0; j<block_count; j++) {
            sum = blocks[k*block_count+j][0] =
blocks[k*block_count+j][0] <<    (3-dc_prec);
            for (i=1; i<64; i++) {
              val = (int)(blocks[k*block_count+j][i] *
              intra_q[i]*mquant) /16;
              ...
            }
          }
```

Furthermore, the following transformations may be performed:

A peephole optimization may reduce the divide by 16 to a right shift 4. This may be essential since loop bodies including division for the XPP are not considered.

Idiom recognition may reduce the statement after the "saturation" comment to dst[i]=min(max(val, −2048), 2047).

Increasing Parallelism

It may be desired to increase parallelism. The j-i loop nest is a candidate for unroll-and-jam when the interprocedural value range analysis finds that block_count can only get the values 6, 8, or 12. Therefore, it has a value range [6,12] with the additional attribute to be dividable by 2. Thus, an unroll-and-jam with the factor 2 is applicable (the resource constraints would choose a greater value). Since no loop carried dependencies exist, this transformation is safe.

This is to say that the source code contains a manually peeled first iteration. This peeling has been done because the value calculated for the first block value is completely different from the other iterations, and the control statement in the loop would cause a major performance decrease on traditional processors. Although this does not prevent unroll-and-jam (because there are no dependencies between the peeled off first iteration and the rest of the loop), the transformation must be prepared to handle such cases.

After unroll-and-jam, the source code may be approximately as follows (only one of the nests shown and the peeled first iterations moved in front):

```
for (j=0; j<block_count; j+=2) {
  blocks[k*count+j][0] = blocks[k*count+j][0] << (3-dc prec);
  blocks[k*count+j+1][0] = blocks[k*count+j+1][0] << (3-dc prec);
for (i=1; i<64; i++) {
    val = (int)(blocks[k*count+j][i]*intra_q[i]*mbinfo[k].mquant) >>4;
    /* mismatch control */
    if ((val&1)==0 && val!=0)
      val+= (val>0) ? -1 : 1;
    /* saturation */
    blocks[k*count+j][i] = min(max(val, -2048), 2047);
    val = (int)
    (blocks[k*count+j+1][i]*intra_q[i]*mbinfo[k].mquant) >>4;
    /* mismatch control */
    if ((val&1)==0 && val!=0)
      val+= (val>0) ? -1 : 1;
    /* saturation */
    blocks[k*count+j+1][i] = min(max(val, -2048), 2047);
  }
}
```

Further parallelism can be obtained by index set splitting. Normally used to break dependence cycles in the DDG, it can here be used to split the i-loop in two and let two sub-configurations (sub-configuration is chosen as a working title for configurations that include independent networks that do not interfere) work on distinct blocks of data. Thus, the i loop is split into 2 or more loops which work on different subsets of the data at the same time.

Handling the Data Types

In contrast to the FIR-Filter, edge detector and matrix multiplication benchmarks, which all use data types fitting perfectly to the XPP (it is assumed that the size of int is chosen to be the XPP architecture data bit width, as everything else would not lead to any feasible result), the MPEG2 codec uses all data types commonly used on a processor for desktop applications. Written for the Intel x86 and comparable architectures, it may be assumed that the sizes of char, short, and int are 8, 16, and 32 respectively. Assuming that the XPP has a bit width of 32 precautions should be taken for the smaller data types.

Figure 48:
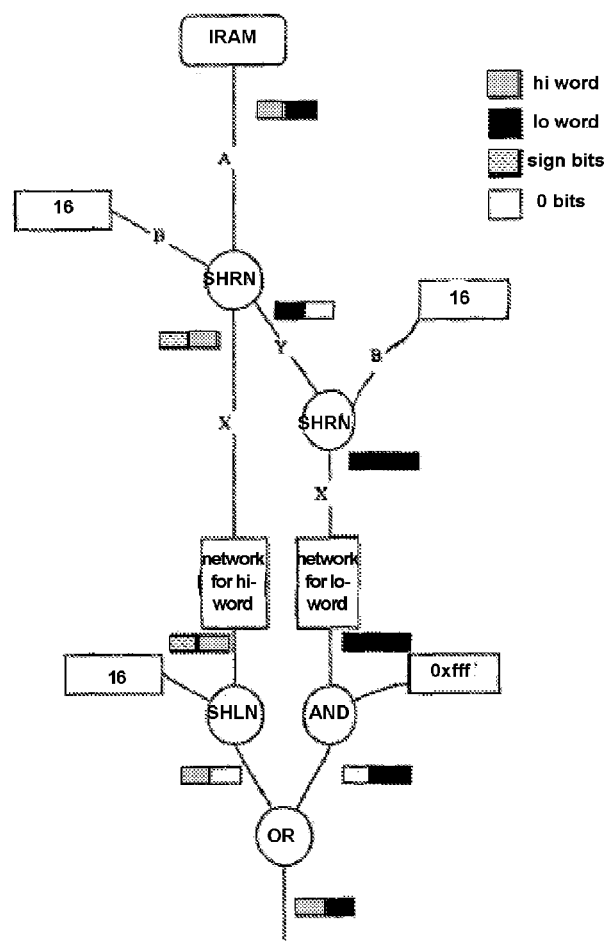
FIG. 48 is a diagram that illustrates how short values are handled, according to an example embodiment of the present invention.

Therefore, the stream of data packets with each packet including 2 or 4 values of the shorter data type may be split into 2 or 4 streams. If enough resources are left, this will cause no performance penalty. Each of the divided streams may be sent to its own calculation network. Therefore, in every cycle, two short or four char values may be handled. Nevertheless, this may cause an area penalty because, besides the split-merge elements, the whole data flow graph has to be duplicated as often as needed. FIG. 48 shows how short values are handled. It shows the splitting of short values into two streams and the merging of the streams after the calculation. The packet is split into its hi and lo part by shift operations and merged behind the calculation branches. The legality of this transformation is the same as with loop unrolling, with an unrolling factor as big as the data type being smaller as the architecture data type.

This, however, is not the end of the pole. It may be further required for the compiler to ensure that every intermediate result which produces an over/under-flow for the shorter data type does the same with the bigger data type. Therefore, it has to insert clipping operations which ensure that the network calculates with real 16 or 8 bit values, respectively.

Figure 49:
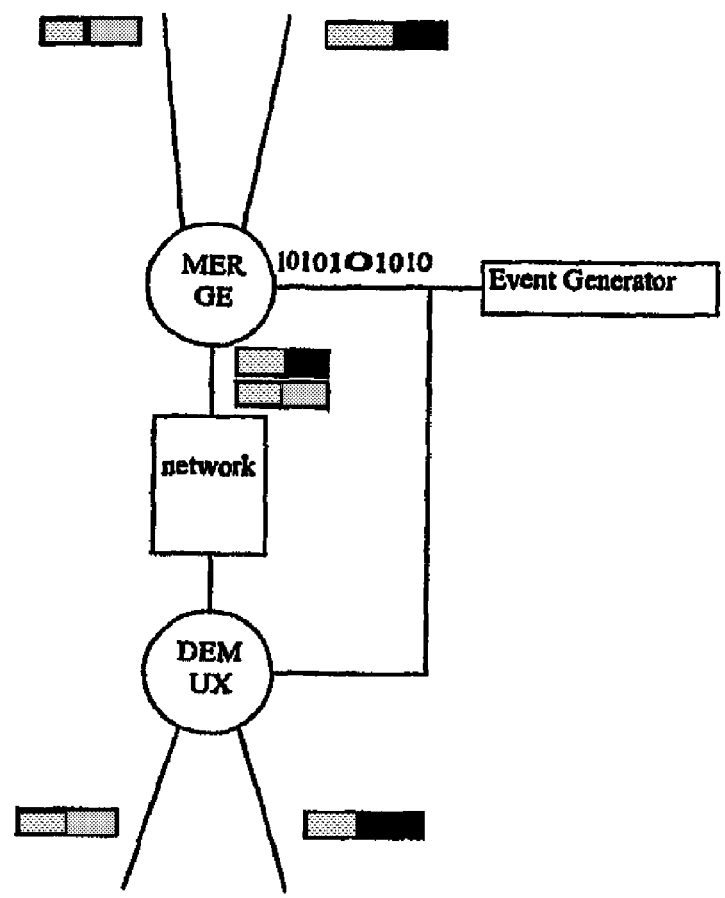
FIG. 49 is a diagram that illustrates how a merge is done, according to an example embodiment of the present invention.

If the configuration size does not allow the whole loop body to be duplicated or dependencies prevent this, there is still a possibility of merging the split values again. This causes a performance penalty to the previous solution, because the throughput is only one (short) value/cycle. FIG. 49 shows how the merge is done. Instead of streaming parallel through two networks, the values are serialized and de-serialized again after the network. The split values are merged before the network. An event generator drives the merge and Demux PAEs. FIG. 49 replaces the two boxes labeled "network" in FIG. 48.

Inverse Discrete Cosine Transformation (idct.c)

The idct-algorithm may be used for the MPEG2 video decompression algorithm. It operates on 8×8 blocks of video images in their frequency representation and transforms them back into their original signal form. The MPEG2 decoder contains a transform-function that calls idct for all blocks of a frequency-transformed picture to restore the original image.

The idct function may include two for-loops. The first loop calls idctrow, and the second calls idctcol. Function inlining is able to eliminate the function calls within the entire loop nest structure so that the numeric code is not interrupted by function calls anymore. In another embodiment, a way to get rid of function calls between the loop nest is loop embedding that pushes loops from the caller into the callee.

Original Code

```
(idct.c)
        /* two dimensional inverse discrete cosine
           transform */
        void idct (block)
        short *block;
        {
            int i;
            for (i=0; i<8; i++)
                idctrow(block+8*i);
            for (i=0; i<8; i++)
                idctcol(block+i);
        }
```

Figure 50:
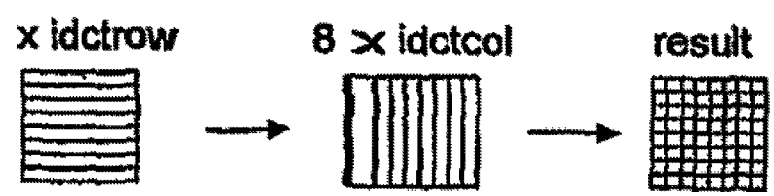
FIG. 50 illustrates a changing of values of a block row by row before processing of columns.

The first loop may change the values of the block row by row. Afterwards, the changed block is further transformed column by column. In this embodiment, all rows have to be finished before any column processing can be started. The function is illustrated in FIG. 50.

Dependency analysis may detect true data dependencies between row processing and column processing. Therefore, it may be required for the processing of the columns to be delayed until all rows are done. The innermost loop bodies idctrow and idctcol are nearly identical. They process numeric calculations on eight input values (column values in case of idctcol and row values in case of idctcol). Eight output values are calculated and written back (as column/row). Idctcol additionally applies clipping before the values are written back. Accordingly, idctcol is presented herein. The code may be as follows:

```
/*      column (vertical) IDCT
 *
 *
 *      dst [ 8 * k ] = sum 1 = 0 7 c [
 *      1 ] * src [ 8 * 1 ] * cos ( pi 8 * ( k +
        1 2 ) * 1 )
 *
 *
 *      where:                          c[0]    =
 *                                              1/1024
 *      c[1 ... 7]                      = (1/1024)
 *                                              *sqrt(2)
 */
static void
idctcol (blk)
short *blk;
{
        int x0, x1, x2, x3, x4, x5, x6, x7, x8;
/* shortcut
*/
if (!    (x1 = (blk[8*4]<<8))) | (x2 = blk[8*6]) |
         (x3 = blk[8*2]) | (x4 = blk[8*1]) | (x5 =
         blk[8*7]) |
         (x6 = blk[8*5]) | (x7 = blk[8*3])))
{
         blk[8*0] = blk[8*1] = blk[8*2] =
         blk[8*3] = blk[8*4] = blk[8*5] =
         blk[8*6] = blk[8*7] = iclp[(blk[8*0] +32)
         >>6];
         return;
}
         x0 = (blk[8*0] <<8) + 8192;
         /* first stage */
         x8 = W7* (x4+x5) + 4;
         x4 = (x8+ (W1–W7) *x4) >>3;
         x5 = (x8– (W1+W7) *x5) >>3;
         x8 = W3* (x6+x7) + 4;
         x6 = (x8– (W3–W5) *x6) >>3;
         x7 = (x8– (W3+W5) *x7) >>3;
         /* second stage */
         x8 = x0 + x1;
         x0 –= x1;
         x1 = W6* (x3+x2) + 4;
         x2 = (x1– (W2+W6) *x2) >>3
         x3 = (x1+ (W2–W6) *x3) >>3;
         x1 = x4 + x6;
         x4 –= x6;
         x6 = x5 + x7;
```

```
            x5 -= x7;
            /* third stage */
            x7 = x8 + x3;
            x8 -= x3;
            x3 = x0 + x2;
            x0 -= x2;
            x2 = (181* (x4+x5) + 128) >>8;
            x4 = (181* (x4-x5) + 128) >>8;
            /* fourth stage */
            blk[8*0] = iclp[(x7+x1) >>14];
            blk[8*1] = iclp[(x3+x2) >>14];
            blk[8*2] = iclp[(x0+x4) >>14];
            blk[8*3] = iclp[(x8+x6) >>14];
            blk[8*4] = iclp[(x8-x6) >>14];
            blk[8*5] = iclp[(x0-x4) >>14];
            blk[8*6] = iclp[(x3-x2) >>14];
            blk[8*7] = iclp[(x7-x1) >>14];
   }
```

W1-W7 are macros for numeric constants that are substituted by the preprocessor. The iclp array is used for clipping the results to 8-bit values. It is fully defined by the init_jdct function before idct is called the first time:

```
            void init_idct( )
            {
              int i;
              iclp = iclip+512;
              for (i= -512; i<512; i++)
                 iclp[i] = (i<-256) ? -256 : ((i>255) ? 255 : i);
            }
```

Figure 51:
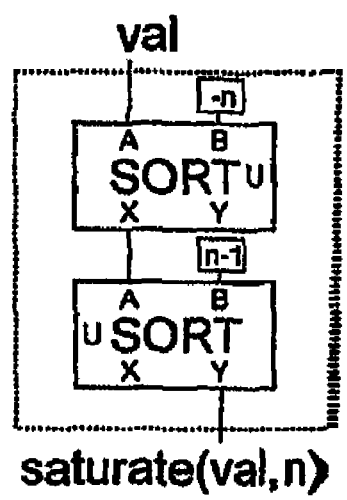
FIG. 51 illustrates a possible implementation for saturate (val,n) as an NML schematic using two ALUs, according to an example embodiment of the present invention.

A special kind of idiom recognition (function recognition) is able to replace the calculation of each array element by a compiler known function that can be realized efficiently on the XPP. If the compiler features whole program memory aliasing analysis, it is able to replace all uses of the iclp array with the call of the compiler known function. Alternatively, a developer can replace the iclp array accesses manually by the compiler known saturation function calls. FIG. 51 shows a possible implementation for saturate (val,n) as an NML schematic using two ALUs. In this case, it is necessary to replace array accesses like iclp[i] with saturate (i,256).

The /*shortcut*/ code in idctcol may speed column processing up if x1 to x7 is zero. This breaks the well-formed structure of the loop nest. The if-condition is not loop invariant and loop unswitching cannot be applied. Nonetheless, the code after shortcut handling is well suited for the XPP. It is possible to synthesize if-conditions for the XPP (speculative processing of both blocks plus selection based on condition) but this would just waste PAEs without any performance benefit. Therefore, the /*shortcut*/ code in idctrow and idctcol has to be removed manually. The code snippet below shows the inlined version of the idctrow-loop with additional cache instructions for XPP control:

```
void idct(block)
short *block;
{
  int i;
  XPPPreload(IDCTROW_CONFIG); // Loop Invariant
  for (i=0; i<8; i++) {
    short *blk;
    int x0, x1, x2, x3, x4, x5, x6, x7, x8;
    blk = block+8*i;
    XPPPreload (0, blk, 8);
    XPPPreloadClean(1,blk,8); //IRAM1 is erased and assigned to blk
    XPPExcute(IDCTROW_CONFIG, IRAM(0); IRAM(1));
  }
  for (i=0; i<8; i++) {
    ...
  }
}
```

As the configuration of the XPP does not change during the loop execution, invariant code motion has moved out XPP-Preload(IDCTROW_CONFIG) from the loop.

NML Code Generation

Data Flow Graph

As idctcol is more complex due to clipping at the end of the calculations, idctcol is well suited as a representative loop body for a presentation of the data flow graph.

Figure 52:
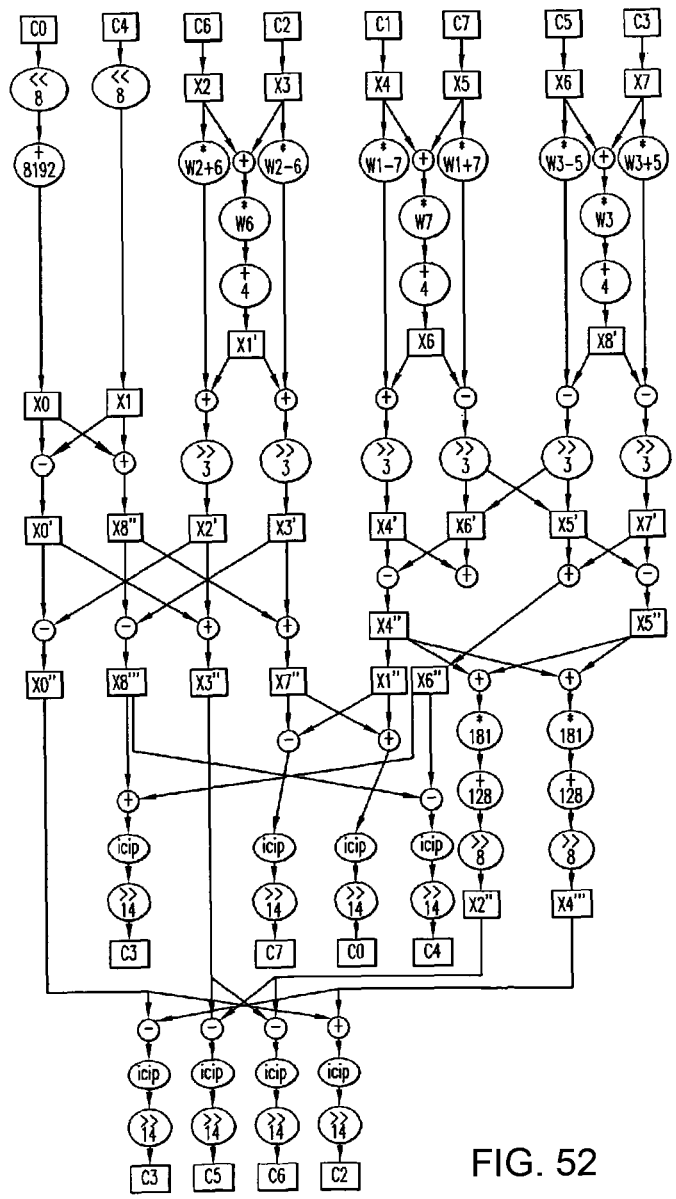
FIG. 52 is a data flow graph for IDCTCOLUMN_CONFIG.

FIG. 52 shows the data flow graph for the IDCTCOLUMN_CONFIG. A heuristic has to be applied to the graph to estimate the resource needs on the XPP. In this example, the heuristic produces the following results:

| | ADD, SUB | MUL | <<X, >>X | Saturate (x, n) |
|---|---|---|---|---|
| Ops needed | 35 | 11 | 18 | 8 |
| | ALUs | FREGs | BREGs | |
| Res. left | 19 | 80 | 45 | |
| Res. avail. | 64 | 80 | 80 | |

The data flow graph fits into an XPP64 and this example may proceed without loop dissevering (splitting the loop body into suitable chunks). See João M. P. Cardoso et al., supra.

Address Generation

To fully synthesize the loop body the problem of address generation for accessing the data must be addressed.

Figure 53:
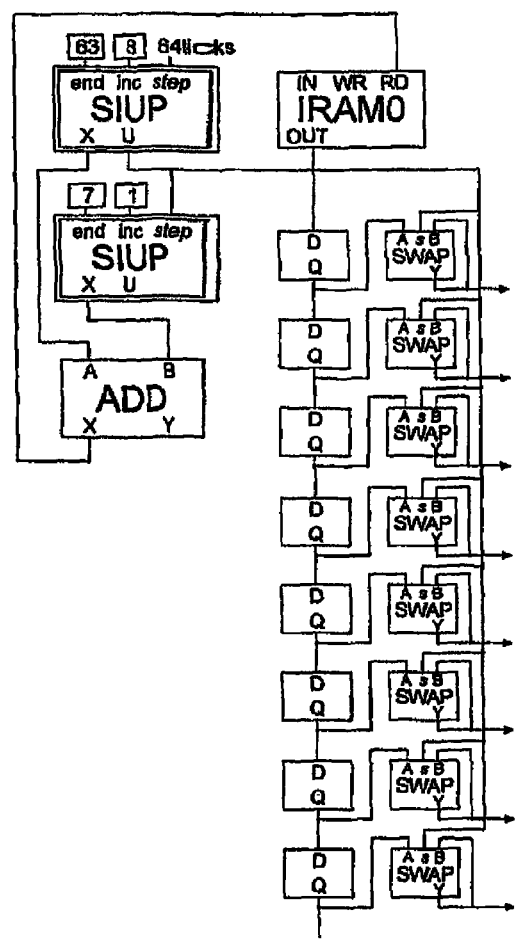
FIG. 53 is a diagram that illustrates use of two counter macros for address generation, according to an example embodiment of the present invention.

For IDCTCOLUMN_CONFIG, the $n^{th}$ element of every row must be selected, which means an address serial of (0, 8, 16 . . . 1, 9, 17 . . . 7, 15, 23 . . . ). Two counter macros may be used for address generation as shown in FIG. 53. The upper counter increments by eight and the lower counter increments by one. The IRAM output is passed to the data flow graph of IDCTCOLUMN. If all (eight) row elements of a column are available, SWAP is switched through to the data flow graph input and the calculation for a new column begins.

For the IDCTROW_CONFIG, the address generation is very simple as the IRAM already has the block in the appropriate order (row after row as it has to be accessed). Again, by using SIUP (stepped iterative up)-counter macros as described in the XPP tutorial, it is possible to map linear address expressions to NML-code in a generic way. As IDCTROW_CONFIG accesses a two-dimensional array, two SIUP-counters may be needed in the corresponding NML code. The column-elements have to be accessed row after row so the upper counter's increment is one and the lower counter's increment is eight. However, the NML code for this access pattern (0 . . . 5, 6, 7, 8, 9 . . . 63) can be reduced to one single counter (or to FIFO-mode IRAM access).

Address generation for write access may be implemented in the same manner. The resources have to be updated to take this additional code into account. It takes 2*(8+8+2*1) FREGs and 2*(2+1) more BREGs in the worst case, which is still available on the XPP.

If IRAM use is not critical, it is also possible to distribute the data on several IRAMs to improve the memory throughput into the XPP-array. This task may be done by the RISC-core or by a more sophisticated XPP-cache controller.

Further Enhancing XPP Utilization

As mentioned above, idct is called for all data blocks of a video image (loop in transform.c). This circumstance may allow for improvement of the XPP utilization.

When looking at the data flow graph of idctcol in detail, it can be seen that it forms a very deep pipeline. Considering that the IDCTROW_CONFIG runs only eight times on the XPP, which means that only 64 (8 times 8 elements of a column) elements are processed through this pipeline, and that change from the XPP configuration to the IDCTCOLUMN_CONFIG configuration to go on with column processing must wait until all data has left the pipeline, this example is suboptimal.

Problem (Pipeline Depth)

Figure 54:
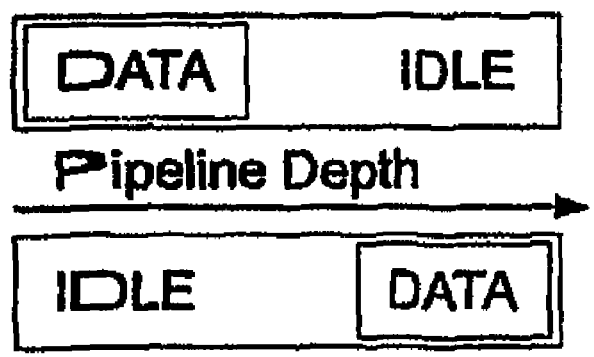
FIG. 54 is a diagram that illustrates an idling of units of a deep pipeline.

The pipeline is just too deep for processing only eight times eight rows. Filling and flushing a deep pipeline is expensive if only little data is processed with it. First the units at the end of the pipeline are idle and then the units at the beginning are unused, as shown in FIG. 54.

Solution (Loop Tiling)

It is profitable to use loop interchange for moving the dependencies between row and column processing to an outer level of the loop nest. The loop that calls the idct-function (in transform.c) on several blocks of the image has no loop interchange preventing dependencies. Therefore, this loop can be moved inside the loops of column and row processing, as shown in FIG. 55.

Now the processing of rows and columns can be applied on more data (by applying loop tiling). Therefore, filling and flushing the pipeline can be neglected.

Constraints (Cache Sensitive Loop Tiling)

The caching hierarchy has to be taken into account when defining the number of blocks that will be processed by the IDCTROW_CONFIG. As discussed above, the same blocks are needed in the subsequent IDCTCOLUMN_CONFIG configuration. It should be ensured that all blocks that are processed during IDCTROW_CONFIG fit into the cache. Loop tiling has to be applied with respect to the cache size so that the processed data fits into the cache.

IRAM Reuse Between Different Configurations

Figure 56:
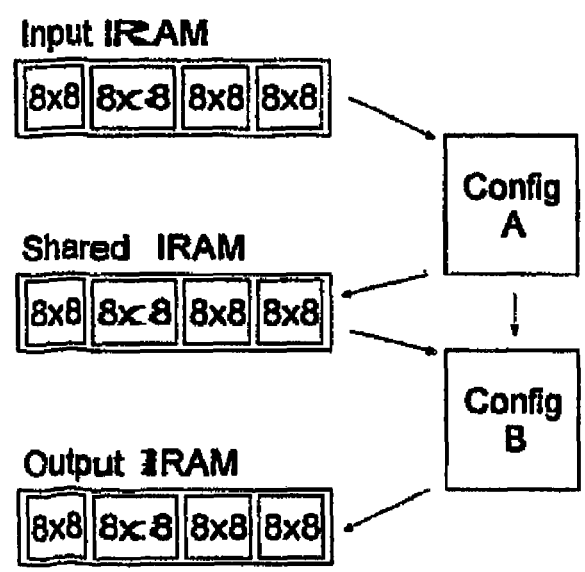
FIG. 56 illustrates use of output IRAM of Config A as input IRAM of Config B to bypass a memory interface for bandwidth optimization, according to an example embodiment of the present invention.

This example implies another bandwidth optimization that is just another version of loop tiling. Instead of transferring data from row processing to column processing via the memory hierarchy (cache sensitive loop tiling takes care that only the cache memory is accessed), the memory interface can be completely bypassed by using the output IRAM of Config A as input IRAM of Config B, as shown in FIG. 56.

Putting all Together

If we apply cache sensitive loop tiling, IRAM reuse, and function in-lining, the example can be further optimized.

Finally, the idct-function becomes completely inlined in transform.c. If block_count is, e.g., 6 and it is assumed that 64*6 words do not exceed the cache size, then the example may be transformed to:

```
// transform.c
..
block = blocks [k* 6];
XPPPreload(IDCTROW_CONFIG);
XPPPreload(0,block,64*6); //IRAM0 gets 64 words from 6 blocks
XPPPreloadClean(1,block,64*6); //erase IRAM1 and assign to the 6 blocks
XPPExecute(IDCTROW_CONFIG, IRAM(0), IRAM(1));
XPPPreload(IDCOLUMN_CONFIG);
```

-continued

```
XPPPreload(1,block,64 *6 ); //redundant -> will be eliminated
XPPExecute(IDCOLUMN_CONFIG, IRAM(1), IRAM(2));
..
```

Figure 57:
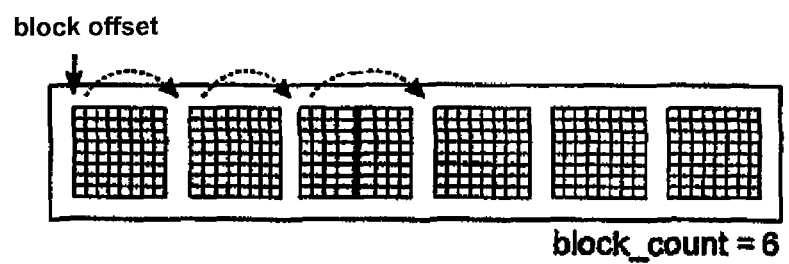
FIG. 57 illustrates block offsets inside tiles generated by a SUIP counter, according to an example embodiment of the present invention.

The address generation in IDCTROW_CONFIG and IDCOLUMN_CONFIG has to be modified for reflecting the different data block size—caused by loop tiling—that has to be processed. This can be implemented by an additional SUM counter that generates the block offsets inside the tiles, as shown in FIG. 57.

The following table provides architectural parameters for IDCTROW_CONFIG and IDCOLUMN_CONFIG of the final result. It relies on a cache that is able to store block_count blocks. As two configurations are executed in this example, the configuration cycles have to be taken twice. Therefore, the total configuration cycles are 2×(block_count× 64+(12+2×8)×2).

| Parameter | Value |
| --- | --- |
| Vector length | 8 words |
| Reused data set size | block_count × 64 words |
| I/O IRAMs | 3 (one shared) |
| ALU | 45 FUs |
| DREG | 41 FUs |
| FREG | 36 FUs |
| Data flow graph width | 8 |
| Data flow graph height | 12 |
| Configuration cycles | block_count × 64 + (12 + 2 * 8) × 2 |

Performance Considerations

In this example, it is possible to exploit high data locality, which means that many operations are performed on a limited memory range. The performance of the XPP solution of this embodiment is compared to a hypothetical superscalar RISC-architecture. An issue width of two is assumed, which means that the RISC executes on average two operations in parallel.

| | Ops for Row/Column | Est. RISC cycles | | |
| --- | --- | --- | --- | --- |
| LD/ST | 16 | 2 | 32 | |
| ADRCOMP | 16 | 1 | 16 | |
| ADD/SUB | 35 | 1 | 35 | |
| MULT | 11 | 2 | 22 | |
| SHIFT | 18 | 1 | 18 | |
| SAT | 8 | 4 | 32 | |
| | Issue Width | 2 | 155 | |
| | Cyc/Row (Col) | | 78 | |
| Proc. Rows | 8 | 620 | | |
| Proc. Cols | 8 | 620 | | |
| | RISC Cyc/Blk | 1240 | | |
| | XPP Cyc/Blk | 128 | | with data duplication + reordering | 24 |
| | Speedup | | 10 | with data duplication + reordering | 52 |

Figure 58:
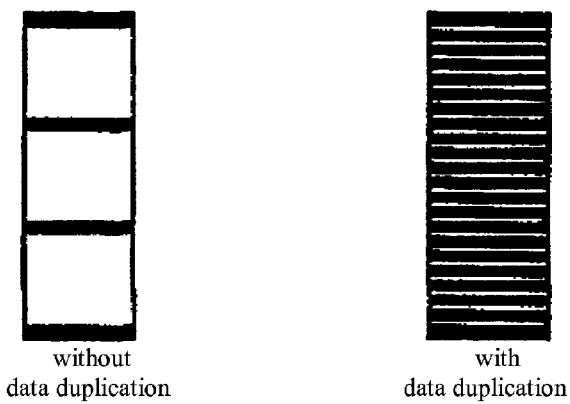
FIG. 58 illustrates a difference in efficiency between an instance where there is no data duplication and instance where there is data duplication according to an example embodiment of the present invention.

Even though speedup is reasonable, fetching the input data from a single IRAM (which means that it is required to feed the eight inputs in eight cycles before processing is started) reduces the potential speedup significantly. In other words, there is a pipeline that is able to process eight input values per cycle, but the pipeline is loaded only every eighth cycle. This causes that only every eighth pipeline stage is filled. FIG. 58 illustrates this.

Full utilization can be achieved only by loading the eight input values of the pipeline in one cycle. A solution to improve the memory throughput to the pipeline is data duplication as described under the heading "Hardware."

Instead of loading the six 8×8 blocks to a single IRAM, in an embodiment of the present invention, the XPPPreload-Multiple command may be used to load the eight IRAMs with the same contents:

```
XPPPreload(0,block,64*6); //IRAM0 gets 64 words from 6 blocks
is changed to:
XPPPreloadMultiple(0xFF,block,64x6) //load RAM0 up to IRAM7 with
blocks
```

Now the pipeline gets fully utilized and eight results per cycle must be stored. This can be achieved by writing every output value to another IRAM, which additionally takes eight more IRAMs. (Using data duplication in this example requires all 16 IRAMs of the XPP64.) For storing the data that is generated with IDCTROW_CONFIG we have to change:

```
XPPPreloadClean(1,block,64*6); //erase IRAM1 and assign to the 6
   blocks
to:
   tmpsize=64*6/8;
   XPPPreloadClean(8, block+0*tmpsize, tmpsize);    //IRAM8 for interm.
Rslt 1
   XPPPreloadClean(9, block+1*tmpsize, tmpsize);    //IRAM9 for interm.
Rslt 1
   XPPPreloadClean(10, block+2*tmpsize, tmpsize); //IRAM 10 for interm.
Rslt 1
   XPPPreloadClean(11, block+3*tmpsize, tmpsize); //IRAM11 for interm.
Rslt 1
   XPPPreloadClean(12, block+4*tmpsize, tmpsize); //IRAM12 for interm.
Rslt 1
   XPPPreloadClean(13, block+5*tmpsize, tmpsize); //IRAM 13 for interm.
Rslt 1
   XPPPreloadClean(14, block+6*tmpsize, tmpsize); //IRAM14 for interm.
Rslt 1
   XPPPreloadClean(15, block+7*tmpsize, tmpsize); //IRAM15 for interm.
Rslt 1
```

Figure 59:
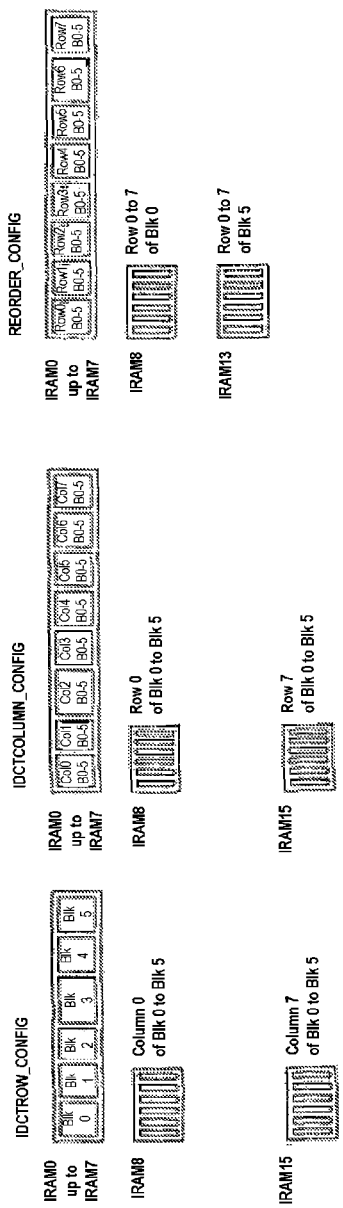
FIG. 59 illustrates IDCTROW_CONFIG, IDCTCOLUMN_CONFIG, and REORDER_CONFIG of an example embodiment of the present invention.

This causes different data layouts for the intermediate results. An additional configuration (REORDER_CONFIG), as shown in FIG. 59, may be needed to restore the original data layout.

Again, address generation has to be modified to fetch eight input values per cycle. This, on the one hand, requires seven additional adders, but, on the other hand, avoids swaps and latches for keeping the data eight cycles.

Data duplication and data reordering may finally transforms the example code to:

```
// transform c
..
block = blocks[k*6];
XPPPreload (IDCTROW_CONFIG);
XPPPreloadMultiple (0xFF, block, 64x6) //load IRAM0 up to IRAM7 with
blocks
tmpsize = 64 * 6/8; //result gets seperated into 8 IRAMs
XPPPreloadClean(8, block+0*tmpsize, tmpsize); // IRAM 8 tmpsize); for
interm. Rslt 1
XPPPreloadClean(9, block+1*tmpsize, tmpsize); // IRAM 9 tmpsize); for
interm. Rslt 1
XPPPreloadClean(10, block+2*tmpsize, tmpsize); // IRAM 10 tmpsize);
for interm. Rslt 1
XPPPreloadClean(11, block+3*tmpsize, tmpsize); // IRAM 11 tmpsize);
for interm. Rslt
1
XPPPreloadClean(12, block+4*tmpsize, tmpsize); // IRAM 12 tmpsize);
for interm. Rslt
1
XPPPreloadClean(13, block+5*tmpsize, tmpsize); // IRAM 13 tmpsize);
for interm. Rslt
1
XPPPreloadClean(14, block+6*tmpsize, tmpsize); // IRAM 14 tmpsize);
for interm. Rslt
1
XPPPreloadClean(15, block+7*tmpsize, tmpsize); // IRAM 15 tmpsize);
for interm. Rslt
1
XPPExecute(IDCTROW_CONFIG, IRAM(0-7), IRAM(8-15));
XPPPreload(IDCOLUMN_CONFIG);
XPPPreloadMultiple (0xFF, block, 64×6) // ld IRAM0-IRAM7 with
interm. Rslt 1
XPPPreloadClean(8, block+0 *tmpsize, tmpsize); // IRAM8 for interm.
Rslt 2
XPPPreloadClean(9, block+1 *tmpsize, tmpsize); // IRAM9 for interm.
Rslt 2
XPPPreloadClean(10, block+2 *tmpsize, tmpsize); // IRAM10 for interm.
Rslt 2
XPPPreloadClean(11, block+3 *tmpsize, tmpsize); // IRAM11 for interm.
Rslt 2
XPPPreloadClean(12, block+4 *tmpsize, tmpsize); // IRAM12 for interm.
Rslt 2
XPPPreloadClean(13, block+5 *tmpsize, tmpsize); // IRAM13 for interm.
Rslt 2
XPPPreloadClean(14, block+6 *tmpsize, tmpsize); // IRAM14 for interm.
Rslt 2
XPPPreloadClean(15, block+7 *tmpsize, tmpsize); // IRAM15 for interm.
Rslt 2
XPPExecute (IDCOLUMN_CONFIG, IRAM(0-7), IRAM(8-15));
XPPPreload(REORDER_CONFIG);
XPPPreloadMultiple(0xFF, block, 64×6) // ld IRAMO-IRAM7 with interm.
Rslt 2
rsltsize = 64; // 64*6/6;
XPPPreloadClean(8, block+0 *rsltsize, rsltsize); // IRAM8 for final Rslt
XPPPreloadClean(9, block+1 *rsltsize, rsltsize); // IRAM9 for final Rslt
XPPPreloadClean(10, block+2 *rsltsize, rsltsize); // IRAM10 for final Rslt
XPPPreloadClean(11, block+3 *rsltsize, rsltsize); // IRAM11 for final Rslt
XPPPreloadClean(12, block+4 *rsltsize, rsltsize); // IRAM12 for final Rslt
XPPPreloadClean(13, block+4 *rsltsize, rsltsize); // IRAM13 for final Rslt
XPPExecute(IDCOLUMN_CONFIG, IRAM(0-7), IRAM(8-13));
Wavelet
void
forward wavelet( )
{
    int i, nt, *dmid;
    int *sp, *dp, d_tmp0, d_tmp1, d_tmpi, s_tmp0,
  s_tmp1;
    int mid, ii;
    int *x;
    int s[256], d[256];
    for (nt=COL; nt>=BLOCK_SIZE; nt>>=1) {
    for (i=0; i<nt*COL/*tmp_nt*/; i+=COL) {
    x = &int_data[i];
    mid=(nt>>1)-1;
    s[0] = x[0]
    d[0] = x[ROW];
    s[1] = x[2];
    s[mid] = x[2*mid];
    d[mid] = x[2*mid+ROW];
    d[0] = (d[0]<<1-s[0]-s[1];
    s[0] = s[0]+(d[0[>>2);
    d_tmp0 = d[0];
    s_tmp0 = s[1];
    for (ii=1; ii<mid; ii++) {
    s_tmp1 = x[2*ii+2];
    d_tmp1 = ((x[2*ii+ROW])<<1) − s_tmp0 − s_tmp1;
    d[ii] = dtmp1;
    s[ii] = s_tmp0+((d_tmp0+d_tmp1)>>3);
    d_tmp0 = d_tmp1;
    s_tmp0 = s_tmp1;
    }
    d[mid] = (d[mid]−s[mid])<<1;
    s[mid] = s[mid]+((d[mid−1]+d[mid])>>3);
```

```
for (ii=0; ii<=mid; ii==) {
  x[ii] = s [ii];
  x[ii+mid+1] = d[ii];
  }
}
for (i=0; i<nt; i++) {
  x = &int_data[i];
  mid = (nt>>1)-1;
  s[0] = x[0];
  d[0] = x[COL];
  s[1] = x[COL<<1];
  s[mid] = x[(COL<<1)*mid];
  d[mid] = x[(COL<<1)*mid +COL];
  d[0] = d[0]<<1)-s[0]-s[1];
  s[0] = s[0]+(d[0]>>2);
  d_tmp0 = d[0];
  s_tmp0 = s[1];
  for (ii=1; ii<mid; ii++) {
    s_tmp1 = x[2*COL*(ii+1)];
    d_tmp1 = (x[2*COL*ii+COL]<<1)-s_tmp0-s_tmp1;
    d[ii] = d_tmp1;
    s[ii] = s_tmp0+((d_tmp0+d_tmp1)>>3);
    d_tmp0 = d_tmp1;
    s_tmp0 = s_tmp1;
  }
  d[mid] = (d[mid]<<1)-(s[mid]<<1);
  s[mid] = s[mid]+((d[mid-1]+d[mid])>>3);
  for (ii=0; ii<=mid; ii++) {
    x[ii*COL] = s[ii];
    x[(ii+mid+1)*COL] = d[ii];
  }
  }
  }
 }
}
```

Original Code

Optimizing the Whole Loop Nest

After pre-processing and application of copy propagation over s_tmp1, d_tmp1, the following loop nest may be obtained:

```
void forward_wavelet( )
{
  int i, nt, *dmid;
  int *sp, *dp, d_tmp0, d_tmp1, d_tmpi, s_tmp0, s_tmp1;
  int mid, ii;
  int *x;
  int s[256], d[256];
  for (nt=64; nt>=16; nt>>=1) {
    for (i=0; i<nt*64; i+=64) {
      x = &int_data[i];
      mid = (nt>>1)-1;
      s[0] = x[0];
      d[0] = x[1];
      s[1] = x[2];
      s[mid] = x[2*mid];
      d[mid] = x[2*mid+1];
      d[0] = (d[0]<<1)-s[0]-s[1];
      s[0] = s[0]+(d[0]>>2);
      d_tmp0 = d[0];
      s_tmp0 = s[1];
      for (ii=1; ii<mid; ii++) {
        d[ii] = ((x[2*ii+1])<<1) - s_tmp0 - x[2*ii+2];
        s[ii] = s_tmp0 + ((d_tmp0 + d[ii])>>3);
        d_tmp0 = d[ii];
        s_tmp0 = s[ii];
      }
      d[mid] = (d[mid]-s[mid])<<1;
      s[mid] = s[mid]+((d[mid-1]+d[mid])>>3);
      for (ii=0; ii<=mid; ii++) {
        x[ii] = s[ii];
        x[ii+mid+1] = d[ii];
      }
    }
  }
}
```

```
for (i=0; i<nt; i++) {
  x = &int_data[i];
  mid = (nt>>1)-1;
  s[0] = x[0];
  d[0] = x[64];
  s[1] = x[128];
  s[mid] = x[128*mid];
  d[mid] = x[128*mid+64];
  d[0] = (d[0]<<1)-s[0]-s[1];
  s[0] = s[0]+(d[0]>>2);
  d_tmp0 = d[0];
  s_tmp0 = s[1];
  for (ii=1; ii<mid; ii++) {
    d[ii] = (x[128*ii+64]<<1) - s_tmp0 - x[128*(ii+1)];
    s[ii] = s_tmp0 + ((d_tmp0 + d[ii])>>3);
    d_tmp0 = d[ii];
    s_tmp0 = s[ii];
  }
  d[mid] = (d[mid]<<1) - (s[mid]<<1);
  s[mid] = s[mid] + ((d[mid-1]+d[mid])>>3);
  for (ii=0; ii<=mid; ii++) {
    x[ii*64] = s[ii];
    x[(ii+mid+1)*64] = d[ii];
  }
  }
  }
 }
}
```

Below is a table for each innermost loop. The tables for the first and the third loops are identical, as are the tables for the second and the fourth loops. Accordingly, 2 tables are presented below.

| Parameter | Value |
| --- | --- |
| Vector length | mid-2 |
| Reused data set size | — |
| I/O IRAMs | 6 |
| ALU | 6 |
| BREG | 0 |
| FREG | 2 |
| Data flow graph width | 2 |
| Data flow graph height | 6 |
| Configuration cycles | 6 + (mid-2) |
| Vector length | mid |
| Reused data set size | — |
| I/O IRAMs | 6 |
| ALU | 0 |
| BREG | 0 |
| FREG | 0 |
| Data flow graph width | 2 |
| Data flow graph height | 1 |
| Configuration cycles | mid |

The two inner loops do not have the same iteration range and could be candidates for loop fusion. Therefore, the first and last iterations of the second loop may be peeled off. The surrounding code between the 2 loops can be moved to after the second loop. Accordingly, the following code for the loop nest may be obtained.

```
for (nt=64; nt>=16; nt>>=1) {
  for (i=0; i<nt*64; i+=64) {
    x = &int_data[i];
    mid = (nt>>1)-1;
    s[0] = x[0];
    d[0] = x[1];
    s[1] = x[2];
    s[mid] = x[2*mid];
    d[mid] = x[2*mid+1];
    d[0] = (d[0]<<1)-s[0]-s[1];
    s[0] = s[0]+(d[0]>>2);
```

-continued

```
        d_tmp0 = d[0]
        s_tmp0 = s[1];
        for (ii=1; ii<mid; ii++) {
            d[ii] = ((x[2*ii+1])<<1) - s_tmp0 - x[2*ii+2];
            s[ii] = s_tmp0+((d_tmp0 + d[ii])>>3);
            d_tmp0 = d[ii];
            s_tmp0 = s[ii];
        }
        for (ii=1; ii<mid; ii++) (
            x[ii] = s[ii];
            x[ii+mid+1] = d[ii];
        }
        d[mid] = (d[mid]-s[mid])<<1;
        s[mid] = s[mid] + ((d[mid-1]+d[mid])>>3);
        x[0] = s[0];
        x[mid+1] = d[0];
        x[mid] = s[mid];
        x[2*mid+1] = d[mid];
    }
    for (i=0; i<nt; i++) {
        x = &int_data[i];
        mid = (nt>>1)-1;
        s[0] = x[0];
        d[0] = x[64];
        s[1] = x[128];
        s[mid] = x[128*mid];
        d[mid] = x[128*mid +64];
        d [0] = (d[0]<<1)-s[0]-s[1];
        s[0] = s[0]+(d[0]>>2);
        d_tmp0 = d[0];
        s_tmp0 = s[1];
        for (ii=1; ii<mid; ii++) {
            d[ii] = (x[128*ii+64]<<1) - s_tmp0 - x[128*(ii+1)];
            s[ii] = s_tmp0 + ((d_tmp0+d_tmp1)>>3);
            d_tmp0 = d[ii];
            s_tmp0 = s[ii];
        }
        for (ii=1; ii<mid; ii++) {
            x[ii*64] = s[ii];
            x[(ii+mid+1)*64] = d[ii];
        }
        d[mid] = (d[mid]<<1) - (s[mid]<<1);
        s[mid] = s[mid] + ((d[mid-1]+d[mid])>>3);
        x[0] = s[0];
        x[(mid+1)*64] = d[0];
        x[mid*64] = s[mid];
        x[(2*mid+1)*64] = d[mid];
    }
}
```

After loop peeling, the only change with respect to the parameters is the vector length. Accordingly, the tables are changed to the following:

| Parameter | Value |
| --- | --- |
| Vector length | mid-2 |
| Reused data set size | — |
| I/O IRAMs | 6 |
| ALU | 2 |
| BREG | 0 |
| FREG | 2 |
| Data flow graph width | 2 |
| Data flow graph height | 6 |
| Configuration cycles | 6 + (mid-2) |
| Vector length | mid-2 |
| Reused data set size | — |
| I/O IRAMs | 6 |
| ALU | 0 |
| BREG | 0 |
| FREG | 0 |
| Data flow graph width | 2 |
| Data flow graph height | 1 |
| Configuration cycles | mid-2 |

The fusion of the inner loops is legal as there would be no loop-carried dependencies between the instructions formerly in the second loop and the instructions formerly in the first loop. The following loop nest may be obtained.

```
for (nt=64; nt>=16; nt>>=1) {
    for (i=0; i<nt*64; /*tmp_nt*/; i+=64) {
        x = &int_data[i];
        mid = (nt>>1)-1;
        s[0] = x[0];
        d[0] = x[1];
        s[1] = x[2];
        s[mid] = x[2*mid];
        d[mid] = x[2*mid+1];
        d[0] = (d[0]<<1)-s[0]-s[1];
        s[0] = s[0]+(d[0]>>2);
        d_tmp0 = d[0];
        s_tmp0 = s[1];
        for (ii=1; ii<mid; ii++) {
            d[ii] = ((x[2*ii+1])<<1) - s_tmp0 - x[2*ii+2];
            s[ii] = s_tmp0 + ((d tmp0+d[ii])>>3);
            d_tmp0 = d[ii];
            s_tmp0 = s[ii];
            x[ii+mid+1] = d[ii];
        }
        d[mid] = (d[mid]-s[mid])<<1;
        s[mid] = s[mid]+ ((d[mid-1]+d[mid])>>3);
        x[0] = s[0];
        x[mid+1] = d[0];
        x[mid] = s[mid];
        x[2*mid+1] = d[mid];
    }
    for (i=0; i<nt; i++) {
        x = &int_data[i];
        mid = (nt>>1)-1;
        s[0] = x[0];
        d[0] = x[64];
        s[1] = x[128];
        s[mid] = x[128*mid];
        d[mid] = x[128*mid+64];
        d[0] = (d[0]<<1)-s[0]-s[1];
        s[0] = s[0]+(d[0]>>2);
        d_tmp0 = d[0];
        s_tmp0 = s[1];
        for (ii=1; ii<mid; ii++) {
            d[ii] = (x[128*ii+64]<<1) - s_tmp0 - x[128*(ii+1)];
            s[ii] = s_tmp0 + ((d_tmp0 + d[ii])>>3);
            d_tmp0 = d[ii];
            s_tmp0 = s[ii];
            x[ii*64] = s[ii];
            x[(ii+mid+1)*64] = d[ii];
        }
        d[mid] = (d[mid]<<1)-(s[mid]<<1);
        s[mid] = s[mid]+((d[mid-1]+d[mid])>>3);
        x[0] = s[0];
        x[(mid+1)*64] = d[0];
        x[mid*64] = s[mid];
        x[(2*mid+1)*64] = d[mid];
    }
}
```

After loop fusion, there are only two loops, and they have the following same parameter table.

| Parameter | Value |
| --- | --- |
| Vector length | mid-2 |
| Reused data set size | — |
| I/O IRAMs | 8 |
| ALU | 6 |
| BREG | 0 |
| FREG | 2 |
| Data flow graph width | 2 |
| Data flow graph height | 6 |
| Configuration cycles | 6 + (mid-2) |

When performing value range analysis, the compiler finds that nt ranges take the values 64, 32, and 16. The upper bound of the inner loops is mid, which depends on the value of nt.

The analysis finds then that mid can take the values 31, 15, and 7. Loops with constant loop bounds can be handled more efficiently on the PACT XPP. This means that the inner loops can be better optimized if mid is replaced by a constant value. This will happen when the outer loop is unrolled. This way, a larger set of code will be obtained, but with 3 instances of the loop nest, each being a candidate for a configuration. This can be seen as a kind of temporal partitioning. Thus, the outer loop is completely unrolled giving six new loop nests.

```
for (i=0; i<4096; i+=64) { /*nt=64*/
    x = &int_data[i];
    mid=31;
    s[0] = x[0];
    d[0] = x[1];
    s[1] = x[2];
    s[31] = x[61];
    d[31] = x[63];
    d[0] = (d[0]<<1)-s[0]-s[1];
    s[0] = s[0]+(d[0]>>2);
    d_tmp0 = d[0];
    s_tmp0 = s[1];
    for (ii=1; ii<31; ii++) {
        d[ii] = ((x[2*ii+1])<<1) - s_tmp0 - x[2*ii+2];
        s[ii] = s_tmp0+((d_tmp0 + d[ii])>>3);
        d_tmp0 = d[ii];
        s_tmp0 = s[ii];
        x[ii] = s[ii];
        x[ii+32] = d[ii];
    }
    d[31] = (d[31]-s[31])<<1;
    s[31] = s[31]+((d[30]+d[31])>>3);
    x[0] = s[0];
    x[32] = d[0];
    x[31] = s[31];
    x[63] = d[31];
}
for (i=0; i<64; i++) {
    x = &int_data[i];
    mid = 31;
    s[0] = x[0];
    d[0] = x[64];
    s[1] = x[128];
    s[31] = x[3968];
    d[31] = x[4032];
    d[0] = (d[0]<<1)-s[0]-s[1];
    s[0] = s[0]+(d[0]>>2);
    d_tmp0 = d[0];
    s_tmp0 = s[1];
    for (ii=1; ii<31; ii++) {
        d[ii] = (x[128*ii+64]<<1) - s_tmp0 - x[128*(ii+1)];
        s[ii] = s_tmp0 + ((d_tmp0 +d[ii])>>3);
        d_tmp0 = d[ii];
        s_tmp0 = s[ii];
        x[ii*64] = s[ii];
        x[(ii+32)*64] = d[ii];
    }
    d[31] = (d[31]<<1) - (s[31]<<1);
    s[31] = s[31] + ((d[30]+d[31])>>3);
    x[0] = s[0];
    x[2048] = d[0];
    x[1984] = s[31];
    x[4032] = d[31];
}
for (i=0; i<2048; i+=64) { /*nt =32*/
    x = &int_data[i];
    mid = 15;
    s[0] = x[0];
    d[0] = x[1];
    s[1] = x[2];
    s[15] = x[30];
    d[15] = x[31];
    d[0] = (d[0]<<1)-s[0]-s[1];
    s[0] = s[0]+(d[0]>>2);
    d_tmp0 = d[0];
    s_tmp0 = s[1];
    for (ii=1; ii<15; ii++) {
        d[ii] = ((x[2*ii+1])<<1) - s_tmp0 - x[2*ii+2];
        s[ii] = s_tmp0 + ((d_tmp0+d[ii])>>3);
        d_tmp0 = d[ii];
        s_tmp0 = s[ii];
        x[ii] = s[ii];
        x[ii+16] = d[ii];
    }
    d[15] = (d[15]-s[15])<<1;
    s[15] = s[15]+((d[14]+d[15])>>3);
    x[0] = s[0];
    x[16] = d[0];
    x[15] = s[15];
    x[31] = d[15];
}
for (i=0; i<32; i++) {
    x = &int_data[i];
    mid = 15;
    s[0] = x[0];
    d[0] = x[64];
    s[1] = x[128];
    s[15] = x[1920];
    d[15] = x[1984];
    d[0] = (d[0]<<1)-s[0]-s[1];
    s[0] = s[0]+(d[0]>>2);
    d_tmp0 = d[0];
    s_tmp0 = s[1];
    for (ii=1; ii<15; ii++) {
        d[ii] = (x[128*ii+64]<<1) - s_tmp0 - x[128*(ii+1)];
        s[ii] = s_tmp0 + ((d_tmp0+d[ii])>>3);
        d_tmp0 = d[ii];
        s_tmp0 = s[ii];
        x[ii*64] = s[ii];
        x[(ii+16)*64] = d[ii];
    }
    d[15] = (d[15]<<1)-(s[15]<<1);
    x[0] = s[0];
    x[1024] = d[0];
    x[960] = s[15];
    x[1984] = d[15];
}
for (i=0; i<1024; i+=64) { /*nt =16*/
    x = &int_data[i];
    mid = 7;
    s[0] = x[0];
    d[0] = x[1];
    s[1] = x[2];
    s[7] = x[14];
    d[7] = x[15];
    d[0] = (d[0]<<1)-s[0]-s[1];
    s[0] = s[0]+(d[0]>>2);
    d_tmp0 = d[0];
    s_tmp0 = s[1];
    for (ii=1; ii<7; ii++) {
        d[ii] = ((x[2*ii+1])<<1) - s_tmp0 - x[2*ii+2];
        s[ii] = s_tmp0+((d_tmp0+d[ii])>>3);
        d_tmp0 = d[ii];
        s_tmp0 = s[ii];
        x[ii] = s[ii];
        x[ii+8] = d[ii];
    }
    d[7] = (d[7]-s[7])<<1;
    s[7] = s[7]+((d[6]+d[7])>>3);
    x[0] = s[0];
    x[8] = d[0];
    x[7] = s[7];
    x[15] = d[7];
}
for (i=0; i<16; i++) {
    x = &int_data[i];
    mid = 7;
    s[0] = x[0];
    d[0] = x[64];
    s[1] = x[128];
    s[7] = x[896];
    d[7] = x[960];
    d[0] = (d[0]<<1)-s[0]-s[1];
    s[0] = s[0]+(d[0]>>2);
```

-continued

```
        d_tmp0 = d[0];
        s_tmp0 = s[1];
        for (ii=1; ii<7; ii++) {
            d[ii] = (x[128*ii+64]<<1) - s_tmp0 - x[128*(ii+1)];
            s[ii] = s_tmp0 + ((d_tmp0+d[ii])>>3)
            d_tmp0 = d[ii];
            s_tmp0 = s[ii];
            x[ii*64] = s[ii];
            x[(ii+8)*64] = d[ii];
        }
        d[7] = (d[7]<<1) - (s[7]<<1);
        s[7] = s[7] + ((d[6]+d[7])>>3);
        x[0] = s[0];
        x[512] = d[0];
        x[448] = s[7];
        x[960] = d[7];
    }
```

In the parameter table, the vector length is the only value that changes. Below is a parameter table for the first two loops. To deduce the table for the other loops, the vector length has to be set to 14 and 6, respectively.

| Parameter | Value |
| --- | --- |
| Vector length | 30 |
| Reused data set size | — |
| I/O IRAMs | 8 |
| ALU | 6 |
| BRED | 0 |
| FREG | 2 |
| Data flow graph width | 2 |
| Data flow graph height | 6 |
| Configuration cycles | 6 + 30 = 36 |

Optimizing the Inner Loops

The efforts are then concentrated on the six inner loops. They all need 2 input data and 4 output data. 2 more data are needed for the first iteration. Hence, at most, 8 IRAMs are required for the first iteration and 6 for the others. This means that the loops can be unrolled twice, requiring 14 IRAMs for one iteration of the new loop bodies. Below are presented only the unrolled inner loops.

The first loop may be as follows:

```
for (ii=1; ii<31 ; ii=ii+2) {
    d[ii] = ((x[2*ii+1])<<1) - s_tmp0 - x[2*ii+2];
    s[ii] = s_tmp0 + ((d_tmp0+d [ii])>>3);
    d_tmp0 = d[ii];
    s_tmp0 = s[ii];
    x[ii+1] = s[ii];
    x[ii+33] = d[ii];
    d[ii+1] = ((x[2*(ii+1)+1])<<1) - s_tmp0 - x[2*(ii+1)+2];
    s[ii+1] = s_tmp0 + ((d_tmp0+d[ii+1])>>3);
    d_tmp0 = d[ii+1];
    s_tmp0 = s[ii+1];
    x[ii+1] = s[ii+1];
    x[ii+33] = d[ii+1];
}
```

The second loop may be as follows:

```
for (ii=1; ii<31; ii=ii+2) {
    d[ii] = (x[128*ii+64]<<1) - s_tmp0 - x[128*(ii+1)];
    s[ii] = s_tmp0 + ((d_tmp0+d[ii])>>3);
    d_tmp0 = d[ii];
    s_tmp0 = s[ii];
    x[ii*64] = s[ii];
    x[(ii+32)*64] = d[ii];
    d[ii+1] = (x[128*(ii+1)+64]<<1) - s_tmp0 - x[128*(ii+2)];
    s[ii+1] = s_tmp0 + ((d_tmp0+d[ii+1])>>3);
    d_tmp0 = d[ii+1];
    s_tmp0 = s[ii+1];
    x[(ii+1)*64] = s[ii+1];
    x[(ii+33)*64] = d[ii+1];
}
```

The third loop may be as follows:

```
for (ii=1; ii<15; ii=ii+2) {
    d[ii] = ((x[2*ii+1])<<1) - s_tmp0 - x[2*ii+2];
    s[ii] = s_tmp0 + ((d_tmp0+d[ii])>>3);
    d_tmp0 = d[ii];
    s_tmp0 = s[ii];
    x[ii] = s[ii];
    x[ii+16] = d[ii];
    d[ii+1] = ((x[2*(ii+1)+1])<<1) - s_tmp0 - x[2*(ii+1)+2];
    s[ii+1] = s_tmp0 +((d_tmp0+d[ii+1])>>3);
    d_tmp0 = d[ii+1];
    s_tmp0 = s[ii+1];
    x[ii+1] = s[ii+1];
    x[ii+17] = d[ii+1];
}
```

The fourth loop may be as follows:

```
for (ii=1; ii<15; ii=ii+2) {
    d[ii] = (x[128*ii+64]<<1) - s_tmp0 - x[128*(ii+1)];
    s[ii] = s_tmp0 + ((d_tmp0 + d[ii])>>3);
    d_tmp0 = d[ii];
    s_tmp0 = s[ii];
    x[ii*64] = s[ii];
    x[(ii+16)*64] = d[ii];
    d[ii+1] = (x[128*(ii+1)+64]<<1) - s_tmp0 - x[128*(ii+2)];
    s[ii+1] = s_tmp0 + ((d_tmp0+d[ii+1])>>3);
    d_tmp0 = d[ii+1];
    s_tmp0 = s[ii+1];
    x[(ii+1)*64] = s[ii+1];
    x[(ii+17)*64 = d[ii+1];
}
```

The fifth loop may be as follows:

```
for (ii= 1; ii<7; ii=ii+2) {
    d[ii] = ((x[2*ii+1])<<1) - s_tmp0 - x[2*ii+2];
    s[ii] = s_tmp0 + ((d_tmp0+d[ii])>>3);
    d_tmp0 = d[ii];
    s_tmp0 = s[ii];
    x[ii] = s[ii];
    x[ii+8] = d[ii];
    d[ii+1] = ((x[2*(ii+1)+1])<<1) - s_tmp0 - x[2*(ii+1)+2];
    s[ii+1] = s_tmp0 + ((d_tmp0+d[ii+1])>>3);
    d_tmp0 = d[ii+1];
    s_tmp0 = s[ii+1];
    x[ii+1] = s[ii+1];
    x[ii+9] = d[ii+1];
}
```

The sixth loop may be as follows:

```
for (ii=1; ii<7; ii=ii+2) {
    d[ii] = (x[128*ii+64]<<1) - s_tmp0 - x[128*(ii+1)];
    s[ii] = s_tmp0 + ((d_tmp0+d[ii])>>3);
    d_tmp0 = d[ii];
    s_tmp0 = s[ii];
    x[ii*64] = s[ii];
    x[(ii+8)*64] = d[ii];
    d[ii+1] = (x[128*(ii+1)+64]<<1) - s_tmp0 - x[128*(ii+2)];
```

```
    s[ii] = s_tmp0 + ((d_tmp0+d[ii+1])>>3);
    d_tmp0 = d[ii+1];
    s_tmp0 = s[ii+1];
    x[(ii+1)*64] =
    s[ii+1];
    x[(ii+9)*64] = d[ii+1];
}
```

Figure 60:
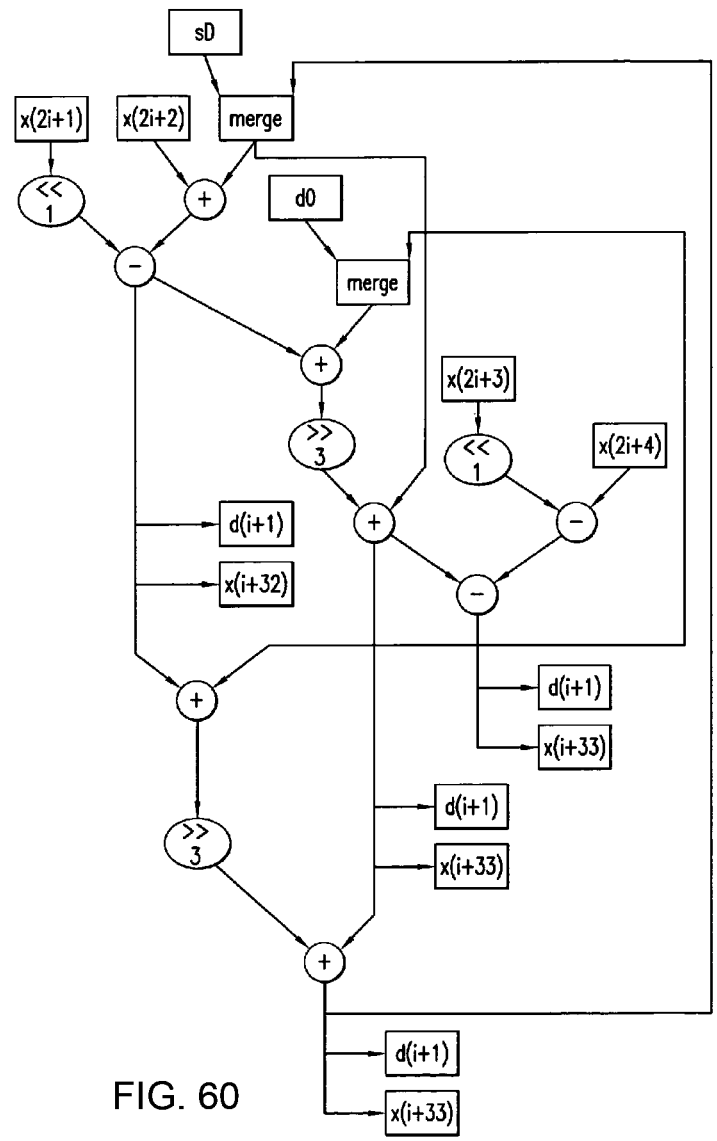
FIG. 60 is a dataflow graph of loop bodies of wavelet after performance of a step of tree balancing, according to an example embodiment of the present invention.

FIG. 60 is a dataflow graph of these loop bodies after a step of tree balancing has been performed. The dataflow graph of FIG. 60 corresponds to the first loop. To obtain the graphs for the other loops, only the input and output data need to be changed.

Each input and output data will occupy an IRAM. d0 and s0 will be the only values in their IRAM, enabling the merge operations to select between d0 and s0 at the first iteration and the feedback values for the other iterations. Once the pipeline is filled, 8 values can be output in a cycle, corresponding to 4 values for array x. The same configuration is used for all loops; only the data in the IRAMs differ. Below are result tables for only the 2 first loops. The tables for the other loops are the same.

For the first two loops, the following table is obtained, and the expected speedup with respect to a standard superscalar processor with 2 instructions issued per cycle is 1 5.3.

| Parameter | Value |
|---|---|
| Vector length | 30 |
| Reused data set size | — |
| I/O IRAMs | 14 |
| ALU | 12 |
| BREG | 0 |
| FREG | 2 |
| Data flow graph width | 2 |
| Data flow graph height | 10 |
| Configuration cycles | 10 + 15 = 25 |
| Ops | Number |
| LD/ST (2 cycles) | 14 |
| ADDRCOMP (1 cycle) | 2 |
| ADD/SUB (1 cycle) | 17 |
| MUL (2 cycles) | 0 |
| SHIFT (1 cycle) | 4 |
| Cycles per iteration | 51 |
| Cycles needed for the loop (2-way) | (51 * 15)/2 = 383 |

Data Processing

In embodiments of the present invention, support is provided for modern technologies of data processing and program execution, such as multi-tasking, multi-threading, hyper-threading, etc.

In embodiments of the present invention, data are inputted into the data processing logic cell fields in response to the execution of a load configuration by the data processing logic cell fields, and/or data are stored from the data processing logic cell fields by executing a store-configuration. Accordingly, it is preferred to provide the load- and/or store-configurations in such a way that the addresses of those memory cells used are directly or indirectly generated within the data processing logic cell fields, the addresses indicating those memory cells and/or locations to which an access has to be effected as a load- and/or store-access, i.e., a read- and/or write-access. By configuring address generators within the configuration it becomes possible to load a plurality of data into the data processing logic cell fields where they can be stored in IRAMs and/or within the internal cells such as EALUs having registers and/or in other dedicated memory and/or storage. The load- or store-configuration, respectively, thus allows for a blockwise and thus almost data-stream-like loading and storing of data, this being in particular much faster than a single access and can be executed prior to or during the execution of one or more data processing—and/or data handling in a data altering manner—configurations processing the preloaded data.

The data loading can take place, provided that that logic cell fields are, as is typically the case, sufficiently large, in small partial areas thereof, while other partial areas are executing other tasks. For example, in other published documents by PACT is discussed a ping-pong-like data processing that relies on memory cells provided on each side of the data processing field. In a first processing step, data stream from the memory on one side through the data processing field to the memory on the other side of the data processing field. The data are stored there as intermediate results while, if necessary, the array is reconfigured. The intermediate results then stream for further processing, etc. Here, a memory strip on one side and/or memory part on one side can be preloaded with data by a load configuration in one array part, while in the memory part on the other side of the logic cell field data are written out using a store-configuration. Such a simultaneous load-/store-way of data processing is possible even without spatial distribution and/or separation of memory areas in which data are retrieved and/or in which data are stored.

It is possible to effect the data loading from a cache and/or into a cache. In one embodiment, the external communication to large memory banks may be handled via a cache controlling unit without having to provide for separate circuitry within the data-processing logic cell field. The access in a writing or reading manner to cache-memory-means typically is very fast and has a small latency (if any). Also, typically a CPU-Unit is, for example, via a load-/store-unit, coupled to the cache so that access to data and an ex-change thereof between the CPU-core and the data processing logic cell fields can be effected quickly, block-wise, and such that not every single datum needs to be transferred via a separate instruction that must be fetched, for example, by the opcode-fetcher of the CPU and processed therein.

This cache-coupling may be much better than the coupling of the data processing logic cell field to the ALU with the CPU via registers, if those registers communicate only via a load-/store-unit with the cache, as is the conventional case.

In an embodiment of the present invention, a further data connection may be provided to and/or from the load-/store-unit of the, or one of the, sequential-CPU-units connected to the data processing logic cell fields and/or their registers.

It is possible to address units via separate input/output ports of the data processing logic cell field, which can in particular be provided as a VPU or XPP, and/or to address the data processing logic cells via one or more multiplexers downstream a single port.

Besides the blockwise and/or streaming and/or random mode access to cache areas in a writing and a reading manner and/or to the load-/store-unit and/or the known connection to the registers of a sequential CPU, in an embodiment of the present invention, a connection is provided to an external mass memory such as a RAM, a hard disc or any other data exchange or input or output port such as an antenna, etc. In an embodiment, separate ports may be provided for the access to several of such units and/or memory means. Suitable drivers, signal conditioning circuitry, and so forth may accordingly be provided. Furthermore, although not exclusively for the handling of a data stream streaming into the data processing logic cell field and/or out of the data processing logic cell fields, the logic cells of the field can include ALUs or EALUs, respectively, which can have at their input and/or output ports short, fine-granularly configurably FPGA-like circuitries, for example, to cut out 4-bit-blocks out of a continuous data stream as is necessary, for example, for an MPEG-4-decoding. This may be advantageous, for example, if a data stream is to be input into the cell and is to be processed or preprocessed without blocking larger PAE-units. In an embodiment of the present invention, the ALU may be provided as an SIMD-ALU. For example, a very broad data word having, for example, a broad 32-bit-data-width may accordingly be split via an FPGA-like stripe in front of the SIMD-ALU into eight data words having, for example, a 0-bit-data-width that can then be processed parallelly in the SIMD-ALU, increasing the overall performance of the system significantly, provided that the respect of applications are needed.

Furthermore, it is noted that when reference is being made to FPGA-like pre- or post structures, it is not absolute necessary to refer to 1-bit-granular devices. Instead, it would be possible to provide finer-granular structures of a, for example, 4-bit, instead of the hyper-fine-granular 1-bit, structures. In other words, the FPGA-like input- and/or output-structures, in front of or data downstream of the ALU-unit. In particular, SIMD-ALU-units may be configurable in such a way that 4-bit-data-words are always processed. It is also possible to provide for a cascading, so that, for example, incoming 32-bit-data-width words are separated into 4-bit parts by 8-bit FPGA-like structures in sequence of each other, then the four 8-bit data words are processed in four FPGA-like 8-bit-width structures, then a second stripe of 8 separate 4-bit-wide FPGA-like structures are provided, and, if necessary, sixteen separate parallel 2-bit FPGA-like structures, for example, are provide. If this is the case, a significant reduction of the overhead compared to a hyper-fine-granular 1-bit FPGA-like structure can be achieved. This may allow for significantly reducing the configuration memory, etc., thus saving on silicon area.

It is noted that many of the coupling advantages may be achieved using data block streams via a cache. However, it is preferred in particular if the cache is built slice-wise and if an access onto several slices, and in particular onto all slices, can take place simultaneously. It may be advantageous if the data processing logic cell field (XPP) and/or the sequential CPU and/or CPUs process a plurality of threads, whether by way of hyper-threading, multi-tasking, and/or multi-threading. It may also be preferable to provide cache-storage with slice access and/or slice access enabling control. For example, every single thread can be assigned a separate slice, thereby allowing that on processing that thread the respective cache areas are accessed on the re-entry of the group of codes to be processed. However, the cache need not necessarily be separated into slices and, even if the cache is separated into slices, not every single thread must be assigned a separate slice, although this may be a highly preferred method. Furthermore, it is to be noted that there may be cases where not all cache areas are used simultaneously or temporarily at a given time. Instead, it is to be expected that in typical data processing applications, such as in hand-held mobile telephones, laptops, cameras, etc., there may be periods during which not the entire cache is needed. Accordingly, it may be highly advantageous that certain cache-areas can be separated from the power source in such a way that the energy consumption is significantly reduced, in particular, close to or exactly to 0. This can be achieved by a power supply separation arrangement adapted to separate cache slices from power. The separation can either be effected by a down-clocking, separation of clock-lines, and/or the overall separation of a power supply. In particular, it may be possible to provide for such a separation for every single cache slice, for example, by an access identification arrangement adapted to identify whether or not a thread, hyper-thread, task, or the like is currently assigned to a respective cache slice. In case the access identification arrangement indicates and/or detects that this is not the case, there may be a separation of slice from a clock-line and/or even the power-line. It is also noted that on repowering-up after a separation from power, it is possible to immediately access the cache area. Thus, no significant delay by switching an ON or OFF of the power is to be expected, as long as the hardware is implemented with current semiconductor technologies.

In embodiments of the present invention, although the transfer of data and/or operands is possible in a block-wise manner, no particular balancing is needed to ensure that exactly the same times of execution of data processing steps in the sequential CPU and the XPP and/or other data processing logic cell fields are achieved. Instead, the processing may frequently be independent, in particular in such a way that the sequential CPU and the data processing logic cell field can be considered as separate resources by a scheduler. This allows for the immediate implementation of known data processing programs splitting technologies such as multi-tasking, multi-threading, and/or hyper-threading. A result of a data path balancing not being necessary is that, for example, in a sequential CPU a number of-pipeline stages may be included, clock frequencies and/or schemes of clocking may be achieved in a different way, etc. It is a particular advantage if asynchronous logic is needed.

In an embodiment of the present invention, by configuring a load- and a store-configuration into the data processing logic cell fields, the data inside the field can be loaded into that field or out of that field which is not controlled by the clock frequency of the CPU, the performance of the opcode fetcher, etc. In other words, the opcode fetcher does not bottle-neck the data throughput to the data logic cell field without having an only loose coupling.

In an example embodiment of the present invention, it is possible to use the known CT or CM (commonly employed in the XPP-unit, also given the fact that with one or more, even hierarchically arranged XPP-fields having in some embodiments their own CTs while simultaneously using one or more sequential CPUs) as a quasi hyper-threading hardware-management unit, which may have the advantage that known technologies, such as FILMO and others, become applicable for the hardware support and management of hyper-threading, etc. It is alternatively possible, in particular in a hierarchical arrangement, to provide the configurations from the opcode-fetcher of a sequential CPU via the coprocessing interface, allowing for instantiation of an XPP and/or data processing logic cell field call by the sequential CPU to effect data processing on the data processing logic cell field. Cache coupling and/or load and/or store configurations providing address generators for loading and/or storing of data into the data processing logic cell field or out of that field may provide for the data exchange of the XPP. In other words, the coprocessor-like coupling to the data processing logic cell field may be enabled while, simultaneously, a data stream-like dataloading is effected via cache- and/or I/O-port coupling.

The method of coprocessor coupling, that is the indicated coupling of the data processing logic cell field, may typically result in the scheduling of the logic cell field taking place on the sequential CPU and/or a supervising scheduler unit and/or a respective scheduler means. In such a case, the threading control and/or management practically takes place on the scheduler and/or the sequential CPU. Although this is possible, this will not necessarily be the case where the easiest implementation of the invention is sought. The data processing logic cell field can be called in a conventional manner, such as has been the case in a standard coprocessor such as a combination of 8086/8087.

In one example embodiment, independent of its configuration, e.g., as a coprocessor interface, the configuration manager acting as scheduler at the same time or in any other way, it is possible to address memory within or in an immediate vicinity of the data processing logic cell fields or under its management, in particular memory within the XPP-architecture, RAM-PAEs, etc. Accordingly, managing internal memories such as a vector register may be advantageous. That is, the data volumes loaded via the load configuration may be stored vector-like in vector registers in the internal-memory-cells, and thereafter said registers may be accessed after loading and/or activating of a new configuration for effecting the actual data processing. (It is noted that a data processing configuration can be referred to as one configuration even in a case where several distinct configurations are to be processed simultaneously, one after the other or in a wave-like modus.)

A vector register can be used to store results and/or intermediate results in the internal or internally managed memory cell elements. The vector register-like accessed memory in the XPP can be used also, after reconfiguration of the processing configuration by loading a store configuration in a suitable manner, in a way that takes place again in a data-stream-like manner, be it via an I/O-port directly streaming data into external memory areas and/or into cache areas or out of these which then can be accessed at a later stage by the sequential CPU and/or other configurations executed on the other data processing logic cell field, particularly in a data processing logic cell field having produced said data in the first place.

In one example embodiment, at least for certain data processing results and/or intermediate results, for the memory and/or memory registers into which the processed data are to be stored, not an internal memory, but instead a cache area having access reservation, particularly cache areas which are organized in a slice-wise manner, can be used. This can have the disadvantage of a larger latency, in particular if the paths between the XPP and/or data processing logic cell fields to or from the cache are of considerable length such that signal transmission delays need to be considered. Still, this may allow for additional store configurations to be avoided. It is also noted that this way of storing data in a cache area becomes, on the one hand, possible by placing the memory into which data are stored physically close to the cache controller and embodying that memory as a cache, but that alternatively and/or additionally the possibility exists to submit a part of a data processing logic cell field memory area or internal memory under the control of one or several cache-memory controller(s), e.g., in the "RAM over PAE" case.

This may be advantageous if the latency in storing the data processing results are to be kept small, while latency in accessing the memory area serving as a quasi-cache to other units will not be too significant in other cases.

In an embodiment of the present invention, the cache controller of the known sequential CPU may address as a cache a memory area that is, without serving for the purpose of data exchange with a data processing logic cell field, physically placed onto that data processing logic cell field and/or close to that field. This may be advantageous in that, if applications are run onto the data processing logic cell fields having a very small local memory need and/or if only few other configurations compared to the overall amount of memory space available are needed, these memory areas can be assigned to one or more sequential CPUs as cache or additional cache. In such a case the cache controller may be adapted for the management of a cache area having a dynamically varying size.

A dynamic cache-size management and/or dynamic cache management size means for the dynamic cache management may take into account the work load on the sequential CPU and/or the data processing logic cell fields. In other words, so as to enable fast reconfiguration (whether by way of wave-reconfiguration or in any other way), how many NOPs in a given time unit are executed on the sequential CPU and/or how many configurations are preloaded in the dynamically reconfigurable field in the memory areas provided therefore may be analyzed. The dynamic cache size or cache size management disclosed herein may be runtime dynamical. That is, the cache controller may control a momentary cache size that can be changed from clock-cycle to clock-cycle or from one group of clock-cycles to another. It is also noted that the access management of a data processing logic cell field with access as internal memory, such as vector register, is possible. While, as discussed above, a configuration management unit can be provided, it is noted that such units and their way of operation, allowing in particular the preloading or configurations not yet needed, can be used very easily to effect the multi-task operation and/or hyper-threading and/or multi-threading, in particular for task- and/or thread- and/or hyper-thread switches. During the runtime of a thread or a task, it is possible to preload configurations for different tasks and/or threads and/or hyper-threads into the PAE-array. This may allows for a preload of configurations for a different task and/or thread if the current thread or task cannot be executed, for example because data are awaited, whether where they have not yet been received, for example due to latencies, or where a resource is blocked by another access. In case of the configuration preloading for a different task or thread, a switch or change becomes possible without the disadvantage of a timing overhead due to the, for example, shadow-like loaded configuration execution.

It is in principle possible to use this technique also in cases where the most likely continuation of an execution is predicted and a prediction is missed. However, this way of operation may be particularly advantageous in cases free of predictions. When using a pure sequential CPU and/or several pure sequential CPUs, the configuration manager thus also acts as and realizes a hyper-threading management hardware. It can be considered as sufficient, in particular in case where the CPU and/or several sequential CPUs have a hyper-threading management, to keep partial circuitry elements such as the FILMO discussed in DE 198 07 872, WO 99/44147, and WO 99/44120. In particular, in an embodiment of the present invention, the configuration manager discussed in these documents with and/or without FILMO may be provided for use with the hyper-threading management for one and/or more purely sequential CPUs with or without coupling to a data processing logic cell field.

It is noted that the plurality of CPUs can be realized with known techniques, for example, such as those discussed DE 102 12 621 and PCT/EP 02/10572. It is also noted that DE 106 51 075, DE 106 54 846, DE 107 04 728, WO 98/26356, WO 98/29952, and WO 98/35299 discuss how to implement sequencers having ring- and/or random-access memory means in data processing logic cell fields.

It is noted that a task-, thread- and/or hyper-thread switch can be effected with the known CT-technology such that performance-slices and/or time-slices are assigned to a software implemented operating system scheduler by the CT, during which slices it is determined which parts of tasks and/or threads are subsequently to be executed provided that resources are available.

The following is an example. First, an address sequence is generated for a first task during which the execution of a load configuration loads data from a cache memory coupled to the data processing logic cell field in the described manner. As soon as the data are present, the execution of a second configuration, the actual data-processing configuration, can be started. This configuration can be preloaded as well since it is certain that this configuration is to be executed provided that no interrupts or the like cause task switches. In conventional processes there is the known problem of the so-called cache-miss, where data are requested that are not yet available in the cache. If such a case occurs in the coupling according to embodiments of the present invention, it is possible to switch over to another thread, hyper-thread and/or task, in particular that has been previously determined as the one to be executed next, in particular by the software implemented operating systems scheduler and/or other hard- and/or software implemented unit operating accordingly, and that has thus been preloaded in an available configuration memory of the data processing logic cell field, in particular preloaded in the background during the execution of another configuration, for example the load configuration which has effected the loading of data that are now awaited.

It is noted that it is possible to provide for separate configuration lines, these being, e.g., separate from communication lines used in the connection of, in particular, the coarse-granular data processing logic cells of the data processing logic cell field. Then, if the configuration to which, due to the task, thread, and/or hyper-thread switch, processing has been switched over has been executed, and in particular has been in the preferable non-dividable, uninterruptable, and hence quasi atomar configuration executed until its end, a further other configuration as predetermined by that scheduler, particularly said operating system-like scheduler, and/or a configuration for which the assigned load configuration has been executed may be executed. Prior to the execution of a processing configuration for which a load configuration has been executed previously, a test can be performed to determine whether or not the respective data have been streamed into the array, e.g., checking if the latency time which typically occurs has lapsed and/or the data are actually present.

In other words, latency times which occur as configurations are not yet preloaded, data have not yet been loaded, and/or data have not yet been stored, are bridged and/or covered by executing threads, hyper-threads, and/or tasks which have been preconfigured and which process data that are already available or can be written to resources that are available for writing thereto. In this way, latency times are covered and/or bridged and, provided a sufficient number of threads, hyper-threads, and/or tasks are to be executed, the data processing logic cell field can have an almost 100% load.

In embodiments of the present invention, it is possible to realize a real time system despite the coupling of the array to a sequential CPU, in particular, while still having a data stream capability. In order to ensure real time capabilities it must be guaranteed that incoming data or interrupts signaling incoming data are reacted upon without exceeding an allowed maximum time. This can be effected by causing a task switch on an interrupt and/or, for example, if the interrupts have a certain priority, by determining that a certain interrupt is currently to be ignored, which has to be determined within a certain time as well. A task switch in such systems capable of real time processing will thus typically be possible in one of three instances, which are when a task has run for a certain time (watch dog-principle), at non-availability of a resource, whether due to a blockade, due to another access, or due to latencies, and/or at the occurrence of interrupts.

A way of implementing one of these variants may ensure the real time capability. In a first alternative, one resource which is under the control of the CT or scheduler switches over to processing the interrupt. If the allowed response time to a certain interrupt is so long that the configuration currently configured can be executed without interruption this is uncritical, particularly in view of that the interrupt handling configuration can be preloaded. The selection of the interrupt handling configuration to be preloaded can be carried out by the CT or in any other way. It is also possible to restrict the runtime of the configuration on the resource to which the interrupt processing has been assigned. Regarding this, see PCT/DE 03/000942.

If the system has to react faster if an interrupt occurs, in one embodiment, a single resource, for example, a separate XPP-unit or parts of a data processing logic cell field, may be reserved for the execution of interrupt handling routines. In this case, it is also possible to preload interrupt handling routines for interrupts that are particularly critical. It is also possible to immediately start loading of an interrupt handling routine once the interrupt occurs. The selection of the configuration necessary for a respective interrupt, can be effected by triggering, wave-processing, etc.

By the methods described, it becomes possible to provide for an instantaneous reaction to the interrupt by using load/store configurations in order to obtain a code-reentrancy. Following every single or every other data processing configuration, for example every five or ten data processing configurations, a store configuration may be executed and then a load configuration accessing the very memory arrays in which data have just been written may be carried out. Then, only that the memory areas used by the store configuration remain untouched has to be ensured until the configuration or group of configurations for which the preloading has been effected has been finished by completely executing a further store configuration. In this way of intermediately carried out load/store configurations and simultaneous protection of not yet overaged store-memory areas, code-reentrancy is generated very easily, for example in compiling a program. Here, resource reservation may be advantageous as well.

Further, in one example embodiment of the present invention, a reaction to an interrupt may include using interrupt routines where code for the data processing logic cell field is forbidden. This embodiment may be particularly suited for an instance where one of the resources available is a sequential CPU. In other words, an interrupt handling routine is executed only on a sequential CPU without calling data processing steps or routines making use of a data processing logic cell field. This may guarantee that the processing on the data processing logic cell field is not interrupted. Then, further processing on the data processing logic cell field can be effected following a task switch. Although the actual interrupt routine does not include any data processing logic cell field code such as XPP-code, it can still be ensured that, at a later time no more relevant to real time processing capabilities, the data processing logic cell field reacts to an interrupt and/or a real time request determined, to state, information and/or data using the data processing logic cell field.

Compiling an HLL Subset Extended by Port Access Functions to an RDFP

The following describes a method, according to an embodiment of the present invention, for compiling a subset of a high-level programming language (HLL), e.g., C or FORTRAN, extended by port access functions to a reconfigurable data-flow processor (RDFP). The program may be transformed to a configuration of the RDFP.

This method can be used as part of an extended compiler for a hybrid architecture including a standard host processor and a reconfigurable data-flow coprocessor. The extended compiler handles a full HLL, e.g., standard ANSI C. It maps suitable program parts, such as inner loops, to the coprocessor and the rest of the program to the host processor. It is also possible to map separate program parts to separate configurations. However, these extensions are not the subject of the discussion below.

Compilation Flow

The compilation method may include a frontend phase, a control/dataflow graph generation phase, and a configuration code phase.

Frontend

The compiler may use a standard frontend which translates the input program, (e.g., a C program) into an internal format including an abstract syntax tree (AST) and symbol tables. The frontend may also perform well-known compiler optimizations, e.g., constant propagation, dead code elimination, common subexpression elimination, etc. For details regarding this, see A. V. Aho, R. Sethi, and J. D. Ullman, "Compilers Principles, Techniques, and Tools," Addison-Wesley 1986. The SURF compiler is an example of a compiler providing such a frontend. Regarding the SURF compiler, see The Stanford SUIT Compiler Group Homepage at http://suif.stanford.edu.

Control/Dataflow Graph Generation

Next, the program may be mapped to a control/dataflow graph (CDFG) including connected RDFP functions. This phase is discussed in more detail below.

Configuration Code Generation

Finally, the last phase may directly translate the CDFG to configuration code used to program the RDFP. For PACT XPP™ Cores, the configuration code may be generated as an NML file.

Configurable Objects and Functionality of an RDFP

A possible implementation of the RDFP architecture is a PACT XPP™ Core. Discussed herein are only the minimum requirements for an RDFP for this compilation method to work. The only data types considered are multi-bit words called data and single-bit control signals called events. Data and events are always processed as packets. See that which is discussed below under the heading "Packet-based Communication Network." Event packets are called 1-events or 0-events, depending on their bit-value.

Configurable Objects and Functions

An RDFP includes an array of configurable objects and a communication network. Each object can be configured to perform certain functions, such as those listed below. It may perform the same function repeatedly until the configuration is changed. The array need not be completely uniform, i.e., not all objects need to be able to perform all functions. For example, a RAM function can be implemented by a specialized RAM object that cannot perform any other functions. It is also possible to combine several objects to a "macro" to realize certain functions. For example, several RAM objects can be combined to obtain a RAM function with larger storage.

Figure 61:
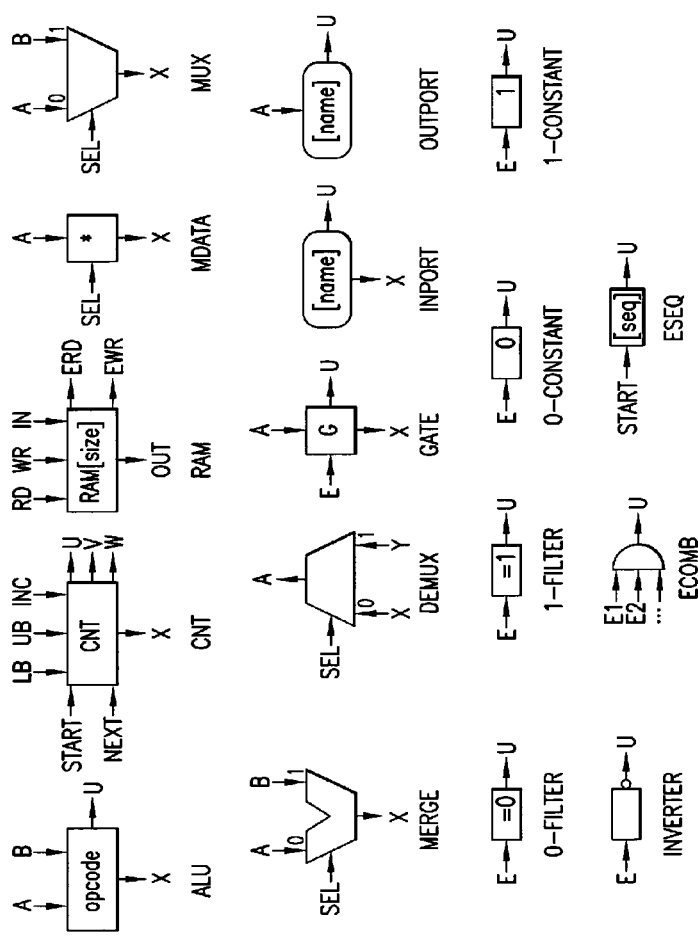
FIG. 61 is a graphical representation of functions for processing data and event packets that can be configured into an RDFP.

FIG. 61 is a graphical representation of functions for processing data and event packets that can be configured into an RDFP. The functions are as follows.

ALU[opcode]: ALUs perform common arithmetic and logical operations on data. ALU functions ("opcodes") must be available for all operations used in the HLL. Otherwise, programs including operations that do not have ALU opcodes in the RDFP must be excluded from the supported HLL subset or substituted by "macros" of existing functions. ALU functions have two data inputs, A and B, and one data output, X. Comparators have an event output U instead of the data output. They produce a 1-event if the comparison is true, and a 0-event otherwise.

CNT: CNT is a counter function which has data inputs, LB, UB, and INC (lower bound, upper bound, and increment), and data output X (counter value). A packet at event input START starts the counter, and event input NEXT causes the generation of the next output value (and output events) or causes the counter to terminate if UB is reached. If NEXT is not connected, the counter may count continuously. The output events U, V, and W have the following functionality. For a counter counting N times, N−1 0-events and one 1-event may be generated at output U. At output V, N 0-events may be generated, and at output W, N 0-events and one 1-event may be created. The 1-event at W is only created after the counter has terminated, i.e., a NEXT event packet was received after the last data packet was output.

RAM[size]: The RAM function may store a fixed number of data words ("size"). It has a data input RD and a data output OUT for reading at address RD. Event output ERD signals completion of the read access. For a write access, data inputs WR and IN (address and value) and data output OUT may be used. Event output EWR signals completion of the write access. ERD and EWR always generate 0-events. Note that external RAM can be handled as RAM functions exactly like internal RAM.

GATE: A GATE may synchronize a data packet at input A and an event packet at input E. When both inputs have arrived, they may both be consumed. The data packet may be copied to output X, and the event packet to output U.

MUX: An MUX function may have 2 data inputs, A and B, an event input, SEL, and a data output, X. If SEL receives a 0-event, input A may be copied to output X, and input B may be discarded. For a 1-event, B may be copied, and A may be discarded.

MERGE: A MERGE function may have 2 data inputs, A and B, an event input SEL, and a data output X. If SEL receives a 0-event, input A may be copied to output X, but input B is not discarded. The packet may be left at the input B instead. For a 1-event, B may be copied and A left at the input.

DEMUX: A DEMUX function may have one data input A, an event input SEL, and two data outputs X and Y. If SEL receives a 0-event, input A may be copied to output X, and no packet is created at output Y. For a 1-event, A may be copied to Y, and no packet is created at output X.

MDATA: A MDATA function may multiplicate data packets. It may have a data input A, an event input SEL, and a data output X. If SEL receives a 1-event, a data packet at A may be consumed and copied to output X. For all subsequent 0-events at SEL, a copy of the input data packet may be produced at the output without consuming new packets at A. Only if another 1-event arrives at SEL, the next data packet at A may be consumed and copied. It is noted that this can be implemented by a MERGE with special properties on XPP™.

INPORT[name]: An IMPORT function may receive data packets from outside the RDFP through input port "name" and may copy them to data output X. If a packet was received, a 0-event may be produced at event output U, too. (It is noted that this function can only be configured at special objects connected to external busses.)

OUTPORT[name]: An OUTPORT function may send data packets received at data input A to the outside of the RDFP through output port "name." If a packet was sent, a 0-event may be produced at event output U, too. (It is noted that this function can only be configured at special objects connected to external busses.)

Additionally, the following functions manipulate only event packets:

0-FILTER, 1-FILTER: A FILTER may have an input E and an output U. A 0-FILTER may copy a 0-event from E to U, but 1-EVENTs at E are discarded. A 1-FILTER may copy 1-events and discard 0-events.

INVERTER: An INVERTER may copy all events from input E to output U, but invert their values.

0-CONSTANT, 1-CONSTANT: 0-CONSTANT may copy all events from input E to output U, but may change them all to value 0. 1-CONSTANT may change them all to value 1.

ECOMB: ECOMB may combine two or more inputs E1, E2, E3 . . . , producing a packet at output U. The output may be a 1-event if and only if one or more of the input packets are 1-events (logical or). A packet must be available at all inputs before an output packet is produced. It is noted that this function may be implemented by the EAND operator on the XPP™.

ESEQ[seq]: An ESEQ may generate a sequence "seq" of events, e.g., "0001," at its output U. If it has an input START, one entire sequence may be generated for each event packet arriving at U. The sequence is only repeated if the next event arrives at U. However, if START is not connected, ESEQ may constantly repeat the sequence.

It is noted that the ALU, MUX, DEMUX, GATE and ECOMB functions may behave like their equivalents in conventional dataflow machines. In this regard, see A. H. Veen, "Dataflow Architecture," *ACM Computing Surveys*, 18(4) (December 1986); and S. J. Allan & A. E. Oldehoeft, "A Flow Analysis Procedure for the Translation of High-Level Languages to a Data Flow Language," *IEEE Transactions on Computers*, C-29(9):826-831 (September 1980).

Packet-Based Communication Network

The communication network of an RDFP can connect outputs of one object, (i.e., its respective function), to the input(s) of one or several other objects. This is usually achieved by busses and switches. By placing the functions properly on the objects, many functions can be connected arbitrarily up to a limit imposed by the device size. As mentioned above, all values may be communicated as packets. A separate communication network may exist for data and event packets. The packets may synchronize the functions as in a dataflow machine with acknowledge. In this regard, see A. H. Veen, supra. That is, the function only executes when all input packets are available (apart from the non-strict exceptions as described above). The function may also stall if the last output packet has not been consumed. Therefore, a data-flow graph mapped to an RDFP may self-synchronize its execution without the need for external control. Only if two or more function outputs (data or event) are connected to the same function input ("N to 1 connection"), is the self-synchronization disabled. It is noted that on XPP™ Cores, an "N to 1 connection" for events is realized by the EOR function, and, for data, by just assigning several outputs to an input. The user has to ensure that only one packet arrives at a time in a correct CDFG. Otherwise, a packet might get lost, and the value resulting from combining two or more packets is undefined. However, a function output can be connected to many function inputs ("1 to N connection") without problems.

There are some special cases:

A function input can be preloaded with a distinct value during configuration. This packet may be consumed like a normal packet coming from another object.

A function input can be defined as constant. In this case, the packet at the input may be reproduced repeatedly for each function execution.

An RDFP may require register delays in the dataflow. Otherwise, very long combinational delays and asynchronous feedback is possible. It is assumed that delays are inserted at the inputs of some functions (like for most ALUs) and in some routing segments of the communication network. It is noted that registers may change the tuning, but not the functionality, of a correct CDFG.

Configuration Generation

Language Definition

The following HLL features are not supported by the method described herein:

pointer operations library calls, operating system calls (including standard I/O functions)

recursive function calls (non-recursive function calls can be eliminated by function in-lining and therefore are not considered herein.)

All scalar data types may be converted to type integer.

Integer values may be equivalent to data packets in the RDFP. Arrays (possibly multi-dimensional) are the only composite data types considered.

The following additional features are supported:

INPORTS and OUTPORTS can be accessed by the HLL functions getstream(name, value) and putstream(name, value), respectively.

Mapping of High-Level Language Constructs

This method may convert an HLL program to a CDFG including the RDFP functions defined in the discussion under the heading "Configurable Objects and Functions." Before the processing starts, all HLL program arrays may be mapped to RDFP RAM functions. An array x may be mapped to RAM RAM(x). If several arrays are mapped to the same RAM, an offset may be assigned, too. The RAMS may be added to an initially empty CDFG. There must be enough RAMS of sufficient size for all program arrays.

The CDFG may be generated by a traversal of the AST of the HLL program. It may process the program statement by statement and descend into the loops and conditional statements as appropriate. The following two pieces of information may be updated at every program point, (which refers to a point between two statements or before the beginning or after the end of a program component such as a loop or a conditional statement), during the traversal:

START may point to an event output of an RDFP function. This output may deliver a 0-event whenever the program execution reaches this program point. At the beginning, a 0-CONSTANT preloaded with an event input may be added to the CDFG. (It may deliver a 0-event immediately after configuration.) START may initially point to its output. This event may be used to start the overall program execution. A START$_{new}$ signal generated after a program part has finished executing may be used as new START signal for the following program parts, or it may signal termination of the entire program. The START events may guarantee that the execution order of the original program is maintained wherever the data dependencies alone are not sufficient. This scheduling scheme may be similar to a one-hot controller for digital hardware.

VARLIST may be a list of {variable, function-output} pairs. The pairs may map integer variables or array elements to a CDFG function's output. The first pair for a variable in VARLIST may contain the output of the function which produces the value of this variable valid at the current program point. New pairs may be always added to the front of VARLIST. The expression VARDEF (var) may refer to the function-output of the first pair with variable var in VARLIST. With respect to this way of using a VARLIST, see D. Galloway, "The transmogrifier C hardware description language and compiler for FPGAs," *Proc. FPGAs for Custom Computing Machines*, IEEE Computer Society Press, 1995, at 136-44.

Below are systematically listed HLL program components and descriptions of how they may be processed, thereby altering the CDFG, START, and VARLIST.

Integer Expressions and Assignments

Straight-line code without array accesses can be directly mapped to a data-flow graph. One ALU may be allocated for each operator in the program. Because of the self-synchronization of the ALUs, no explicit control or scheduling is needed. Therefore processing these assignments does not access or alter START. The data dependencies (as they would be exposed in the DAG representation of the program, in regard to which see A. V. Aho et al., supra) may be analyzed through the processing of VARLIST. These assignments may synchronize themselves through the data-flow. The data-driven execution may automatically exploit the available instruction level parallelism.

All assignments may evaluate the right-hand side (RHS) or source expression. This evaluation may result in a pointer to a CDFG object's output (or pseudo-object as defined below). For integer assignments, the left-hand side (LHS) variable or destination may be combined with the RHS result object to form a new pair {LHS, result(RHS)} which may be added to the front of VARLIST.

For the following examples, C syntax is used. The simplest statement may be a constant assigned to an integer:

$a=5;$

It does not change the CDFG, but adds {a, 5} to the front of VARLIST. The constant 5 is a "pseudo-object" which only holds the value, but does not refer to a CDFG object. Now VARDEF(a) equals 5 at subsequent program points before a is redefined.

Integer assignments can also combine variables already defined and constants:

$b=a*2+3;$

Figure 62:
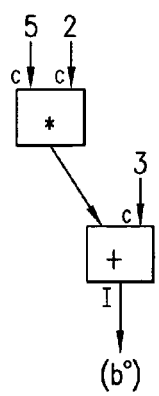
FIGS. 62-76 each illustrates a CDFG according to a respective embodiment of the present invention.

In the AST, the RHS is already converted to an expression tree. This tree may be transformed to a combination of old and new CDFG objects (which are added to the CDFG) as follows. Each operator (internal node) of the tree may be substituted by an ALU with the opcode corresponding to the operator in the tree. If a leaf node is a constant, the ALU's input may be directly connected to that constant. If a leaf node is an integer variable var, it may be looked up in VARLIST, i.e., VARDEF(var) is retrieved. Then VARDEF(var) (an output of an already existing object in CDFG or a constant) may be connected to the ALU's input. The output of the ALU corresponding to the root operator in the expression tree is defined as the result of the RHS. Finally, a new pair {LHS, result(RHS)} may be added to VARLIST. If the two assignments above are processed, the CDFG with two ALUs, as shown in FIG. 62, may be created. It is noted that the input and output names can be deduced from their position. It is further noted that the compiler frontend would normally have substituted the second assignment by b=13 (constant propagation). For the simplicity, no frontend optimizations are considered in this and the following examples. Outputs occurring in VARLIST are labeled by Roman numerals. After these two assignments, VARLIST=[{b, I}, {a, 5}]. (The front of the list is on the left side.) Note that all inputs connected to a constant (whether direct from the expression tree or retrieved from VARLIST) must be defined as constant. Inputs defined as constants have a small c next to the input arrow in FIG. 62.

Conditional Integer Assignments

For conditional if-then-else statements including only integer assignments, objects for condition evaluation may be created first. The object event output indicating the condition result may be kept for choosing the correct branch result later. Next, both branches may be processed in parallel, using separate copies VARLIST1 and VARLIST2 of VARLIST. (VARLIST itself is not changed.) Finally, for all variables added to VARLIST1 or VARLIST2, a new entry for VARLIST may be created (combination phase). The valid definitions from VARLIST1 and VARLIST2 may be combined with a MUX function, and the correct input may be selected by the condition result. For variables only defined in one of the two branches, the multiplexer may use the result retrieved from the original VARLIST for the other branch. If the original VARLIST does not have an entry for this variable, a special "undefined" constant value may be used. However, in a functionally correct program, this value will never be used. As an optimization, only variables live (see A. V. Aho et al., supra) after the if-then-else structure need to be added to VARLIST in the combination phase. A variable is live at a program point if its value is read at a statement reachable from the point without intermediate redefinition.

Consider the above with respect to the following example:

```
i = 7;
a = 3;
if (i < 10){
    a = 5;
    c = 7;
}
else{
    c = a -1;
    d = 0;
}
```

Figure 63:
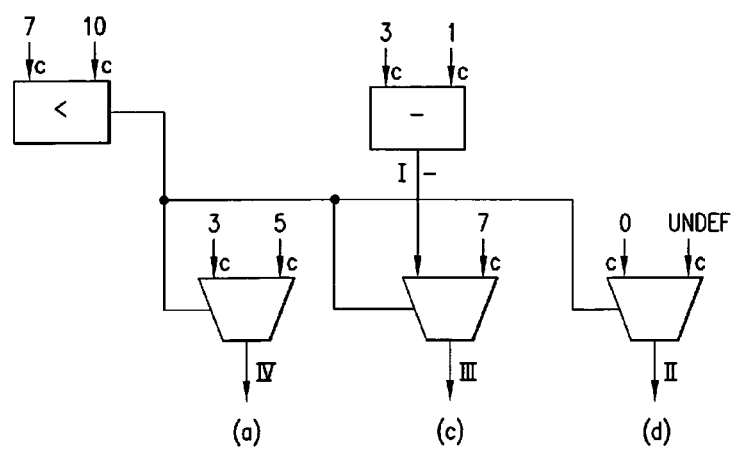

For this example, FIG. 63 shows the resulting CDFG. Before the if-then-else construct, VARLIST=[{a, 3}, {i, 7}]. After processing the branches, for the then branch, VARLIST1=[{c, 7}, {a, 5}, {a, 3}, {i, 7}], and for the else branch, VARLIS72=[{d, 0}, {c, I}, {a, 3}, {i, 7}]. After combination, VARLIST=[{d, II}, {c, III}, {a, IV}, {a, 3}, {i, 7}].

Note that case- or switch-statements can be processed, too, since they can be converted, without loss of generality, to nested if-then-else statements.

Processing conditional statements this way does not require explicit control and does not change START. Both branches may be executed in parallel and synchronized by the dataflow. It is possible to pipeline the dataflow for optimal throughput.

General Conditional Statements

Figure 64:
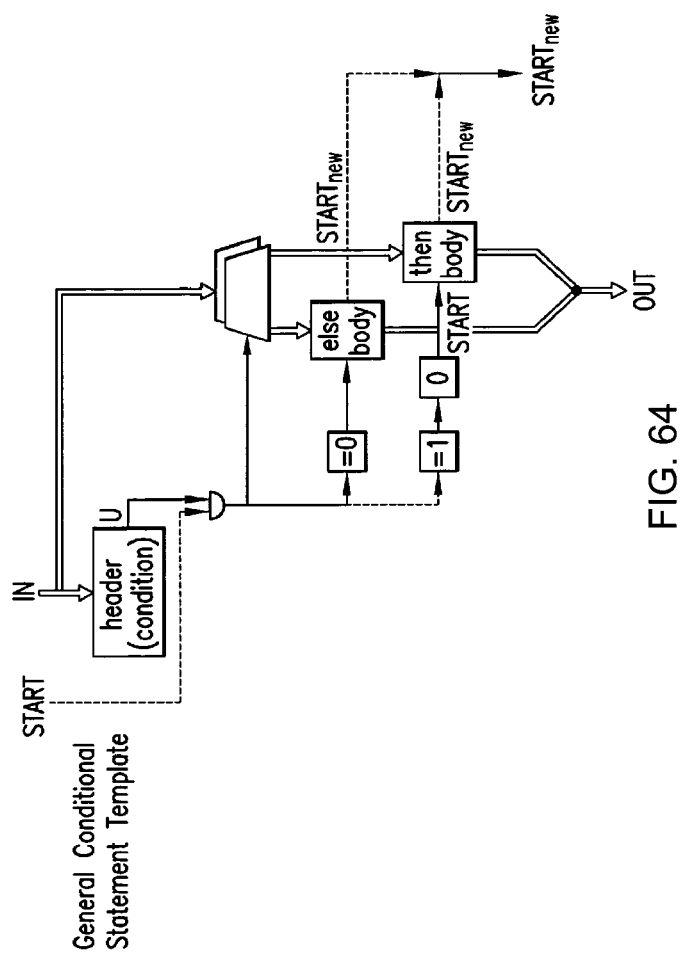

Conditional statements including either array accesses (see the discussion below under the heading "Array Accesses") or inner loops cannot be processed as described above under the heading "Conditional Integer Assignments." Data packets must be sent only to the active branch. This may be achieved by the implementation shown in FIG. 64, similar to the method presented in S. J. Allan et al., supra.

A dataflow analysis may be performed to compute used sets use and defined sets def (see A. V. Aho et al., supra) of both branches. A variable is used in a statement (and hence in a program region including the statement) if its value is read. A variable is defined in a statement (or region) if a new value is assigned to it. For the current VARLIST entries of all variables in IN=use(thenbody)∪def (thenbody)∪use(elsebody)∪def (elsebody)∪use(header), DEMUX functions controlled by the IF condition are inserted. It is noted that arrows with double lines in FIG. 64 denote connections for all variables in IN, and the shadowed DEMUX function stands for several DEMUX functions, one for each variable in IN. The DEMUX functions forward data packets only to the selected branch. New lists VARLIST1 and VARLIST2 are compiled with the respective outputs of these DEMUX functions. The then-branch is processed with VARLIST1, and the else branch with VARLIST2. Finally, the output values are combined. OUT includes the new values for the same variables as in IN. Since only one branch is ever activated, there will not be a conflict due to two packets arriving simultaneously. The combinations will be added to VARLIST after the conditional statement. If the IF execution shall be pipelined, MERGE opcodes for the output must be inserted, too. They are controlled by the condition like the DEMUX functions.

With respect to that which is discussed in S. J. Allan et al., supra, the following extension, corresponding to the dashed lines of FIG. 64 may be added in an embodiment of the present invention in order to control the execution as mentioned above with START events. The START input may be ECOMB combined with the condition output and connected to the SEL input of the DEMUX functions. The START inputs of thenbody and elsebody may be generated from the ECOMB output sent through a 1-FILTER and a 0-CONSTANT or through a 0-FILTER, respectively. (The 0-CONSTANT may be required since START events must always be 0-events.) The overall $START_{new}$ output may be generated by a simple "2 to 1 connection" of thenbody's and elsebody's $START_{new}$ outputs. With this extension, arbitrarily nested conditional statements or loops can be handled within thenbody and elsebody.

WHILE Loops

Figure 65:
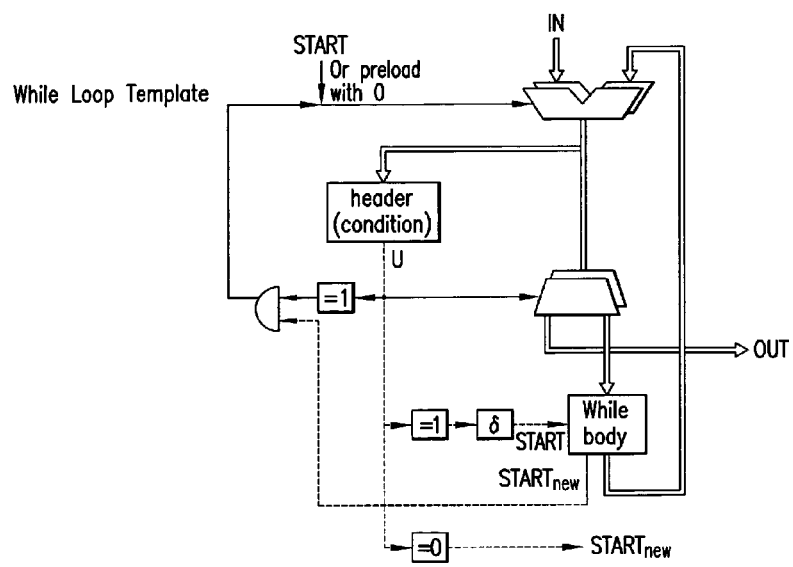

WHILE loops may be processed similarly to the scheme presented in S. J. Allan et al., supra (see FIG. 65). Double line connections and shadowed MERGE and DEMUX functions represent duplication for all variables in IN. Here IN=use (whilebody) ∪ def (whilebody) ∪ use(header). The WHILE loop may execute as follows. In the first loop iteration, the MERGE functions may select all input values from VARLIST at loop entry (SEL=0). The MERGE outputs may be connected to the header and the DEMUX functions. If the while condition is true (SEL=1), the input values may be forwarded to the whilebody and otherwise to OUT. The output values of the while body may be fed back to whilebody's input via the MERGE and DEMUX operators as long as the condition is true. Finally, after the last iteration, they may be forwarded to OUT. The outputs may be added to the new VARLIST. It is noted that the MERGE function for variables not live at the loop's beginning and the whilebody's beginning can be removed since its output is not used. For these variables, only the DEMUX function to output the final value is required. It is further noted that the MERGE functions can be replaced by simple "2 to 1 connections" if the configuration process guarantees that packets from IN1 always arrive at the DEMUX's input before feedback values arrive.

With respect to that which is discussed in S. J. Allan et al., supra, the following two extensions, corresponding to the dashed lines in FIG. 65, may be added in an embodiment of the present invention.

In S. J. Allan et al., supra, the SEL input of the MERGE functions is preloaded with 0. Thus, the loop execution begins immediately and can be executed only once. Instead, in an embodiment of the present invention, the START input may be connected to the MERGE's SEL input ("2 to 1 connection" with the header output). This may allow control of the time of the start of the loop execution and may allow its restart.

The whilebody's START input may be connected to the header output, sent through a 1-FILTER/0-CONSTANT combination as above (generates a 0-event for each loop iteration). By ECOMB-combining whilebody's $START_{new}$ output with the header output for the MERGE functions' SEL inputs, the next loop iteration is only started after the previous one has finished. The while loop's $START_{new}$ output is generated by filtering the header output for a 0-event.

With these extensions, arbitrarily nested conditional statements or loops can be handled within whilebody.

FOR Loops

Figure 66:
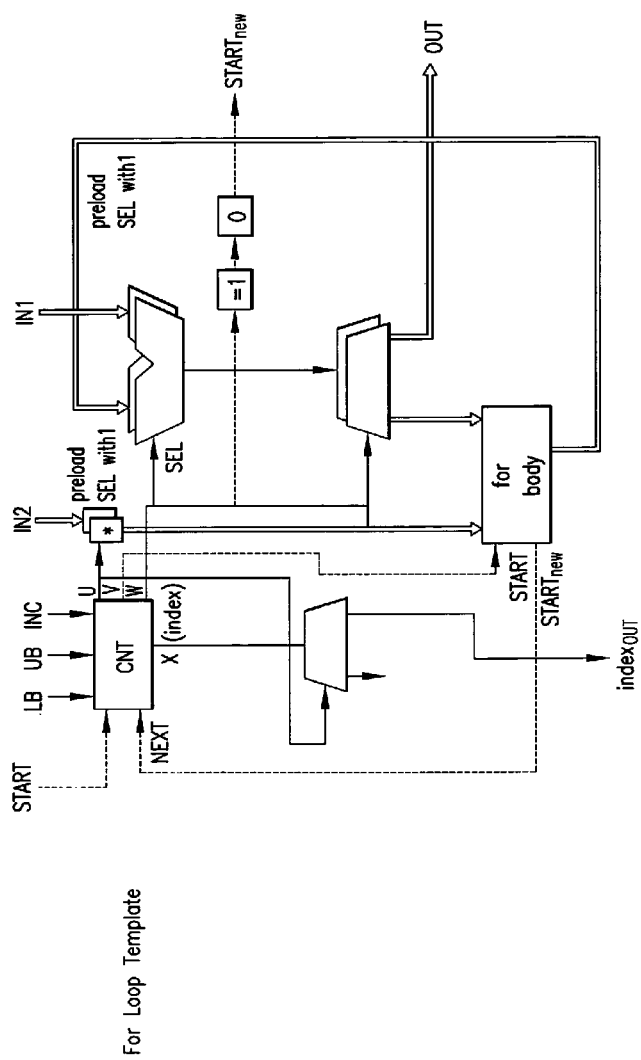

FOR loops are particularly regular WHILE loops. Therefore, they may handled as explained above. However, an RDFP according to an embodiment of the present invention may feature a special counter function CNT and a data packet multiplication function MDATA, which can be used for a more efficient implementation of FOR loops. This new FOR loop scheme is shown in FIG. 66.

A FOR loop may be controlled by a counter CNT. The lower bound (LB), upper bound (UB), and increment (INC) expressions may be evaluated like any other expression (see, for example, that which is discussed above under the heading "Integer Expressions and Assignments," and that which is discussed below under the heading "Array Accesses") and connected to the respective inputs.

As opposed to WHILE loops, a MERGE/DEMUX combination is only required for variables in IN1=def(forbody), i.e., those defined in forbody. It is noted that the MERGE functions can be replaced by simple "2 to 1 connections" as for WHILE loops if the configuration process guarantees that packets from IN1 always arrive at the DEMUX's input before feedback values arrive. IN1 does not include variables which are only used in forbody, LB, UB, or INC, and also does not include the loop index variable. Variables in IN1 may be processed as in WHILE loops, but the MERGE and DEMUX functions' SEL input is connected to CNT's W output. (The W output may do the inverse of a WHILE loop's header output. It may output a 1-event after the counter has terminated. Therefore, the inputs of the MERGE functions and the outputs of the DEMUX functions may be swapped here, and the MERGE functions' SEL inputs may be preloaded with 1-events.)

CNT's X output may provide the current value of the loop index variable. If the final index value is required (live) after the FOR loop, it may be selected with a DEMUX function controlled by CNT's U event output (which may produce one event for every loop iteration).

Variables in IN2=use(forbody)\def(forbody), i.e., those defined outside the loop and only used (but not redefined) inside the loop, may be handled differently. Unless it is a constant value, the variable's input value (from VARLIST) must be reproduced in each loop iteration since it is consumed in each iteration. Otherwise, the loop would stall from the second iteration onwards. The packets may be reproduced by MDATA functions, with the SEL inputs connected to CNT's U output. The SEL inputs must be preloaded with a 1-event to select the first input. The 1-event provided by the last iteration may select a new value for the next execution of the entire loop.

The following control events (corresponding to the dotted lines in FIG. 66) are similar to the WHILE loop extensions, but simpler. CNT's START input may be connected to the loop's overall START signal. $START_{new}$ may be generated from CNT's W output, sent through a 1-FILTER and 0-CONSTANT. CNT's V output may produce one 0-event for each loop iteration and may therefore be used as forbody's START. Finally, CNT's NEXT input may be connected to forbody's $START_{new}$ output.

For pipelined loops (as defined below under the heading "Vectorization and Pipelining"), loop iterations may be allowed to overlap. Therefore, CNT's NEXT input need not be connected. Now the counter may produce index variable values and control events as fast as they can be consumed. However, in this case CNT's W output in not sufficient as overall $START_{new}$ output since the counter terminates before the last iteration's forbody finishes. Instead, $START_{new}$ may be generated from CNT's U output ECOMB-combined with forbody's $START_{new}$ output, sent through a 1-FILTER/0-CONSTANT combination. The ECOMB may produce an event after termination of each loop iteration, but only the last event is a 1-event because only the last output of CNT's U output is a 1-event. Thus, this event may indicate that the last iteration has finished. A FOR loop example compilation with and without pipelining is provided below under the heading "More Examples."

As for WHILE loops, these methods allow for arbitrarily processing nested loops and conditional statements. The following advantages over WHILE loop implementations may be achieved:

One index variable value may be generated by the CNT function each clock cycle. This is faster and smaller than the WHILE loop implementation which allocates a MERGE/DEMUX/ADD loop and a comparator for the counter functionality.

Variables in IN2 (only used in forbody) may be reproduced in the special MDATA functions and need not go through a MERGE/DEMUX loop. This is again faster and smaller than the WHILE loop implementation.

Vectorization and Pipelining

In the embodiments described above, CDFGs are generated that perform the HLL program's functionality on an RDFP. However, the program execution is unduly sequentialized by the START signals. In some cases, innermost loops can be vectorized. This means that loop iterations can overlap, leading to a pipelined dataflow through the operators of the loop body. The Pipeline Vectorization technique (see Markus Weinhardt et al., "Pipeline Vectorization," supra) can be easily applied to the compilation method of embodiments of the present invention. As mentioned above, for FOR loops, the CNT's NEXT input may be removed so that CNT counts continuously, thereby overlapping the loop iterations.

All loops without array accesses can be pipelined since the dataflow automatically synchronizes loop-carried dependencies, i.e., dependencies between a statement in one iteration and another statement in a subsequent iteration. Loops with array accesses can be pipelined if the array, (i.e., RAM), accesses do not cause loop-carried dependencies or can be transformed to such a form. In this case, no RAM address is written in one iteration and read in a subsequent iteration. Therefore, the read and write accesses to the same RAM may overlap. This degree of freedom is exploited in the RAM access technique described below. Especially for dual-ported RAM, it leads to considerable performance improvements.

Array Accesses

In contrast to scalar variables, array accesses have to be controlled explicitly in order to maintain the program's correct execution order. As opposed to normal dataflow machine models (see A. H. Veen, supra), an RDFP does not have a single address space. Instead, the arrays may be allocated to several RAMS. This leads to a different approach to handling RAM accesses and opens up new opportunities for optimization.

To reduce the complexity of the compilation process, array accesses may be processed in two phases. Phase 1 may use "pseudo-functions" for RAM read and write accesses. A RAM read function may have an RD data input (read address) and an OUT data output (read value), and a RAM write function may have WR and IN data inputs (write address and write value). Both functions are labeled with the array the access refers to, and both may have a START event input and a U event output. The events may control the access order. In Phase 2, all accesses to the same RAM may be combined and substituted by a single RAM function. This may involve manipulating the data and event inputs and outputs such that the correct execution order is maintained and the outputs are forwarded to the correct part of the CDFG.

Phase 1:

Since arrays may be allocated to several RAMs, only accesses to the same RAM have to be synchronized. Accesses to different RAMs can occur concurrently or even out of order. In case of data dependencies, the accesses may self-synchronize automatically. Within pipelined loops, not even read and write accesses to the same RAM have to be synchronized. This may be achieved by maintaining separate START signals for every RAM or even separate START signals for RAM read and RAM write accesses in pipelined loops. At the end of a basic block, which is a program part with a single entry and a single exit point, i.e., a piece of straight-line code, (see A. V. Aho et al., supra), all $START_{new}$ outputs must be combined by an ECOMB to provide a START signal for the next basic block, which guarantees that all array accesses in the previous basic block are completed. For pipelined loops, this condition can even be relaxed. Only after the loop exit, all accesses have to be completed. The individual loop iterations need not be synchronized.

First the RAM addresses may be computed. The compiler frontend's standard transformation for array accesses can be used, and a CDFG function's output may be generated which may provide the address. If applicable, the offset with respect to the RDFP RAM (as determined in the initial mapping phase) must be added. This output may be connected to the pseudo RAM read's RD input (for a read access) or to the pseudo RAM write's WR input (for a write access). Additionally, the OUT output (read) or IN input (write) may be connected. The START input may be connected to the variable's START signal, and the U output may be used as $START_{new}$ for the next access.

To avoid redundant read accesses, RAM reads may also be registered in VARLIST. Instead of an integer variable, an array element may be used as the first element of the pair. However, a change in a variable occurring in an array index invalidates the information in VARLIST. It must then be removed from it.

Figure 67:
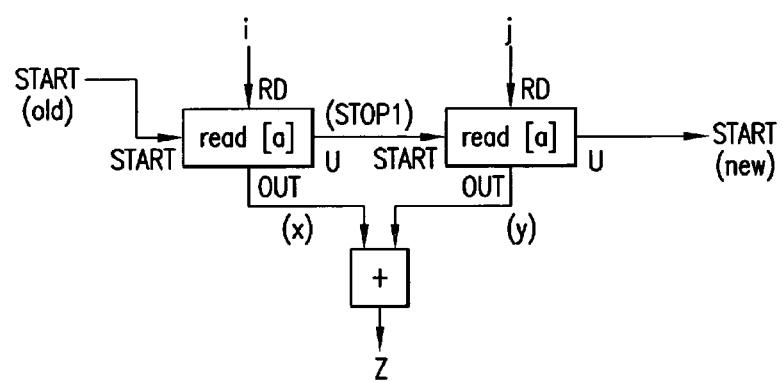

The following example with two read accesses compiles to the intermediate CDFG shown in FIG. 67. The START signals refer only to variable a. STOP1 is the event connection which synchronizes the accesses. Inputs START (old), i, and j should be substituted by the actual outputs resulting from the program before the array reads.

$x=a[i];$ $Y=a[I];$ $z=x+y;$

Figure 68:
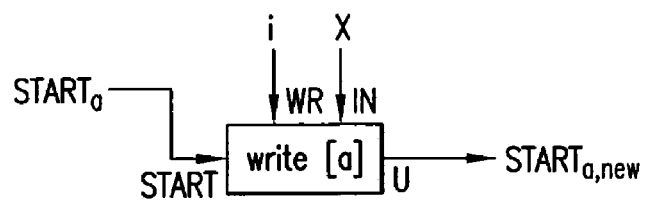
Figure 69:
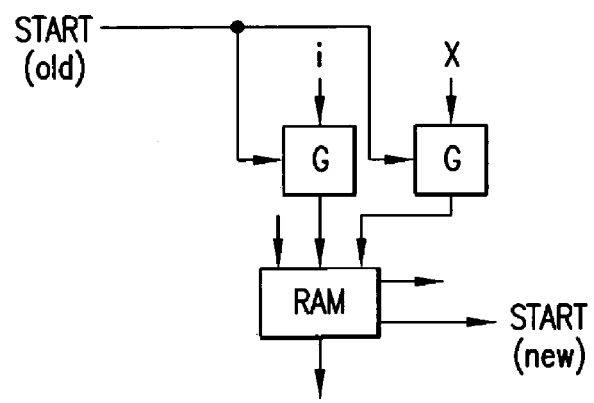

FIG. 68 shows the translation of the write access a[i]=x. Phase 2:

The pseudo-functions of all accesses may be merged to the same RAM and may be substitute by a single RAM function. For all data inputs (RD for read access and WR and IN for write access), GATEs may be inserted between the input and the RAM function. Their E inputs may be connected to the respective START inputs of the original pseudo-functions. If a RAM is read and written at only one program point, the U output of the read and write access may be moved to the ERD or EWR output, respectively. For example, the single access a[i]=x; from FIG. 68 may be transformed to the final CDFG shown in FIG. 69.

However, if several read or several write accesses, (i.e., pseudo-functions from different program points) to the same RAM occur, the ERD or EWR events are not specific anymore. But a STARTnew event of the original pseudo function should only be generated for the respective program point, i.e., for the current access. This may be achieved by connecting the START signals of all other accesses (pseudo-functions) of the same type (read or write) with the inverted START signal of the current access. The resulting signal may produce an event for every access, but a 1-event for only the current access. This event may be ECOMB-combined with the RAM's ERD or EWR output. The ECOMB's output will only occur after the access is completed. Because ECOMB OR-combines its event packets, only the current access produces a 1-event. Next, this event may be filtered with a 1-FILTER and changed by a 0-CONSTANT, resulting in a $START_{new}$ signal which produces a 0-event only after the current access is completed as required.

For several accesses, several sources may be connected to the RD, WR, and IN inputs of a RAM. This may disable the self-synchronization. However, since only one access occurs at a time, the GATEs only allow one data packet to arrive at the inputs.

For read accesses, the packets at the OUT output face the same problem as the ERD event packets, which is that they occur for every read access, but must be used (and forwarded to subsequent operators) only for the current access. This can be achieved by connecting the OUT output via a DEMUX function. The Y output of the DEMUX may be used, and the X output may be left unconnected. Then it may act as a selective gate which only forwards packets if its SEL input receives a 1-event, and discards its data input if SEL receives a 0-event. The signal created by the ECOMB described above for the $START_{new}$ signal may create a 1-event for the current access, and a 0-event otherwise. Using it as the SEL input achieves exactly the desired functionality.

Figure 70:
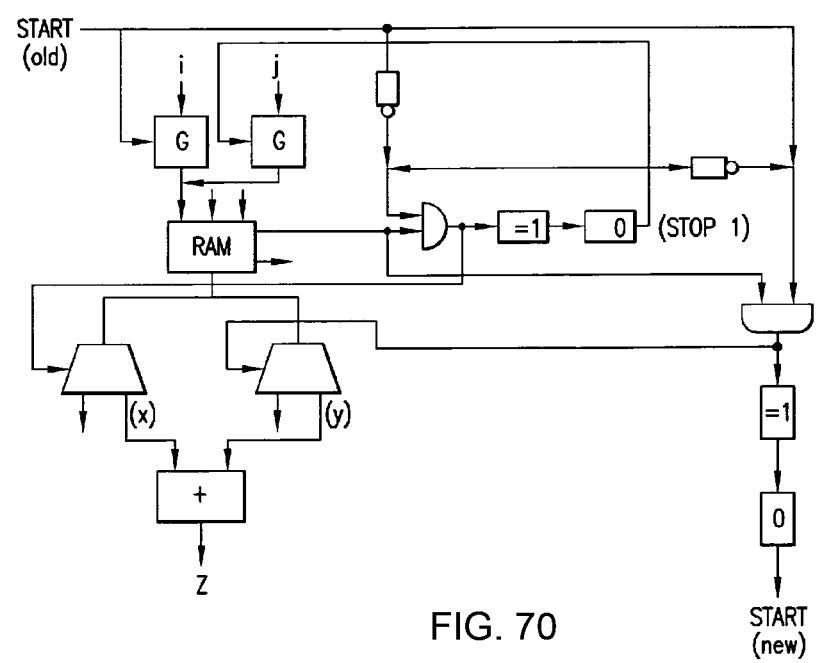

FIG. 70 shows the resulting CDFG for the first example above (two read accesses), after applying the transformations of Phase 2 to FIG. 67. STOP1 may be generated as follows. START(old) may be inverted, "2 to 1 connected" to STOP 1 (because it is the START input of the second read pseudo-function), ECOMB-combined with RAM's ERD output and sent through the 1-FILTER/0-CONSTANT combination. START(new) may be generated similarly, but here START (old) may be directly used and STOP 1 inverted. The GATEs for input IN (i and j) may be connected to START(old) and STOP1, respectively, and the DEMUX functions for outputs x and y may be connected to the ECOMB outputs related to STOP1 and START(new).

Multiple write accesses may use the same control events, but instead of one GATE per access for the RD inputs, one GATE for WR and one gate for IN (with the same E input) may be used. The EWR output may be processed like the ERD output for read accesses.

This transformation may ensure that all RAM accesses are executed correctly, but it is not very fast since read or write accesses to the same RAM are not pipelined. The next access only starts after the previous one is completed, even if the RAM being used has several pipeline stages. This inefficiency can be removed as follows.

First, continuous sequences of either read accesses or write accesses (not mixed) within a basic block may be detected by checking for pseudo-functions whose U output is directly connected to the START input of another pseudo-function of the same RAM and the same type (read or write). For these sequences, it is possible to stream data into the RAM rather than waiting for the previous access to complete. For this purpose, a combination of MERGE functions may select the RD or WR and IN inputs in the order given by the sequence. The MERGES must be controlled by iterative ESEQs guaranteeing that the inputs are only forwarded in the desired order. Then only the first access in the sequence needs to be controlled by a GATE or GATEs. Similarly, the OUT outputs of a read access can be distributed more efficiently for a sequence. A combination of DEMUX functions with the same ESEQ control can be used. It may be most efficient to arrange the MERGE and DEMUX functions as balanced binary trees.

The $START_{new}$ signal may be generated as follows. For a sequence of length n, the START signal of the entire sequence may be replicated n times by an ESEQ[00 . . . 1] function with the START input connected to the sequence's START. Its output may be directly "N to 1 connected" with the other accesses' START signal (for single accesses) or ESEQ outputs sent through 0-CONSTANT (for access sequences), ECOMB-connected to EWR or ERD, respectively, and sent through a 1-FILTER/0-CONSTANT combination, similar to the basic method described above. Since only the last ESEQ output is a 1-event, only the last RAM access generates a $START_{new}$ as required. Alternatively, for read accesses, the generation of the last output can be sent through a GATE (without the E input connected), thereby producing a $START_{new}$ event.

Figure 71:
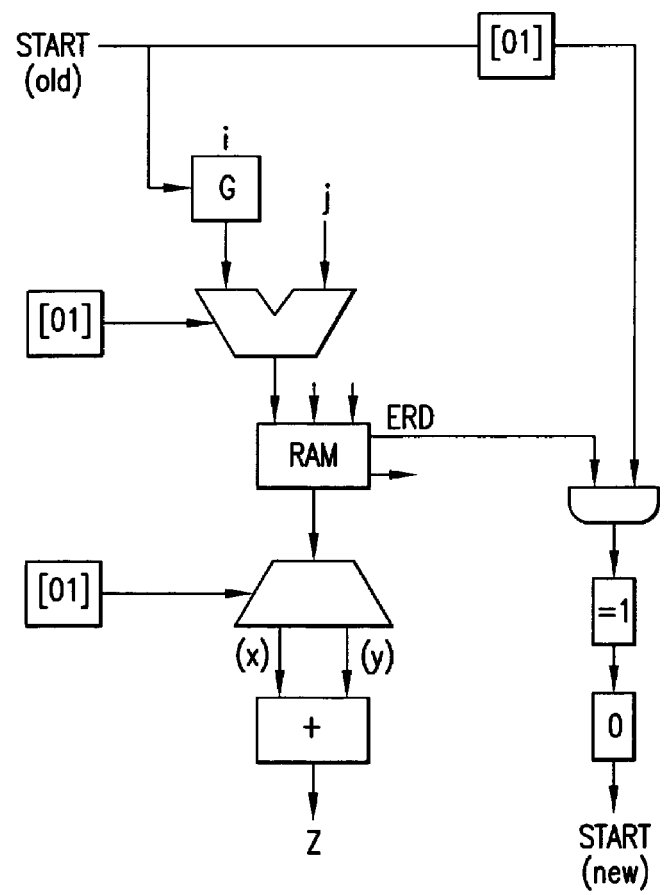
Figure 72:
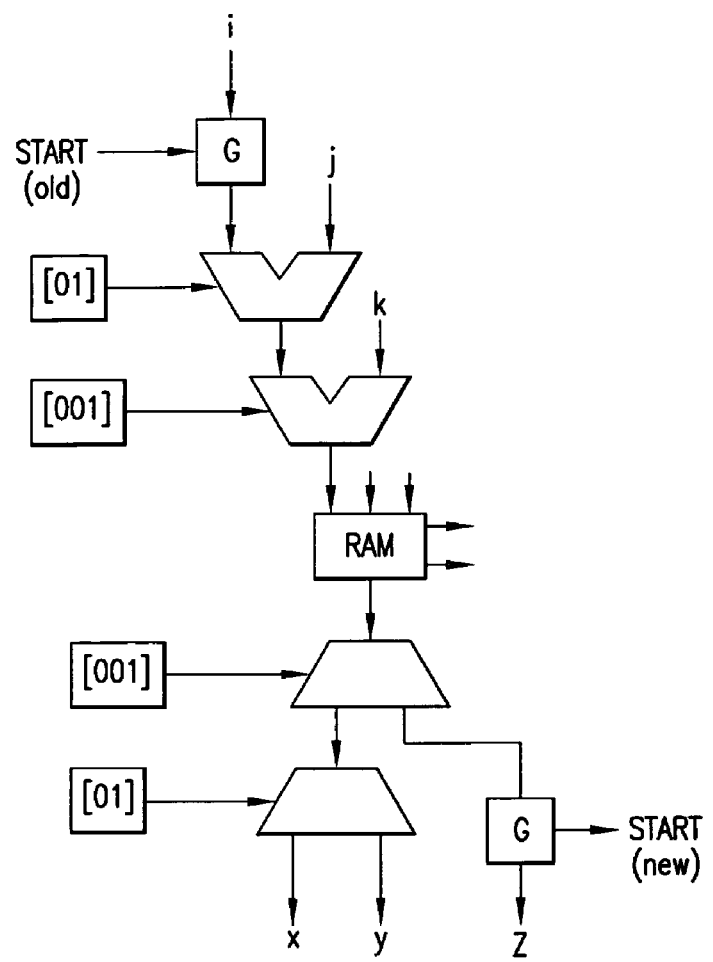

FIG. 71 shows the optimized version of the first example (FIGS. 67 and 70) using the ESEQ-method for generating $START_{new}$ and FIG. 72 shows the final CDFG of the following, larger example with three array reads. In this embodiment, the latter method for producing the $START_{new}$ event is used.

$x=a[i];$ $Y=a[j];$ $z=a[k];$

If several read sequences or read sequences and single read accesses occur for the same RAM, 1-events for detecting the current accesses must be generated for sequences of read accesses. They are needed to separate the OUT-values relating to separate sequences. The ESEQ output just defined, sent through a 1-CONSTANT, may achieve this. It may be again "N to 1 connected" to the other accesses' START signals (for single accesses) or ESEQ outputs sent through 0-CONSTANT (for access sequences). The resulting event may be used to control a first-stage DEMUX which is inserted to select the relevant OUT output data packets of the sequence as described above for the basic method. A complete example is provided below under the heading "More Examples" with reference to FIGS. 75 and 76.

Input and Output Ports

Input and output ports may be processed similar to vector accesses. A read from an input port is like an array read without an address. The input data packet may be sent to DEMUX functions which may send it to the correct subsequent operators. The STOP signal may be generated in the same way as described above for RAM accesses by combining the INPORT's U output with the current and other START signals.

Output ports may control the data packets by GATEs like array write accesses. The STOP signal may also be created as for RAM accesses.

More Examples

Figure 73:
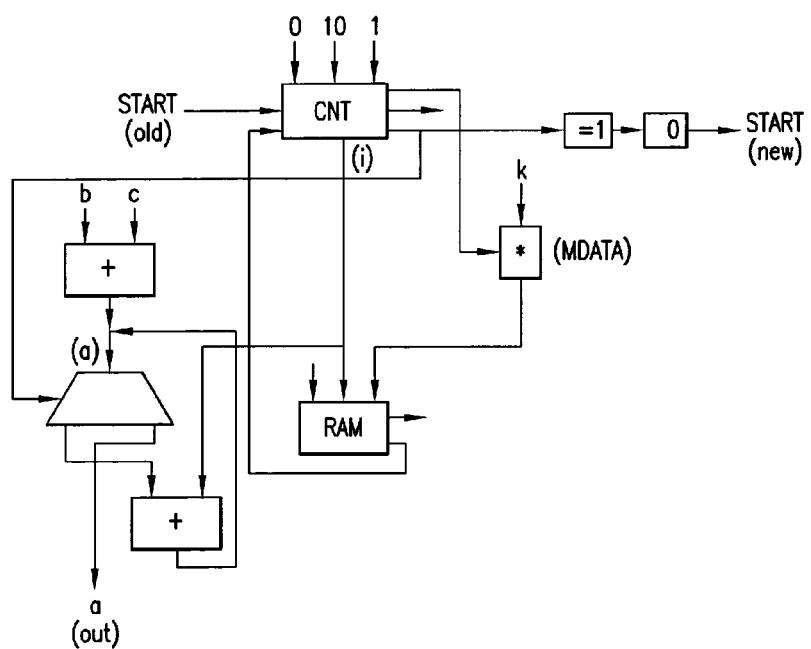
Figure 74:
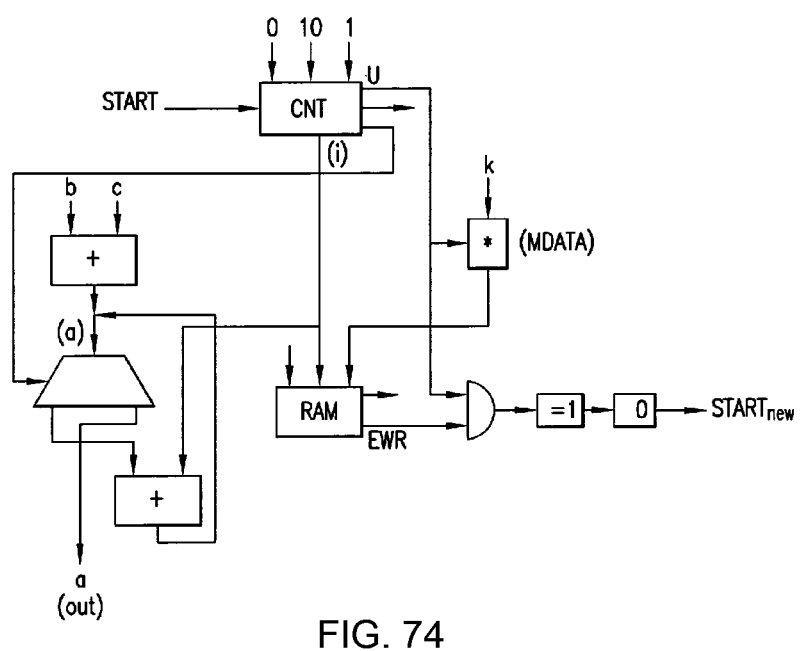

FIG. 73 shows the generated CDFG for the following for loop.

```
a = b+c;
for (i=0; i<=10; i++){
    a = a+i;
    x[i] = k;
}
```

In this example, IN1={a} and IN2={k} (In this regard, see FIG. 25). The MERGE function for variable a may be replaced by a 2:1 data connection as mentioned above under the heading "FOR Loops." It is noted that only one data packet arrives for variables b, c, and k, and one final packet is produced for a (out). Forbody does not use a START event since both operations (the adder and the RAM write) are dataflow-controlled by the counter anyway. But the RAM's EWR output may be the forbody's $START_{new}$ and may be connected to CNT's NEXT input. It is noted that the pipelining optimization (see that which is discussed under the heading "Vectorization and Pipelining") was not applied here. If it is applied (which is possible for this loop), CNT's NEXT input is not connected. See FIG. 67. Here, the loop iterations overlap. $START_{new}$ is generated from CNT's U output and forbody's $START_{new}$ (i.e., RAM's EWR output), as defined at the end of the discussion under the heading "FOR Loops."

The following program includes a vectorizable (pipelined) loop with one write access to array (RAM) x and a sequence of two read accesses to array (RAM) y. After the loop, another single read access to y occurs.

```
z = 0;
for (i=0; i<=10; i++){
    x[i] = i;
    z = z + y[i] + y[2*i];
}
a = y[k];
```

Figure 75:
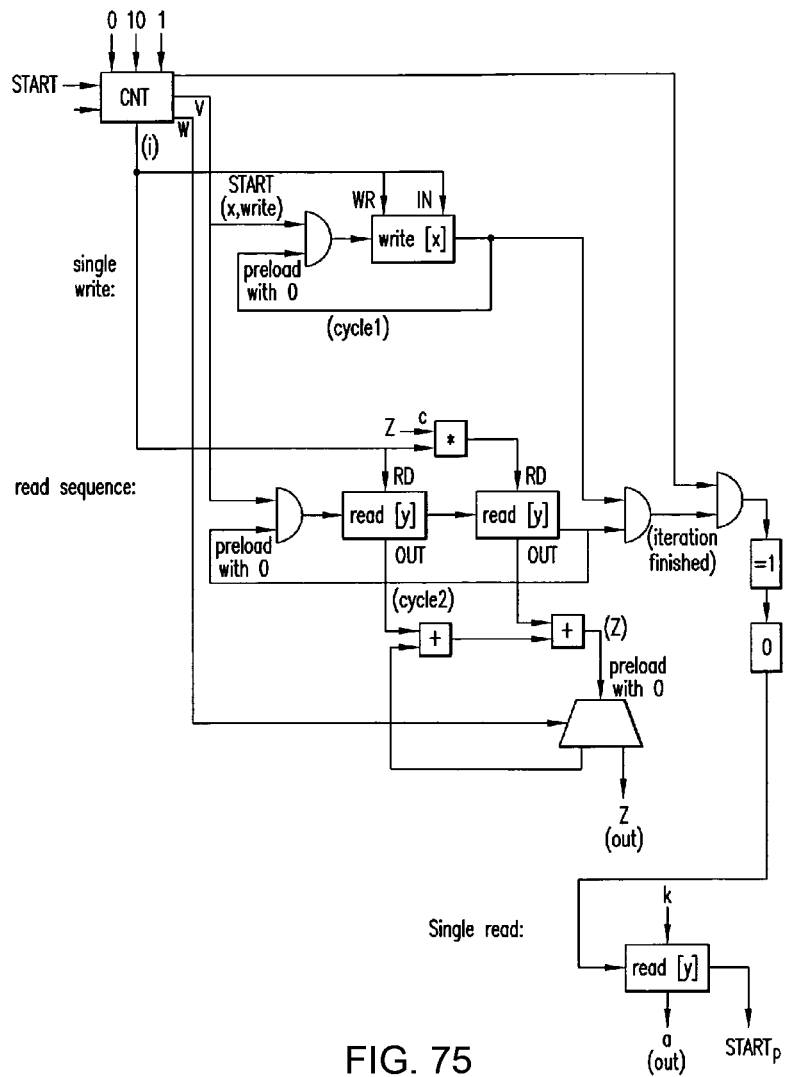

FIG. 75 shows the intermediate CDFG generated before the array access Phase 2 transformation is applied. The pipelined loop may be controlled as follows. Within the loop, separate START signals for write accesses to x and read accesses to y may be used. The reentry to the forbody may also be controlled by two independent signals ("cycle1" and "cycle2"). For the read accesses, "cycle2" may guarantee that the read y accesses occur in the correct order. But the beginning of an iteration for read y and write x accesses is not synchronized. Only at loop exit all accesses must be finished, which may be guaranteed by signal "loop finished". The single read access may be completely independent of the loop.

Figure 76:
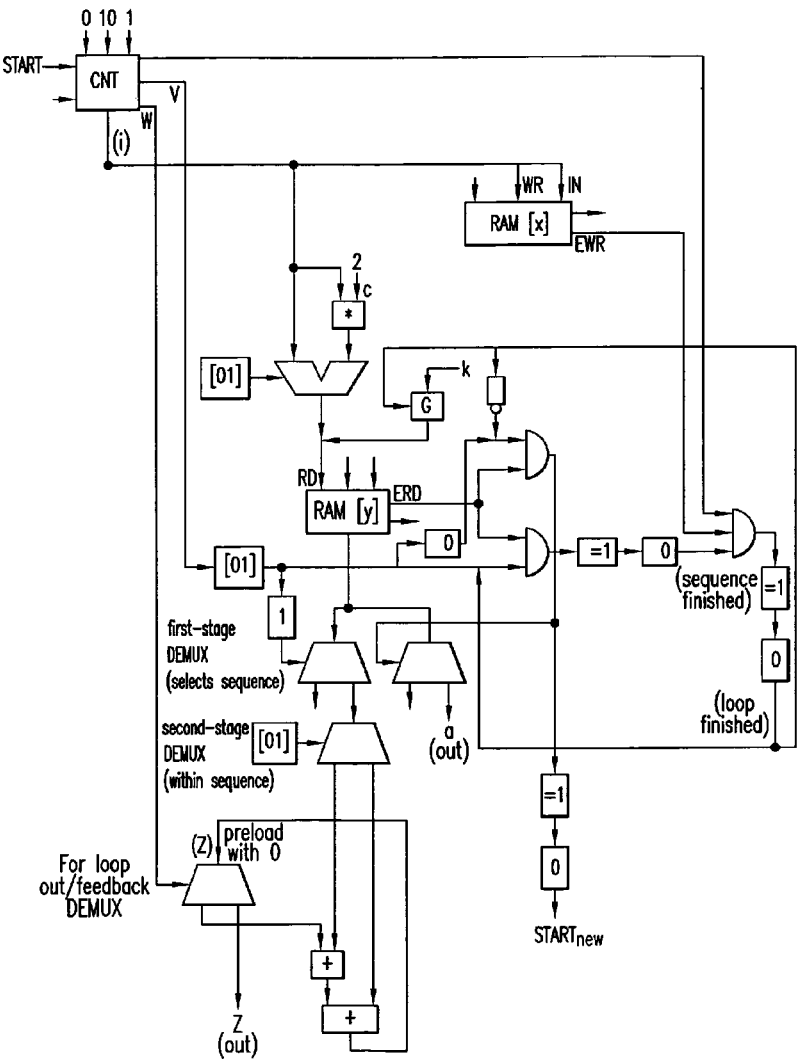

FIG. 76 shows the final CDFG after Phase 2. It is noted that "cycle1" is removed since a single write access needs no additional control, and "cycle2" is removed since the inserted MERGE and DEMUX functions automatically guarantee the correct execution order. The read y accesses are not independent anymore since they all refer to the same RAM, and the functions have been merged. ESEQs have been allocated to control the MERGE and DEMUX functions of the read sequence, and for the first-stage DEMUX functions which separate the read OUT values for the read sequence and for the final single read access. The ECOMBs, 1-FILTERs, 0-CONSTANTs and 1-CONSTANTs are allocated as described with respect to Phase 2 under the heading "Array Accesses" to generate correct control events for the GATEs and DEMUX functions.

In an example embodiment of the present invention, data may be supplied to the data processing logic cell field in response to execution of a load configuration by the data processing logic cell field, and/or data from this data processing logic cell field may be written back (STORED) by processing a STORE configuration accordingly. These load configurations and/or memory configurations may be designed in such a way that addresses of memory locations to be accessed directly or indirectly by loading and/or storage are generated directly or indirectly within the data processing logic cell field. Through this configuration of address generators within a configuration, a plurality of data may be loadable into the data processing logic cell field, where it may be stored in internal memories (iRAM), if necessary, and/or in internal cells such as EALUs having registers and/or internal memory arrangements. The load configuration and/or memory configuration may thus allow loading of data by blocks, almost like data streaming, in particular being comparatively rapid in comparison with individual access, and such a load configuration may be executable before one or more configurations that process data by actually analyzing and/or modifying it, with which configuration(s) the previously loaded data is processed. Data loading and/or writing may typically take place in small areas of large logic cell fields, while other subareas may be involved in other tasks. Reference is made to FIGS. 77A-77J for these and other particulars of the present invention. In the ping-pong-like data processing described in other published documents by the present applicant in which memory cells are provided on both sides of the data processing field, one memory side may be preloaded with new data by a LOAD configuration in an array part, while data from the opposite memory side having a STORE configuration may be written back in another array part; in a first processing step. Data from the memory on one side may stream through the data processing field to the memory on the other side. Intermediate results obtained in the first stream through the field may be stored in the second memory, the field may be reconfigured, if necessary, and the interim results may then stream back for further processing, etc. This simultaneous LOAD/STORE procedure is also possible without any spatial separation of memory areas.

Figure 77B:
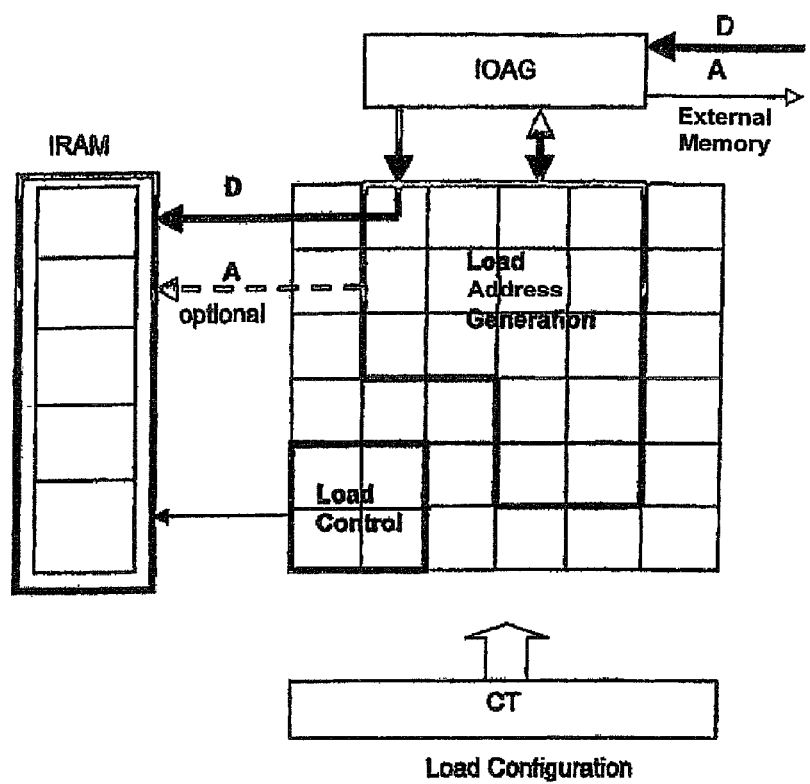

For example, FIG. 77A provides an overview of the basic data operation model. Four listed configurations, config 1, 2, 3, n, are shown to be loaded via a Configuration Manager (CT) into a reconfigurable array, which includes at least two banks of iRAMs, one at each side. The listed configurations config 1, 2, 3, n are shown in detail in the FIGS. 77B-77J. Address generators (labeled as In/Out Addressgen or IOAGs) transfer internal data to the array or iRAMs from, or from the array or iRAMs to, external elements, such as external memory.

FIG. 77B shows a configuration loading data from external memory into one or more internal iRAM-Bank(s) via the IOAG. The IOAG is shown to generate addresses (A) for the external memory, which, in turn, in shown to return the according data (D) to the IOAG. The IOAG forwards the data, e.g., through the reconfigurable array, to the iRAM-Bank(s). The configuration executed on the reconfigurable array may comprise further address generation, which may be fed to the IOAG, and/or provide addressing for one or multiple iRAM-Bank(s). Also, according control for loading the data is shown to be provided.

Figure 77C:
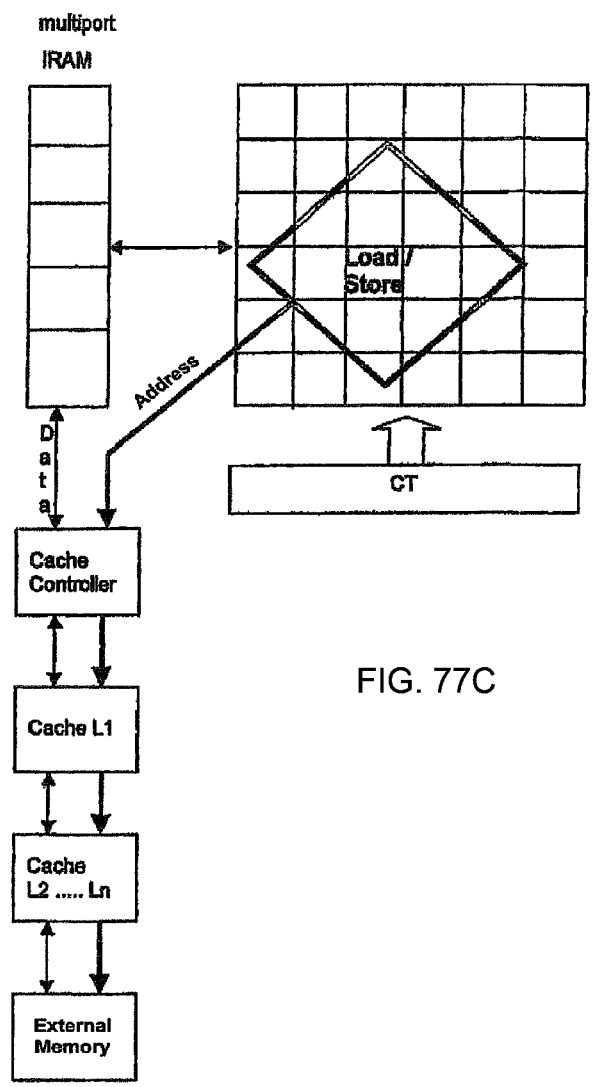

FIG. 77C shows an alternative implementation, where a Cache Controller is used, e.g., in place of the IOAG. The Load/Store configuration, according to FIG. 77B provides addresses to the Cache controller. A cache hierarchy, shown to include Level I-n caches, connects the reconfigurable array with the external memory.

Figure 77D:
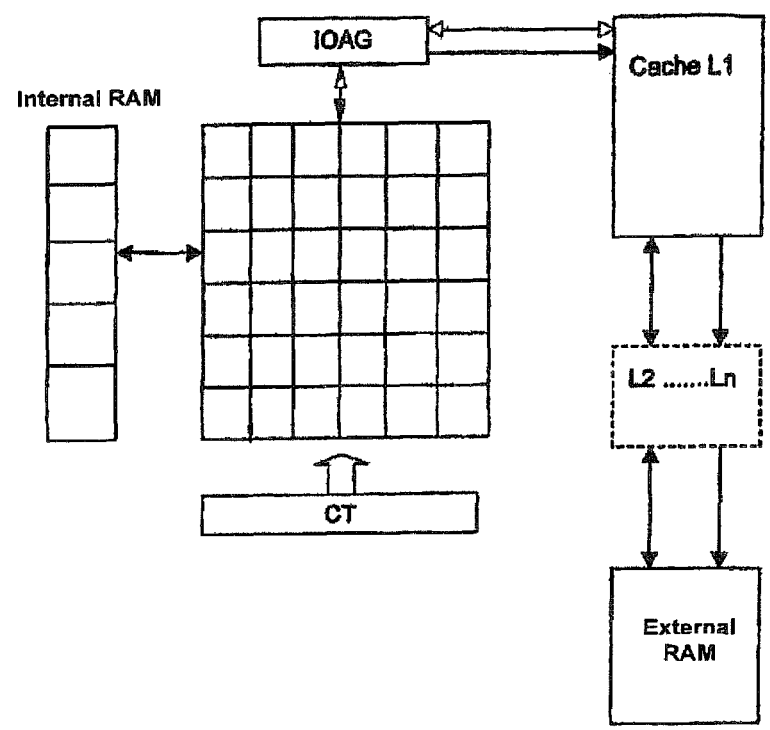

FIG. 77D shows the same, but with a separated IOAG between the reconfigurable array and the Cache.

Figure 77E:
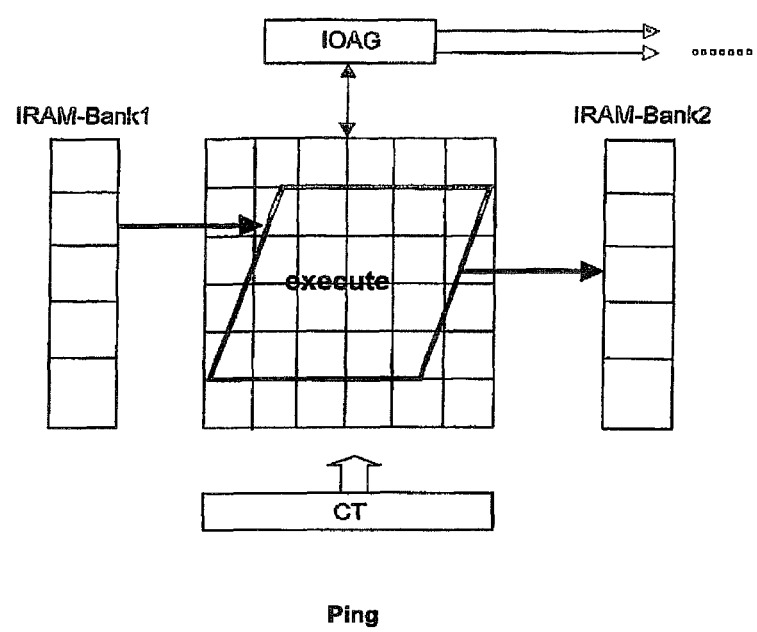

FIG. 77E shows a first data processing step, in which data to be processed is read from a source iRAM (iRAM-Bank1), which may be loaded as described above. The data is processed by execution within the configurable array, while additional input data may be received through the IOAG from an external source. Result data is written to a target iRAM (iRAM-Bank2) and/or may be sent out through the IOAG. The configurations of FIGS. 77E and 77F are described as analogous to the game of "ping pong." The configuration of FIG. 77E is therefore referenced as "ping" as data is transferred in a first direction from left to right.

Figure 77F:
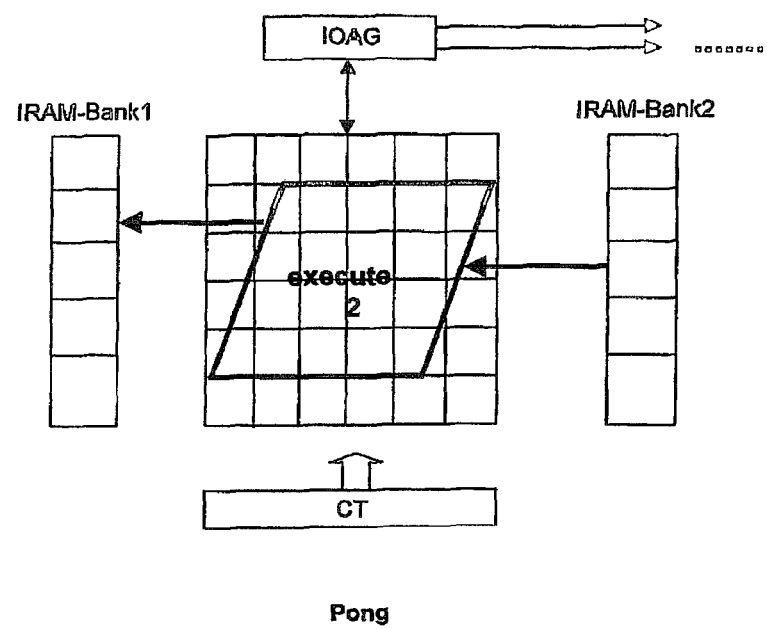

The subsequent configuration shown in FIG. 77F is called "pong" as the next processing step reads from iRAM-Bank2 the result data previously produced in the "ping" step, using the result data as input data. The input data is processed, again possibly together with additional data from the IOAG, and the results are written into iRAM-Bank1, while (again) some data might be sent out to external devices via the IOAG.

Figure 77G:
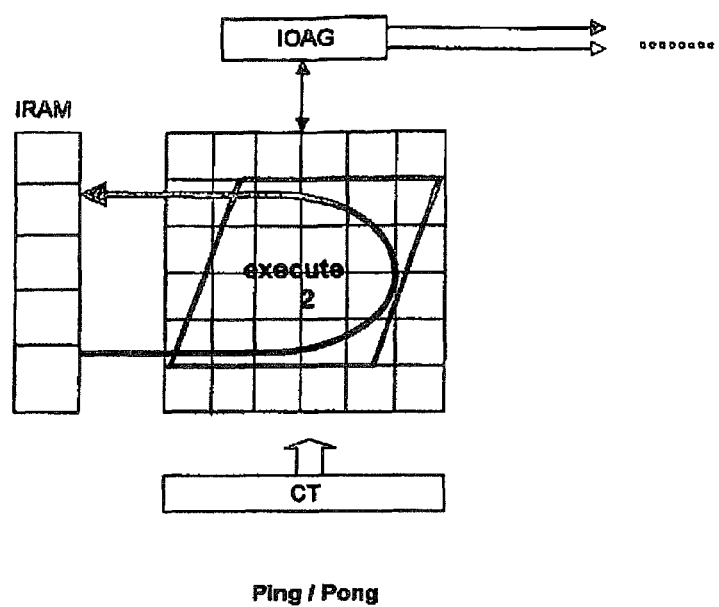

As shown in FIG. 77G, operand data might be read from one iRAM-Bank and be written back into the same iRAM-Bank.

Figure 77H:
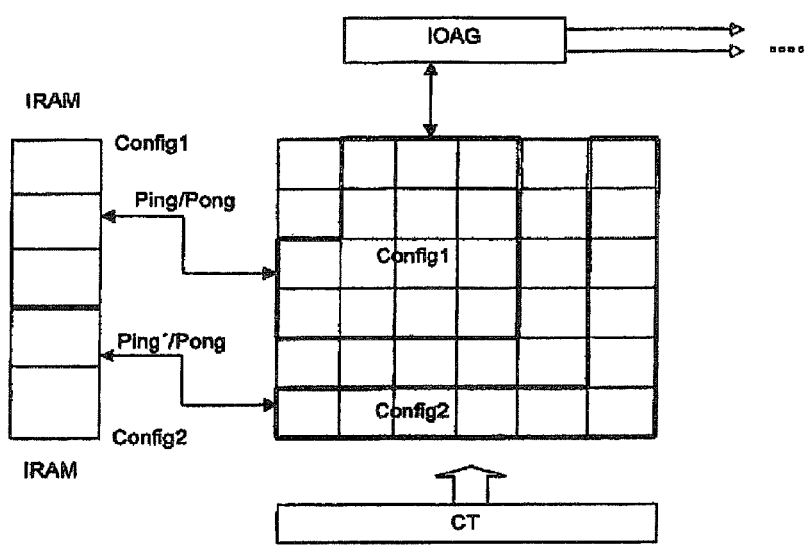

As shown in FIG. 77H, for example, two configurations Config1 and Config2 can operate in parallel and access one or multiple iRAM-Banks, e.g., in parallel.

Figure 77I:
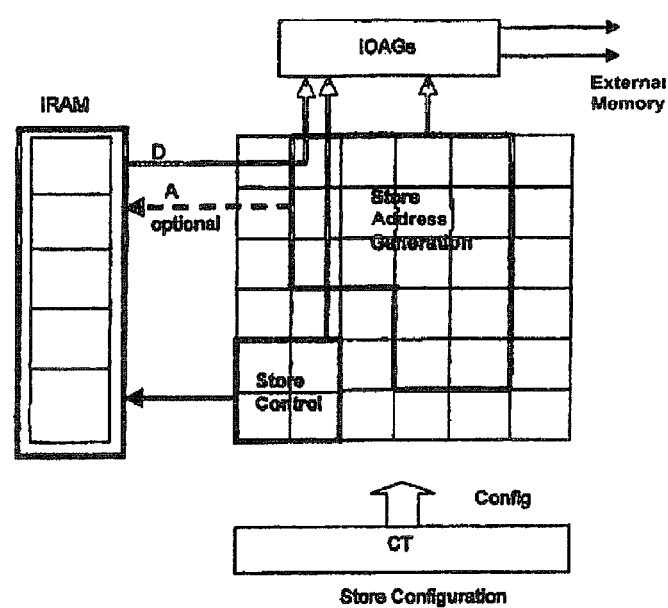
Figure 77J:
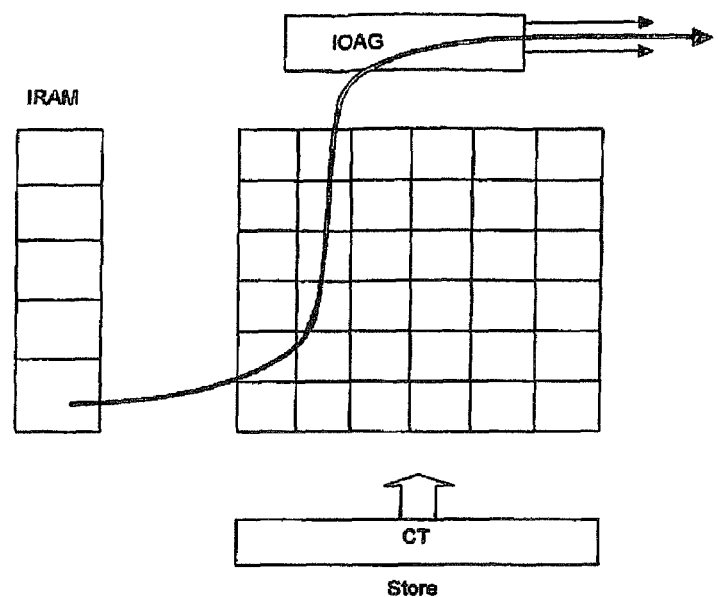

FIG. 77J shows the function of a Store configuration, reading data from an iRAMBank and writing the data to the external memory. The according configuration is shown in FIG. 77I, essentially including the same elements and functions as FIG. 77B in the reverse direction, i.e., such that data is read from the iRAM-Bank(s) and sent via the IOAG to the external memory. Further address calculation might be provided by the reconfigurable array for the iRAM-Bank(s) and/or the IOAG for addressing the external memory. Store control might control the data transfer from the iRAM-Bank(s) to or through the IOAG.

It should be pointed out again that there are various possibilities for filling internal memories with data. The internal memories may be preloaded in advance in particular by separate load configurations using data streaming-like access. This would correspond to use as vector registers, and may result in the internal memories always being at least partially a part of the externally visible state of the XPP and therefore having to be saved, i.e., written back when there is a context switch. Alternatively and/or additionally, the internal memories (iRAMs) may be loaded onto the CPU through separate "load instructions." This may result in reduced load processes through configurations and may result in a broader interface to the memory hierarchy. Here again, access is like access to vector registers.

Preloading may also include a burst from the memory through instruction of the cache controller. Moreover it is possible (and may be preferred as particularly efficient in many cases) to design the cache in such a way that a certain preload instruction maps a certain memory area, which may be defined by the starting address and size and/or increment(s), onto the internal memory (iRAM). If all internal RAMS have been allocated, the next configuration may be activated. Activation may entail waiting until all burst-like load operations are concluded. However, this may be transparent if preload instructions are output long enough in advance and cache localization is not destroyed by interrupts or a task switch. A "preload clean" instruction may then be used in particular, preventing data from being loaded out of memory.

A synchronization instruction may be required to ensure that the content of a specific memory area stored cache-like in iRAM may be written back to the memory hierarchy, which may be accomplished globally or by specifying the accessed memory area. Global access corresponds to a "full write-back." To simplify preloading of the iRAM, it is possible to specify this by giving a basic address, optionally one or more increments (in the event of access to multidimensional data fields), and a total run length, to store these in registers or the like, and then to access these registers for determining how loading is to be performed.

In one example embodiment of the present invention, registers may be designed as FIFOs. One FIFO may then also be provided for each of a plurality of virtual processors in a multithreading environment. Moreover, memory locations may be provided for use as TAG memories, as is customary with caches.

Marking the content of iRAMS as "dirty" in the cache sense may be helpful, so that the contents may be written back to an external memory as quickly as possible if the contents are not to be used again in the same iRAM. Thus, the XPP field and the cache controller may be considered as a single unit because they do not need different instruction streams. Instead, the cache controller may be regarded as the implementation of the steps "configuration fetch," "operand fetch" (iRAM preload) and "write-back," i.e., CF, OF and WB, in the XPP pipeline, the execution stage (ex) also being triggered. In one embodiment, due to the long latencies and unpredictability, e.g., due to faulty access to the cache or configurations of different lengths, steps may be overlapped for the width of multiple configurations, the configuration and data preloading FIFO (pipeline) being used for the purpose of loose coupling. The FILMO, which is known per se, may be situated downstream from the preload. Further, preloading may be speculative, the measure of speculation being determined as a function of the compiler. However, there is no disadvantage in incorrect preloading inasmuch as configurations which have only been preloaded but have not been executed are readily releasable for overwriting, just as is the assigned data. Preloading of FIFO may take place several configurations in advance and may depend, for example, on the properties of the algorithm. It is also possible to use hardware for this purpose.

With regard to writing back data used from iRAM to external memories, this may be accomplished by a suitable cache controller allocated to the XPP, but, in this case, it may typically prioritize its tasks and may preferentially execute preload operations having a high priority because of the assigned execution status. However, preloading may also be blocked by a higher-level iRAM instance in another block or by a lack of empty iRAM instances in the target iRAM block. In the latter case, the configuration may wait until a configuration and/or a write-back is concluded. The iRAM instance in a different block may then be in use or may be "dirty." It is possible to provide for the clean iRAMs used last to be discarded, i.e., to be regarded as "empty." If there are neither empty nor clean iRAM instances, then it may be required for a "dirty" iRAM part and/or a nonempty iRAM part to be written back to the memory hierarchy. Only one instance may be in use at one time, and there should be more than one instance in an iRAM block to achieve a cache effect, so it is impossible that there are neither empty nor clean nor dirty iRAM instances.

Figure 80A:
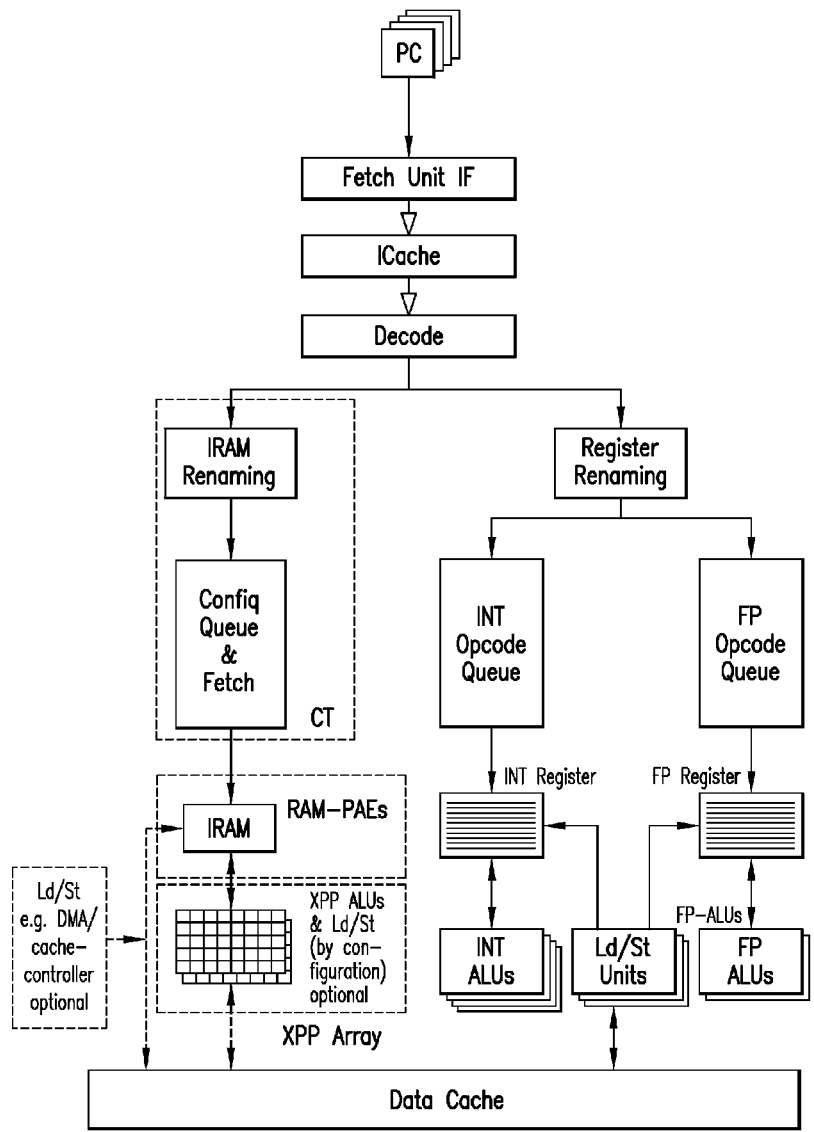
FIGS. 80A to 80C include diagrams that illustrate architectures in which an SMT processor is coupled to an XPP thread resource, according to exemplary embodiments of the present invention.
Figure 80B:
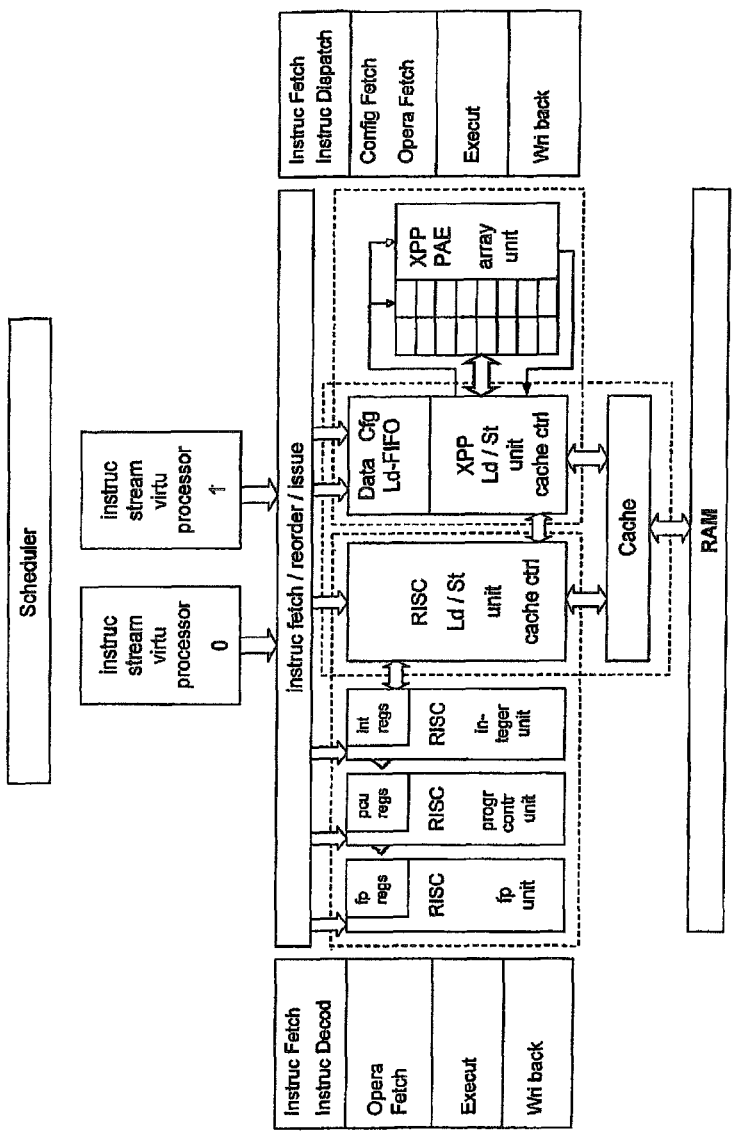
Figure 80C:
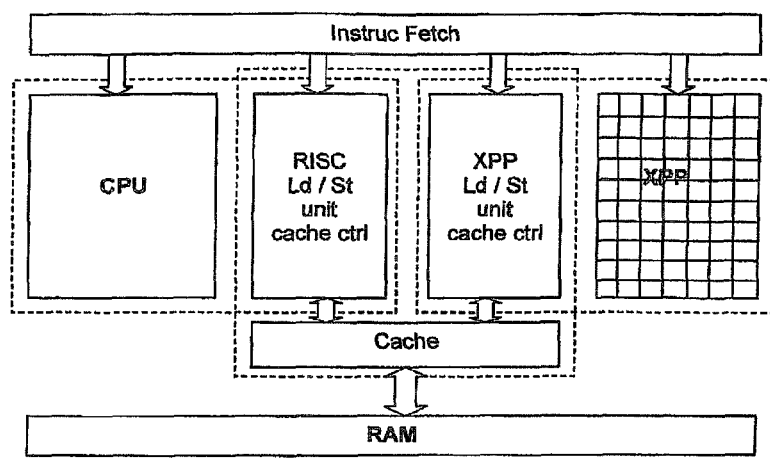

FIGS. 80A to 80C include examples of architectures in which an SMT processor is coupled to an XPP thread resource.

It may be necessary to limit the memory traffic, which may be possible in various ways during a context switch. For example, strict read data need not be stored, as is the case with configurations, for example. In the case of uninterruptible (non-preemptive) configurations, the local states of buses and PAEs need not be stored.

It is possible to provide for only modified data to be stored, and cache strategies may be used to reduce memory traffic. To do so, a Least Recently Used (LRU) strategy may be implemented in particular in addition to a preload mechanism, in particular when there are frequent context switches.

In an example embodiment of the present invention, if iRAMs are defined as local cache copies of the main memory and a starting address and modification state information are assigned to each iRAM, the iRAM cells may be replicated, as is also the case for SMT support, so that only the starting addresses of the iRAMs need be stored and loaded again as context. The starting addresses for the iRAMs of an instantaneous configuration may then select the iRAM instances having identical addresses for use. If no address TAG of an iRAM instance corresponds to the address of the newly loaded context or the context to be newly loaded, the corresponding memory area may be loaded into an empty iRAM instance, this being understood here as a free iRAM area. If no such area is available, it is possible to use the methods described above.

Moreover, delays caused by write-backs may be avoidable by using a separate state machine (cache controller), with which an attempt may be made in particular to write back iRAM instances which are inactive at the moment during unneeded memory cycles.

As is apparent from the preceding discussion, the cache may be preferably interpreted as an explicit cache and not as a cache which is transparent to the programmer and/or compiler as is usually the case. To provide the proper triggering here, configuration preload instructions, which precede iRAM preload instructions used by that configuration, may be output, e.g., by the compiler. Such configuration preload instructions should be provided by the scheduler as soon as possible. Furthermore, i.e., alternatively and/or additionally, iRAM preload instructions which should likewise be provided by the scheduler at an early point in time may also be provided, and configuration execution instructions that follow iRAM preload instructions for this configuration may also be provided, these configuration execution instructions optionally being delayed, in particular by estimated latency times, in comparison with the preload instructions.

It is also possible to provide for a configuration wait instruction to be executed, followed by an instruction which orders a cache write-back, both being output by the compiler, in particular when an instruction of another functional unit such as the load/memory unit is able to access a memory area which is potentially dirty or in use in an iRAM. Synchronization of the instruction flows and cache contents may thus be forced while avoiding data hazards. Through appropriate handling, such synchronization instructions are not necessarily common.

Data loading and/or storing need not necessarily take place in a procedure which is entirely based on logic cell fields. Instead, it is also possible to provide one or more separate and/or dedicated DMA units, i.e., DMA controllers in particular, which are configured, i.e., functionally prepared, i.e., set up, e.g., by specifications with regard to starting address, increment, block size, target addresses, etc., in particular by the CT and/or from the logic cell field.

Loading may also be performed from and into a cache in particular. This may have the advantage that external communication with larger memory banks is handled via the cache controller without having to provide separate switching arrangements within the data processing logic cell field; read or write access in the case of cache memory arrangements is typically very fast and has a low latency time; and typically a CPU unit is also connected to this cache, typically via a separate LOAD/STORE unit, so that access to data and exchange thereof by blocks may take place quickly between the CPU core and data processing logic cell field, so that a separate command need not be fetched from the opcode fetcher of the CPU and processed for each transfer of data.

This cache coupling has also proven to be much more favorable than coupling of a data processing logic cell field to the ALU via registers if these registers communicate with a cache only via a LOAD/STORE unit, as is known per se from the non-PACT publications cited above.

Another data link to the load/memory unit of a sequential CPU unit assigned to the data processing logic cell field and/or to its registers may be provided.

Such units may respond via separate input/output terminals (IO ports) of the data processing logic cell array designable in particular as a VPU and/or XPP and/or through one or more multiplexers downstream from a single port.

Figure 81:
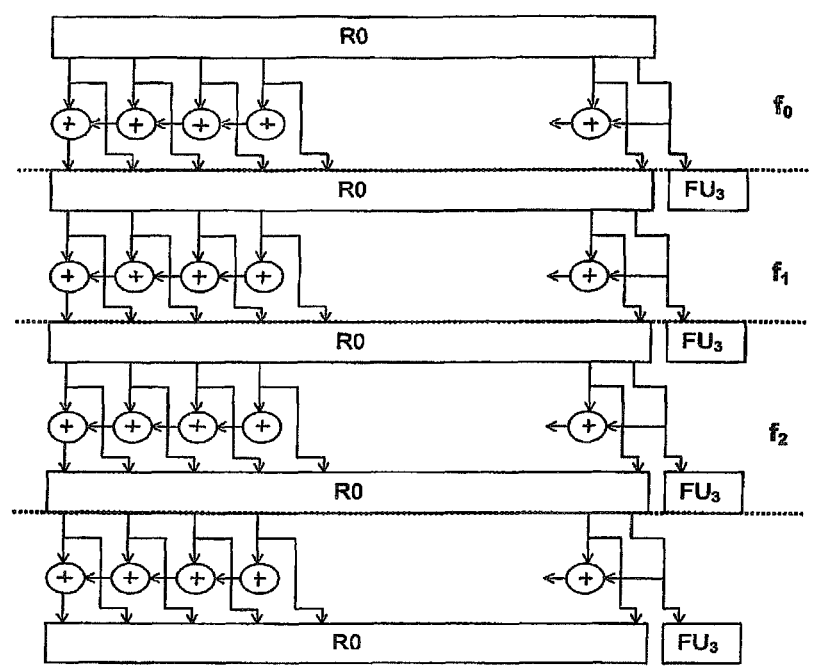
FIG. 81 is a diagram that illustrates an embodiment of the present invention in which a pseudo-random noise may be generated using a single cell if individual output bits obtained stepwise always from a single FPGA cell are written back to the FPGA cell.

In addition to blockwise and/or streaming and/or random reading and/or writing access, in particular in read-modify-write mode (RMW) mode to cache areas and/or the LOAD/STORE unit and/or the connection (known per se in the related art) to the register of the sequential CPU, there may also be a connection to an external bulk memory such as a RAM, a hard drive and/or another data exchange port such as an antenna, etc. A separate port may be provided for this access to cache arrangements and/or LOAD/STORE units and/or memory arrangements different from register units. Suitable drivers, buffers, signal processors for level adjusting and so forth may be provided, e.g., LS74244, LS74245. The logic cells of the field may include ALUs and/or EALUs, in particular but not exclusively for processing a data stream flowing in or into the data processing logic cell field, and typically short fine-granularly configurable FPGA type circuits may be provided upstream from them at the inlet and/or outlet ends, in particular at both the inlet and outlet ends, and/or may be integrated into the PAE-ALU to cut bit blocks out of a continuous data stream, for example, as is necessary for MPEG4 decoding. This may be advantageous when a data stream is to enter the cell and is to be subjected there to a type of preprocessing without blocking larger PAEs units of this type. This may also be of particular advantage when the ALU is designed as a SIMD arithmetic unit, in which case a very long data input word having a data length of 32 bits, for example, may then be split up via the upstream FPGA-type strips into a plurality of parallel data words having a length of 4 bits, for example, which may then be processed in parallel in the SIMD arithmetic units, which is capable of significantly increasing the overall performance of the system, if corresponding applications are needed. FPGA-type upstream and/or downstream structures were discussed above. However, FPGA-type does not necessarily refer to 1-bit granular arrangements. It is possible in particular to provide, instead of these hyperfine granular structures, only fine granular structures having a width of 4 bits, for example. In other words, FPGA-type input and/or output structures upstream and/or downstream from an ALU unit designed as a SIMD arithmetic unit in particular may be configurable, for example, so that 4-bit data words are always supplied and/or processed. It may be possible to provide cascading here so that, for example, the incoming 32-bit-long data words stream into four separate and/or separating 8-bit FPGA-type structures positioned side by side, a second strip having eight 4-bit-wide FPGA-type structures is downstream from these four 8-bit-wide FPGA-type structures and then, if necessary, after another such strip, if necessary for the particular purpose, sixteen parallel 2-bit wide FPGA-type structures are also provided side by side, for example. If this is the case, a substantial reduction in configuration complexity may be achieved in comparison with strictly hyperfine granular FPGA-type structures. This may also result in the configuration memory of the FPGA-type structure possibly turning out to be much smaller, thus permitting a savings in terms of chip area. FPGA-type strip structures, as also shown in conjunction with FIGS. 79A-79D, in particular situated in the PAE, may permit implementation of pseudo-random noise generators in a particularly simple manner. In an example embodiment of the present invention, if individual output bits obtained stepwise always from a single FPGA cell are written back to the FPGA cell, a pseudo-random noise may also be generated creatively using a single cell (see FIG. 81).

In principle, the coupling advantages in the case of data block streams described above may be achievable via the cache. In one example embodiment of the present invention, the cache may be designed in slices and then multiple slices may be simultaneously accessible, in particular all slices being simultaneously accessible. This may be advantageous when a plurality of threads is to be processed on the data processing logic cell field (XPP) and/or the sequential CPU(s), as explained below, whether via hyperthreading, multitasking and/or multithreading. Cache memory arrangements having slice access and/or slice access enabling control arrangements may therefore be provided. For example, a separate slice may be assigned to each thread. This may make it possible later in processing the threads to ensure that the proper cache areas are accessed when the command group to be processed using the thread is resumed.

Figure 78:
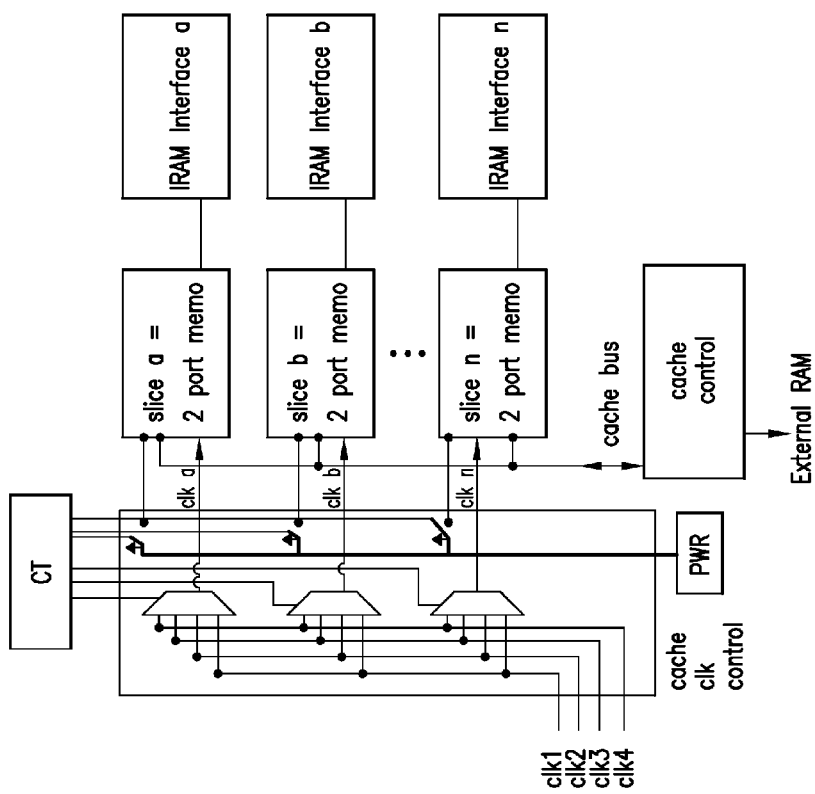
FIG. 78 is a diagram that illustrates a structure that provides for shutting down a cache in slices via power disconnections, according to an example embodiment of the present invention.
Figure 79A:
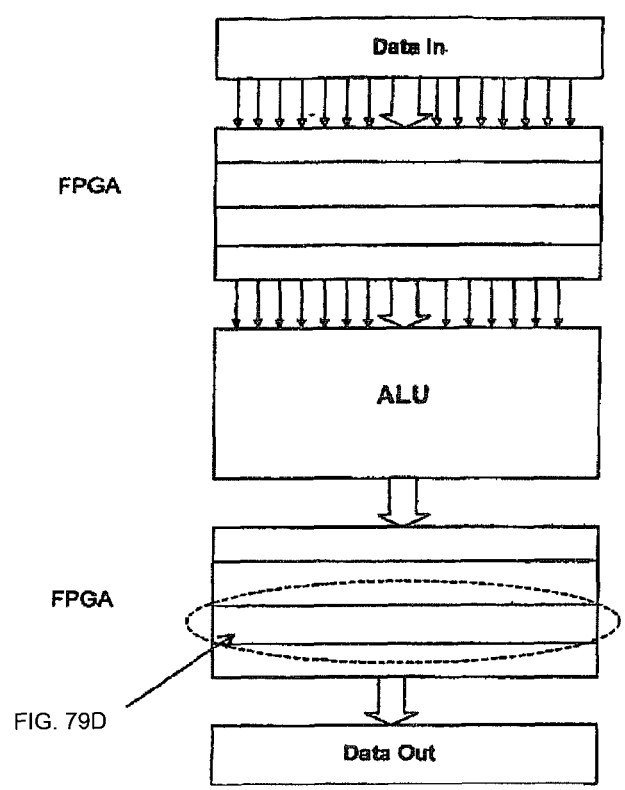
FIGS. 79A-79D include diagrams that illustrate different arrangements of FPGAs and ALUs and/or EALUs of a logic cell field, according to exemplary embodiments of the present invention.
Figure 79B:
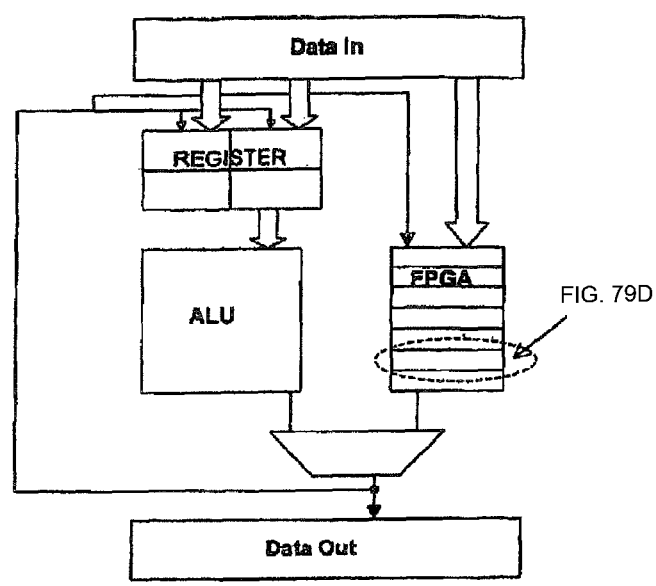
Figure 79C:
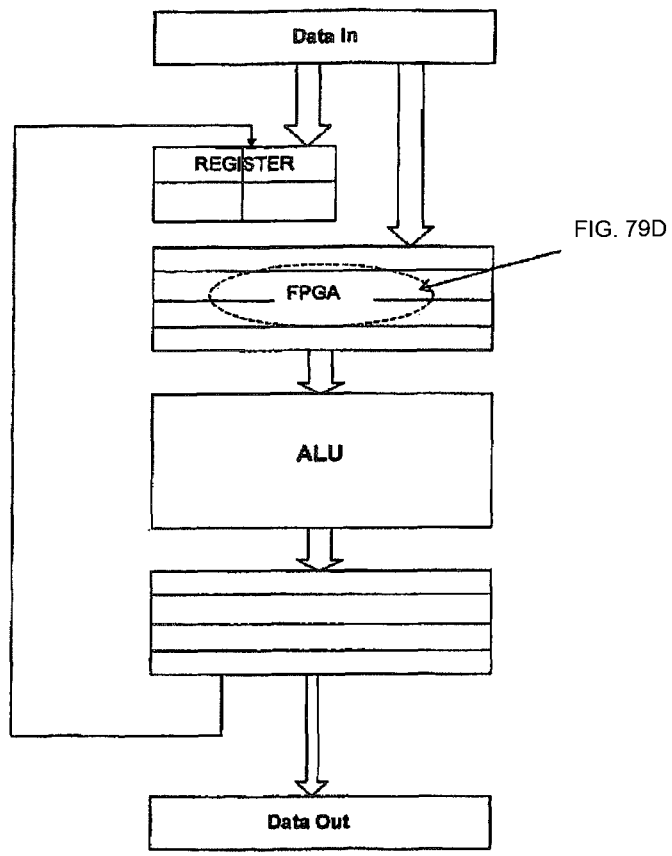
Figure 79D:
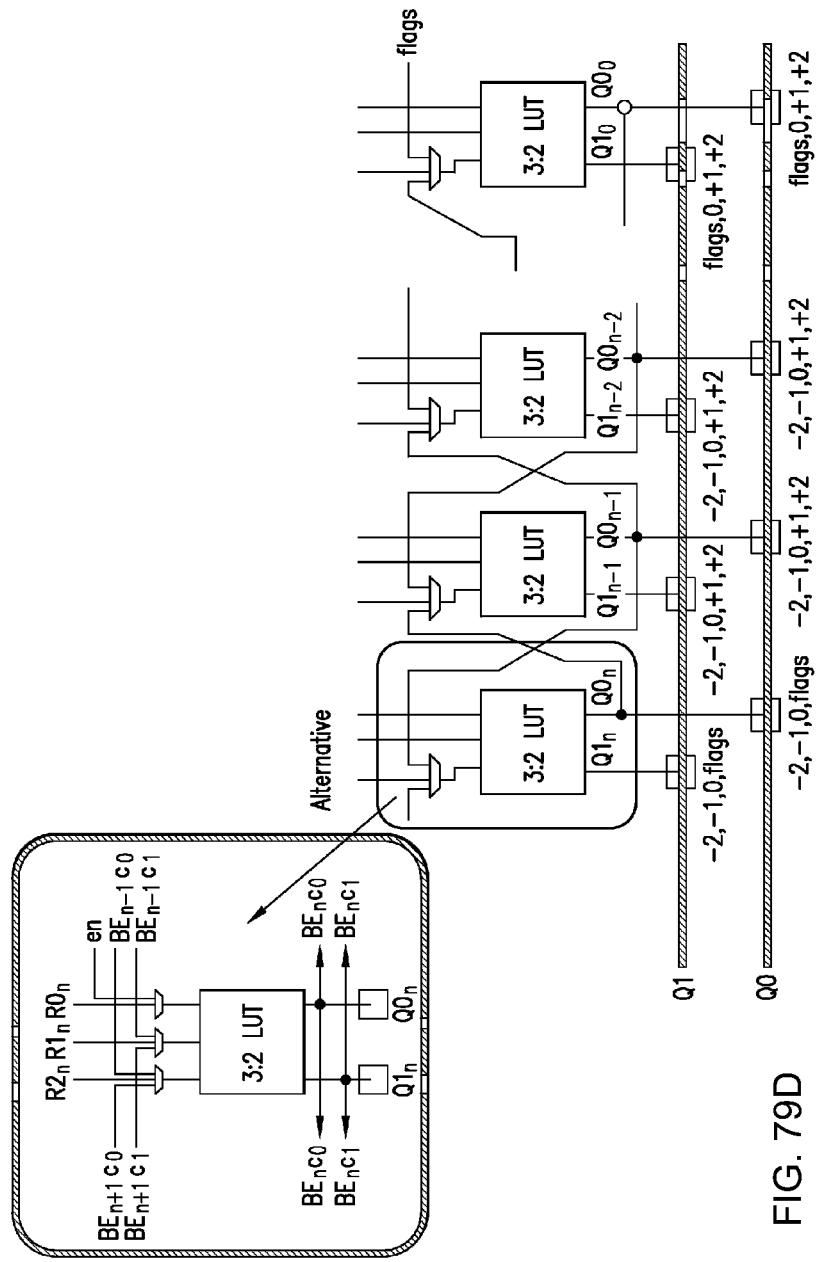

The cache need not necessarily be divided into slices, and if this is the case, a separate thread need not necessarily be assigned to each slice. Further, there may be cases in which not all cache areas are being used simultaneously or temporarily at a given point in time. Instead, it is to be expected that in typical data processing applications such as those occurring with handheld mobile telephone (cell phones), laptops, cameras and so forth, there are frequently times during which the entire cache is not needed. Therefore, in an example embodiment of the present invention, individual cache areas may be separable from the power supply so that their power consumption drops significantly, in particular to zero or almost zero. In a slice-wise cache design, this may occur by shutting down the cache in slices via suitable power disconnection arrangements. The disconnection may be accomplished either by cycling down, clock disconnection, or power disconnection. For example, FIG. 78 shows cache slices and separately controllable connections to power and clock signals via multiplexers and switches, respectively. In particular, access recognition may be assigned to an individual cache slice or the like, this access recognition being designed to recognize whether a particular cache area, i.e., a particular cache slice, has a thread, hyperthread, or task assigned to it at the moment, by which it is being used. If the access recognition then ascertains that this is not the case, typically disconnection from the clock and/or even from the power may then be possible. On reconnecting the power after a disconnection, immediate response of the cache area may be possible again, i.e., no significant delay need be expected due to turning the power supply on and off if implemented in hardware using conventional suitable semiconductor technologies. This is appropriate in many applications independently of the use with logic cell fields.

In an example embodiment of the present invention, although there may be a particularly efficient coupling with respect to the transfer of data and/or operands in blockwise form in particular, nevertheless no balancing is necessary in such a way that exactly the same processing time is necessary in a sequential CPU and XPP and/or data processing logic cell field. Instead, the processing may be performed in a manner which is practically often independent, in particular in such a way that the sequential CPU and the data processing logic cell field system may be considered as separate resources for a scheduler or the like. This may allow immediate implementation of known data processing program splitting technologies, such as multitasking, multithreading, and hyperthreading. A resulting advantage that path balancing is not necessary, i.e., balancing between sequential parts (e.g., on a RISC unit) and data flow parts (e.g., on an XPP), may result in any number of pipeline stages optionally being run through, e.g., within the sequential CPU (i.e., the RISC functional units), for example, cycling in a different way is possible and so forth. Further, according to embodiments of the present invention, by configuring a load configuration and/or a store configuration into the XPP or other data processing logic cell fields, the data may be loaded into the field or written out of it at a rate which is no longer determined by the clock speed of the CPU, the speed at which the opcode fetcher works or the like. In other words, the sequence control of the sequential CPU is no longer a bottleneck restriction for the data throughput through the data processing logic cell field without there being even a loose coupling.

According to an example embodiment of the present invention, it may be possible to use known CTs (or configuration managers (CMs) or configuration tables) for an XPP unit to use the configuration of one or more XPP fields also designed hierarchically with multiple CTs and at the same time one or more sequential CPUs more or less as multithreading scheduler and hardware management, which has the inherent advantage that known technologies (FILMO, etc.) may be used for the hardware-supported management in multithreading, but alternatively and/or additionally, in particular in a hierarchical arrangement, it is possible for a data processing logic cell field like an XPP to receive configurations from the opcode fetcher of a sequential CPU via the coprocessor interface. This may result in a call being instantiable by the sequential CPU and/or another XPP, resulting in data processing on the XPP. The XPP may then be kept in the data exchange, e.g., via the cache coupling described here and/or via LOAD and/or STORE configurations which provide address generators for loading and/or write-back of data in the XPP and/or data processing logic cell field. In other words, coupling of a data processing logic cell field in the manner of a coprocessor and/or thread resources is possible while at the same time data loading in the manner of data streaming is taking place through cache coupling and/or I/O port coupling.

The coprocessor coupling, i.e., the coupling of the data processing logic cell field, may typically result in scheduling for this logic cell field as well as also taking place on the sequential CPU or on a higher level scheduler unit and/or corresponding scheduler arrangements. In such a case, threading control and management may take place in practical terms on the scheduler and/or the sequential CPU. Although this is possible per se, this will not necessarily be the case at least in all embodiments of the present invention. Instead, the data processing logic cell field may be used by calling in the traditional way as is done with a standard coprocessor, e.g., in the case of 8086/8087 combinations.

In addition, in an example embodiment of the present invention, regardless of the type of configuration, whether via the coprocessor interface, the configuration manager of the XPP and/or of the data processing logic cell field or the like, where the CT also functions as a scheduler, or in some other way, it is possible, in and/or directly on the data processing logic cell field and/or under management of the data processing logic cell field, to address memories, in particular internal memories, in particular, in the case of the XPP architecture, such as that known from the various previous patent applications and publications by the present applicant, RAM PAEs or other similarly managed or internal memories, as a vector register, i.e., to store the data quantities loaded via the LOAD configuration like vectors as in vector registers in the internal memories and then, after reconfiguring the XPP and/or the data processing logic field, i.e., overwriting and/or reloading and/or activating a new configuration which performs the actual processing (in this context, for such a processing configuration, reference may also be made to a plurality of configurations which are to be processed in wave mode and/or sequentially), to access them as in the case of a vector register and then store the results thus obtained and/or intermediate results in turn in the internal memories or external memories managed via the XPP like internal memories to store these results there. The memory written in this way in the manner of a vector register with processing results using XPP access may then be written back in a suitable manner by loading the STORE configuration after reconfiguring the processing configuration. This, in turn, may take place in the manner of data streaming, whether via the I/O port directly into external memory areas and/or into cache memory areas which may then be accessed by the sequential CPU, other configurations on the XPP, which previously generated the data, and/or another corresponding data processing unit.

According to one example embodiment of the present invention, at least for certain data processing results and/or interim results, the memory and/or vector register arrangement in which the resulting data is to be stored are not internal memories into which data may be written via STORE configuration in the cache area or some other area which the sequential CPU or another data processing unit may access. Instead, the results may be written directly into corresponding cache areas, in particular, access-reserved cache areas, which may be organized like slices in particular. This may have the disadvantage of a greater latency, in particular when the paths between the XPP or data processing logic cell field unit and the cache are so long that the signal propagation times become significant, but it may result in no additional STORE configuration being needed. Such storage of data in cache areas may be possible, as described above, due to the fact that the memory to which the data is written is located in physical proximity to the cache controller and is designed as a cache. Alternatively and/or additionally there is also the possibility of placing part of an XPP memory area, XPP-internal memory or the like, in particular in the case of RAM via PAEs (see PACT31: DE 102 12 621.6, WO 03/036507, now U.S. Pat. No. 8,429,385), under the management of one or more sequential cache memory controllers. This may have advantages when minimizing the latency when storing the processing results, which are determined within the data processing logic cell field, whereas the latency in the case of access by other units to the memory area, which then functions only as a "quasi-cache," may play little or no role.

According to another embodiment of the present invention, the cache controller of the traditional sequential CPU may address a memory area as a cache, this memory area being physically located on and/or at the data processing logic cell field without being used for the data exchange with it. This may have the advantage that, when applications having a low local memory demand are running on the data processing logic cell field, and/or when only a few additional configurations are needed, based on the available storage volume, this may be available as a cache to one or more sequential CPUs. The cache controller may be designed for management of a cache area having a dynamic extent, i.e., of varying size. Dynamic cache size management and/or cache size management arrangements for dynamic cache management may typically take into account the work load and/or the input/output load on the sequential CPU and/or the data processing logic cell field. In other words, it is possible to analyze, for example, how many NOP data accesses there are in a given unit of time to the sequential CPU and/or how many configurations in the XPP field should be stored in advance in memory areas provided for this purpose to be able to permit rapid reconfiguration, whether by way of wave reconfiguration or in some other way. The dynamic cache size described here may thus be a runtime dynamic, i.e., the cache controller may manage a prevailing cache size, which may change from one clock pulse to the other or from one clock pulse group to the other. Moreover, the access management of an XPP and/or data process logic cell field including access as an internal memory as is the case with a vector register and as a cachetype memory for external access, with regard to the memory accesses, has already been described in DE 196 54 595 and PCT/DE 97/03013, now U.S. Pat. No. 6,338,106, (PACT03). The publications cited are herewith incorporated fully by reference thereto for disclosure purposes.

Reference was made above to data processing logic cell fields which are runtime reconfigurable in particular. The fact that a configuration management unit (CT and/or CM) may be provided for these systems was discussed. Management of configurations per se is known from the various patents and applications by the present applicant, to which reference has been made for disclosure purposes, as well as the applicant's other publications. Such units and their mechanism of operation via which configurations not yet currently needed are preloadable, in particular independently of connections to sequential CPUs, etc., may also be highly usable for inducing a task switch, a thread switch, and/or a hyperthread switch in multitasking operation, inhyperthreading, and/or in multi-threading (see FIGS. 82A and 82B, for example). That, during the runtime of a thread or task, configurations for different tasks, i.e., threads and/or hyperthreads, may also be loaded into the configuration memory in the case of a single cell or a group of cells of the data processing logic cell field, i.e., a PAE of a PAE field (PA), for example, may be used to do so. That is, in the case of a blockade of a task or thread, e.g., when it is necessary to wait for data because the data is not yet available, whether because it has not yet been generated or received by another unit, e.g., because of latencies, or because a resource is currently still being blocked by another access, configurations for another task or thread may be preloadable and/or preloaded and it is possible to switch to them without the time overhead of having to wait for a configuration switch in the case of a shadow-loaded configuration in particular. In principle, it is possible to use this technique even when the most probable continuation is predicted within a task and a prediction is not correct (prediction miss), but this type of operation is preferred in prediction-free operation. In the case of use with a purely sequential CPU and/or multiple purely sequential CPU s, in particular exclusively with such CPU s, multi-threading management hardware may thus be implemented by adding a configuration manager. Reference is made in this regard in particular to PACTIO (DE 198 07 872.2, WO 99/44147, now U.S. Pat. No. 6,480,937, WO 99/44120, now U.S. Pat. No. 6,571,381) and PACT17 (DE 100 28 397.7, WO 02/13000, now U.S. Pat. No. 7,003,660). It may be regarded as sufficient, in particular if hyperthreading management is desired for a CPU and/or a few sequential CPUs, to omit certain partial circuits like the FILMO as described in the patents and applications to which reference has been made specifically. In particular, this also describes the use of the configuration manager described there with and/or without FILMO for hyperthreading management for one or more purely sequentially operating CPU s with or without connection to an XPP or another data processing logic cell field. A plurality of CPUs may be implemented using the known techniques, as are known in particular from PACT31 (DE 102 12 621.6-53, PCT/EP 02/10572, now U.S. Pat. No. 8,429, 385) and PACT34 (DE 102 41 812.8, PCT/EP 03/09957, now U.S. Pat. No. 7,394,284) in which one or more sequential CPUs are provided within an array, utilizing one or more memory areas in the data processing logic cell field in particular for construction of the sequential CPU, in particular as an instruction register and/or data register. It should also be pointed out here that previous patent applications such as PACT02 (DE 196 51 075.9-53, WO 98/26356, now U.S. Pat. No. 6,728,871), PACT04 (DE 196 54 846.2-53, WO 98/29952 (no US)), and PACT08 (DE 197 04 728.9, WO 98/35299 (no US)) have already disclosed how sequencers having ring and/or random access memories may be constructed.

A task switch and/or a thread switch and/or a hyperthread switch using the known CT technology-see PACTIO (DE 198 07 872.2, WO 99/44147, now U.S. Pat. No. 6,480,937, WO 99/44120, now U.S. Pat. No. 6,571,381) and PACTI7 (DE 10028 397.7, WO02/13000, now U.S. Pat. No. 7,003,660)—may take place. Performance slices and/or time slices may be assigned by the CT to a software-implemented operating system scheduler or the like which is known per se, during which it may be determined which parts per se are to be processed subsequently by which tasks or threads, assuming that resources are free. An example may be given in this regard as follows. First, an address sequence may be generated for a first task. According to this, data may be loaded from a memory and/or cache memory to which a data processing logic cell field is connected in the manner described here, during the execution of a LOAD configuration. As soon as this data is available, processing of a second data processing configuration, i.e., the actual data processing configuration, may be initiated. This may also be preloaded because it is certain that this configuration is to be executed as long as no interrupts or the like require a complete task switch. In conventional processors, there is the problem known as cache miss, in which data is requested but is not available in the cache for load access. If such a case occurs in a coupling according to the present invention, it is possible to switch preferably to another thread, hyperthread and/or task which was intended for the next possible execution in particular by the operating system scheduler implemented through software in particular and/or another similarly acting unit, and therefore was loaded, e.g., in advance, into one of the available configuration memories of the data processing logic cell field, in particular in the background during the execution of another configuration, e.g., the LOAD configuration which has triggered the loading of the data for which the system is now waiting. Separate configuration lines may lead from the configuring unit to the particular cells directly and/or via suitable bus systems, such as those known in the related art per se, for advance configuration, undisturbed by the actual wiring of the data processing logic cells of the data processing logic cell field having a close granular design in particular. This design may permit undisturbed advance configuration without interfering with another configuration underway at that moment. Reference is made to PACT10 (DE 198 07 872.2, WO 99/44147, now U.S. Pat. No. 6,480,937, WO 99/44120, now U.S. Pat. No. 6,571,381), PACT17 (DE 100 28 397.7, WO 02/13000, now U.S. Pat. No. 7,003,660), PACT13 (DE 199 26 538.0, WO 00/77652, now U.S. Pat. No. 8,230,411), PACT02 (DE 196 51 075.9, WO 98/26356, now U.S. Pat. No. 6,728,871) and PACT08 (DE 197 04 728.9, WO 98/35299 (no US)). If the configuration to which the system has switched during and/or because of the task thread switch and/or hyperthread switch has been processed and processing has been completed in the event of preferably indivisible, uninterruptible and thus quasi-atomic configurations—see PACT19 (DE 102 02 044.2, WO 2003/060747, now U.S. Pat. No. 8,281,108) and PACT11 (DE 101 39 170.6, WO 03/017095, now U.S. Pat. No. 7,996,827)—then in some cases another configuration may be processed as predetermined by the corresponding scheduler, in particular the scheduler close to the operating system and/or the configuration for which the particular LOAD configuration was executed previously. Before execution of a processing configuration for which a LOAD configuration has previously been executed, it is possible to test, e.g., by query of the status of the load configuration or the data loading DMA controller, to determine whether in the meantime the particular data has streamed into the array, i.e., whether the latency time has elapsed, as typically occurs, and whether the data is actually available.

In other words, if latency times occur, e.g., because configurations have not yet been configured into the system, data has not yet been loaded, and/or data has not yet been written back, they will be bridged and/or masked by the execution of threads, hyperthreads, and/or tasks which have already been preconfigured and are operating using data which is already available and/or which may be written back to resources which are already available for write-back. Latency times may be largely covered in this way and virtually 100% utilization of the data processing logic cell field may be achieved, assuming an adequate number of threads, hyperthreads, and/or tasks to be executed per se.

By providing an adequate number of XPP-internal memory resources which are freely assigned to threads, e.g., by the scheduler or the CT, the cache and/or write operations of several simultaneous and/or superimposed threads may be executed, which may have a particularly positive effect on bridging any latencies.

Using the system described here with regard to data stream capability in the case of simultaneous coupling to a sequential CPU and/or with regard to coupling an XPP array and/or data processing logic cell field and simultaneously a sequential CPU to a suitable scheduler unit such as a configuration manager or the like, real time-capable systems may be readily implementable. For real time capability, it may be necessary to ensure a response to incoming data and/or interrupts signaling the arrival of data in particular within a maximum period of time, which is not to be exceeded in any case. This may be accomplished, for example, by a task switch to an interrupt and/or, e.g., in the case of prioritized interrupts, by ascertaining that a given interrupt is to be ignored at the moment, in which case it might be required for this to be defined within a certain period of time. A task switch in such real time-capable systems may be achievable in three ways, namely when a task has been running for a certain period of time (timer principle), when a resource is not available, whether due to being blocked by some other access or due to latencies in access thereto, e.g., reading and/or writing access, i.e., in the case of latencies in data access, and/or in the event of occurrence of interrupts.

A runtime-limited configuration in particular may also trigger a watchdog and/or parallel counter on a resource which is to be enabled and/or switched for processing the interrupt. Although it has otherwise been stated explicitly see also PACT29 (DE 102 12 622.4, WO 03/081454, published as US Pub. Number 2006-0075211)—that new triggering of the parallel counter and/or watchdog to increase runtime is suppressible by a task switch, according to the present invention, an interrupt may also have a blocking effect, i.e., according to a task switch, parallel counter- and/or watchdog-and new trigger, i.e., in such a case it is possible to prevent the configuration itself from increasing its maximum possible runtime by new triggering.

The real time capability of a data processing logic cell field may now be achieved, e.g., by implementing one or more of three exemplary embodiments.

According to a first embodiment, within a resource addressable by the scheduler and/or the CT, there may be a switch to processing an interrupt, for example. If the response times to interrupts or other requests are so long that a configuration may still be processed without interruption during this period of time, then this is noncritical in particular, since a configuration for interrupt processing may be preloaded onto the resource which is to be switched to processing the interrupt, and this may be done during processing of the currently running configuration. The choice of the interrupt processing configuration to be preloaded is to be made by the CT, for example. It is possible to limit the runtime of the configuration on the resource which is to be enabled and/or switched for the interrupt processing. Reference is made in this regard to PACT29/PCT (PCT/DE03/000942, published as US Pub Number 2006-0075211).

Figure 83:
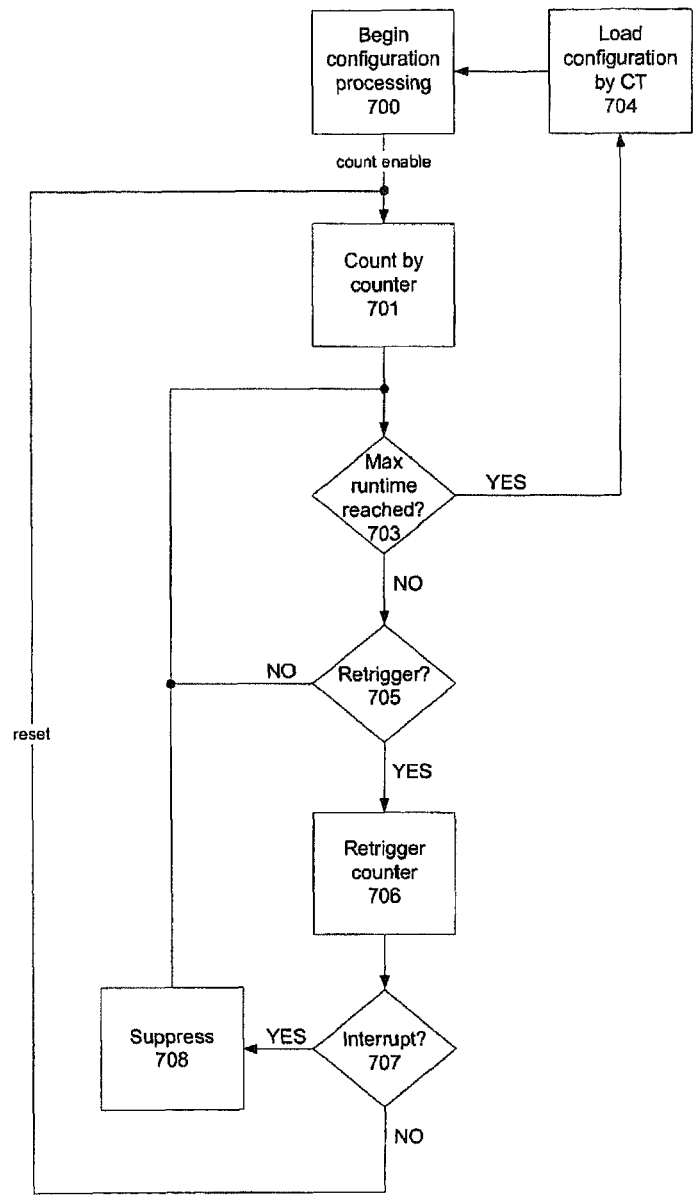
FIG. 83 is a flowchart illustrating a method for a configuration to increase its maximum allowed runtime, according to an example embodiment of the present invention.

In systems which must respond to interrupts more quickly, in one embodiment of the present invention, a single resource, i.e., for example, a separate XPP unit and/or parts of an XPP field, may be reserved for such processing. If an interrupt which must be processed quickly then occurs, it is possible to either process a configuration preloaded for particularly critical interrupts in advance or to begin immediately loading an interrupt processing configuration into the reserved resource. A choice of the particular configuration required for the corresponding interrupt is possible through appropriate triggering, wave processing, etc. Thus, with reference to FIG. 83, at step 700, processing may be begin according to a configuration, in response to which a counter may be enabled to begin counting at step 701. During the processing, the configuration may, at step 705 determine whether to retrigger the counter to increase its maximum allowed time. If it is determined that the configuration should end and the CT should perform a reconfiguration, the counter may continue without being reset until maximum runtime of the current configuration is reached at step 703. Responsive to reaching the maximum runtime, the CT may load a new configuration at step 704. If it is determined at step 705 that the configuration should be continued, the configuration may retrigger the counter at step 706. If an interrupt is detected at step 707, the trigger of the configuration may be suppressed, so that maximum runtime is reached at step 703. If an interrupt is not detected, the configuration's trigger may reset the counter at step 701, and the process may be repeated.

Using the methods already described, it may be possible to obtain an instant response to an interrupt by achieving code re-entrance by using LOAD/STORE configurations. After each data processing configuration or at given points in time, e.g., every five or ten configurations, a STORE configuration may be executed and then a LOAD configuration may be executed while accessing the memory areas to which data was previously written. When it is certain that the memory areas used by the STORE configuration will remain unaffected until another configuration has stored all relevant information (states, data) by progressing in the task, it may then be certain that the same conditions will be obtained again on reloading, i.e., on re-entrance into a configuration previously initiated but not completed. Such an insertion of LOAD/STORE configurations with simultaneous protection of STORE memory areas which are not yet outdated may be very easily generated automatically without additional programming complexity, e.g., by a compiler. Resource reservation may be advantageous there. It should also be pointed out that in resource reservation and/or in other cases, it is possible to respond to at least a quantity of highly prioritized interrupts by preloading certain configurations.

According to another embodiment of the response to interrupts, when at least one of the addressable resources is a sequential CPU, an interrupt routine in which a code for the data processing logic cell field is prohibited may be processed on it. In other words, a time-critical interrupt routine may be processed exclusively on a sequential CPU without calling XPP data processing steps. This may ensure that the processing operation on the data processing logic cell field is not to be interrupted and then further processing may take place on this data processing logic cell field after a task switch. Although the actual interrupt routine might not have an XPP code, it is nevertheless possible to ensure that at a later point in time, which is no longer relevant to real time, following an interrupt it is possible to respond with the XPP to a state and/or data detected by an interrupt and/or a real time request using the data processing logic cell field.

The invention claimed is:

1. A data processing system, comprising:
a memory;
a single integrated circuit, having
   a data processor core;
   an integrated array data processor;
   the integrated array data processor having
     i) an array of arithmetic execution units arranged to execute one or more algorithms in parallel; and ii) an algorithm loader connected to the array of arithmetic execution units, wherein an algorithm comprises a set of instructions for joint execution; and a joint cache shared between the data processor core and the array data processor;

the joint cache connected to the memory;

the single integrated circuit further including:

an algorithm list buffer connected to both the data processor core and the algorithm loader.

2. The data processing system according to claim 1, wherein the joint cache comprises a hierarchy of caches, and wherein at least one adaptable cache within the cache hierarchy is adaptable in size.

3. The data processing system according to claim 2, wherein the adaptable cache has a plurality of separately powered sections and wherein the size of the adaptable cache is controlled by disconnecting at least one separately powered section of the adaptable cache from its power supply.

4. The data processing system according to claim 2, wherein the adaptable cache has a plurality of separately clocked sections and wherein the size adaptable cache is controlled by disconnecting at least one separately clocked section of the adaptable cache from its clock supply.

5. The data processing system according to claim 2, wherein the adaptable cache has a plurality of separately powered sections and the size the adaptable cache is controlled by powering down at least one separately powered section of the adaptable cache.

6. The data processing system according to claim 2, wherein the adaptable cache has a plurality of separately powered sections and wherein the size the adaptable cache is controlled by changing the power supply of the separately powered section of the adaptable cache.

7. The data processing system according to claim 2, wherein at least one of said a hierarchy of caches is segmented in sections.

8. The multi-core processor according to claim 1, wherein at least one of the data processor core or the integrated array data processor has a dedicated 1st level data cache.

9. The data processing system according to claim 8, wherein the at least one of the data processor core or the integrated array data processor that has a dedicated 1st level data cache shares a higher cache level with at least one other of the at least one of the data processor core or the integrated array data processor.

10. The data processing system according to claim 9, wherein the one of the plurality of processing unit one of the data processor core or the integrated array data processor that has a dedicated 1st level data cache shares at least the 2nd level cache with at least one other of the plurality of processing units.

11. The data processing system according to claim 1, wherein one of the data processor core or the integrated array data processor comprises a floating point unit.

12. An integrated circuit data processor device comprising:
a data processor core having a plurality of data load units;
at least one array data processor having an array of parallel processing arithmetic execution units; and
a multi-level cache for caching instructions and data, at least one level of the multi-level cache comprising a plurality of cache slices, the multi-level cache being shared by the data processor core and the array data processor;
an instruction dispatch unit separate from the data processor core connected to the array data processor, the instruction dispatch unit configured to dispatch software threads to the array data processor for parallel execution by the parallel processing arithmetic units.

13. The integrated circuit data processor device according to claim 12, wherein the multi-level cache comprises a hierarchy of caches, and wherein at least one adaptable cache within the cache hierarchy is adaptable in size.

14. The integrated circuit data processor device according to claim 13, wherein the adaptable cache has a plurality of separately powered sections and wherein the size of the adaptable cache is controlled by disconnecting at least one separately powered section of the adaptable cache from its power supply.

15. The integrated circuit data processor device according to claim 13, wherein the adaptable cache has a plurality of separately clocked sections and wherein the size adaptable cache is controlled by disconnecting at least one separately clocked section of the adaptable cache from its clock supply.

16. The integrated circuit data processor device according to claim 13, wherein the adaptable cache has a plurality of separately powered sections and the size the adaptable cache is controlled by powering down at least one separately powered section of the adaptable cache.

17. The integrated circuit data processor device according to claim 13, wherein the adaptable cache has a plurality of separately powered sections and wherein the size the adaptable cache is controlled by changing the power supply of the separately powered section of the adaptable cache.

18. The integrated circuit data processor device according to claim 13, wherein at least one of said a hierarchy of caches is segmented in sections.

* * * * *